(12) United States Patent
Nishina et al.

(10) Patent No.: US 7,031,074 B2
(45) Date of Patent: Apr. 18, 2006

(54) ZOOM LENS, CAMERA, AND MOBILE INFORMATION TERMINAL

(75) Inventors: Kiichiro Nishina, Tokyo (JP); Hibiki Tatsuno, Tokyo (JP); Nobuaki Ono, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/117,398

(22) Filed: Apr. 29, 2005

(65) Prior Publication Data

US 2005/0195493 A1 Sep. 8, 2005

Related U.S. Application Data

(62) Division of application No. 10/804,068, filed on Mar. 19, 2004, now Pat. No. 6,924,938.

(30) Foreign Application Priority Data

| Mar. 19, 2003 | (JP) | ............................. 2003-075660 |
| Mar. 19, 2003 | (JP) | ............................. 2003-076534 |
| Mar. 19, 2003 | (JP) | ............................. 2003-076660 |
| May 2, 2003 | (JP) | ............................. 2003-126882 |

(51) Int. Cl.
   *G02B 15/14* (2006.01)
(52) U.S. Cl. ...................................... 359/690; 359/687
(58) Field of Classification Search ................ 359/687, 359/690
See application file for complete search history.

(56) References Cited

U.S. PATENT DOCUMENTS

| 4,270,848 A | 6/1981 | Angenieux ................... 359/806 |
| 4,494,828 A * | 1/1985 | Masumoto et al. .......... 359/690 |
| 4,690,518 A | 9/1987 | Kouchiwa et al. ........... 359/740 |
| 4,701,033 A * | 10/1987 | Masumoto .................... 359/686 |
| 4,738,517 A | 4/1988 | Nishina et al. .............. 359/758 |
| 4,753,522 A | 6/1988 | Nishina et al. .............. 359/775 |
| 4,836,664 A | 6/1989 | Nishina ....................... 359/740 |
| 4,997,265 A | 3/1991 | Nishina ....................... 359/679 |

(Continued)

FOREIGN PATENT DOCUMENTS

JP          6-94997          4/1994

(Continued)

*Primary Examiner*—Scott J. Sugarman
*Assistant Examiner*—M. Hasan
(74) *Attorney, Agent, or Firm*—Oblon, Spivak, McClelland, Maier & Neustadt, P.C.

(57) ABSTRACT

A first group optical system having a positive refracting power, a second group optical system having a negative refracting power, and a third group optical system having a positive refracting power are sequentially arranged from an object side toward an image side. At least the first group optical system and the third group optical system move so that a distance between the first group optical system and the second group optical system becomes minimum at short focal-length side, and a distance between the second group optical system and the third group optical system becomes minimum at long focal-length side. The third group optical system includes a triplet lens formed with a negative lens, a positive lens, and a negative lens.

12 Claims, 50 Drawing Sheets

U.S. PATENT DOCUMENTS

| | | | |
|---|---|---|---|
| 5,086,356 A * | 2/1992 | Kojima et al. | 359/686 |
| 5,124,837 A | 6/1992 | Ono | 359/423 |
| 5,225,937 A | 7/1993 | Horiuchi | 359/688 |
| 5,311,364 A | 5/1994 | Kanoshima et al. | 359/756 |
| 5,680,254 A | 10/1997 | Ueda et al. | 359/652 |
| 5,748,381 A | 5/1998 | Ono | 359/647 |
| 5,781,324 A | 7/1998 | Nishina | 359/206 |
| 6,130,768 A | 10/2000 | Ono | 359/207 |
| 6,304,388 B1 | 10/2001 | Shimo | 359/687 |
| 6,353,506 B1 | 3/2002 | Ohashi | 359/687 |
| 6,718,132 B1 | 4/2004 | Nishina | 396/72 |
| 6,747,818 B1 | 6/2004 | Ohashi et al. | 359/806 |
| 6,795,257 B1 | 9/2004 | Andoh et al. | 359/819 |
| 6,839,157 B1 | 1/2005 | Ono et al. | 359/204 |
| 6,856,335 B1 | 2/2005 | Ono | 347/115 |
| 2001/0035493 A1 | 11/2001 | Ono et al. | 250/236 |
| 2005/0185288 A1* | 8/2005 | Nishina et al. | 359/692 |
| 2005/0195492 A1* | 9/2005 | Nishina et al. | 359/687 |
| 2005/0195493 A1* | 9/2005 | Nishina et al. | 359/687 |

FOREIGN PATENT DOCUMENTS

| | | |
|---|---|---|
| JP | 10-62687 | 3/1998 |
| JP | 11-6958 | 1/1999 |
| JP | 11-109234 | 4/1999 |
| JP | 2899019 | 6/1999 |
| JP | 2920549 | 7/1999 |
| JP | 11-242157 | 9/1999 |
| JP | 11-258507 | 9/1999 |
| JP | 3091250 | 9/2000 |
| JP | 2000-275526 | 10/2000 |
| JP | 2002-72088 | 3/2002 |
| JP | 2002-133686 | 5/2002 |
| JP | 2002-156581 | 5/2002 |

* cited by examiner

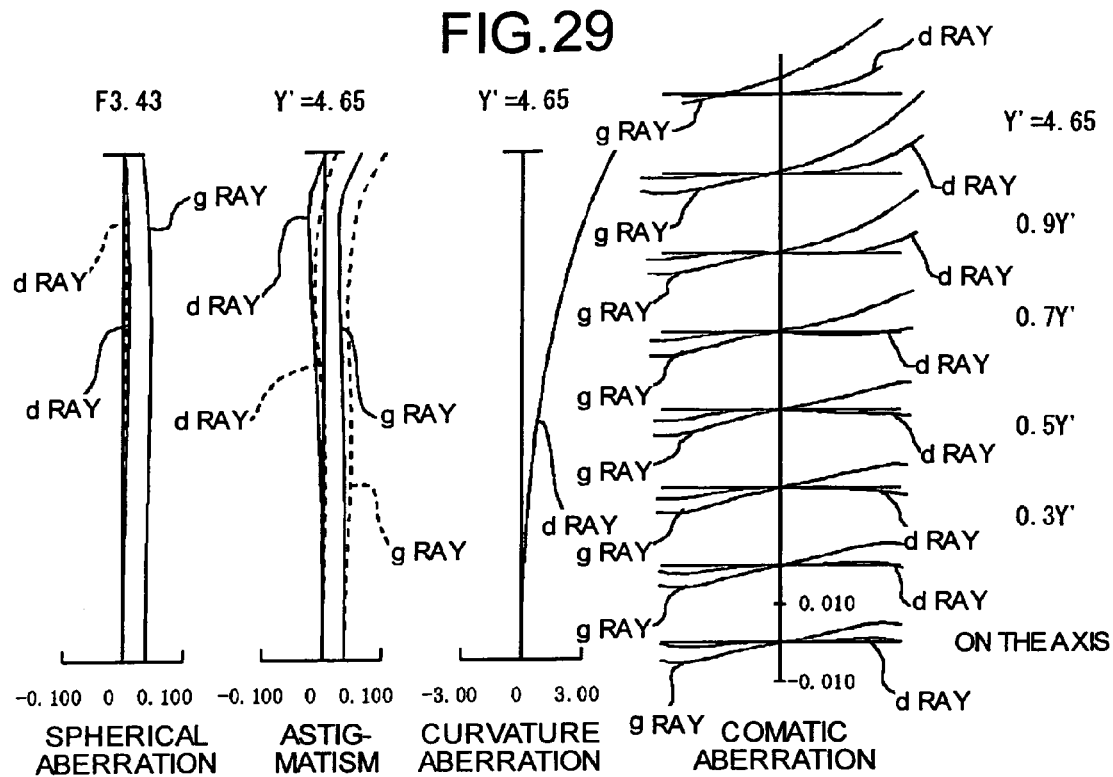
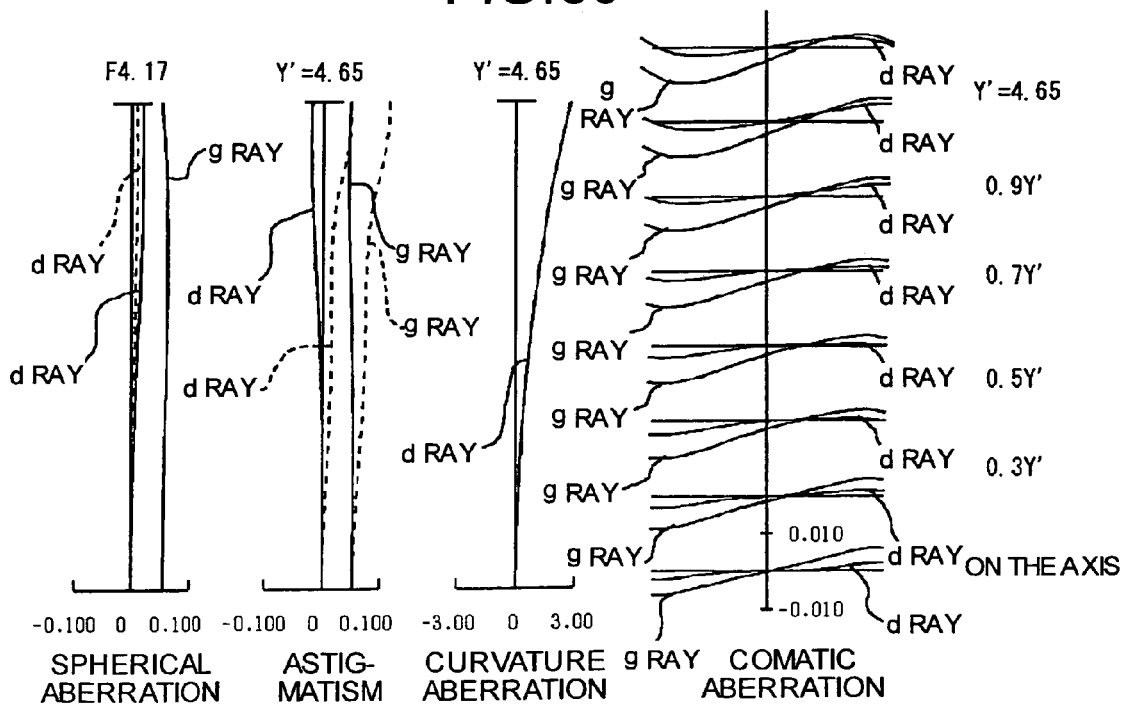

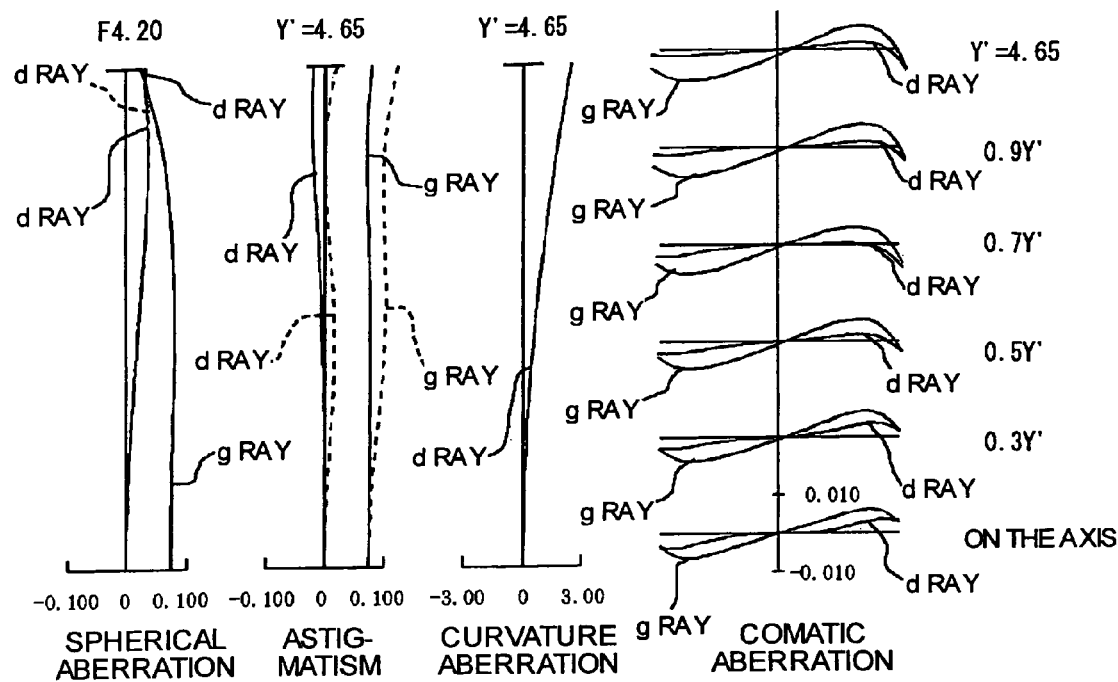
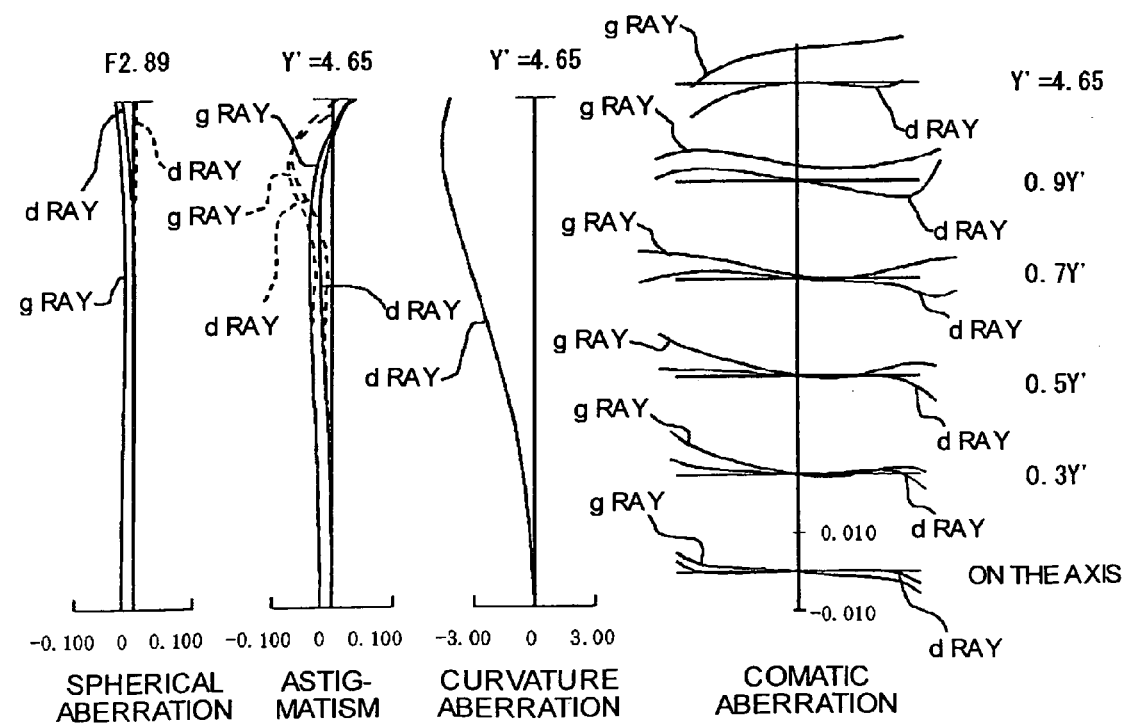

ZOOM LENS, CAMERA, AND MOBILE INFORMATION TERMINAL

CROSS-REFERENCE TO RELATED APPLICATIONS

This application is a divisional of application Ser. No. 10/804,068, filed Mar. 19, 2004, now U.S. Pat. No. 6,924,938 the entire contents of which are incorporated herein by reference. The present document incorporates by reference the entire contents of Japanese priority documents, 2003-075660, 2003-076534 and 2003-076660 filed in Japan on Mar. 19, 2003 and 2003-126882 filed in Japan on May 2, 2003.

BACKGROUND OF THE INVENTION

1) Field of the Invention

The present invention relates to a compact zoom lens suitable for a video camera and a still camera, a camera using the zoom lens as a shooting optical system, and a mobile information terminal using the zoom lens as a shooting optical system in its camera unit.

2) Description of the Related Art

Since requirements for a higher magnification, a wider angle of view, and a higher resolving power are increasing in the zoom lens for a video camera and a still camera, it is essential to reduce whole length and outer diameter of the lens, as well as the number of lenses, in order to realize small size, light weight, and low cost. As such a zoom lens, a zoom configuration has been proposed, in which a first group optical system having a positive refracting power, a second group optical system having a negative refracting power, and a third group optical system having a positive refracting power are sequentially arranged from an object side. Zooming operation is performed by increasing the interval between the first group optical system and the second group optical system, and by decreasing the interval between the second group optical system and the third group optical system, accompanying zooming from the short focal-length side to the long focal-length side.

Such type of zoom lens having a magnification exceeding 3× is disclosed, for example, in Japanese Patent Application Laid-open No. 2000-275526, Japanese Patent Application Laid-open No. H11-242157, and Japanese Patent No. 2899019.

Another zoom lens with the magnification close to 10× is disclosed, for example, in Japanese Patent Application Laid-open No. H11-109234.

However, the configurations disclosed above cannot sufficiently satisfy the requirement for a wider angle of view, since the half angle of view at the short focal-length side is as narrow as 30 degrees.

A zoom lens with the half angle of view at the short focal-length side of about 37 degrees, which corresponds to a relatively wide angle of view, is disclosed in Japanese Patent Application Laid-open No. H11-6958. However, an F value (F number) becomes F4.1 at the short focal-length side, and F5.8 at the long focal-length side, and hence the lens becomes dark. With such a dark lens, when the size of one pixel decreases, since the image capturing device such as a charge coupled device (CCD) has a high density, the performance considerably deteriorates in a high frequency domain. Therefore, it cannot satisfy the requirement for the high density sufficiently.

Japanese Patent Application Laid-open No. 2002-072088 discloses a configuration corresponding to a wide angle of view, in which the angle of view at the short focal-length side is 45 degrees or more. However, the magnification is not larger than 2×, and hence it cannot sufficiently satisfy the requirement for the high magnification.

A zoom lens miniaturized for consumer products is disclosed, for example, in Japanese Patent No. 2920549 and Japanese Patent No. 3091250, in which a first group optical system having a positive refracting power and not moving with zooming, a second group optical system having a negative refracting power and moving from an object side to an image surface side, from the wide-angle side toward the telephoto side with zooming, a third group optical system having a positive refracting power and moving from the image surface side to the object side, from the wide-angle side toward the telephoto side with zooming, and a fourth group optical system having a positive refracting power and not moving with zooming, are arranged in order from the object side to the image surface side. However, the half angle of view is only 25 degrees or less, and hence it is still not sufficient for obtaining a wide angle.

Furthermore, a zoom lens is disclosed, for example, in Japanese Patent Application Laid-open No. H6-94997, Japanese Patent Application Laid-open No. H10-62687, and Japanese Patent Application Laid-open No. H11-258507, in which the fourth group optical system in the same configuration as described above is made movable with zooming, to perform a higher degree aberration correction, realizing small size and wide angle. The zoom lens disclosed in the Japanese Patent Application Laid-open No. H6-94997 includes the whole basic configuration in this case, but does not propose a configuration requirement sufficient for achieving small size. The zoom lens disclosed in the Japanese Patent Application Laid-open No. H10-62687 aims at miniaturization by reducing the number of pieces, but sufficient aberration correction is not performed, and does not have performance that can correspond to an image capturing device with 3,000,000 to 5,000,000 pixels. The zoom lens disclosed in the Japanese Patent Application Laid-open No. H11-258507 is relatively small, and the imaging performance is better than those described above, but the half angle of view is still about 33 degrees, and hence it is still not sufficient for achieving wide angle.

There are many types of zoom lens for a digital camera. One of the conventional zoom lenses having a small size and a relatively high magnification is disclosed, for example, in Japanese Patent Application Laid-open No. 2002-133686, in which a first group optical system having a positive refracting power, i.e., a positive focal length, a second group optical system having a negative refracting power, i.e., a negative focal length, a third group optical system having a positive refracting power, a fourth group optical system having a positive refracting power, and a fifth group optical system having a positive refracting power are arranged in order from the object side. The respective lens groups are shifted at the time of zooming from the wide-angle side to the telephoto side, so that the interval between the first group optical system and the second group optical system increases; the interval between the second group optical system and the third group optical system and the interval between the third group optical system and the fourth group optical system both decrease; and the interval between the fourth group optical system and the fifth group optical system increases.

However, the magnification obtained is about 3×, which is not a sufficient value for the recent requirement for high magnification. A conventional zoom lens suitable for achieving a high magnification is disclosed, for example, in Japanese Patent Application Laid-open No. 2002-156581, in which a first group optical system having a positive refracting power, a second group optical system having a negative refracting power, a third group optical system having a positive refracting power, a fourth group optical system having a positive refracting power, and a fifth group optical system having a positive refracting power are arranged in order from the object side. A diaphragm is provided on the object side of the third group optical system; and at least the second group optical system and the fourth group optical system move with zooming from the short focal-length side to the long focal-length side. However, a magnification of about 6× can be obtained, which is still not sufficient considering the recent requirement for high magnification.

SUMMARY OF THE INVENTION

It is an object of the present invention to solve at least the problems in the conventional technology.

The zoom lens according to one aspect of the present invention includes a first group optical system having a positive refracting power, a second group optical system having a negative refracting power, a third group optical system having a positive refracting power, and a diaphragm that moves toward an object side integrally with the third group optical system. The first group optical system, the second group optical system, and the third group optical system are sequentially arranged from the object side toward an image side. At least the first group optical system and the third group optical system moves in such a manner that a distance between the first group optical system and the second group optical system becomes minimum at a short focal-length side, and a distance between the second group optical system and the third group optical system becomes minimum at a long focal-length side. The third group optical system includes a triplet lens formed by sequentially bonding a negative lens, a positive lens, and a negative lens.

The zoom lens according to another aspect of the present invention includes a first group optical system that has a positive refracting power and does not move with zooming, a second group optical system that has a negative refracting power and moves from an object side toward an image side with zooming from wide-angle side toward telephoto side, a third group optical system that has a positive refracting power and moves from the image side to the object side with zooming from the wide-angle side toward the telephoto side, and a fourth group optical system that has a positive refracting power and does not move with zooming. The first group optical system, the second group optical system, the third group optical system, and the fourth group optical system are sequentially arranged from the object side toward an image side. The third group optical system includes a triplet lens formed by sequentially bonding a negative lens, a positive lens, and a negative lens.

The zoom lens according to still another aspect of the present invention includes a first group optical system that has a positive refracting power and does not move with zooming, a second group optical system that has a negative refracting power and moves from an object side to an image side with zooming from wide-angle side toward telephoto side, a third group optical system that has a positive refracting power and moves from the image side to the object side with zooming from the wide-angle side toward the telephoto side, and a fourth group optical system that has a positive refracting power and does not move with zooming. The first group optical system, the second group optical system, the third group optical system, and the fourth group optical system are sequentially arranged from the object side toward an image side. The third group optical system includes a triplet lens formed by sequentially bonding a negative lens, a positive lens, and a negative lens, and at least one positive lens at each of the object side and the image side of the triplet lens.

The zoom lens according to still another aspect of the present invention includes a first group optical system that has a positive refracting power and does not move with zooming, a second group optical system that has a negative refracting power and moves from an object side toward an image side with zooming from wide-angle side toward telephoto side, a third group optical system that has a positive refracting power and moves from the image side to the object side with zooming from the wide-angle side toward the telephoto side, and a fourth group optical system that has a positive refracting power and moves accordingly with zooming. The first group optical system, the second group optical system, the third group optical system, and the fourth group optical system are sequentially arranged from the object side toward an image side. The third group optical system includes a triplet lens formed by sequentially bonding a negative lens, a positive lens, and a negative lens.

The zoom lens according to still another aspect of the present invention includes a first group optical system having a positive refracting power, a second group optical system having a negative refracting power, a third group optical system having a positive refracting power, a fourth group optical system having a positive refracting power, a fifth group optical system having a positive refracting power, and a diaphragm arranged at an object side of the third group optical system. The first group optical system, the second group optical system, the third group optical system, the fourth group optical system, and the fifth group optical system are sequentially arranged from the object side toward an image side. At least the second group optical system and the fourth group optical system move with zooming from short focal-length side toward long focal-length side. The second group optical system includes a triplet lens formed by sequentially bonding a negative lens, a positive lens, and a negative lens from the object side.

The camera according to still another aspect of the present invention uses the zoom lens according to the above aspects as a shooting optical system.

The mobile information terminal according to still another aspect of the present invention uses the zoom lens according to the above aspects as a shooting optical system for its camera unit.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 29 is a set of graphs for illustrating aberration characteristics of the zoom lens shown in FIG. 20 at the mean focal length;

FIG. 30 is a set of graphs for illustrating aberration characteristics of the zoom lens shown in FIG. 20 at the long focal length;

FIG. 39 is a set of graphs for illustrating aberration characteristics of the zoom lens shown in FIG. 23 at the long focal length;

FIG. 40 is a set of graphs for illustrating aberration characteristics of the zoom lens shown in FIG. 24 at the short focal length;

DETAILED DESCRIPTION

Figure 1:
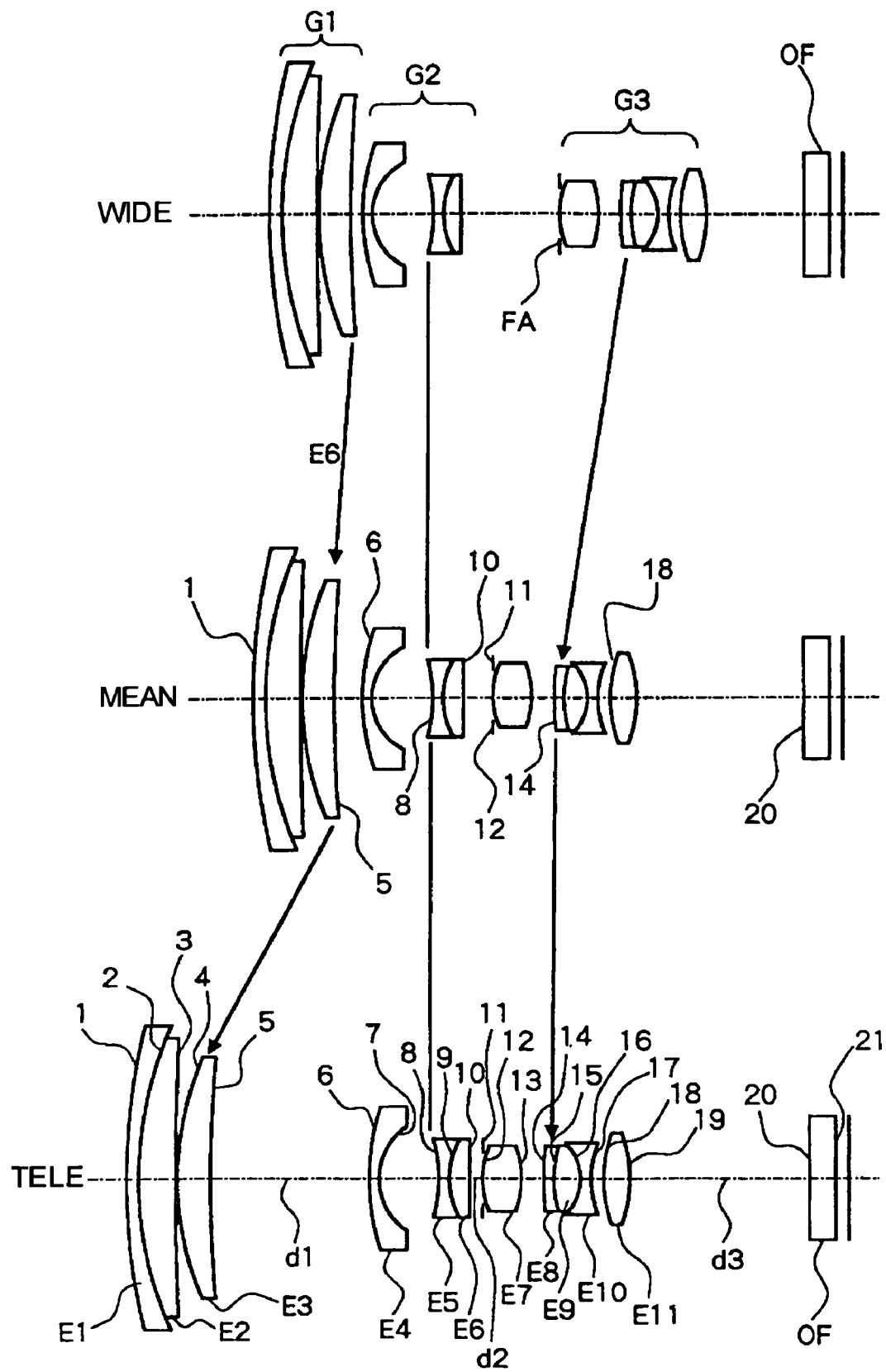
FIG. 1 is a schematic diagram of an optical system of example 1-1 of a zoom lens according to a first embodiment of the present invention.

Exemplary embodiments of a zoom lens, a camera, and a mobile information terminal according to the present invention will be explained in detail with reference to the accompanying drawings.

A first embodiment of the present invention explains the zoom lens according to the present invention. At first, a fundamental configuration of the zoom lens according to the first embodiment is explained, followed by a specific configuration of the zoom lens according to the first embodiment, by enumerating specific numerical examples as example 1-1 to example 1-7, and with reference to FIG. 1 to FIG. 15.

The zoom lens according to the first embodiment includes a first group optical system having a positive refracting power, a second group optical system having a negative refracting power, a third group optical system having a positive refracting power, and a diaphragm that moves toward an object side integrally with the third group optical system. The first group optical system, the second group optical system, and the third group optical system are sequentially arranged from the object side toward an image side. At least the first group optical system and the third group optical system moves in such a manner that a distance between the first group optical system and the second group optical system becomes minimum at a short focal-length side, and a distance between the second group optical system and the third group optical system becomes minimum at a long focal-length side. The third group optical system includes a triplet lens formed by sequentially bonding a negative lens, a positive lens, and a negative lens.

The configuration of the third group optical system in the conventional zoom lens of this type is obtained by using three lenses having positive, negative, and positive refracting powers, or four lenses having positive, positive, negative, and positive refracting powers, wherein two lenses thereof are cemented together according to need.

In the present invention, by having a configuration including a triplet having negative, positive, and negative lenses in the third group optical system, two cementing surfaces at different positions from the diaphragm are arranged, and by using the fact that the beams pass through in different ways on the axis and off the axis on the two cementing surfaces, axial and off-axis chromatic aberrations can be corrected individually to some extent. This has a large effect particularly on the correction of chromatic aberration of magnification resulting from achieving a wide angle of view. As a method for obtaining two cementing surfaces, two sets of doublets can be arranged. However, when a deviation from the optical axis occurs in the two sets of doublets due to an assembly deviation, chromatic aberration of magnification occurs asymmetrically, to cause unnatural color blur. In the case of a triplet, since the deviation from the optical axis on the two cementing surfaces can be suppressed, chromatic aberration of magnification can be corrected more favorably, as compared with the two sets of doublets.

The specific shift of each group is, for example, as in example 1-1 illustrated in FIG. 1, such that the second group optical system G2 is fixed with respect to the image surface, the first group optical system G1 moves toward the object side, from the short focal-length side (Wide) to the long focal-length side (Tele), and the third group optical system G3 moves toward the object side from the short focal-length side to the long focal-length side.

Figure 2:
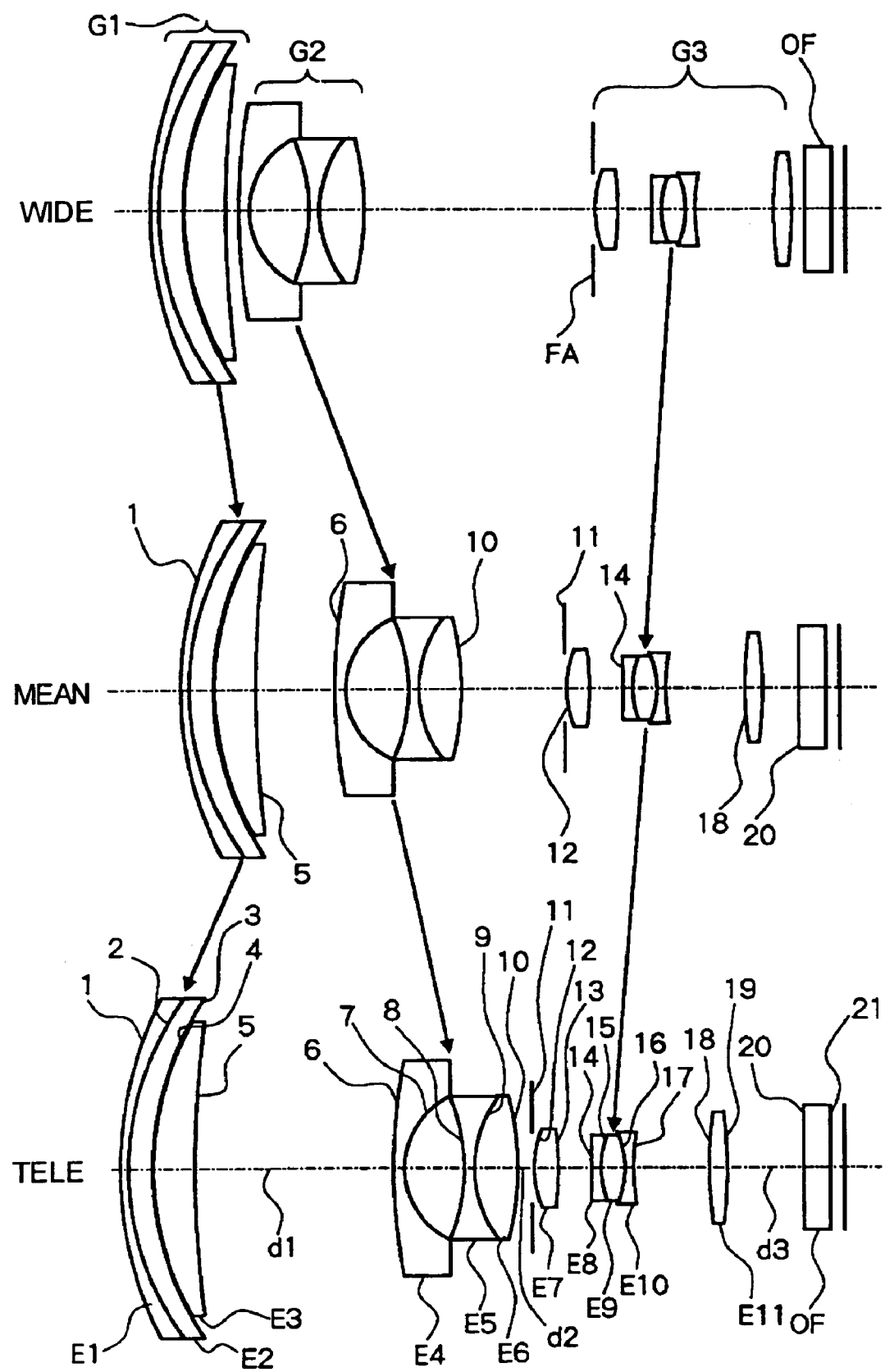
FIG. 2 is a schematic diagram of an optical system of example 1-2 of the zoom lens according to the first embodiment.
Figure 3:
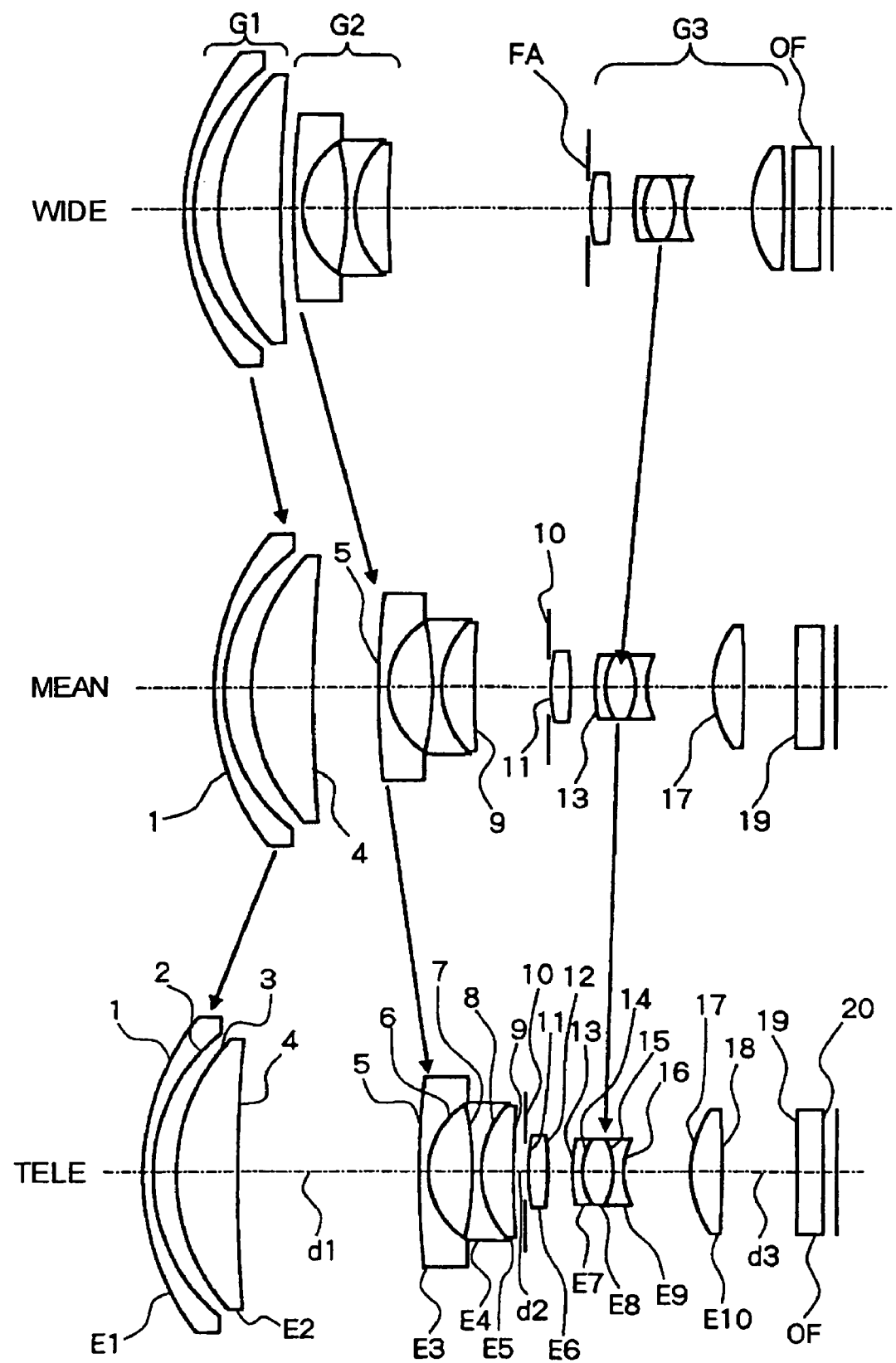
FIG. 3 is a schematic diagram of an optical system of example 1-3 of the zoom lens according to the first embodiment.
Figure 4:
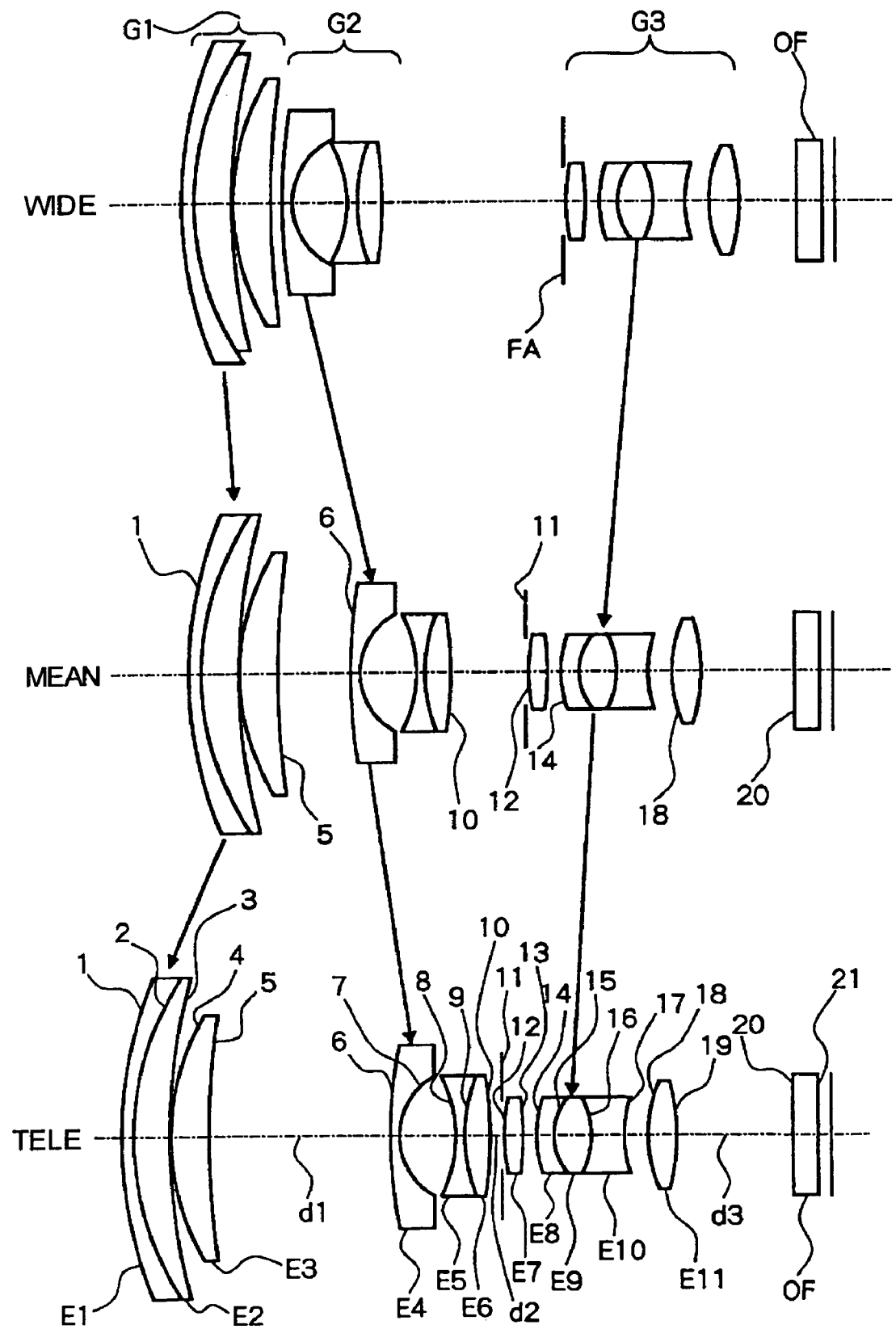
FIG. 4 is a schematic diagram of an optical system of example 1-4 of the zoom lens according to the first embodiment.

As another example, as illustrated in example 1-2 to example 1-4 illustrated in FIG. 2 to FIG. 4, the first group optical system G1 moves toward the image surface side from the short focal-length side to the mean focal length (Mean), and then toward the object side from the mean focal length to the long focal-length side. The second group optical system G2 moves toward the object side from the short focal-length side to the long focal-length side; and the third group optical system G3 moves toward the object side from the short focal-length side to the long focal-length side.

Figure 5:
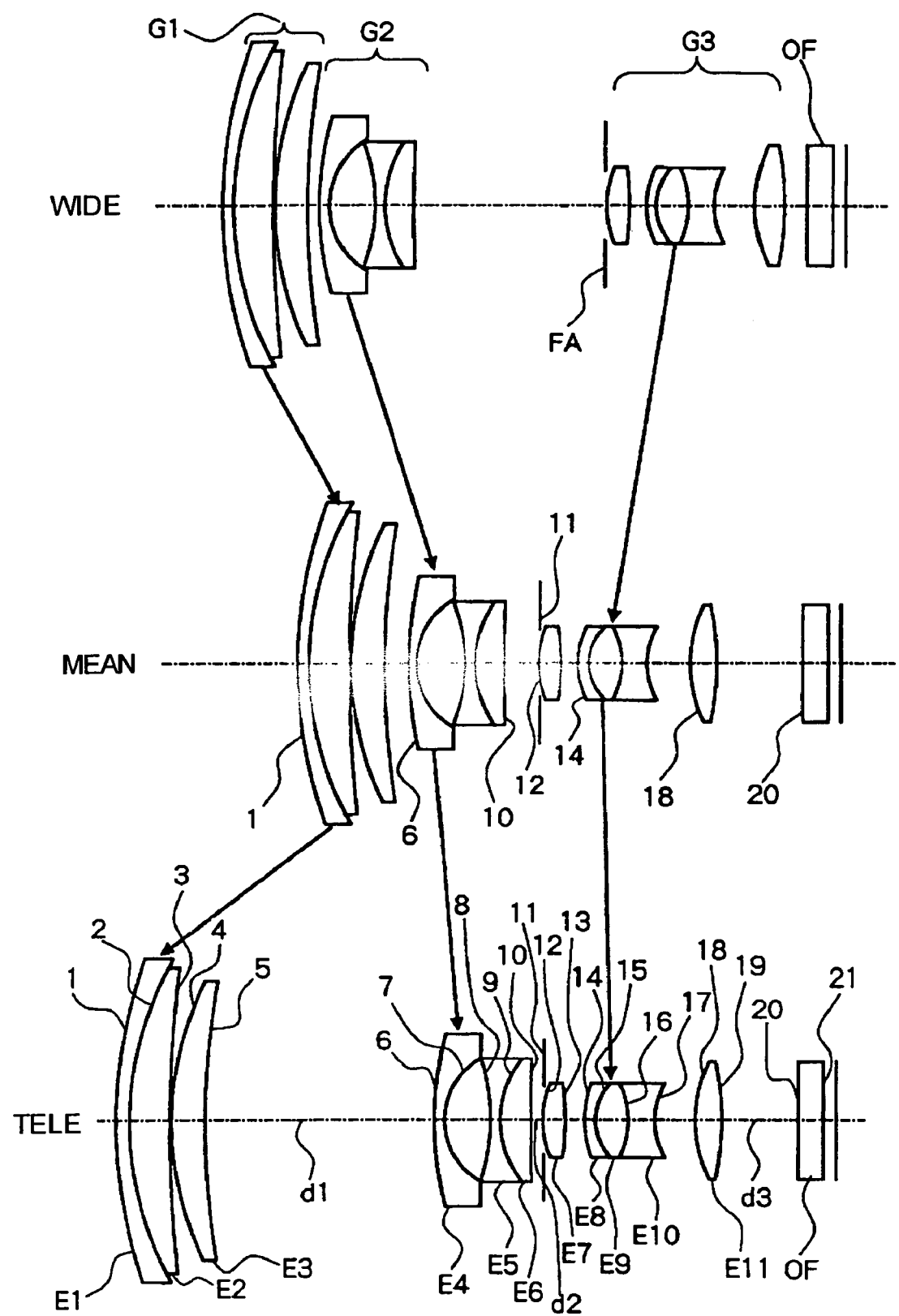
FIG. 5 is a schematic diagram of an optical system of example 1-5 of the zoom lens according to the first embodiment.

In example 1-5 illustrated in FIG. 5, the shifts of the first group optical system G1 and the second group optical system G2 are similar to those in FIG. 2 to FIG. 4, but the third group optical system G3 moves toward the object side from the short focal-length side to the mean focal length, and moves toward the image surface side from the mean focal length to the long focal-length side.

Figure 6:
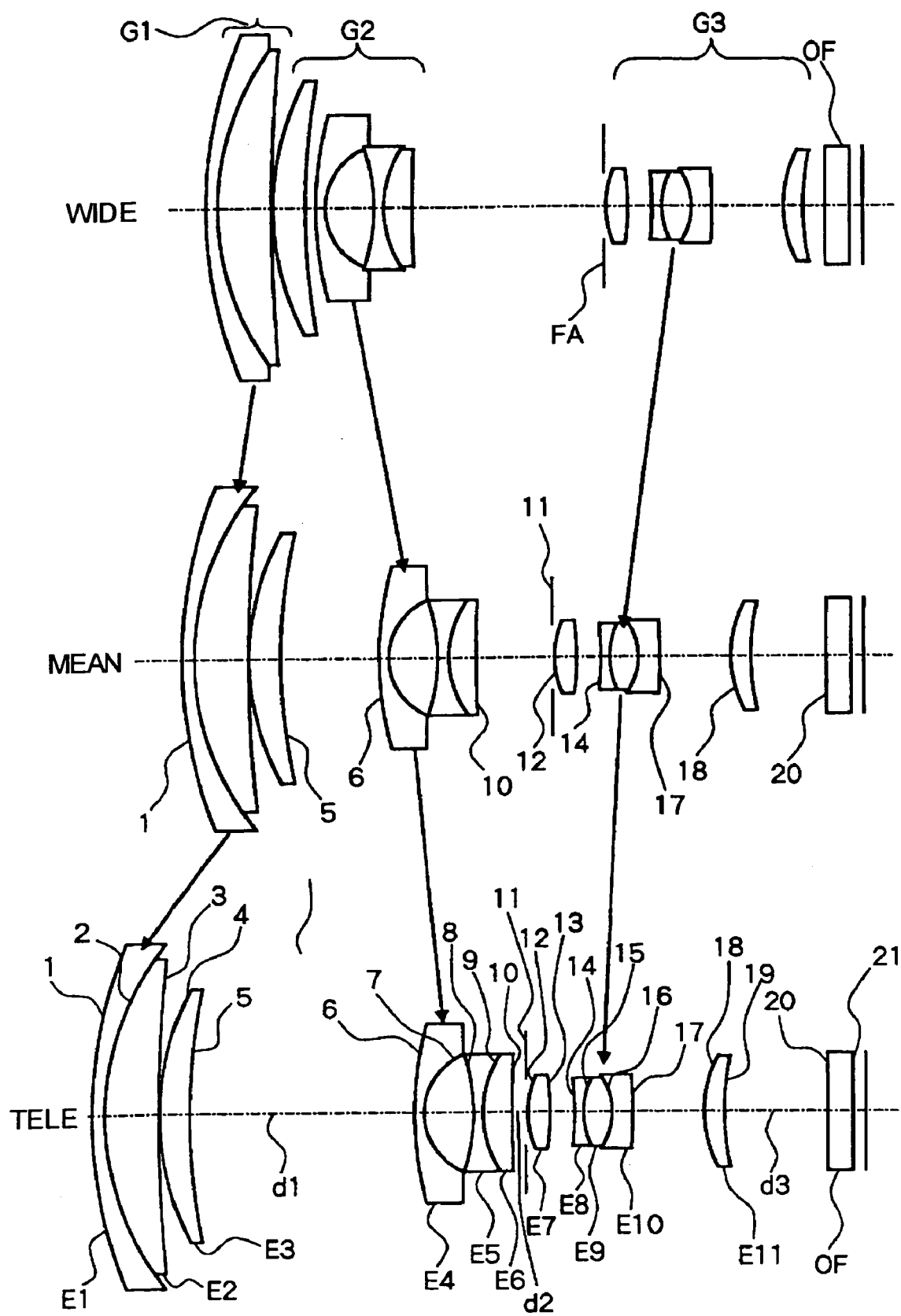
FIG. 6 is a schematic diagram of an optical system of example 1-6 of the zoom lens according to the first embodiment.
Figure 7:
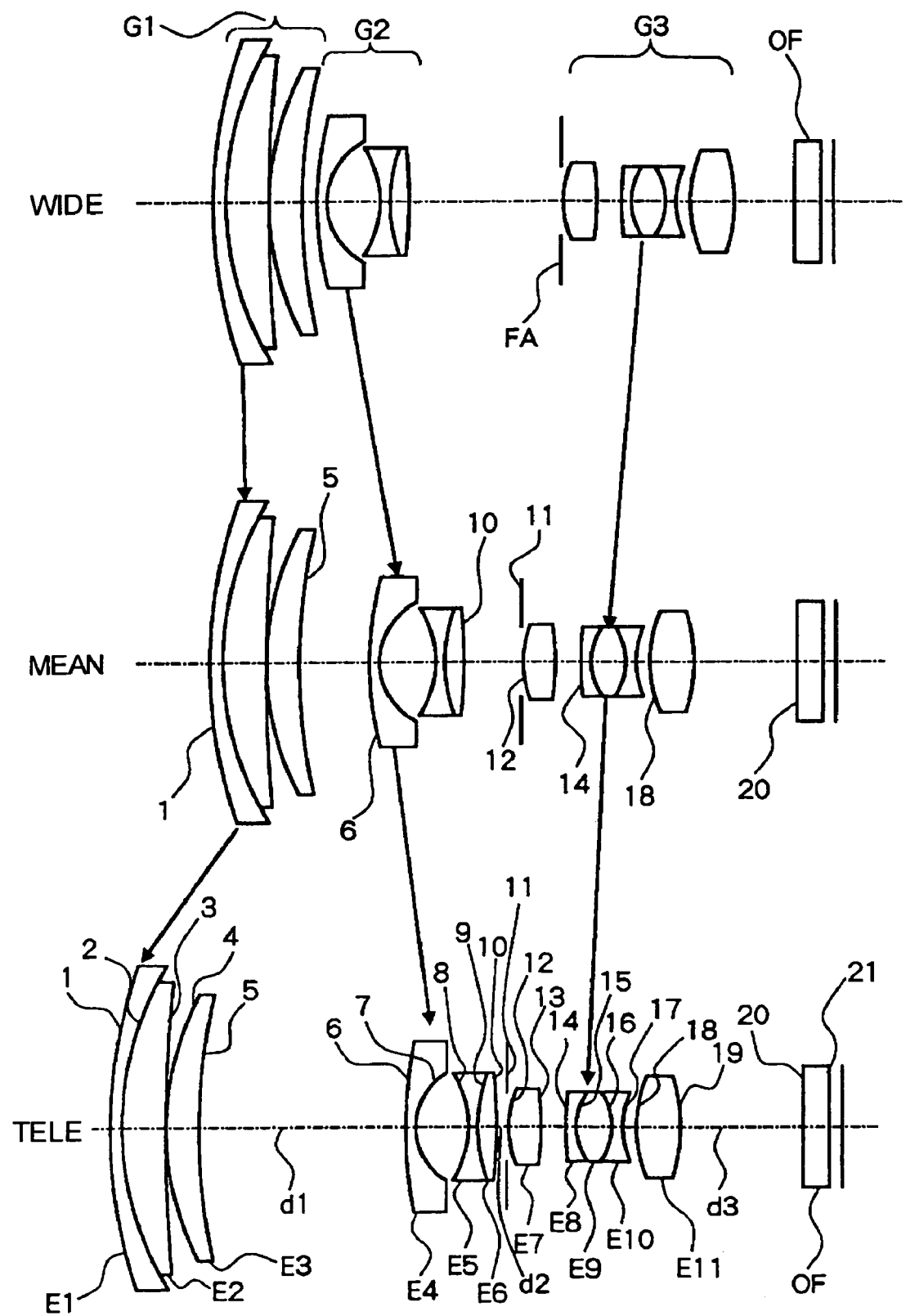
FIG. 7 is a schematic diagram of an optical system of example 1-7 of the zoom lens according to the first embodiment.

As an another example, as in example 1-6 and example 1-7 illustrated in FIG. 6 and FIG. 7, the first group optical system G1 moves toward the object side from the short focal-length side to the long focal-length side, the second group optical system G2 moves toward the image surface side from the short focal-length side to the long focal-length side, and the third group optical system G3 moves toward the object side from the short focal-length side to the long focal-length side.

In such a zoom lens, in any case of example 1-1 to example 1-7 illustrated in FIG. 1 to FIG. 7, the first group optical system G1 moves in a trajectory forming a convex shape toward the image surface side. The second group optical system G2 moves monotonously or in a trajectory slightly forming a convex shape toward the image surface side, and the third group optical system G3 moves monotonously or in a trajectory forming a convex shape toward the object side. By moving the respective groups in this manner, zooming is performed mainly by the shift of the second group optical system G2, and zooming and a variation in the image surface position accompanying zooming are corrected by the way of movement of other groups.

As in example 1-2 to example 1-4 illustrated in FIG. 2 to FIG. 4, the first group optical system G1 may be shifted to a position closest to the image surface at a focal length other than at the short focal-length side and the long focal-length side, so that the first group optical system G1 performs correction of a variation in the image surface position accompanying zooming.

The negative lens closest to the object side of the triplet including negative, positive, and negative lenses arranged in the third group optical system G3 may be arranged with a strong concave face facing the image surface side. The surface on the object side of the negative lens closest to the object side is made to have a refracting power as weak as possible, to suppress the occurrence of unnecessary aberrations, and spherical aberration and comatic aberration are corrected mainly by the surfaces on the image surface side. Preferably, the zoom satisfies a relation $$0.6 < K12/(fw+ft) < 1.2 \quad (1)$$

where K12 is changing amount of a distance between the first group optical system and the second group optical system, fw is a combined focal length of whole system at the short focal-length side, and ft is a combined focal length of the whole system at the long focal-length side.

This conditional expression (1) is for regulating a variation in the interval between the first group optical system G1 and the second group optical system G2 mainly due to zooming, and when {K12/(fw+ft)} exceeds the upper limit, the fluctuations of the first group optical system G1 and the second group optical system G2 increase. Accordingly, the zoom lens itself becomes large, and the front-cell diameter increases, and hence miniaturization cannot be achieved. On the other hand, if {K12/(fw+ft)} is smaller than the lower limit, the power of the first group optical system G1 and the second group optical system G2 becomes too strong, thereby increasing the occurrence of aberrations in the respective groups, and performance degradation due to a manufacturing error such as a deviation from the center increases. As a result, excellent imaging performance cannot be obtained. Furthermore, the zoom lens satisfies relations $$-0.22 < Np-Nn < 0 \text{ and} \quad (2)$$

$$3 < vp-vn < 36 \quad (3)$$

where Np and vp are a refractive index and an Abbe constant of the positive lens of the triplet lens, respectively, and Nn and vn are an average of refractive indexes and an average of Abbe constants of the two negative lenses of the triplet lens.

These conditional expressions (2) and (3) are for giving a condition for performing excellent correction of chromatic aberration, and when {Np−Nn} is smaller than the lower limit of the conditional expression (2), or {vp−vn} exceeds the upper limit of the conditional expression (3), excellent ability for correcting chromatic aberration can be obtained, but the glass material of the positive lens becomes very expensive. On the contrary, when {Np−Nn} exceeds the upper limit of the conditional expression (2), or {vp−vn} is smaller than the lower limit of the conditional expression (3), it becomes difficult to maintain the balance between on-axis chromatic aberration and other aberrations favorably, and particularly, on-axis chromatic aberration at the long focal-length side increases, and the ability for correcting chromatic aberration on the cementing surface on the object side considerably deteriorates.

The third group optical system further includes at least one positive lens at each of the object side and the image side of the triplet lens. Since the triplet has two strong concave surfaces, it is necessary to arrange a positive refracting power opposing the negative refracting power thereof. By arranging a positive lens both on the object side and the image surface side of the triplet, the third group optical system G3 has a configuration of positive, negative, positive, negative, and positive, and the well-balanced refracting power can be arranged. As a result, the occurrence of aberrations on one lens surface can be effectively suppressed, and performance degradation due to a manufacturing error, such as a deviation from the center, can be also suppressed.

At least one positive lens from among the positive lenses arranged at the object side and the image side of the triplet lens is an aspheric lens. By forming an aspheric surface on at least one of the positive lenses arranged on the object side and the image surface side of the triplet in the third group optical system G3, the whole length of the third group optical system G3 can be reduced. When the aspheric surface is formed on the lens on the object side, since the aspheric surface is arranged at a position close to the diaphragm, it is effective mainly for correction of spherical aberration and comatic aberration. When the aspheric surface is formed on the lens on the image surface side, since the aspheric surface is arranged at a position away from the diaphragm, it can be arranged at a position where the beams on the axis and off the axis are separated, and hence it is effective mainly for correction of astigmatism.

Furthermore, each of the first group optical system and the second group optical system includes at least one positive lens and one negative lens. In order to obtain high-performance lens, it is necessary to suppress the respective aberrations. In order to favorably correct the respective aberrations, it is necessary to increase the number of lenses to some extent, to suppress the occurrence of aberrations in each lens. However, when the number of lenses increases, each group becomes thick, and hence miniaturization of the whole zoom lens cannot be achieved, and the mechanism becomes complicated, thereby causing a cost increase in production and the like. Therefore, the zoom lens according to the present invention has a configuration such that the first group optical system G1 and the second group optical system G2 include at least one positive lens and negative lens, which is a minimum requirement for correcting aberrations. Specifically, the first group optical system G1 has a triple configuration of negative, positive, and positive lenses, or a double configuration of negative and positive lenses, and the second group optical system G2 has a triple configuration of negative, negative, and positive lenses. In order to favorably maintain the imaging performance with such a configuration of a fewer lenses, it is further desired to provide at least one aspheric surface in the first group optical system G1 or the second group optical system G2.

A camera according to a second embodiment of the present invention uses the zoom lens according to the first embodiment as the shooting optical system.

The camera according to the second embodiment is for recording an image of a subject via the zoom lens according to the present invention. By employing the zoom lens in a film camera, a digital still camera, or a digital video camera, a compact camera of an electric power saving type, which can obtain a high variable power and high image quality, can be obtained. Further, it is desired that the light-receiving image capturing device that receives light of the subject image by the zoom lens have 3,000,000 pixels or more. As the number of pixels increases, the light-receiving image capturing device can improve the recording density of the subject image. Therefore, by having 3,000,000 pixels or more, even when the subject image recorded by the camera of the present invention is printed out, an output image having the quality the same as that of the conventional film camera or higher can be obtained.

Figure 16:
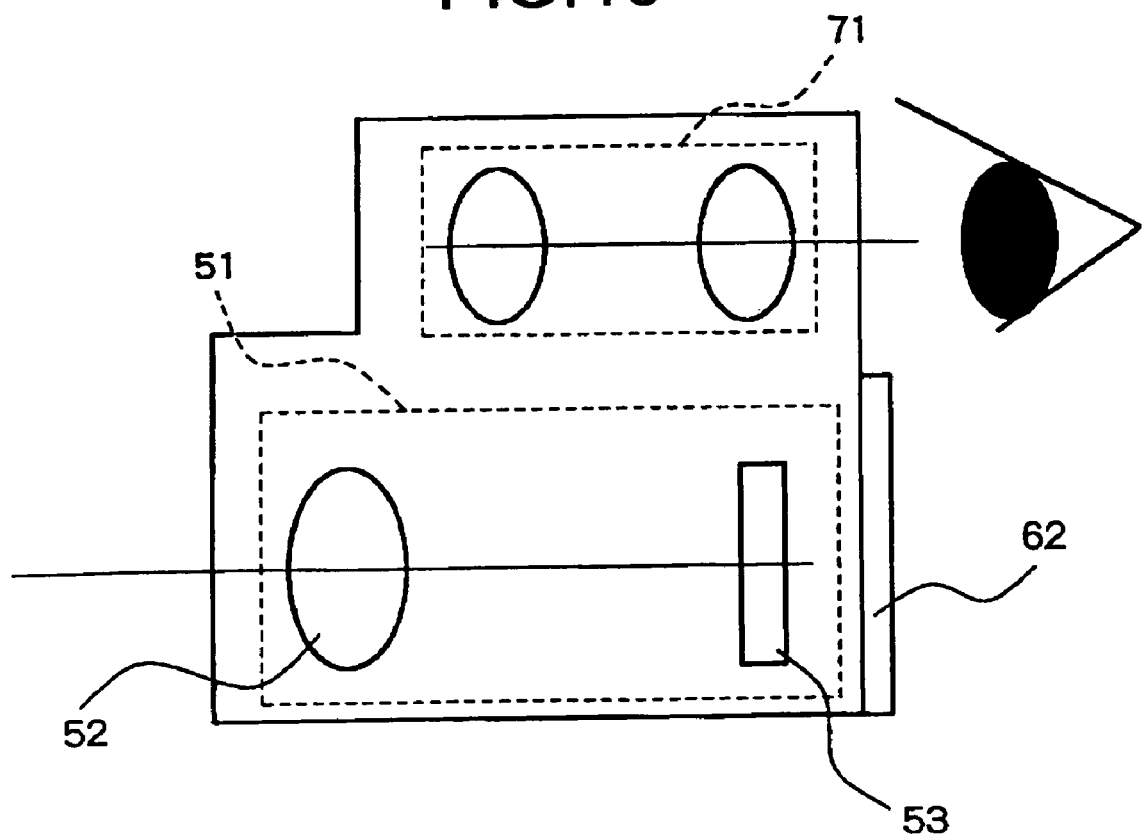
FIG. 16 is a schematic diagram of a digital camera according to a second embodiment of the present invention, which has a range-finder-type optical finder.

FIG. 16 is a schematic diagram of a digital camera according to a second embodiment of the present invention, which has a range-finder-type optical finder. An image capturing device 51 includes a shooting zoom optical system 52 that captures a subject optically to image the subject image, and a solid image capturing device 53, such as a CCD image capturing device that photoelectrically exchanges the subject image imaged by the shooting zoom optical system 52. Further, according to need, a finder optical system 71 of a range finder type for visually checking the shooting range of the subject.

Figure 18:
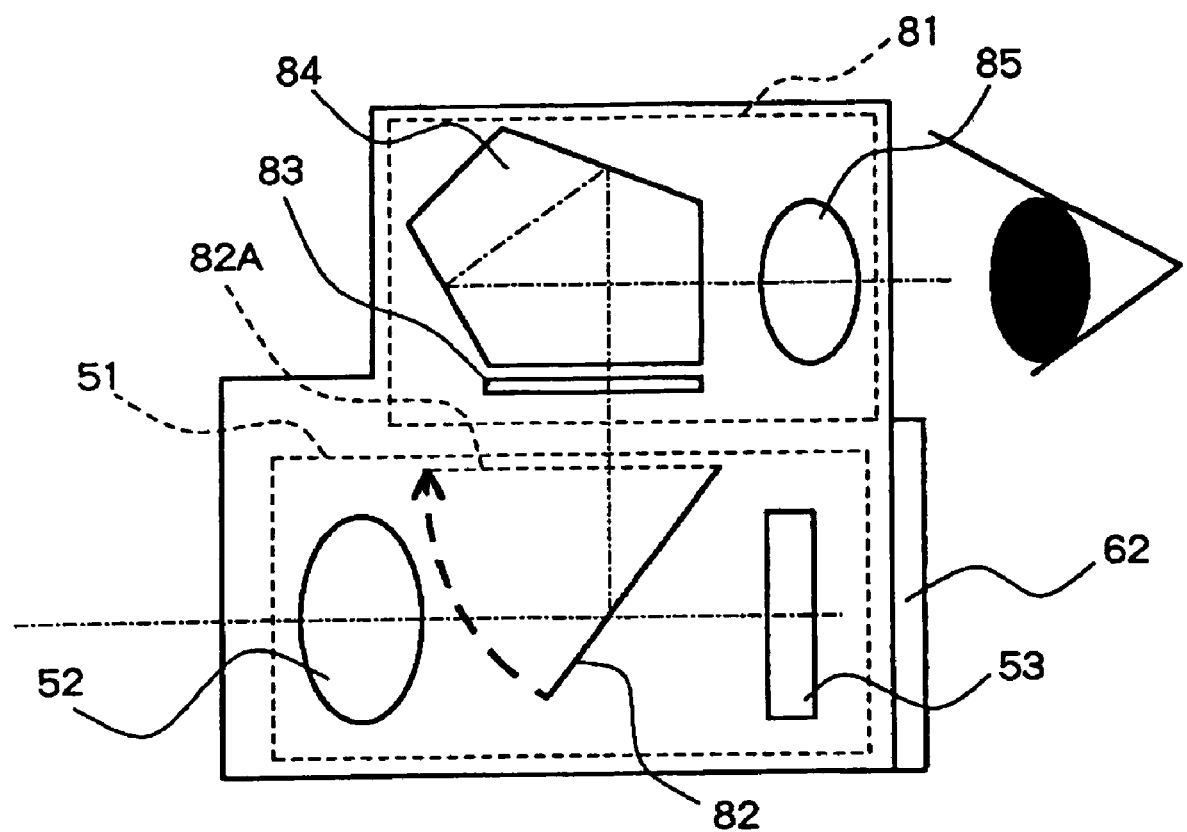
FIG. 18 is a schematic diagram of a digital camera according to a third embodiment of the present invention, which has a single-lens reflex-type optical finder.

FIG. 18 is a schematic diagram of a digital camera having a single-lens reflex-type optical finder. The image capturing device 51 includes a shooting zoom optical system 52 that captures a subject optically to image the subject image, and a solid image capturing device 53, such as a CCD image capturing device that photoelectrically exchanges the subject image imaged by the shooting zoom optical system 52, as in the example illustrated in FIG. 16. In this case, a finder optical system 81 of a single-lens reflex type is used for visually checking the shooting range of the subject. In other words, the finder optical system 81 includes a movable reflex mirror 82, which is inserted in a subject image imaging optical path in the shooting zoom optical system 52, at the time of visually checking the shooting range, to deflection-reflect the optical path to guide it to a finder optical path, and at the time of shooting, is evacuated (82A) from the subject image imaging optical path in the shooting zoom optical system 52, a focusing screen 83 for imaging the subject image at the time of visually checking the shooting range, a pentaprism 84 for forming a bent finder optical path for observing the imaging state of the focusing screen 83, and an eyepiece 85 for observing the image on the focusing screen 83 guided by the pentaprism 84 as an actual image.

The shooting zoom optical system 52 is formed by using a zoom lens corresponding to any of the examples according to the first embodiment, and a solid image capturing device 53 is arranged at a predetermined position at the back thereof, via a shutter of a focal plane type or the like (not shown).

Figure 17:
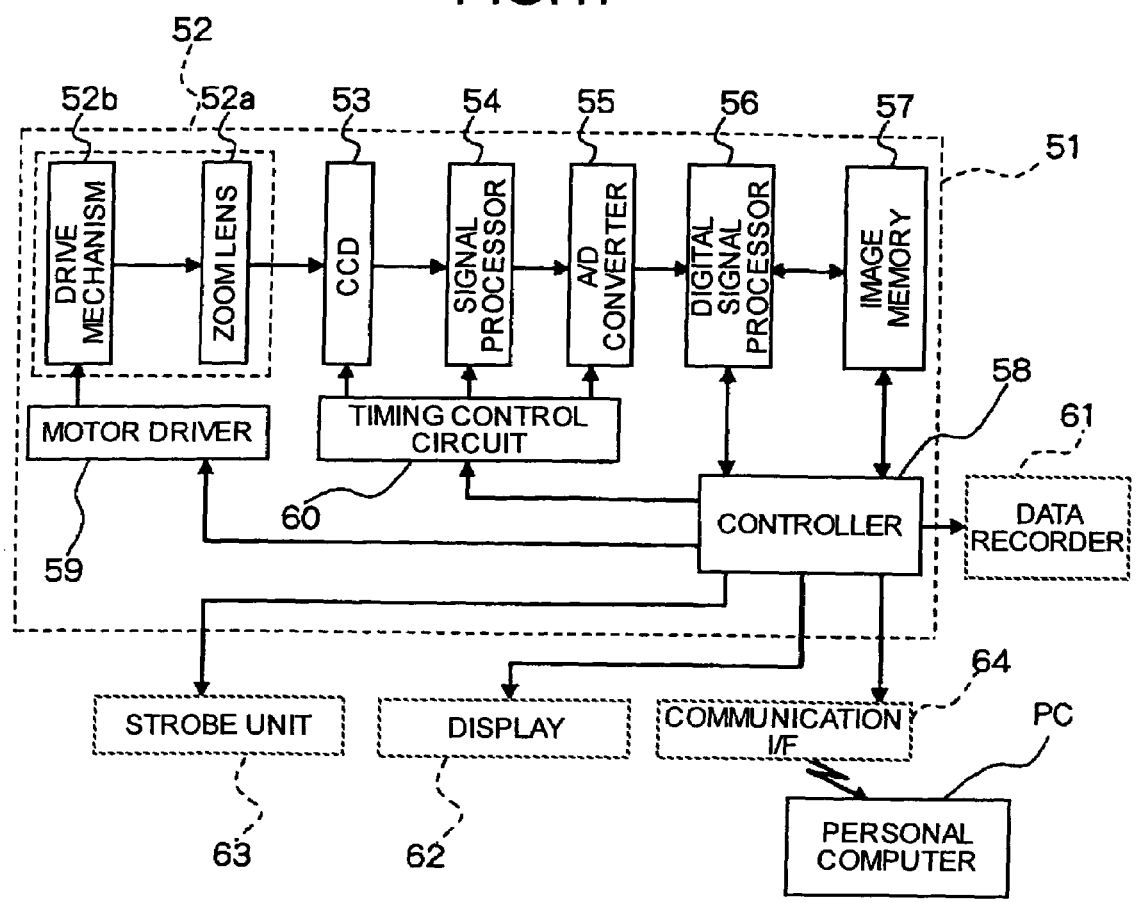
FIG. 17 is a block diagram of a digital camera or a mobile information terminal according to the second embodiment.

The configuration of one example of the control system in the image capturing device 51 in the camera according to the second and the third embodiments is illustrated in FIG. 17. The shooting zoom optical system 52 includes a shooting zoom lens 52a corresponding to any of the examples according to the first embodiment, and a mechanical drive mechanism 52b that mechanically drives the shooting zoom lens 52a. The mechanical drive mechanism 52b includes, for example, an auto focus mechanism, a mechanical shutter mechanism, and a zoom mechanism that changes the intervals between the zoom lens groups.

The subject image guided by the optical system is imaged on the solid image capturing device 53, and photoelectrically exchanged after the colors are separated by a filter (not shown) arranged on the solid image capturing device 53, and output as an analog image signal of R (red), G (green), and B (blue). The output analog signal is subjected to noise reduction in the image signal by a correlated double sampling (CDS) circuit, and adjustment of the image signal level by an auto gain control (AGC) circuit, in a signal processor 54. The signal having passed through the signal processor 54 enters into an analog-to-digital (A/D) converter 55, where the analog image data is converted to digital image data having an optimum sampling frequency. The digital image data is subjected to digital signal processing including white balance adjustment for adjusting the gain of the respective R and G signals, and image processing such as processing for separating the digital image data to color difference and luminance in a digital signal processor 56. The image data digitalized by the digital signal processor 56 is temporarily stored in an image memory 57.

A controller 58 has a central processing unit (CPU), a read only memory (ROM), a random access memory (RAM), and the like. According to a program stored in the ROM, the CPU operates, using the RAM as a work area, to perform control of the whole system. For example, a motor driver 59 for driving and operating the mechanical drive mechanism 52b operates based on a control signal from the controller 58, to drive the mechanical drive mechanism 52b in the zoom optical system 52. A timing control circuit 60 controls generation of a drive control signal with respect to the solid image capturing device 53, signal processing, and the timing of the A/D conversion in the A/D converter 55.

When a camera is constructed by using the above configuration, for example as illustrated in FIG. 17, a data recorder 61 for recording the shot image, for example by using media such as a flash memory card is provided in addition to the image capturing device 51, and further according to need, a display 62 that displays the shooting range by a liquid crystal display (LCD) or the like is provided.

Further, in order to shoot a dark subject, a strobe unit 63 may be equipped, and when a dark subject is shot under an insufficient quantity of light, an adequate shooting becomes possible by illuminating the subject by the strobe unit 63.

A mobile information terminal according to a third embodiment of the present invention uses the zoom lens according to the first embodiment as a shooting optical system in its camera unit. In the third embodiment, the mobile information terminal is formed, in which the functional configuration similar to that of the camera in the second embodiment is incorporated as the camera unit. In other words, the zoom lens according to the first embodiment is used in the camera unit included in the mobile information terminal, as the shooting zoom optical system. The configuration similar to that of the camera described with reference to FIG. 16 and FIG. 17 is incorporated to constitute the mobile information terminal.

FIG. 18 is a schematic diagram of a digital camera according to a third embodiment of the present invention, which has a single-lens reflex-type optical finder The mobile information terminal further includes a communication interface (I/F) 64 for transmitting image data shot and recorded by the camera to a personal computer PC or the like via a communication system, in addition to the configuration of the camera as illustrated in FIG. 18, to constitute the camera unit.

In such a mobile information terminal, the mobile information terminal can be made considerably small, by using the camera as a built-in camera unit, thereby obtaining high quality recorded data.

A fourth embodiment of the present invention explains the zoom lens according to the present invention. At first, a fundamental configuration of the zoom lens according to the fourth embodiment is explained, followed by a specific configuration of the zoom lens according to the fourth embodiment, by enumerating specific numerical examples as example 2-1 to example 2-6, and with reference to FIG. 1 to FIG. 42.

In the zoom lens according to the fourth embodiment, a first group optical system having a positive refracting power, a second group optical system having a negative refracting power, a third group optical system having a positive refracting power, and a fourth group optical system having a positive refracting power are sequentially arranged from the object side toward the image surface, that is, four group optical systems of positive-negative-positive-positive are arranged. In the configuration of a certain zoom lens, the second group optical system moves from the object side to the image surface side, and the third group optical system moves from the image surface side to the object side, accompanying zooming from the wide-angle side toward the telephoto side.

In the configuration of another zoom lens according to the fourth embodiment, the second group optical system moves from the object side to the image surface side, and the third group optical system moves from the image surface side to the object side, accompanying zooming from the wide-angle side toward the telephoto side, and the fourth group optical system also moves. This fourth group optical system is a group optical system that mainly performs a role of correcting the shift of the image surface, with the shifts of the second and the third group optical systems. In order to realize a zoom lens having less various aberrations and having a high resolving power, aberration fluctuation due to zooming should be suppressed, and particularly, it is necessary that aberration correction of the third group optical system, which takes responsibility of zooming action, or two actions, that is, zooming and image surface correction, is performed favorably over the whole area of the zooming range. Further, in order to achieve a wide angle of view at the wide-angle side, it is necessary to reduce the chromatic aberration of magnification, which increases with achievement of the wide angle of view. In order to correct this favorably in the whole area of the zooming range, the configuration of the third group optical system is important.

Conventionally, as the configuration of the third group optical system, one having a two-piece configuration in which a positive lens and a negative lens are sequentially arranged from the object side to the image surface side, one having a three-piece configuration in which a positive lens, a negative lens, and a positive lens are sequentially arranged, and one having a three-piece configuration in which a positive lens, a positive lens, and a negative lens are sequentially arranged are known. However, the present invention is for realizing the third group optical system having an aberration correction ability exceeding these. Namely, in the zoom lens according to the fourth embodiment, the third group optical system has a configuration including a triplet obtained by cementing a negative lens, a positive lens, and a negative lens. The two cementing surfaces have different distances from the diaphragm, and the way of passage of the beams on the axis and off the axis is also different. The on-axis chromatic aberration and the chromatic aberration of magnification can be corrected independently to some extent, by such two cementing surfaces, and as a result, it is effective for correction of chromatic aberration of magnification, which increases with achievement of a wide angle of view. In order to provide two cementing surfaces, it can be considered to use two sets of cemented lenses, but when the optical axes of the two cemented lenses are deviated from each other, due to a deviation at the time of assembly, chromatic aberration of magnification occurs asymmetrically off the axis, and as a result, unnatural color blur is likely to occur.

On the other hand, when the triplet is used as described above, a deviation at the time of assembly does not occur on the two cementing surfaces, and chromatic aberration of magnification can be reduced sufficiently in the actual configuration.

In order to perform more sufficient correction of aberrations, the negative lens of the triplet arranged closest to the object side in the third group optical system is desirably in a meniscus shape with the concave facing the image side. The surface on the object side of the negative lens is a convex surface so as to prevent occurrence of unnecessary aberrations, without largely refracting the incident beams, and the image surface side of the negative lens is a strong concave, so as to mainly perform correction of spherical aberration and comatic aberration. Further, in order to perform sufficient correction of aberrations, it is desired that the negative lens of the triplet arranged closest to the image side in the third group optical system have a strong concave facing the image side. The surface on the image side of the negative lens is a strong concave, so as to perform secondary correction of spherical aberration and comatic aberration, and also contribute to the correction of astigmatism.

Further, it is desired to satisfy the following conditional expressions in order to perform favorable correction of chromatic aberration.

$$1.45 < N_{c2} < 1.52 \quad (4)$$

$$68 < v_{c2} < 85 \quad (5)$$

where $N_{c2}$ and $v_{c2}$ respectively denote a refractive index and an Abbe constant of the positive lens arranged in the middle of the triplet in the third group optical system. If $N_{c2}$ is not smaller than 1.52, and $v_{c2}$ is not larger than 68, it becomes difficult to balance the on-axis chromatic aberration against other aberrations, and particularly, the on-axis chromatic aberration at the long focal-length side is likely to occur. In this case, the correction effect of monochromatic aberration on the cementing surface on the object side cannot be obtained sufficiently. On the other hand, if $N_{c2}$ is not larger than 1.45, and $v_{c2}$ is not smaller than 85, it is advantageous in view of the correction of aberrations, but such a glass material is expensive, thereby causing an unnecessary cost increase.

In order to correct the chromatic aberration of magnification more favorably, it is desired to satisfy the following conditional expressions.

$$1.60 < N_{c1} < 1.95 \quad (6)$$

$$20 < v_{c1} < 40 \quad (7)$$

$$1.60 < N_{c3} < 1.95 \quad (8)$$

$$20 < v_{c3} < 40 \quad (9)$$

where $N_{c1}$ and $v_{c1}$ respectively denote a refractive index and an Abbe constant of the negative lens of the triplet arranged closest to the object side in the third group optical system, and $N_{c3}$ and $v_{c3}$ respectively denote a refractive index and an Abbe constant of the negative lens of the triplet arranged closest to the image side in the third group optical system. By satisfying these conditional expressions, together with the conditional expressions relating to $N_{c2}$ and $v_{c2}$, the on-axis chromatic aberration can be balanced against the chromatic aberration of magnification, and particularly, the chromatic aberration of magnification at the short focal-length side can be reduced. At this time, the corrected state of monochromatic aberration can be also maintained favorably.

In order to further improve the monochromatic aberration, it is desired to satisfy the following conditional expression.

$$0.25 < (R_{c2}/R_{c4}) < 1.25 \quad (10)$$

where $R_{c2}$ denotes a radius of curvature of the cementing surface on the object side of the triplet in the third group optical system, and $R_{c4}$ denotes a radius of curvature of the surface closest to the image side of the triplet in the third group optical system. If $(R_{c2}/R_{c4})$ is not smaller than 1.25, the spherical aberration at the long focal-length side is likely to occur largely in the positive direction, thereby causing deterioration in the image contrast. On the other hand, if $(R_{c2}/R_{c4})$ is not larger than 0.25, the correction ability of astigmatism and curvature of field becomes insufficient, thereby causing deterioration in flatness of the image surface, over the whole area of the zooming range.

In the zoom lens according to the fourth embodiment, it is further desired that the third group optical system have a triplet including a negative lens, a positive lens, and a negative lens, and positive lenses provided at least one each respectively on the object side and the image side of the triplet. The triplet has two concaves having a strong negative refracting power, and in order to pull out the aberration correction ability thereof sufficiently, it is necessary to arrange a positive refracting power against it. If a positive lens is respectively arranged on the object side and the image side of the triplet, the third group optical system has a configuration of positive-negative-positive-negative-positive, thereby having a good balance as the arrangement of the refracting power. By having such an arrangement, occurrence of excessive aberrations can be prevented on one lens surface, and deterioration in development due to a manufacturing error such as a deviation can be suppressed.

Further, in order to make the third group optical system small, and particularly, to reduce the whole length thereof, it is effective to use an aspheric surface in the third group optical system. At this time, the aspheric surface is preferably provided either one or both of the positive lenses arranged on the object side and the image side of the triplet. The positive lens on the object side is close to the diaphragm, and is effective mainly for the correction of spherical aberration and comatic aberration. The positive lens on the image side is away from the diaphragm, and off-axis beams pass through, being separated from each other to some extent. Therefore, it is effective for the correction of astigmatism, as well as correction of spherical aberration and comatic aberration.

In the zoom lens according to the fourth embodiment, a configuration in which the fourth group optical system is shifted can be considered. By adopting such a configuration, and considering various movements associated with the third group optical system, a higher magnification, a wider angle of view, and miniaturization can be achieved.

A fifth embodiment of the present invention explains the zoom lens according to the present invention. At first, a fundamental configuration of the zoom lens according to the fifth embodiment is explained, followed by a specific configuration of the zoom lens according to the fifth embodiment, by enumerating specific numerical examples as example 3-1 to example 3-4, and with reference to FIG. 43 to FIG. 58.

The zoom lens according to the fifth embodiment includes a first group optical system G1 having a positive focal length, a second group optical system G2 having a negative focal length, a third group optical system G3 having a positive focal length, a fourth group optical system G4 having a positive focal length, and a fifth group optical system G5 having a positive focal length, arranged in order from the object side to the image surface side. A diaphragm FA is provided on the object side of the third group optical system, and at least the second group optical system and the fourth group optical system move, accompanying zooming from the short focal-length side toward the long focal-length side. Further, the zoom lens is formed in various modes having features described below.

The zoom lens according to a first mode is such that the second group optical system G2 includes a triplet including a negative lens, a positive lens, and a negative lens in order from the object side toward the image surface side. The zoom lens according to a second mode is such that the negative lens arranged closest to the object side of the triplet in the second group optical system G2 is a double-concave lens.

The zoom lens according to the third mode is such that, in the zoom lens in the first mode, the negative lens arranged closest to the object side of the triplet in the second group optical system G2 is a double-concave lens.

The zoom lens according to the fourth mode is such that, in the zoom lens in the first mode, when it is assumed that the refractive index and the Abbe constant of the positive lens arranged in the middle of the triplet in the second group optical system G2 are respectively $N_{c2}$ and $v_{c2}$, the following conditional expressions are satisfied.

$$1.70 < N_{c2} < 1.90 \quad (11)$$

$$20 < v_{c2} < 40 \quad (12)$$

The zoom lens according to the fifth mode is such that, in the zoom lens in the fourth mode, when it is assumed that the refractive index and the Abbe constant of the negative lens arranged closest to the object side of the triplet in the second group optical system G2 are respectively $N_{c1}$ and $v_{c1}$, and the refractive index and the Abbe constant of the negative lens arranged closest to the image surface side of the triplet in the second group optical system G2 are respectively $N_{c3}$ and $v_{c3}$, the following conditional expressions are satisfied.

$$N_{c1} < 1.62 \quad (13)$$

$$55 < v_{c1} \quad (14)$$

$$1.65 < N_{c3} \quad (15)$$

$$v_{c3} < 40 \quad (16)$$

The zoom lens according to the sixth mode is such that, in the zoom lens in the first mode, when it is assumed that a radius of curvature of a cementing surface on the object side of the triplet in the second group optical system G2 is $R_{c2}$, and a radius of curvature of a surface closest to the image surface side of the triplet in the second group optical system is $R_{c4}$, the following conditional expression is satisfied.

$$0.2 < (R_{c2}/R_{c4}) < 0.4 \quad (17)$$

The zoom lens according to the seventh mode is such that, in the zoom lens in the first mode, the surface closest to the object side in the second group optical system is aspherical.

In the zoom lens formed of five groups of positive-negative-positive-positive-positive, such as the zoom lens according to the fifth embodiment, generally, the second group optical system G2 monotonously moves from the object side to the image surface side, accompanying zooming from the short focal-length side toward the long focal-length side, and the fourth group optical system G4 moves so as to correct a change in the image surface position accompanying zooming. The zooming function is the responsibility of the second group optical system G2, and the fifth group optical system G5 is mainly provided for keeping an exit pupil from the image surface.

In such a zoom lens, in order to further reduce the size, it is necessary to strengthen the power of the respective group optical systems, particularly, the power of the second group optical system G2, being a zooming group. Therefore, in the second group optical system G2, excellent correction of aberrations should be performed. In the zoom lens according to the fifth embodiment, the second group optical system G2 has a configuration including a triplet including a negative lens, a positive lens, and a negative lens, in order to perform excellent correction of aberrations. The two cementing surfaces have different distances from the diaphragm, and the ways of passage of the on-axis and off-axis beams are also different. The on-axis chromatic aberration and the chromatic aberration of magnification can be corrected independently to some extent, by such two cementing surfaces, and as a result, it is effective for correction of chromatic aberration of magnification, which increases with achievement of a wide angle of view. As a method of providing two cementing surfaces, it can be considered to use two sets of cemented lenses, but when the optical axes of the two cemented lenses are deviated from each other, due to a deviation at the time of assembly, chromatic aberration of magnification occurs asymmetrically off the axis, and as a result, unnatural color blur is likely to occur. On the other hand, when the triplet is used as in the present invention, a deviation at the time of assembly does not occur on the two cementing surfaces, and hence, a product in which chromatic aberration of magnification is reduced sufficiently can be manufactured.

In the zoom lens according to the fifth embodiment, in order to perform more sufficient correction of aberrations, as described above, it is desired that the negative lens arranged closest to the object side of the triplet in the second group optical system G2 be a double-concave lens. Particularly, the surface on the image surface side of the negative lens is made a strong concave, so as to mainly perform correction of spherical aberration and comatic aberration.

In order to perform more sufficient correction of aberrations, it is desired that the negative lens arranged closest to the image surface side of the triplet in the second group optical system G2 has a strong concave facing the image surface side. The surface on the image surface side of the negative lens is made a strong concave, so as to perform secondary correction of spherical aberration and comatic aberration, and also contribute to the correction of astigmatism.

In order to perform excellent correction of chromatic aberration, it is desired that the conditional expressions (11) $1.70 < N_{c2} < 1.90$ and (12) $20 < v_{c2} < 40$ be satisfied. If the refractive index $N_{c2}$ of the positive lens arranged in the middle of the triplet in the second group optical system G2 is not smaller than 1.90, and the Abbe constant $v_{c2}$ of the positive lens is not larger than 20, it becomes difficult to balance the on-axis chromatic aberration against other aberrations, and particularly, the on-axis chromatic aberration at the long focal-length side is likely to occur. Further, the correction effect of monochromatic aberration on the cementing surface on the object side cannot be sufficiently obtained.

On the other hand, if the refractive index $N_{c2}$ is not larger than 1.7, and the Abbe constant $v_{c2}$ is not smaller than 40, it is advantageous in view of the correction of aberrations, but such a glass material is expensive, thereby causing an unnecessary cost increase.

Further, in order to favorably correct the chromatic aberration of magnification, it is desired to satisfy the conditional expressions (13) $N_{c1}<1.62$, (14) $v_{c1}>55$, (15) $N_{c3}>1.65$, and (16) $v_{c3}<40$. By satisfying the conditional expressions (13) to (16) relating to the refractive index $N_{c1}$ and the Abbe constant $v_{c1}$ of the negative lens arranged closest to the object side of the triplet, and the refractive index $N_{c3}$ and the Abbe constant $v_{c3}$ of the negative lens arranged closest to the image surface side of the triplet in the second group optical system G2, as well as the conditional expressions (11) and (12) relating to the refractive index $N_{c2}$ and the Abbe constant $v_{c2}$ of the positive lens arranged in the middle of the triplet in the second group optical system G2, the on-axis chromatic aberration can be balanced against the chromatic aberration of magnification, and particularly, the chromatic aberration of magnification at the short focal-length side can be reduced.

At this time, the correction state of the monochromatic aberration can be also maintained favorably.

In order to further improve the monochromatic aberration, it is desired to satisfy the conditional expression (17), $0.2<(R_{c2}/R_{c4})<0.4$. When a ratio $(R_{c2}/R_{c4})$ between a radius of curvature $R_{c2}$ of the cementing surface on the object side and a radius of curvature $R_{c4}$ of the surface closest to the image surface side, of the triplet in the second group optical system G2, becomes not smaller than 0.5, spherical aberration at the long focal-length side is likely to occur largely in the positive direction, thereby causing deterioration in the image contrast. On the other hand, when the ratio $(R_{c2}/R_{c4})$ is not larger than 0.1, the correction ability of astigmatism and curvature of field becomes insufficient, thereby causing deterioration in the flatness on the image surface in the whole area of the zooming range.

In order to make the zoom lens of the present invention more simple and high performance, it is desired that the surface on the object side be an aspheric surface at least on the lens closest to the object side in the second group optical system G2. Since the surface closest to the object side in the second group optical system G2 is relatively close to the diaphragm FA arranged on the object side of the third group optical system G3, a change in the beam height due to zooming is small, in addition to that the marginal beam has a sufficient height. As a result, by providing an aspheric surface here, spherical aberration, being the standard of imaging performance, can be corrected more favorably.

According to the second and the third modes of the zoom lens of the fifth embodiment, since high-performance zoom lens can be provided in which various aberrations are corrected more favorably, a higher quality camera and a higher quality mobile information terminal can be realized.

According to the fourth mode of the zoom lens of the fifth embodiment, a high performance zoom lens in which mainly on-axis chromatic aberration is corrected more favorably can be provided. As a result, a higher quality camera and a higher quality mobile information terminal can be realized.

According to the fifth mode of the zoom lens of the fifth embodiment, a high performance zoom lens in which mainly chromatic aberration of magnification is corrected more favorably can be provided. As a result, a higher quality camera and a higher quality mobile information terminal can be realized.

According to the sixth mode of the zoom lens of the fifth embodiment, a high performance zoom lens in which mainly monochromatic aberration is corrected more favorably can be provided. As a result, a higher quality camera and a higher quality mobile information terminal can be realized.

According to the seventh mode of the zoom lens of the fifth embodiment, a high performance zoom lens in which mainly spherical aberration is corrected more favorably can be provided. As a result, a higher quality camera and a higher quality mobile information terminal can be realized.

A sixth embodiment of the present invention explains the zoom lens according to the present invention. A fundamental configuration of the zoom lens according to the sixth embodiment is explained first, followed by a specific configuration of this zoom lens is explained in detail, with reference to the block diagram of the optical system illustrated in FIG. 59 to FIG. 74, while enumerating specific numerical examples as example 4-1 to example 4-1.

The zoom lens according to the sixth embodiment includes a first group optical system G1 having a positive focal length, a second group optical system G2 having a negative focal length, a third group optical system G3 having a positive focal length, a fourth group optical system having a positive focal length, and a fifth group optical system having a positive focal length, arranged in order from the object side to the image surface side. A diaphragm FA is provided on the object side of the third group optical system G3, and at least the second group optical system G2 and the fourth group optical system G4 move accompanying zooming from the short focal-length side toward the long focal-length side. Further, the zoom lens is formed in various modes having features described below. The zoom lens according to the first mode is such that the second group optical system G2 includes a triplet including a negative lens, a positive lens, and a negative lens in order from the object side toward the image surface side. The zoom lens according to the second mode is such that, in the zoom lens in the first mode, the negative lens arranged closest to the object side of the triplet in the second group optical system G2 is a double-concave lens.

The zoom lens according to the third mode is such that, in the zoom lens in the first mode, the negative lens arranged closest to the image surface side of the triplet in the second group optical system G2 is a double-concave lens. The zoom lens according to the fourth mode is such that, in the zoom lens in the first mode, when it is assumed that the refractive index and the Abbe constant of the positive lens arranged in the middle of the triplet in the second group optical system G2 is respectively $N_{c2}$ and $v_{c2}$, the following conditional expressions are satisfied.

$$1.70<N_{c2}<1.90 \quad (18)$$

$$20<v_{c2}<40 \quad (19)$$

The zoom lens according to the fifth mode is such that, in the zoom lens in the fourth mode, when it is assumed that the refractive index and the Abbe constant of the negative lens arranged closest to the object side of the triplet in the second group optical system G2 are respectively $N_{c1}$ and $v_{c1}$, and the refractive index and the Abbe constant of the negative lens arranged closest to the image surface side of the triplet in the second group optical system G2 are respectively $N_{c3}$ and $v_{c3}$, the following conditional expressions are satisfied.

$N_{c1}<1.62$ (20)

$v_{c1}>55$ (21)

$N_{c3}>1.65$ (22)

$v_{c3}<40$ (23)

The zoom lens according to the sixth mode is such that, in the zoom lens in the first mode, when it is assumed that a radius of curvature of a cementing surface on the object side of the triplet in the second group optical system G2 is $R_{c2}$, and a radius of curvature of a surface closest to the image surface side of the triplet in the second group optical system G2 is $R_{c4}$, the following conditional expression is satisfied.

$0.2<(R_{c2}/R_{c4})<0.4$ (24)

The zoom lens according to the seventh mode is such that, in the zoom lens in the first mode, the surface closest to the object side in the group optical system G2 is an aspheric surface.

In the zoom lens including five groups of positive-negative-positive-positive-positive, like the zoom lens according to the sixth embodiment, generally, the second G2 moves monotonously from the object side to the image surface side, accompanying zooming from the short focal-length side to the long focal-length side, and the fourth group optical system G4 moves so as to correct a change in the image surface position accompanying zooming. The zooming function is the responsibility of the second group optical system G2, and the fifth group optical system G5 is mainly provided for keeping an exit pupil from the image surface.

In such a zoom lens, in order to further reduce the size, it is necessary to strengthen the power of the respective group optical systems, particularly, the power of the second group optical system G2, being a zooming group. Therefore, in the second group optical system G2, excellent correction of aberrations should be performed. In the zoom lens according to the sixth embodiment, the second group optical system G2 has a configuration including a triplet including a negative lens, a positive lens, and a negative lens, in order to perform excellent correction of aberrations. The two cementing surfaces have different distances from the diaphragm, and the ways of passage of the beams on the axis and off the axis are also different. The on-axis chromatic aberration and the chromatic aberration of magnification can be corrected independently to some extent, by such two cementing surfaces, and as a result, it is also effective for correction of chromatic aberration of magnification, which increases with achievement of a wide angle of view. As a method of providing two cementing surfaces, it can be considered to use two sets of cemented lenses, but when the optical axes of the two cemented lenses are deviated from each other, due to a deviation at the time of assembly, chromatic aberration of magnification occurs asymmetrically off the axis, and as a result, unnatural color blur is likely to occur. On the other hand, when the triplet is used as in the present invention, a deviation at the time of assembly does not occur on the two cementing surfaces, and hence, a product in which chromatic aberration of magnification is reduced sufficiently can be manufactured.

In the zoom lens according to the sixth embodiment, in order to perform correction of aberrations more sufficiently, it is desired that the negative lens arranged closest to the object side of the triplet in the second group optical system G2 is a double-concave lens. The surface of the negative lens, particularly, the surface on the image surface side is a strong concave, so as to mainly perform correction of spherical aberration and comatic aberration. In order to perform aberration correction more sufficiently, it is desired that the negative lens arranged closest to the image surface side of the triplet in the second group optical system G2 is a double-concave lens. The surface of the negative lens on the image surface side is a strong concave, so as to perform secondary correction of spherical aberration and comatic aberration, and also contribute to the correction of astigmatism.

In order to perform excellent correction of chromatic aberration, it is desired that the conditional expressions (18) $1.70<N_{c2}<1.90$ and (19) $20<v_{c2}<40$ be satisfied. If the refractive index $N_{c2}$ of the positive lens arranged in the middle of the triplet in the second group optical system G2 is not smaller than 1.90, and the Abbe constant $v_{c2}$ of the positive lens is not larger than 20, it becomes difficult to balance the on-axis chromatic aberration against other aberrations, and particularly, the on-axis chromatic aberration at the long focal-length side is likely to occur. Further, the correction effect of monochromatic aberration on the cementing surface on the object side cannot be sufficiently obtained. On the other hand, if the refractive index $N_{c2}$ is not larger than 1.7, and the Abbe constant $v_{c2}$ is not smaller than 40, it is advantageous in view of the correction of aberrations, but such a glass material is expensive, thereby causing an unnecessary cost increase.

Further, in order to favorably correct the chromatic aberration of magnification, it is desired to satisfy the conditional expressions (20) $N_{c1}<1.62$, (21) $v_{c1}>55$, (22) $N_{c3}>1.65$, and (23) $v_{c3}<40$. By satisfying the conditional expressions (20) to (23) relating to the refractive index $N_{c1}$ and the Abbe constant $v_{c1}$ of the negative lens arranged closest to the object side of the triplet, and the refractive index $N_{c3}$ and the Abbe constant $v_{c3}$ of the negative lens arranged closest to the image surface side of the triplet in the second group optical system G2, as well as the conditional expressions (18) and (19) relating to the refractive index $N_{c2}$ and the Abbe constant $v_{c2}$ of the positive lens arranged in the middle of the triplet in the second group optical system G2, the on-axis chromatic aberration can be balanced against the chromatic aberration of magnification, and particularly, the chromatic aberration of magnification at the short focal-length side can be reduced.

At this time, the correction state of the monochromatic aberration can be also maintained favorably. In order to further improve the monochromatic aberration, it is desired to satisfy the conditional expression (24), $0.2<(R_{c2}/R_{c4})<0.4$. When a ratio $(R_{c2}/R_{c4})$ between a radius of curvature $R_{c2}$ of the cementing surface on the object side and a radius of curvature $R_{c4}$ of the surface closest to the image surface side, of the triplet in the second group optical system G2, becomes not smaller than 0.5, spherical aberration at the long focal-length side is likely to occur largely in the positive direction, thereby causing deterioration in the image contrast. On the other hand, when the ratio $(R_{c2}/R_{c4})$ is not larger than 0.1, the correction ability of astigmatism and curvature of field becomes insufficient, thereby causing deterioration in the flatness on the image surface in the whole area of the zooming range.

In order to make the zoom lens of the present invention more simple and high performance, it is desired that the surface on the object side be an aspheric surface at least on the lens closest to the object side in the second group optical system G2. Since the surface closest to the object side in the second group optical system G2 is relatively close to the diaphragm FA arranged on the object side of the third group optical system G3, a change in the beam height due to zooming is small, in addition to that the marginal beam has a sufficient height. As a result, by providing an aspheric surface here, spherical aberration, being the standard of imaging performance, can be corrected more favorably.

Therefore, enumeration of advantages in the camera or the mobile information terminal associated with the zoom lens according to the sixth embodiment of the present invention is as follows.

According to the first mode of the zoom lens of the sixth embodiment, a zoom lens having a resolving power corresponding to the image capturing device with 3,000,000 to 5,000,000 pixels can be provided. As a result, a camera and a mobile information terminal of a small size, which can obtain high magnification and high quality, can be realized.

According to the second and the third modes of the zoom lens of the sixth embodiment, since a high-performance zoom lens in which various aberrations are favorably corrected can be provided, a camera and a mobile information terminal having a higher quality can be realized.

According to the fourth mode of the zoom lens of the sixth embodiment, since a high-performance zoom lens in which mainly on-axis chromatic aberration is more favorably corrected can be provided, a camera and a mobile information terminal having a higher quality can be realized.

According to the fifth mode of the zoom lens of the sixth embodiment, since a high-performance zoom lens in which mainly chromatic aberration of magnification is more favorably corrected can be provided, a camera and a mobile information terminal having a higher quality can be realized.

According to the sixth mode of the zoom lens of the sixth embodiment, since a high-performance zoom lens in which mainly monochromatic aberration is more favorably corrected can be provided, a camera and a mobile information terminal having a higher quality can be realized.

According to the seventh mode of the zoom lens of the sixth embodiment, since a high-performance zoom lens in which mainly spherical aberration is more favorably corrected can be provided, a camera and a mobile information terminal having a higher quality can be realized.

A camera according to a seventh embodiment of the present invention uses the zoom lens according to the fourth to the sixth embodiments as the shooting optical system. A mobile information terminal according to the seventh embodiment uses the zoom lens according to the fifth embodiment as the shooting optical system in its camera unit.

Figure 75:
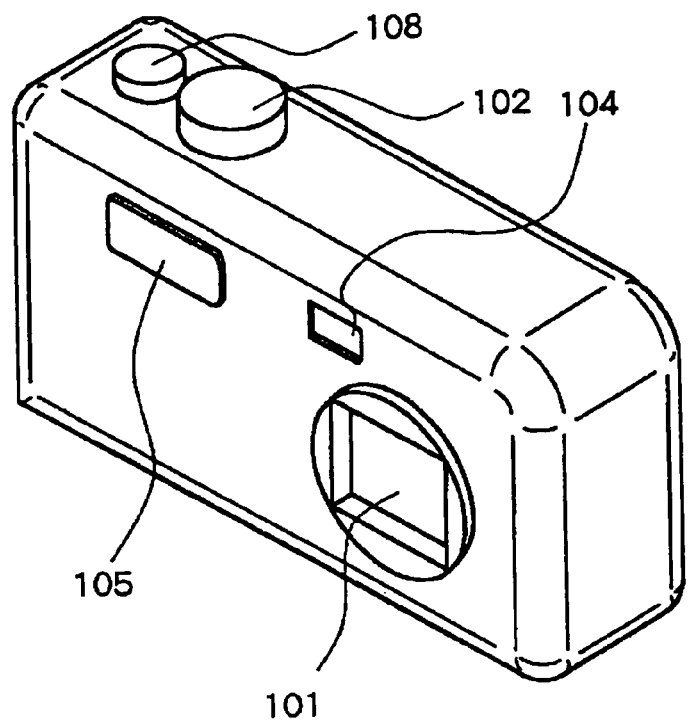
FIG. 75 is a perspective view of a camera according to a first mode of a seventh embodiment of the present invention, with a shooting lens retracted in the camera body seen from an object side.
Figure 76:
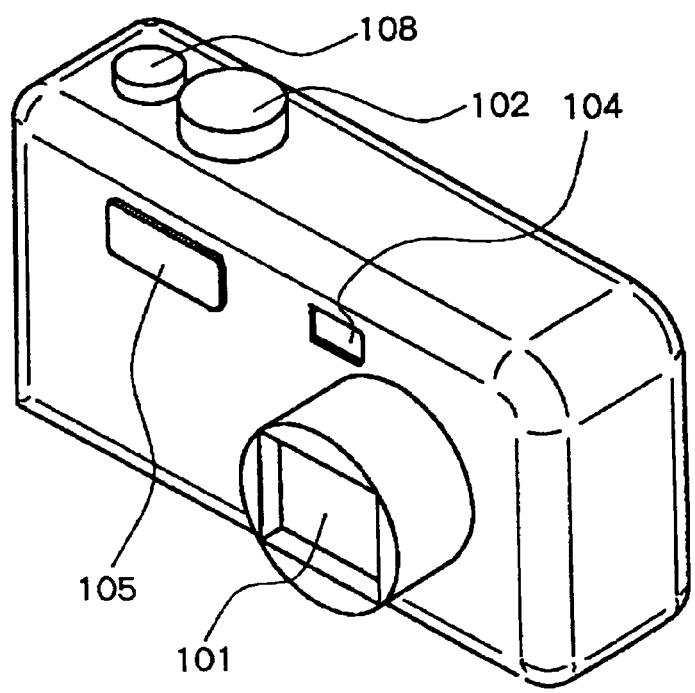
FIG. 76 is a perspective view of the camera according to the first mode of the seventh embodiment, with the shooting lens extended from the camera body seen from the object side.
Figure 77:
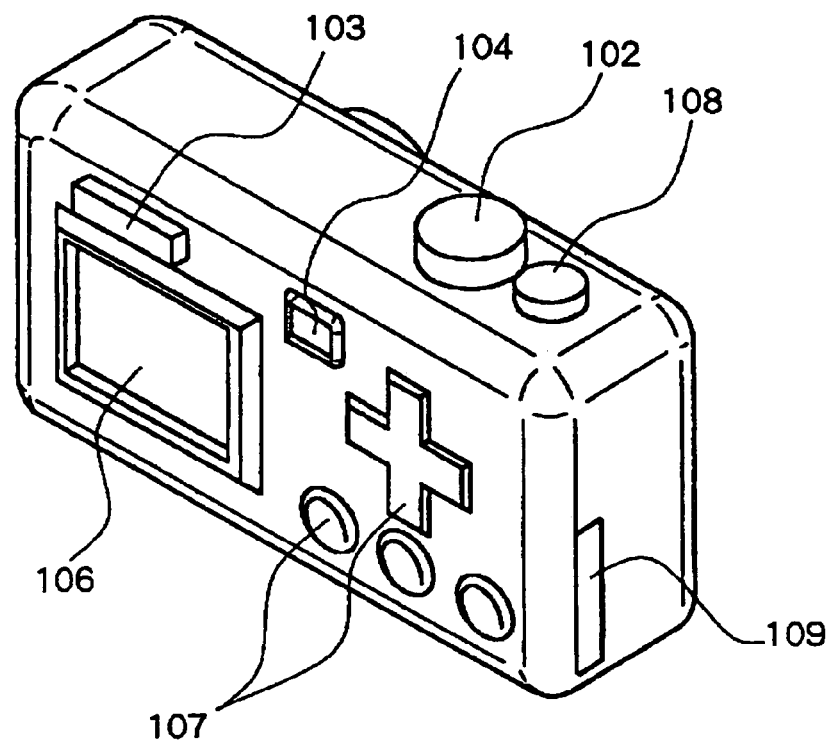
FIG. 77 is a perspective view of the camera shown in FIG. 75, seen from a photographer side.

A first mode of the seventh embodiment, in which the camera is constructed by adopting the zoom lens as shown in the fifth embodiment as the shooting optical system, will be explained with reference to FIG. 75 to FIG. 77. FIG. 75 is a perspective view of a camera according to a first mode of a seventh embodiment of the present invention, with a shooting lens retracted in the camera body seen from an object side. FIG. 76 is a perspective view of the camera according to the first mode of the seventh embodiment, with the shooting lens extended from the camera body seen from the object side. FIG. 77 is a perspective view of the camera shown in FIG. 75, seen from a photographer side.

Figure 78:
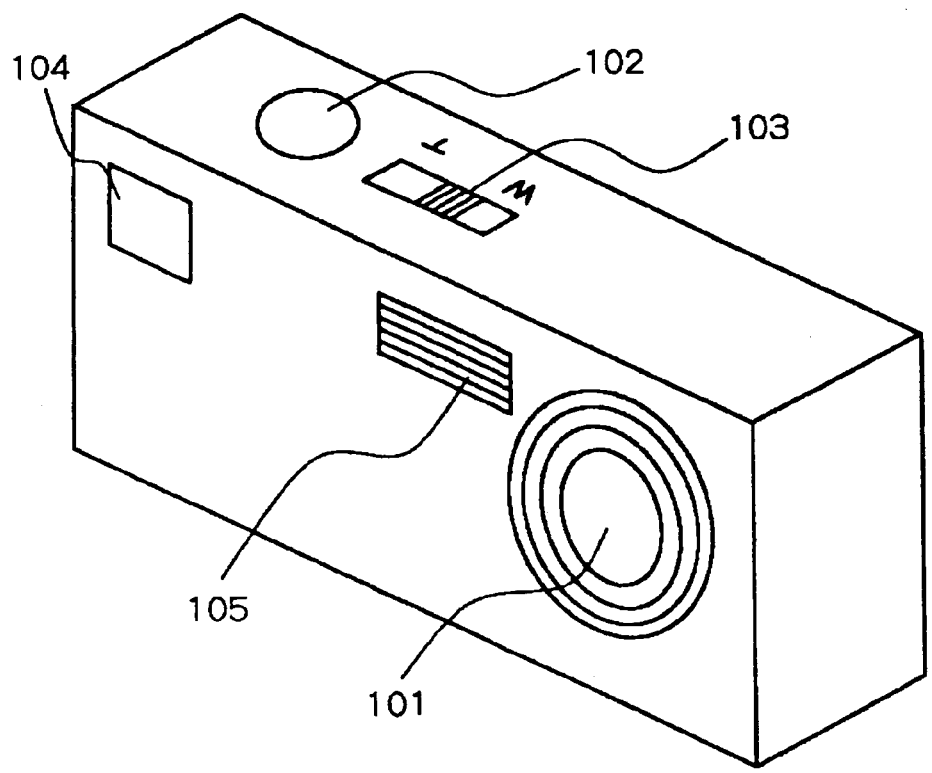
FIG. 78 is a perspective view of a camera according to a second mode of the seventh embodiment, with a shooting lens retracted in the camera body seen from an object side.
Figure 79:
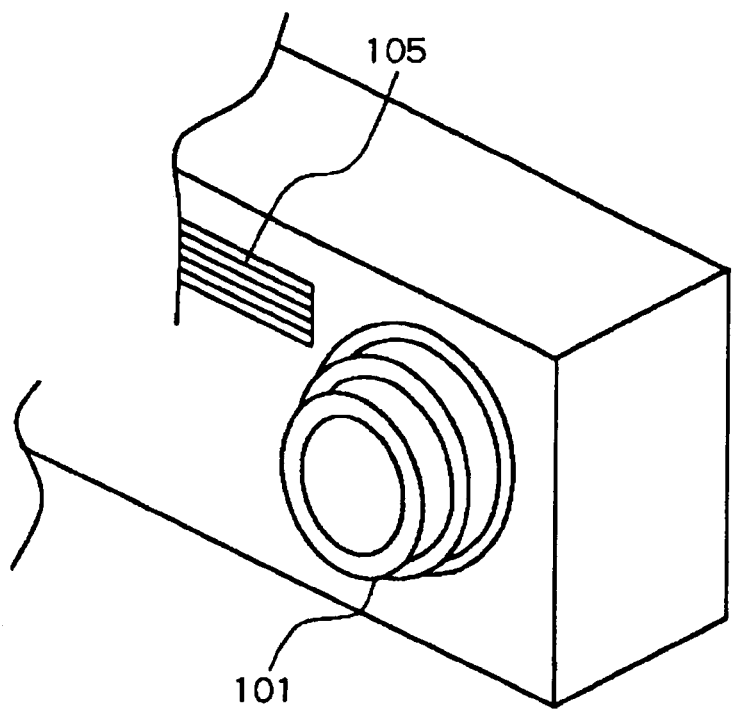
FIG. 79 is a perspective view of the camera according to the second mode of the seventh embodiment, with the shooting lens extended from the camera body seen from the object side.
Figure 80:
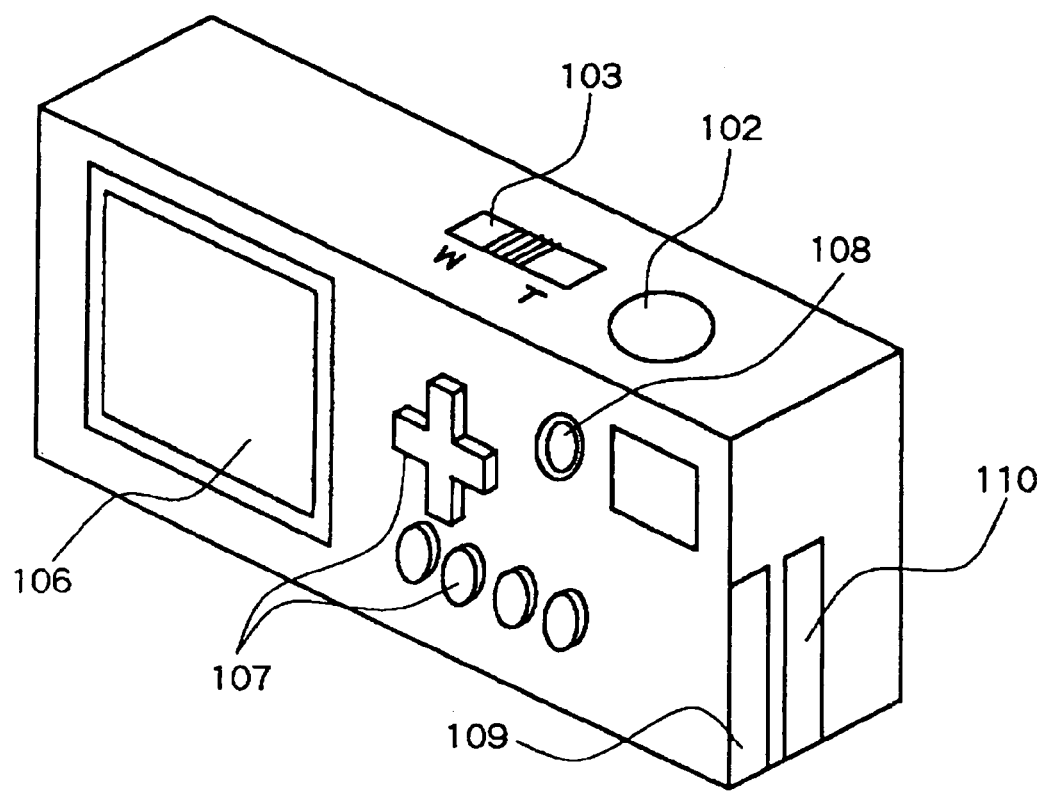
FIG. 80 is a perspective view of the camera shown in FIG. 78, seen from a photographer side.

A second mode of the seventh embodiment, in which a camera is constructed by adopting the zoom lens as shown in the fifth embodiment as the shooting optical system will be explained with reference to FIG. 78 to FIG. 80. FIG. 78 is a perspective view of a camera according to a second mode of the seventh embodiment, with a shooting lens retracted in the camera body seen from an object side. FIG. 79 is a perspective view of the camera according to the second mode of the seventh embodiment, with the shooting lens extended from the camera body seen from the object side. FIG. 80 is a perspective view of the camera shown in FIG. 78, seen from a photographer side.

A camera is explained here as an example, however, devices in which the camera function is incorporated in a mobile information terminal such as a so-called personal data assistant (PDA) and a mobile phone are in market recently. Such a mobile information terminal includes substantially the same function and configuration as those of the camera, though the appearance is slightly different. Such a mobile information terminal may be realized by the second mode in the seventh embodiment of the present invention, in which the zoom lens according to the fourth to the sixth embodiments is used.

As illustrated in FIG. 75 to FIG. 80, the camera includes a shooting lens 101, a shutter button 102, a zoom lever 103, a finder 104, a strobe 105, a liquid crystal monitor 106, operation buttons 107, a power switch 108, a memory card/communication card slot 109, and the like.

Figure 81:
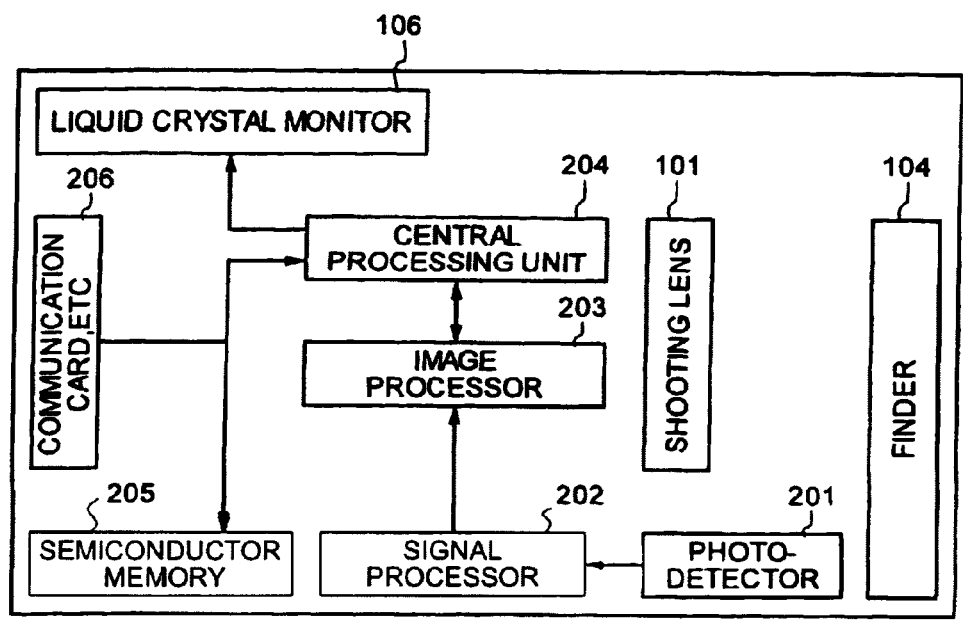
FIG. 81 is a block diagram of the camera according to the seventh embodiment.

FIG. 81 is a block diagram of the camera according to the seventh embodiment. The camera includes a photodetector 201, a signal processor 202, an image processor 203, a CPU 204, a semiconductor memory 205, and a communication card 206.

The camera has the shooting lens 101 and the photodetector 201 as an area sensor such as a CCD image capturing device, and is constructed such that an image of an object, being an object to be photographed, that is, the image of the subject formed by the shooting lens 101, being the shooting optical system, is read by the photodetector 201. For the shooting lens 101, the zoom lens explained in the fifth embodiment is used.

The output of the photodetector 201 is processed by the signal processor 202 controlled by the CPU 204, and converted into digital image information. The image information digitalized by the signal processor 202 is subjected to predetermined image processing in the image processor 203 controlled by the CPU 204, and thereafter, recorded in the semiconductor memory 205 such as a nonvolatile memory. In this case, the semiconductor memory 205 may be a memory card loaded in the memory card/communication card slot 109, or a semiconductor memory built in the camera body. The image being photographed can be displayed on the liquid crystal monitor 104, or the image recorded in the semiconductor memory 205 can be displayed thereon. The image recorded in the semiconductor memory 205 can be also transmitted to external equipment via the communication card 206 or the like loaded in the memory card/communication card slot 109.

The shooting lens 101 is buried in the camera body, at the time of carrying the camera, as illustrated in FIG. 75, and when a user operates the power switch 108 to turn on the power, the body tube is let out as illustrated in FIG. 76, and protruded from the camera body. At this time, inside of the body tube of the shooting lens 101, the optical system in each group constituting the zoom lens has the arrangement, for example, at the short focal-length side, and by operating the zoom lever 103, the arrangement of the respective group optical systems is changed, thereby enabling the zooming operation toward the long focal-length side. Preferably, the finder 104 is also zoomed, linked with a change in the angle of view of the shooting lens 101.

In many cases, focusing is performed by half-pressing the shutter button 102. Focusing in the zoom lens constituted of five groups of positive-negative-positive-positive-positive as shown in the fifth embodiment can be performed by the movement of the fifth group optical system G5 or by the movement of the photodetector 201. When the shutter button 102 is further pressed to the fully pressed state, shooting is performed, and thereafter, the processing as described above is performed.

When the image recorded in the semiconductor memory 205 is displayed on the liquid crystal monitor 106, or transmitted to the external equipment via the communication card 206 or the like, the operation button 107 is operated in a predetermined manner. The semiconductor memory 205 and the communication card 206 are loaded in a respectively dedicated slot or a general-purpose slot equipped in the memory card/communication card slot 109 or the like and used.

The zoom lens as shown in the fifth embodiment can be used as the shooting optical system in the camera or the mobile information terminal. Therefore, a camera or a mobile information terminal, which is small and high quality, and uses a photodetector of a class of 3,000,000 to 5,000,000 pixels, can be achieved. Therefore, advantages in the camera or the mobile information terminal associated with the zoom lens according to the fifth and the seventh embodiments of the present invention are as follows.

According to the first mode of the zoom lens of the fifth embodiment, a zoom lens having a resolving power corresponding to the image capturing device with 3,000,000 to 5,000,000 pixels can be provided. As a result, a camera and a mobile information terminal of a small size, which can obtain a high magnification and high quality, can be realized.

According to the camera in the first mode of the seventh embodiment of the present invention, a camera that is small and can achieve a high magnification and high performance can be provided, by using the zoom lens having a resolving power corresponding to the image capturing device with 3,000,000 to 5,000,000 pixels, which is sufficiently small and efficient, while being capable of obtaining a high magnification, as the shooting optical system. As a result, users can take pictures of high quality with a camera excellent in portability.

According to the mobile information terminal in the second mode of the seventh embodiment of the present invention, a mobile information terminal that is small and can achieve a high magnification and high quality can be provided, by using the zoom lens having a resolving power corresponding to the image capturing device with 3,000,000 to 5,000,000 pixels, which is sufficiently small and efficient, while being capable of obtaining a high magnification, as the shooting optical system in the camera unit. As a result, users can take pictures of high quality with a mobile information terminal excellent in portability, and transmit the image to external equipment. Since the optical system in the zoom lens of the present invention corresponding to the fifth embodiment, and according to the respective examples explained below can be formed of an optical glass, which is chemically stable and does not contain any toxic substance such as lead or arsenic, the materials can be recycled, and hence conservation of global environment is possible, without having water pollution due to waste fluid at the time of machining.

Example 1 to example 4 for illustrating specific numerical configurations of the zoom lens according to the first embodiment and the fourth to the sixth embodiments of the present invention will be explained in detail.

Specific configuration and numerical example is shown in example 1, as an example of the zoom lens according to the first embodiment of the present invention. In example 1, the aberrations of the zoom lens are sufficiently corrected, and correspondence to the photodetector with 3,000,000 to 5,000,000 pixels becomes possible. It will be obvious from the examples below, that excellent imaging performance can be ensured, while achieving sufficient miniaturization and a wide angle of view, by forming the zoom lens as shown in the first embodiment.

In example 1, various signs are used as described below.

R: radius of curvature of each surface
D: spacing
$N_d$: refracting power with respect to d ray
$v_d$: Abbe constant with respect to d ray
f: combined focal length of the whole system
F: F number
$\omega$: half angle of view
y': image height
Wide: wide angle, short focal-length side
Mean: means focal length
Tele: telephoto, long focal-length side Further, in order to define an aspheric surface, following signs are used.

Y: height from the optical axis
R: paraxial radius of curvature of the aspheric surface
K: conical multiplier
$A_4$: fourth coefficient of the aspheric surface
$A_6$: sixth coefficient of the aspheric surface
$A_8$: eighth coefficient of the aspheric surface
$A_{10}$: tenth coefficient of the aspheric surface
SQRT: square root That is, the aspheric surface is expressed by the following expression, as a distance X from a tangent plane at an apex of the aspheric surface at a height Y from the optical axis.

$$X = \frac{(1/R) \times Y^2}{1 + SQRT\{1 - (1+K) \times (Y/R)^2\}} + A_4 \times Y^4 + A_6 \times Y^6 + A_8 \times Y^8 + A_{10} \times Y^{10} \qquad (25)$$

In the numerical example described below, E–XY stands for $10^{-XY}$. Further, in the aberration diagram explained below, a solid line expresses spherical aberration, a broken line expresses a sine condition in the spherical aberration, and in astigmatism, a solid line expresses a sagittal image surface, and a broken line expresses a meridional image surface. Further, one solid line denotes d ray (587.56 nm), and the other solid line denotes g ray (435.83 nm).

FIG. 1 is a schematic diagram of an optical system of example 1-1 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a diaphragm FA, and an optical filter (including a cover glass) OF. In this case, the first to the third lenses E1 to E3 constitute the first group optical system G1, the fourth to the sixth lenses E4 to E6 constitute the second group optical system G2, and the seventh to the eleventh lenses E7 to E11 constitute the third group optical system G3.

The respective lenses are supported by an appropriate common support frame or the like for each lens group, and at the time of zooming, each group optical system integrally operates. The diaphragm FA is arranged on the object side of the third group optical system G3, and operates integrally with the third group optical system G3. Surface numbers of the respective optical surfaces are added for reference. The respective reference signs in FIG. 1 are used independently for each example, in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, and the optical filter OF are arranged in order from the object side of a subject or the like, and an image is formed at the back of the optical filter OF having various optical filtering functions.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative meniscus lens formed in a convex shape on the object side, the fifth lens E5 is a negative lens including a double-concave lens, and the sixth lens E6 is a positive meniscus lens formed in a convex shape on the object side. The fifth lens E5 and the sixth lens E6 form a densely cemented doublet, and the second group optical system G2 formed of the fourth to the sixth lenses E4 to E6 exhibits a negative focal length as a whole. The seventh lens E7 is a positive lens including a double-convex lens, the eighth lens E8 is a negative meniscus lens formed in a convex shape on the object side, the ninth lens E9 is a positive lens including a double-convex lens, the tenth lens E10 is a negative lens including a double-concave lens, and the eleventh lens E11 is a positive lens including a double-convex lens. The eighth to the tenth lenses E8 to E10 form a densely cemented triplet, and the third group optical system G3 formed of the seventh to the eleventh lenses E7 to E11 exhibits a positive focal length as a whole. The diaphragm FA arranged between the second group optical system G2 and the third group optical system G3 operates integrally with the third group optical system G3, and the distance from the third group optical system G3 is constant.

The optical filter OF arranged on the image surface side of the eleventh lens E11 in the third group optical system G3 may include a cover glass of a solid image capturing device 53 such as a CCD image capturing device, and has various optical filtering functions. In this example 1-1, the sixth surface, being a surface on the object side of the fourth lens E4 located closest to the object side in the second group optical system G2, and the twelfth surface, being a surface on the object side of the seventh lens E7 located closest to the object side in the third group optical system G3 are respectively aspheric surfaces. The shift of the respective group optical systems G1 to G3 accompanying zooming between the wide-angle end, that is, the short focal-length side, and the telephoto end, that is, the long focal-length side is, as illustrated in FIG. 1, such that the second group optical system G2 is fixed with respect to the image surface without shift, the first group optical system G1 shifts from the image surface side toward the object side, and the third group optical system G3 also shifts from the image surface side toward the object side, with a shift from the short focal-length side to the long focal-length side. In example 1-1, the focal length f of the whole system, the F number F, and the half angle of view, $\omega$, respectively change in the range of f=5.902 to 17.707, F=3.37 to 4.41, and $\omega$=38.2 to 14.7. The optical characteristics relating to the respective optical surfaces and the optical elements are as shown in the following table. The lens surface added with * are aspheric surfaces.

TABLE 1

Optical characteristics

| Surface | R | D | Nd | vd | Note |
|---|---|---|---|---|---|
| 1 | 52.282 | 1.000 | 1.84666 | 23.8 | First lens |
| 2 | 28.671 | 2.898 | 1.48749 | 70.4 | Second lens |
| 3 | 174.021 | 0.100 | | | |
| 4 | 24.552 | 2.568 | 1.72916 | 54.7 | Third lens |
| 5 | 99.447 | d1 | | | |
| 6* | 17.989 | 0.800 | 1.88300 | 40.8 | Fourth lens |
| 7 | 4.910 | 4.778 | | | |
| 8 | −9.828 | 0.800 | 1.58313 | 59.5 | Fifth lens |
| 9 | 7.598 | 1.483 | 1.80518 | 25.5 | Sixth lens |
| 10 | 1630.729 | d2 | | | |
| 11 | 0.000 | 0.100 | | | |
| 12* | 10.680 | 3.012 | 1.51680 | 64.2 | Seventh lens |
| 13 | −8.429 | 1.837 | | | |
| 14 | 41.562 | 0.800 | 1.84666 | 23.8 | Eighth lens |
| 15 | 13.393 | 2.091 | 1.74950 | 35.0 | Ninth lens |
| 16 | −3.828 | 0.800 | 1.68893 | 31.2 | Tenth lens |
| 17 | 5.954 | 0.991 | | | |
| 18 | 8.271 | 2.061 | 1.49700 | 81.6 | Eleventh lens |
| 19 | −13.509 | d3 | | | |
| 20 | 0.000 | 1.980 | 1.51680 | 64.2 | Filter, cover glass |
| 21 | 0.000 | | | | |

The optical surfaces on the sixth and the twelfth surfaces in Table 1 are aspheric surfaces, and parameters relating to expression (25) on the respective aspheric surfaces are as shown in the following table.

TABLE 2

Coefficient of aspheric surface

| Surface | K | $A_4$ | $A_6$ | $A_8$ | $A_{10}$ |
|---|---|---|---|---|---|
| 6 | −2.73185 | 1.43332E−04 | −3.96660E−06 | 1.13380E−07 | −1.45326E−09 |
| 12 | −3.57231 | −5.64058E−04 | −1.78799E−05 | 2.26160E−06 | −2.09146E−07 |

The interval d1 between the first group optical system G1 and the second group optical system G2, the interval d2 between the second group optical system G2 and the diaphragm FA, and the interval d3 between the third group optical system G3 and the optical filter OF are variable, and these variable intervals d1, d2, and d3 are changed as shown in the following table, corresponding to the focal length f of the whole system, accompanying zooming.

TABLE 3

| | Variable intervals | | | |
|---|---|---|---|---|
| | f | d1 | d2 | d3 |
| Wide | 5.902 | 1.000 | 7.680 | 7.877 |
| Mean | 10.688 | 2.377 | 2.188 | 13.362 |
| Tele | 17.707 | 12.868 | 1.002 | 14.538 |

The parameter values according to the respective conditional expressions (1) to (3) of the present invention in example 1-1 are as shown in the following table, and within the range of the respective conditional expressions.

TABLE 4

| Parameter values in conditional expressions | |
|---|---|
| Np − Nn | −0.018 |
| vp − vn | 7.57 |
| K12/(fw + ft) | 0.715 |

Figure 8:
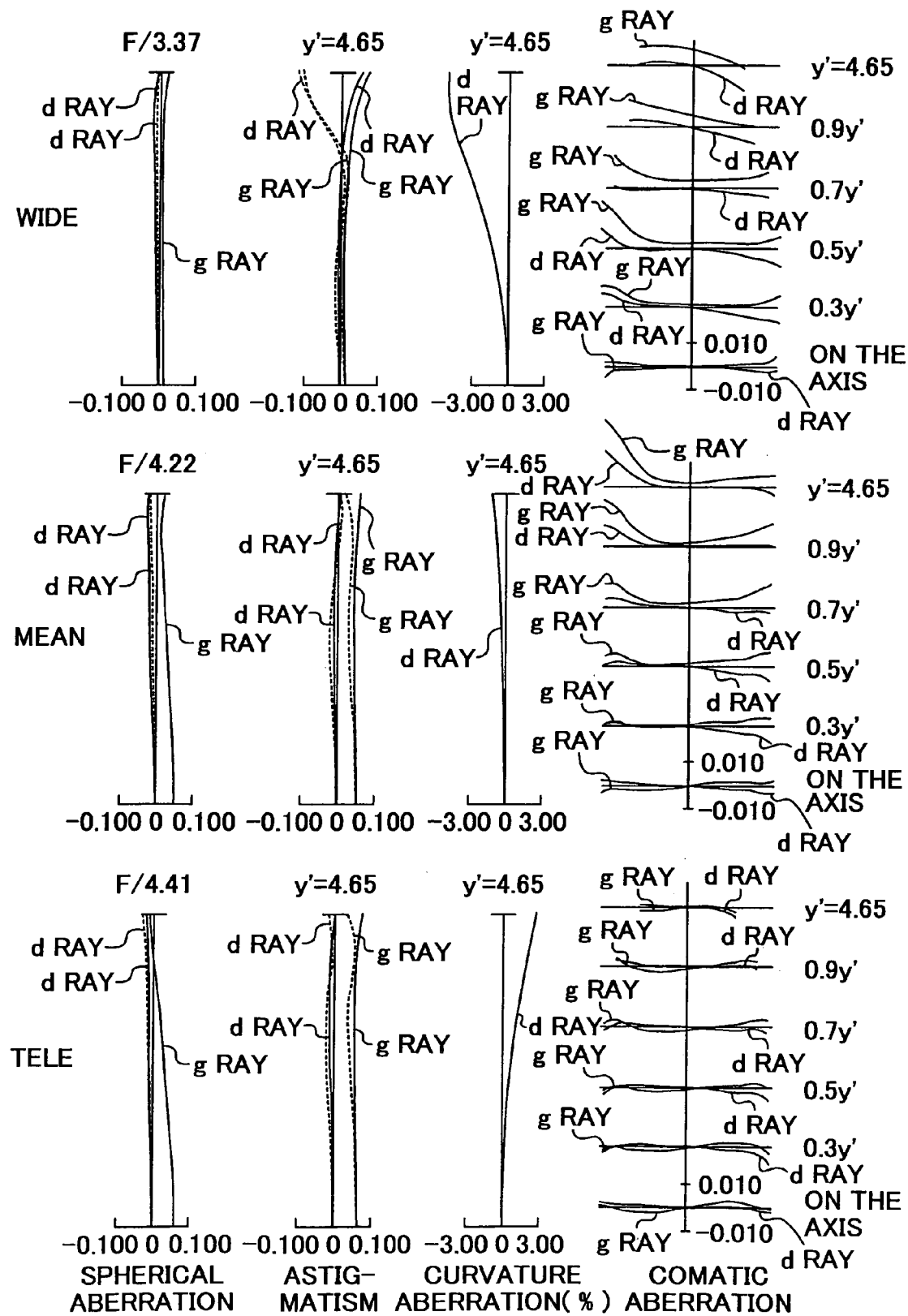
FIG. 8 is a set of graphs for illustrating aberration characteristics of the zoom lens shown in FIG. 1.

The aberration diagram in example 1-1 is illustrated in FIG. 8.

FIG. 2 is a schematic diagram of an optical system of example 1-2 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a diaphragm FA, and an optical filter (including a cover glass) OF. In this case, the first to the third lenses E1 to E3 constitute the first group optical system G1, the fourth to the sixth lenses E4 to E6 constitute the second group optical system G2, and the seventh to the eleventh lenses E7 to E11 constitute the third group optical system G3.

The respective lenses are supported by an appropriate common support frame or the like for each lens group, and at the time of zooming, each group optical system integrally operates. The diaphragm FA is arranged on the object side of the third group optical system G3, and operates integrally with the third group optical system G3. Surface numbers of the respective optical surfaces are added for reference. The respective reference signs in FIG. 2 are used independently for each example, in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, and the optical filter OF are arranged in order from the object side of a subject or the like, and an image is formed at the back of the optical filter OF having various optical filtering functions.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative meniscus lens formed in a convex shape on the object side, the fifth lens E5 is a negative lens including a double-concave lens, and the sixth lens E6 is a positive lens including a double-convex lens. The fifth lens E5 and the sixth lens E6 form a densely cemented doublet, and the second group optical system G2 formed of the fourth to the sixth lenses E4 to E6 exhibits a negative focal length as a whole. The seventh lens E7 is a positive lens including a double-convex lens, the eighth lens E8 is a negative lens including a double-concave lens, the ninth lens E9 is a positive lens including a double-convex lens, the tenth lens E10 is a negative lens including a double-concave lens, and the eleventh lens E11 is a positive lens including a double-convex lens. The eighth to the tenth lenses E8 to E10 form a densely cemented triplet, and the third group optical system G3 formed of the seventh to the eleventh lenses E7 to E11 exhibits a positive focal length as a whole. The diaphragm FA arranged between the second group optical system G2 and the third group optical system G3 operates integrally with the third group optical system G3, and the distance from the third group optical system G3 is constant.

The optical filter OF arranged on the image surface side of the eleventh lens E11 in the third group optical system G3 may include a cover glass of a solid image capturing device 53 such as a CCD image capturing device, and has various optical filtering functions.

In this example 1-2, the fifth surface, being a surface on the image surface side of the third lens E3 located closest to the image surface side in the first group optical system G1, and the twelfth surface, being a surface on the object side of the seventh lens E7 located closest to the object side in the third group optical system G3, and the eighteenth surface, being a surface on the object side of the eleventh lens E11 located closest to the image surface side in the third group optical system G3 are respectively aspheric surfaces.

The shift of the respective group optical systems G1 to G3 accompanying zooming between the wide-angle end, that is, the short focal-length side, and the telephoto end, that is, the long focal-length side is, as illustrated in FIG. 2, such that the first group optical system G1 shifts with from the object side toward the image surface with a shift from the intermediate focal-length side to the long focal-length side, and the second group optical system G2 shifts from the object side toward the mage surface side with a shift from the short focal-length side to the long focal-length side, and the third group optical system G3 also shifts from the image surface side toward the object side, with a shift from the short focal-length side to the long focal-length side.

In example 1-2, the focal length f of the whole system, the F number F, and the half angle of view, ω, respectively change in the range of f=5.081 to 15.307, F=2.87 to 3.53, and ω=42.5 to 16.9. The optical characteristics relating to the respective optical surfaces and the optical elements are as shown in the following table. The lens surface added with * are aspheric surfaces.

TABLE 5

Optical characteristics

| Surface | R | D | Nd | vd | Note |
|---|---|---|---|---|---|
| 1 | 29.023 | 0.800 | 1.84666 | 23.8 | First lens |
| 2 | 22.712 | 1.757 | 1.49700 | 81.6 | Second lens |
| 3 | 24.448 | 0.141 | | | |
| 4 | 24.399 | 3.354 | 1.72916 | 54.7 | Third lens |
| 5* | 100.352 | d1 | | | |
| 6 | 92.631 | 0.800 | 1.83500 | 40.8 | Fourth lens |
| 7 | 6.089 | 4.846 | | | |
| 8 | −13.244 | 0.800 | 1.51680 | 64.2 | Fifth lens |
| 9 | 9.018 | 3.524 | 1.70200 | 33.3 | Sixth lens |
| 10 | −25.662 | d2 | | | |
| 11 | 0.000 | 0.100 | | | |
| 12 | 7.653 | 1.853 | 1.69680 | 55.5 | Seventh lens |
| 13 | −78.558 | 2.720 | | | |
| 14 | −49.283 | 0.800 | 1.83400 | 43.0 | Eighth lens |
| 15 | 5.245 | 1.970 | 1.77250 | 55.5 | Ninth lens |
| 16 | −6.596 | 0.800 | 1.75520 | 33.3 | Tenth lens |
| 17 | 2508.659 | 6.154 | | | |
| 18* | 33.022 | 1.400 | 1.64769 | 81.6 | Eleventh lens |
| 19 | −63.392 | d3 | | | |
| 20 | 0.000 | 1.980 | 1.51680 | 64.2 | Filter, cover glass |
| 21 | 0.000 | | | | |

The optical surfaces on the fifth, the twelfth surfaces, and the eighteenth surfaces in Table 5 are aspheric surfaces, and parameters relating to expression (25) on the respective aspheric surfaces are as shown in the following table.

TABLE 6

Coefficient of aspheric surface

| Surface | K | $A_4$ | $A_6$ | $A_8$ | $A_{10}$ |
|---|---|---|---|---|---|
| 5 | 5.1558 | 1.09142E−04 | −7.88649E−07 | 6.95776E−09 | −2.88606E−11 |
| 12 | 0.5678 | −2.72169E−04 | −6.04473E−06 | 1.38190E−07 | −1.47112E−08 |
| 18 | −109722.6 | 7.20399E−04 | 1.32008E−05 | 7.50297E−07 | −2.83837E−08 |

The interval d1 between the first group optical system G1 and the second group optical system G2, the interval d2 between the second group optical system G2 and the diaphragm FA, and the interval d3 between the third group optical system G3 and the optical filter OF are variable, and these variable intervals d1, d2, and d3 are changed as shown in the following table, corresponding to the focal length f of the whole system, accompanying zooming.

TABLE 7

Variable intervals

| | f | d1 | d2 | d3 |
|---|---|---|---|---|
| Wide | 5.081 | 1.000 | 18.345 | 1.000 |
| Mean | 8.307 | 6.481 | 8.179 | 3.074 |
| Tele | 15.307 | 15.868 | 0.847 | 5.883 |

The parameter values according to the respective conditional expressions (1) to (3) of the present invention in example 1-2 are as shown in the following table, and within the range of the respective conditional expressions.

TABLE 8

Parameter values in conditional expressions

| Np − Nn | −0.022 |
|---|---|
| νp − νn | 17.34 |
| K12/(fw + ft) | 1.111 |

Figure 9:
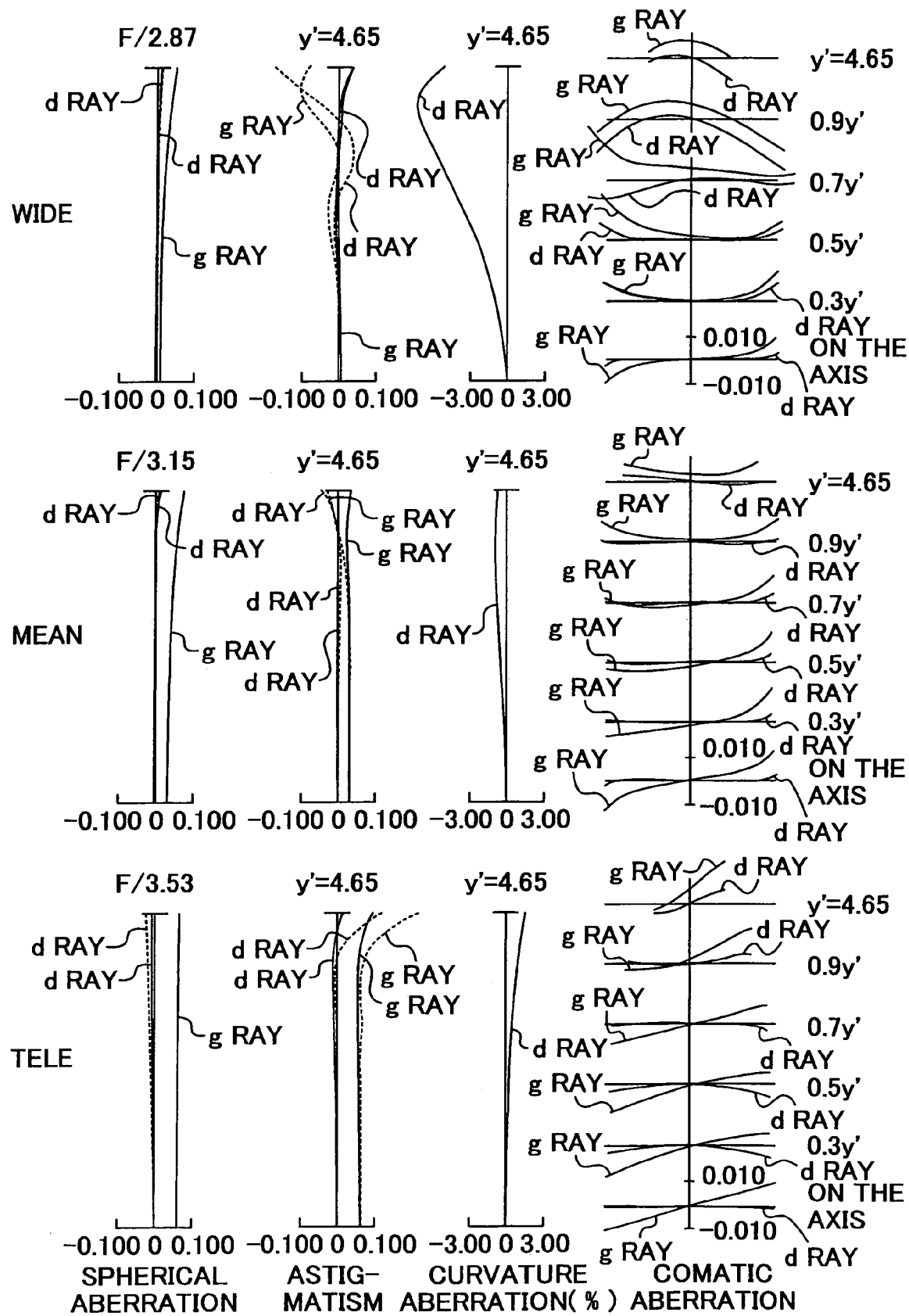
FIG. 9 is a set of graphs for illustrating aberration characteristics of the zoom lens shown in FIG. 2.

The aberration diagram in example 1-2 is illustrated in FIG. 9.

FIG. 3 is a schematic diagram of an optical system of example 1-3 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a diaphragm FA, and an optical filter (including a cover glass) OF. In this case, the first lens E1 and the second lens E2 constitute the first group optical system G1, the third lens E3 to the fifth lenses E5 constitute the second group optical system G2, and the sixth lens E6 to the tenth lens E10 constitute the third group optical system G3.

The respective lenses are supported by an appropriate common support frame or the like for each lens group, and at the time of zooming, each group optical system integrally operates. The diaphragm FA is arranged on the object side of the third group optical system G3, and operates integrally with the third group optical system G3. Surface numbers of the respective optical surfaces are added for reference. The respective reference signs in FIG. 3 are used independently for each example, in order to avoid complexity due to an increase in number of digits of the reference signs. Therefore, even when a common reference sign is given, it is not always a common configuration to other examples.

In FIG. 3, for example, the first lens E1, the second lens E2, the third lens E3, the fourth lens E4, the fifth lens E5, the diaphragm FA, the sixth lens E6, the seventh lens E7, the eighth lens E8, the ninth lens E9, the tenth lens E10, the eleventh lens E11, and the optical filter OF are arranged in order from the object side of a subject or the like, and an image is formed at the back of the optical filter OF having various optical filtering functions.

The first lens E1 is a negative meniscus lens formed in a convex shape on the object side, the second lens E2 is a positive meniscus lens formed in a convex shape on the object side, the first group optical system G1 formed of the first lens E1 and the second lens E2 exhibits a positive focal length as a whole.

The third lens E3 is a negative meniscus lens formed in a convex shape on the object side, the fourth lens E4 is a double-concave negative lens and the fifth lens E5 is a positive meniscus lens formed in a convex shape on the object side. The fourth lens E4 and the fifth lens E5 form a densely cemented doublet, and the second group optical system G2 formed of the third lens E3 to the fifth E5 exhibits a negative focal length as a whole.

The sixth lens E6 is a positive lens including a double-convex lens, the seventh lens E7 is a negative meniscus lens formed in a convex shape on the object side, the eighth lens E8 is a positive lens including a double-convex lens, the ninth lens E9 is a negative lens including a double-concave lens, and the tenth lens E10 is a positive lens a double-convex lens. The seventh lens E7 to the ninth lens E9 form a densely cemented triplet, and the third group optical system G3 formed of the sixth to the tenth lenses E6 to E10 exhibits a positive focal length as a whole. The diaphragm FA arranged between the second group optical system G2 and the third group optical system G3 operates integrally with the third group optical system G3, and the distance from the third group optical system G3 is constant.

The optical filter OF arranged on the image surface side of the tenth lens E10 in the third group optical system G3 may include a cover glass of a solid image capturing device 53 such as a CCD image capturing device, and has various optical filtering functions. In this example 1-3, the fifth surface, being a surface on the object side of the third lens E3 located closest to the object side in the second group optical system G2, and the eleventh surface, being a surface on the object side of the sixth lens E6 located closest to the object side in the third group optical system G3 are respectively aspheric surfaces.

The shift of the respective group optical systems G1 to G3 accompanying zooming between the wide-angle end, that is, the short focal-length side, and the telephoto end, that is, the long focal-length side is, as illustrated in FIG. 3, such that the first group optical system G1 shifts from the object side toward the image surface side with a shift from the short focal-length side to the intermediate focal length, and shifts from the image surface side toward the object side with a shift from the intermediate focal length to the long focal-length side, and the second group optical system G2 shifts from the object side toward the image surface side.

In example 1-3, the focal length f of the whole system, the F number F, and the half angle of view, ω, respectively change in the range of f=5.899 to 23.611, F=3.14 to 3.83, and ω=36.7 to 10.6. The optical characteristics relating to the respective optical surfaces and the optical elements are as shown in the following table. The lens surface added with * are aspheric surfaces.

TABLE 9

Optical characteristics

| Surface | R | D | Nd | vd | Note |
|---|---|---|---|---|---|
| 1 | 20.366 | 0.800 | 1.84666 | 23.8 | First lens |
| 2 | 14.124 | 1.967 | | | |
| 3 | 15.110 | 4.900 | 1.72916 | 54.7 | Second lens |
| 4 | 127.637 | d1 | | | |
| 5* | 72.676 | 0.800 | 1.88300 | 40.8 | Third lens |
| 6 | 6.144 | 3.409 | | | |
| 7 | −28.791 | 0.800 | 1.49700 | 81.6 | Fourth lens |

TABLE 9-continued

Optical characteristics

| Surface | R | D | Nd | vd | Note |
|---|---|---|---|---|---|
| 8 | 7.631 | 2.587 | 1.80610 | 33.3 | Fifth lens |
| 9 | 53.039 | d2 | | | |
| 10 | 0.000 | 0.100 | | | |
| 11* | 10.134 | 1.520 | 1.69680 | 55.5 | Sixth lens |
| 12 | −18.621 | 1.976 | | | |
| 13 | 12.892 | 0.800 | 1.88300 | 40.8 | Seventh lens |
| 14 | 4.621 | 2.422 | 1.71300 | 53.9 | Eighth lens |
| 15 | −4.926 | 0.800 | 1.63980 | 34.6 | Ninth lens |
| 16 | 5.519 | 5.379 | | | |
| 17 | 8.661 | 2.373 | 1.49700 | 81.6 | Tenth lens |
| 18 | −224.285 | d3 | | | |
| 19 | 0.000 | 1.980 | 1.51680 | 64.2 | Filter, cover glass |
| 20 | 0.000 | | | | |

The optical surfaces on the fifth and the eleventh surfaces in Table 9 are aspheric surfaces, and parameters relating to expression (25) the respective aspheric surfaces are as shown in the following table.

TABLE 10

Coefficient of aspheric surface

| | K | $A_4$ | $A_6$ | $A_8$ | $A_{10}$ |
|---|---|---|---|---|---|
| 5 | 8.90458 | 4.51607E−05 | −9.20589E−07 | 1.90474E−08 | −1.27028E−10 |
| 11 | −0.30716 | −3.20864E−04 | −2.23050E−06 | 1.31015E−07 | −1.42853E−08 |

The interval d1 between the first group optical system G1 and the second group optical system G2, the interval d2 between the second group optical system G2 and the diaphragm FA, and the interval d3 between the third group optical system G3 and the optical filter OF are variable, and these variable intervals d1, d2, and d3 are changed as shown in the following table, corresponding to the focal length f of the whole system, accompanying zooming.

TABLE 11

Variable intervals

| | f | d1 | d2 | d3 |
|---|---|---|---|---|
| Wide | 5.900 | 1.000 | 15.971 | 1.000 |
| Mean | 11.300 | 5.192 | 6.028 | 4.335 |
| Tele | 23.600 | 14.380 | 1.064 | 5.948 |

The parameter values according to the respective conditional expressions (1) to (3) of the present invention in example 1-3 are as shown in the following table, and within the range of the respective conditional expressions.

TABLE 12

Parameter values in conditional expressions

| Np − Nn | −0.048 |
|---|---|
| νp − νn | 16.26 |
| K12/(fw + ft) | 0.778 |

Figure 10:
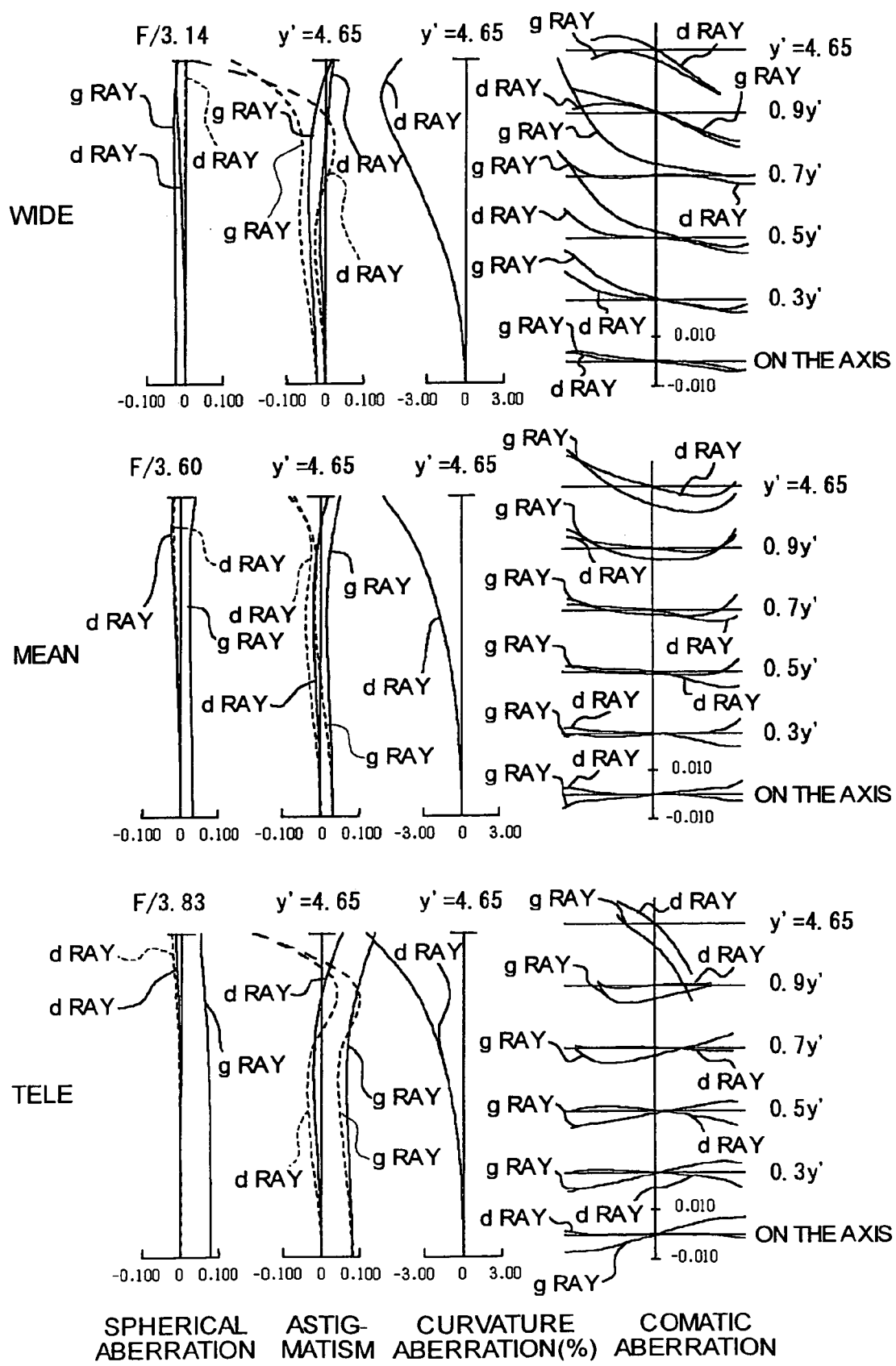
FIG. 10 is a set of graphs for illustrating aberration characteristics of the zoom lens shown in FIG. 3.

The aberration diagram in example 1-3 is illustrated in FIG. 10.

FIG. 4 is a schematic diagram of an optical system of example 1-4 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a diaphragm FA, and an optical filter (including a cover glass) OF. In this case, the first to the third lenses E1 to E3 constitute the first group optical system G1, the fourth to the sixth lenses E4 to E6 constitute the second group optical system G2, and the seventh to the eleventh lenses E7 to E11 constitute the third group optical system G3.

The respective lenses are supported by an appropriate common support frame or the like for each lens group, and at the time of zooming, each group optical system integrally operates. The diaphragm FA is arranged on the object side of the third group optical system G3, and operates integrally with the third group optical system G3. Surface numbers of the respective optical surfaces are added for reference. The respective reference signs in FIG. 4 are used independently for each example, in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, and the optical filter OF are arranged in order from the object side of a subject or the like, and an image is formed at the back of the optical filter OF having various optical filtering functions.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative meniscus lens formed in a convex shape on the object side, the fifth lens E5 is a negative lens including a double-concave lens, and the sixth lens E6 is a positive meniscus lens formed in a convex shape on the object side. The fifth lens E5 and the sixth lens E6 form a densely cemented doublet, and the second group optical system G2 formed of the fourth to the sixth lenses E4 to E6 exhibits a negative focal length as a whole.

The seventh lens E7 is a positive lens including a double-convex lens, the eighth lens E8 is a negative meniscus lens formed in a convex shape on the object side, the ninth lens E9 is a positive lens including a double-convex lens, the tenth lens E10 is a negative lens including a double-concave lens, and the eleventh lens E11 is a positive lens including a double-convex lens. The eighth to the tenth lenses E8 to E10 form a densely cemented triplet, and the third group optical system G3 formed of the seventh to the eleventh lenses E7 to E11 exhibits a positive focal length as a whole. The diaphragm FA arranged between the second group optical system G2 and the third group optical system G3 operates integrally with the third group optical system G3, and the distance from the third group optical system G3 is constant.

The optical filter OF arranged on the image surface side of the eleventh lens E11 in the third group optical system G3 may include a cover glass of a solid image capturing device 53 such as a CCD image capturing device, and has various optical filtering functions. In this example 2-4, the fourth surface, being a surface on the object side of the third lens E3 located closest to the object side in the first group optical system G1, and the sixth surface, being a surface on the object side of the fourth lens E4 located closest to the object side in the second group optical system G3, and the eighteenth surface, being a surface on the object side of the eleventh lens E11 located closest to the object side in the third group optical system G3 are respectively aspheric surfaces.

The shift of the respective group optical systems G1 to G3 accompanying zooming between the wide-angle end, that is, the short focal-length side, and the telephoto end, that is, the long focal-length side is, as illustrated in FIG. 4, such that the first group optical system G1.

The shift of the respective group optical systems G1 to G3 accompanying zooming between the wide-angle end, that is, the short focal-length side, and the telephoto end, that is, the long focal-length side is, as illustrated in FIG. 4, such that the first group optical system G1 shifts from the object side toward the image surface side with a shift from the short focal-length side to the intermediate focal length, and shifts from the image surface side toward the object side with a shift from the intermediate focal length to the long focal-length side, and the second group optical system G2 shifts from the object side toward the image surface side with a shift from the short focal-length side to he long focal-length side, and the third group optical system G3 shifts from the image surface side toward the object side.

In example 1-4, the focal length f of the whole system, the F number F, and the half angle of view, ω, respectively change in the range of f=5.900 to 23.600, F=3.04 to 3.72, and ω=38.2 to 11.1. The optical characteristics relating to the respective optical surfaces and the optical elements are as shown in the following table. The lens surface added with * are aspheric surfaces.

TABLE 13

Optical characteristics

| Surface | R | D | Nd | vd | Note |
|---|---|---|---|---|---|
| 1 | 34.733 | 1.000 | 1.84666 | 23.8 | First lens |
| 2 | 23.249 | 2.992 | 1.49700 | 81.6 | Second lens |
| 3 | 50.425 | 0.100 | | | |
| 4* | 19.468 | 3.048 | 1.72916 | 54.7 | Third lens |
| 5 | 67.451 | d1 | | | |
| 6* | 86.341 | 0.800 | 1.80518 | 25.5 | Fourth lens |
| 7 | 5.603 | 4.512 | | | |
| 8 | −9.394 | 0.800 | 1.49700 | 81.6 | Fifth lens |
| 9 | 13.186 | 2.087 | 1.84666 | 23.8 | Sixth lens |
| 10 | −33.540 | d2 | | | |
| 11 | 0.000 | 0.100 | | | |
| 12 | 9.855 | 1.418 | 1.74077 | 27.8 | Seventh lens |
| 13 | 615.630 | 1.279 | | | |
| 14 | 8.944 | 1.382 | 1.84666 | 23.8 | Eighth lens |
| 15 | 4.082 | 2.977 | 1.64000 | 60.2 | Ninth lens |
| 16 | −6.047 | 2.648 | 1.80610 | 33.3 | Tenth lens |
| 17 | 8.079 | 1.883 | | | |
| 18* | 8.267 | 2.364 | 1.48749 | 70.4 | Eleventh lens |
| 19 | −13.748 | d3 | | | |
| 20 | 0.000 | 1.980 | 1.51680 | 64.2 | Filter, cover glass |
| 21 | 0.000 | | | | |

The optical surfaces on the fourth, the sixth, and the eighteenth surfaces in Table 13 are aspheric surfaces, and parameters relating to expression (25) on the respective aspheric surfaces are as shown in the following table.

TABLE 14

Coefficient of aspheric surface

| | K | $A_4$ | $A_6$ | $A_8$ | $A_{10}$ |
|---|---|---|---|---|---|
| 4 | −0.06563 | −2.49787E−06 | 1.31109E−08 | −2.07098E−10 | 7.80637E−13 |
| 6 | 117.23187 | 1.94059E−04 | −3.89470E−06 | 6.63457E−08 | −6.24076E−10 |
| 18 | −2.7548 | 1.24489E−05 | 1.01915E−05 | −8.16729E−07 | 2.67482E−08 |

The interval d1 between the first group optical system G1 and the second group optical system G2, the interval d2 between the second group optical system G2 and the diaphragm FA, and the interval d3 between the third group optical system G3 and the optical filter OF are variable, and these variable intervals d1, d2, and d3 are changed as shown in the following table, corresponding to the focal length f of the whole system, accompanying zooming.

TABLE 15

Variable intervals

| | f | d1 | d2 | d3 |
|---|---|---|---|---|
| Wide | 5.899 | 1.000 | 14.870 | 4.812 |
| Mean | 11.108 | 5.956 | 6.058 | 7.771 |
| Tele | 23.611 | 14.670 | 0.882 | 9.585 |

The parameter values according to the respective conditional expressions (1) to (3) of the present invention in example 1-4 are as shown in the following table, and within the range of the respective conditional expressions.

TABLE 16

Parameter values in conditional expressions

| Np − Nn | −0.186 |
|---|---|
| νp − νn | 31.68 |
| K12/(fw + ft) | 0.804 |

Figure 11:
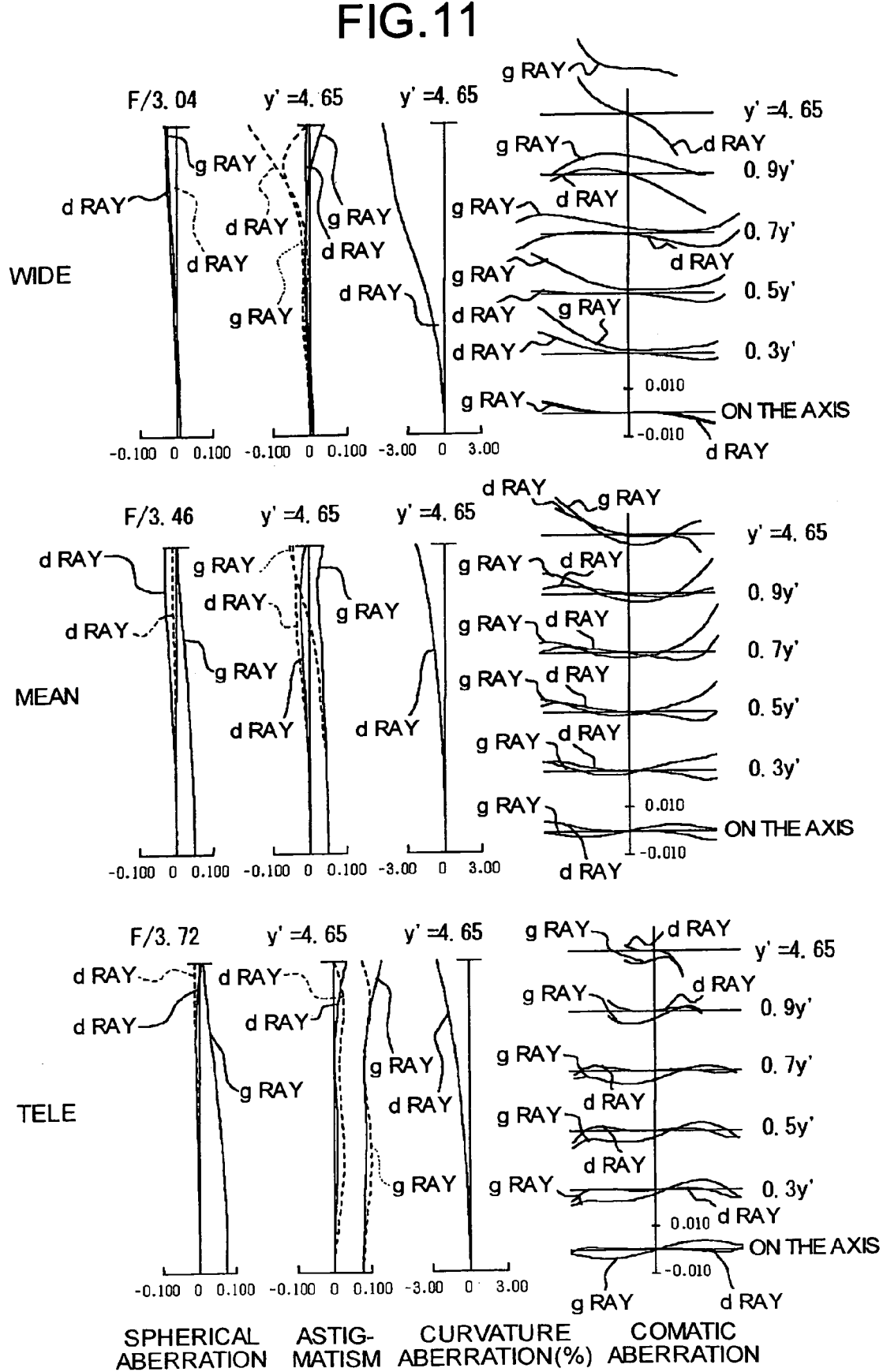
FIG. 11 is a set of graphs for illustrating aberration characteristics of the zoom lens shown in FIG. 4.

The aberration diagram in example 1-4 is illustrated in FIG. 11.

FIG. 5 is a schematic diagram of an optical system of example 1-5 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a diaphragm FA, and an optical filter (including a cover glass) OF. In this case, the first to the third lenses E1 to E3 constitute the first group optical system G1, the fourth to the sixth lenses E4 to E6 constitute the second group optical system G2, and the seventh to the eleventh lenses E7 to E11 constitute the third group optical system G3.

The respective lenses are supported by an appropriate common support frame or the like for each lens group, and at the time of zooming, each group optical system integrally operates. The diaphragm FA is arranged on the object side of the third group optical system G3, and operates integrally with the third group optical system G3. Surface numbers of the respective optical surfaces are added for reference. The respective reference signs in FIG. 5 are used independently for each example, in order to avoid complexity due to an increase in number of digits of the reference signs. Therefore, even when a common reference sign is given, it is not always a common configuration to other examples.

In FIG. 5, for example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, and the optical filter OF are arranged in order from the object side of a subject or the like, and an image is formed at the back of the optical filter OF having various optical filtering functions.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative meniscus lens formed in a convex shape on the object side, the fifth lens E5 is a negative lens including a double-concave lens, and the sixth lens E6 is a positive meniscus lens formed in a convex shape on the object side. The fifth lens E5 and the sixth lens E6 form a densely cemented doublet, and the second group optical system G2 formed of the fourth to the sixth lenses E4 to E6 exhibits a negative focal length as a whole.

The seventh lens E7 is a positive lens including a double-convex lens, the eighth lens E8 is a negative meniscus lens formed in a convex shape on the object side, the ninth lens E9 is a positive lens including a double-convex lens, the tenth lens E10 is a negative lens including a double-concave lens, and the eleventh lens E11 is a positive lens including a double-convex lens. The eighth to the tenth lenses E8 to E10 form a densely cemented triplet, and the third group optical system G3 formed of the seventh to the eleventh lenses E7 to E11 exhibits a positive focal length as a whole. The diaphragm FA arranged between the second group optical system G2 and the third group optical system G3 operates integrally with the third group optical system G3, and the distance from the third group optical system G3 is constant.

The optical filter OF arranged on the image surface side of the eleventh lens E11 in the third group optical system G3 may include a cover glass of a solid image capturing device 53 such as a CCD image capturing device, and has various optical filtering functions.

In this example 1-5, the fifth surface, being a surface on the object side of the third lens E3 located closest to the image surface side in the first group optical system G1, and the twelfth surface, being a surface on the object side of the seventh lens E7 located closest to the object side in the third group optical system G3, and the eighteenth surface, being a surface on the object side of the eleventh lens E11 located closest to the object side in the third group optical system G3, are respectively aspheric surfaces.

The shift of the respective group optical systems G1 to G3 accompanying zooming between the wide-angle end, that is, the short focal-length side, and the telephoto end, that is, the long focal-length side is, as illustrated in FIG. 5, such that the first group optical system G1 shifts from the object side toward the image surface side with a shift from the short focal-length side to the intermediate focal length, and shifts from the image surface side toward the object side with a shift from the intermediate focal length to the long focal-length side, and the second group optical system G2 shifts from the object side toward the image surface side with a shift from the short focal-length side to the long focal-length side, and the third group optical system G3 shifts from the image surface side toward the object side with a shift from the short focal-length side to the long focal-length side.

In example 1-5, the focal length f of the whole system, the F number F, and the half angle of view, ω, respectively change in the range of f=5.900 to 23.601, F=2.79 to 3.41, and ω=38.2 to 11.1. The optical characteristics relating to the respective optical surfaces and the optical elements are as shown in the following table. The lens surface added with * are aspheric surfaces.

TABLE 17

Optical characteristics

| Surface | R | D | Nd | νd | Note |
|---|---|---|---|---|---|
| 1 | 41.101 | 1.000 | 1.84666 | 23.8 | First lens |
| 2 | 27.440 | 3.306 | 1.49700 | 81.6 | Second lens |
| 3 | 100.995 | 0.100 | | | |
| 4 | 26.505 | 2.824 | 1.72916 | 54.7 | Third lens |
| 5* | 70.464 | d1 | | | |
| 6 | 28.455 | 0.800 | 1.88300 | 40.8 | Fourth lens |
| 7 | 6.027 | 3.779 | | | |
| 8 | −15.765 | 0.800 | 1.51680 | 64.2 | Fifth lens |
| 9 | 8.236 | 2.599 | 1.80610 | 33.3 | Sixth lens |
| 10 | 1529.601 | d2 | | | |
| 11 | 0.000 | 0.100 | | | |
| 12* | 10.421 | 1.809 | 1.67790 | 55.5 | Seventh lens |
| 13 | −29.776 | 1.516 | | | |
| 14 | 8.644 | 0.800 | 1.83500 | 43.0 | Eighth lens |
| 15 | 4.195 | 2.733 | 1.69680 | 55.5 | Ninth lens |
| 16 | −7.222 | 2.126 | 1.80610 | 33.3 | Tenth lens |
| 17 | 6.041 | 3.461 | | | |
| 18* | 8.570 | 2.475 | 1.49700 | 81.6 | Eleventh lens |
| 19 | −22.851 | d3 | | | |
| 20 | 0.000 | 1.980 | 1.51680 | 64.2 | Filter, cover glass |
| 21 | 0.000 | | | | |

The optical surfaces on the fifth, the twelfth and the eighteenth surfaces in Table 17 are aspheric surfaces, and parameters relating to expression (25) on the respective aspheric surfaces are as shown in the following table.

TABLE 18

Coefficient of aspheric surface

| | K | $A_4$ | $A_6$ | $A_8$ | $A_{10}$ |
|---|---|---|---|---|---|
| 5 | 2.46107 | −7.24240E−07 | −9.03070E−09 | 4.96805E−11 | −9.91944E−14 |
| 12 | 0.97492 | −2.21645E−04 | 4.93689E−07 | −3.04146E−07 | 1.17057E−08 |
| 18 | −1.91564 | 4.52271E−05 | 2.48651E−06 | 4.43265E−08 | −2.17094E−09 |

The interval d1 between the first group optical system G1 and the second group optical system G2, the interval d2 between the second group optical system G2 and the diaphragm FA, and the interval d3 between the third group optical system G3 and the optical filter OF are variable, and these variable intervals d1, d2, and d3 are changed as shown in the following table, corresponding to the focal length f of the whole system, accompanying zooming.

TABLE 19

Variable intervals

| | f | d1 | d2 | d3 |
|---|---|---|---|---|
| Wide | 5.900 | 1.000 | 15.853 | 1.835 |
| Mean | 12.301 | 1.870 | 2.751 | 7.225 |
| Tele | 23.601 | 19.269 | 1.002 | 6.494 |

The parameter values according to the respective conditional expressions (1) to (3) of the present invention in example 1-5 are as shown in the following table, and within the range of the respective conditional expressions.

TABLE 20

Parameter values in conditional expressions

| Np − Nn | −0.124 |
|---|---|
| νp − νn | 17.34 |
| K12/(fw + ft) | 1.004 |

Figure 12:
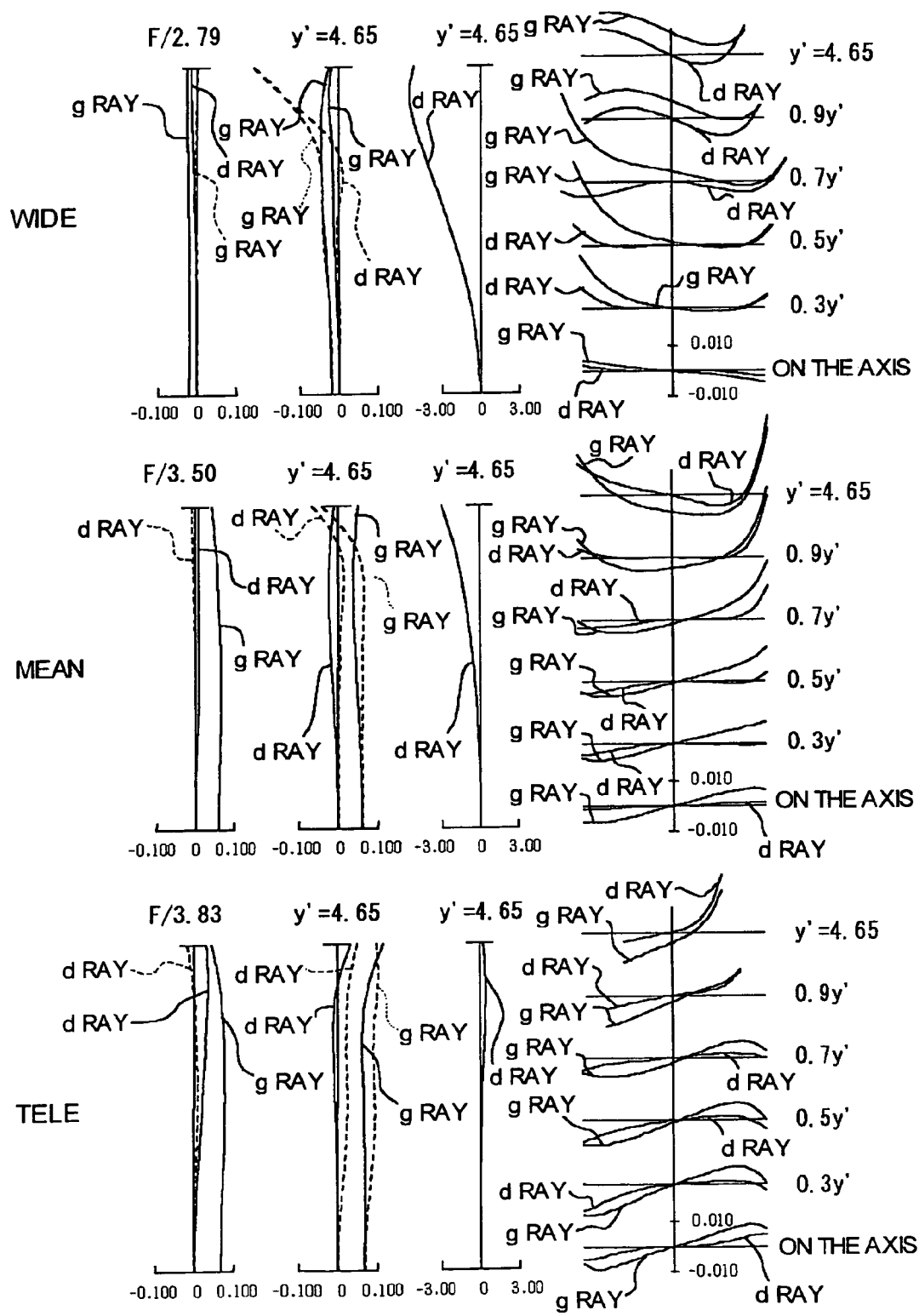
FIG. 12 is a set of graphs for illustrating aberration characteristics of the zoom lens shown in FIG. 5.

The aberration diagram in example 1-5 is illustrated in FIG. 12.

FIG. 6 is a schematic diagram of an optical system of example 1-6 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a diaphragm FA, and an optical filter (including a cover glass) OF. In this case, the first to the third lenses E1 to E3 constitute the first group optical system G1, the fourth to the sixth lenses E4 to E6 constitute the second group optical system G2, and the seventh to the eleventh lenses E7 to E11 constitute the third group optical system G3.

The respective lenses are supported by an appropriate common support frame or the like for each lens group, and at the time of zooming, each group optical system integrally operates. The diaphragm FA is arranged on the object side of the third group optical system G3, and operates integrally with the third group optical system G3. Surface numbers of the respective optical surfaces are added for reference. The respective reference signs in FIG. 6 are used independently for each example, in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, and the optical filter OF are arranged in order from the object side of a subject or the like, and an image is formed at the back of the optical filter OF having various optical filtering functions.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative meniscus lens formed in a convex shape on the object side, the fifth lens E5 is a negative lens including a double-concave lens, and the sixth lens E6 is a positive meniscus lens formed in a convex shape on the object side. The fifth lens E5 and the sixth lens E6 form a densely cemented doublet, and the second group optical system G2 formed of the fourth to the sixth lenses E4 to E6 exhibits a negative focal length as a whole.

The seventh lens E7 is a positive lens including a double-convex lens, the eighth lens E8 is a negative lens including a double-concave, the ninth lens E9 is a positive lens including a double-convex lens, the tenth lens E10 is a negative lens including a double-concave lens, and the eleventh lens E11 is a positive meniscus lens formed in a convex shape on the object side. The eighth lens E8 to the tenth lens E10 form a densely cemented triplet, and the third group optical system G3 formed of the seventh to the eleventh lenses E7 to E11 exhibits a positive focal length as a whole. The diaphragm FA arranged between the second group optical system G2 and the third group optical system G3 operates integrally with the third group optical system G3, and the distance from the third group optical system G3 is constant.

The optical filter OF arranged on the image surface side of the eleventh lens E11 in the third group optical system G3 may include a cover glass of a solid image capturing device 53 such as a CCD image capturing device, and has various optical filtering functions.

In this example 1-6, the sixth surface, being a surface on the object side of the fourth lens E4 located closest to the object side in the second group optical system G2, the twelfth surface, being a surface on the object side of the seventh lens E7 located closest to the object side in the third group optical system G3, and the seventeenth surface, being a surface of the tenth lens E10 located closest to the image surface side of the cemented triplet lens in the third group optical system G3, are respectively aspheric surfaces.

The shift of the respective group optical systems G1 to G3 accompanying zooming between the wide-angle end, that is, the short focal-length side, and the telephoto end, that is, the long focal-length side is, as illustrated in FIG. 6, such that the first group optical system G1 shifts from the image surface side toward the object side with a shift from the short focal-length side to the long focal-length side, and the second group optical system G2 shifts from the object side toward the image surface side, and the third group optical system G3 shifts from the image surface side toward the object side.

In example 1-6, the focal length f of the whole system, the F number F, and the half angle of view, $\omega$, respectively change in the range of f=5.900 to 35.404, F=3.60 to 3.88, and $\omega$=38.2 to 7.5 The optical characteristics relating to the respective optical surfaces and the optical elements are as shown in the following table. The lens surface added with * are aspheric surfaces.

TABLE 21

| | Optical characteristics | | | | |
|---|---|---|---|---|---|
| Surface | R | D | Nd | vd | Note |
| 1 | 38.793 | 1.000 | 1.84666 | 23.8 | First lens |
| 2 | 22.685 | 4.517 | 1.49700 | 81.6 | Second lens |
| 3 | 124.293 | 0.100 | | | |
| 4 | 22.311 | 2.647 | 1.88300 | 40.8 | Third lens |
| 5 | 49.396 | d1 | | | |
| 6* | 35.371 | 0.800 | 1.75520 | 27.5 | Fourth lens |
| 7 | 5.412 | 4.129 | | | |
| 8 | −13.289 | 0.800 | 1.58913 | 61.3 | Fifth lens |
| 9 | 7.995 | 2.469 | 1.84666 | 23.8 | Sixth lens |
| 10 | 421.332 | d2 | | | |
| 11 | 0.000 | 0.100 | | | |
| 12* | 7.562 | 1.898 | 1.73400 | 51.1 | Seventh lens |
| 13 | −38.284 | 2.067 | | | |
| 14 | −35.087 | 0.800 | 1.83400 | 37.3 | Eighth lens |
| 15 | 7.872 | 2.492 | 1.74400 | 44.9 | Ninth lens |
| 16 | −4.880 | 1.587 | 1.80518 | 25.5 | Tenth lens |
| 17* | 551.001 | 5.986 | | | |
| 18 | 9.387 | 1.699 | 1.51742 | 52.2 | Eleventh lens |
| 19 | 21.436 | d3 | | | |
| 20 | 0.000 | 1.980 | 1.51680 | 64.2 | Filter, cover glass |
| 21 | 0.000 | | | | |

The optical surfaces on the sixth, the twelfth, and the seventeenth surfaces in Table 21 are aspheric surfaces, and parameters relating to expression (25) on the respective aspheric surfaces are as shown in the following table.

TABLE 22

| | Coefficient of aspheric surface | | | | |
|---|---|---|---|---|---|
| | K | $A_4$ | $A_6$ | $A_8$ | $A_{10}$ |
| 6 | −15.51346 | 1.19918E−04 | −1.08642E−06 | 1.01994E−08 | −4.97906E−11 |
| 12 | 0.54508 | −2.93810E−04 | −5.76520E−06 | 8.86556E−08 | −1.12299E−08 |
| 17 | −2185.272 | 6.31874E−04 | 1.34142E−05 | 4.20069E−07 | 3.70498E−09 |

The interval d1 between the first group optical system G1 and the second group optical system G2, the interval d2 between the second group optical system G2 and the diaphragm FA, and the interval d3 between the third group optical system G3 and the optical filter OF are variable, and these variable intervals d1, d2, and d3 are changed as shown in the following table, corresponding to the focal length f of the whole system, accompanying zooming.

TABLE 23

| Variable intervals | | | |
|---|---|---|---|
| f | d1 | d2 | d3 |
| Wide 5.900 | 1.000 | 16.155 | 1.928 |
| Mean 13.702 | 8.393 | 6.412 | 6.451 |
| Tele 35.404 | 18.941 | 1.011 | 8.975 |

The parameter values according to the respective conditional expressions (1) to (3) of the present invention in example 1-6 are as shown in the following table, and within the range of the respective conditional expressions.

TABLE 24

| Parameter values in conditional expressions | |
|---|---|
| Np − Nn | −0.076 |
| νp − νn | 13.50 |
| K12/(fw + ft) | 0.915 |

Figure 13:
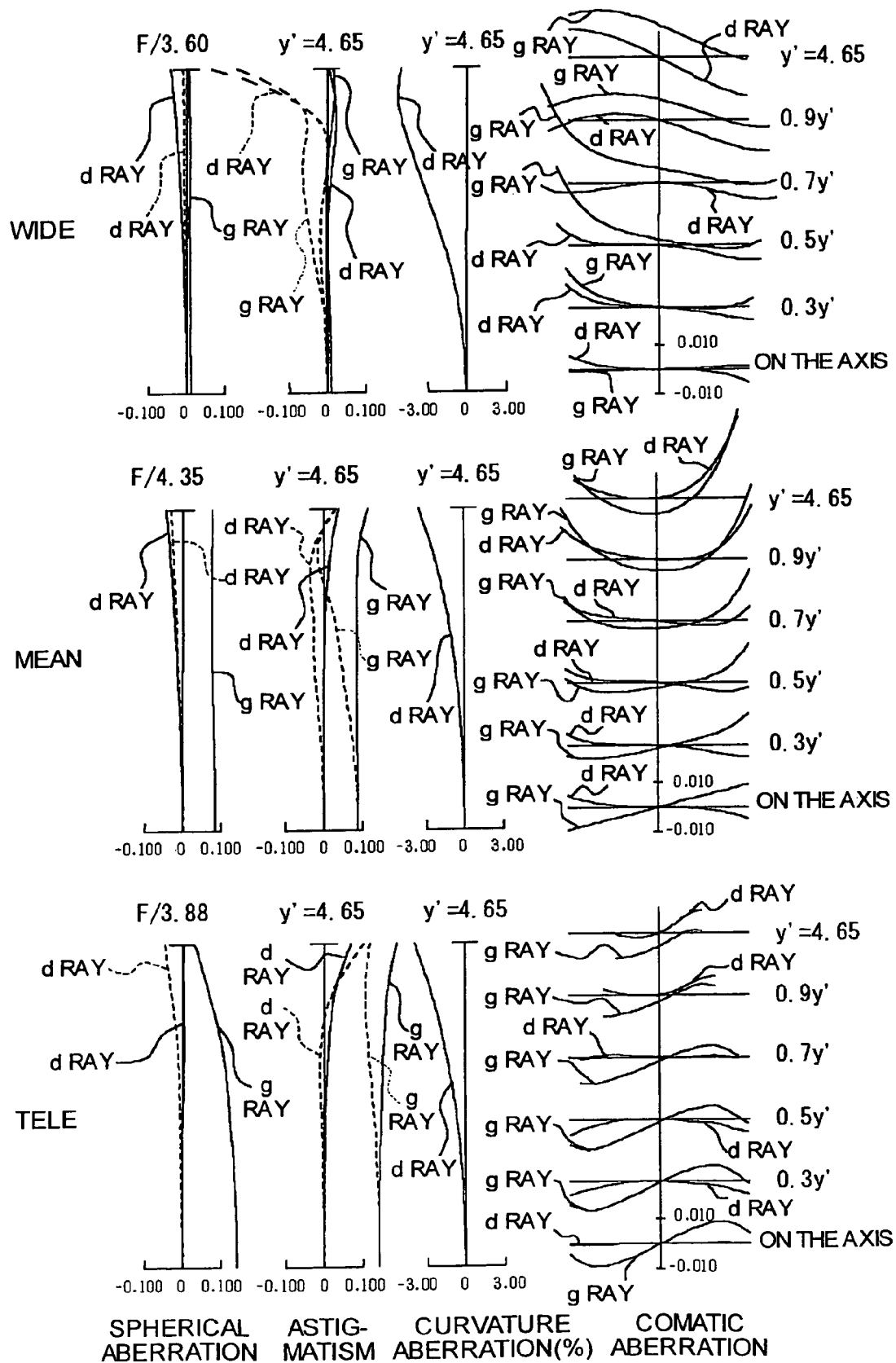
FIG. 13 is a set of graphs for illustrating aberration characteristics of the zoom lens shown in FIG. 6.

The aberration diagram in example 1-6 is illustrated in FIG. 13.

FIG. 7 is a schematic diagram of an optical system of example 1-7 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a diaphragm FA, and an optical filter (including a cover glass) OF. In this case, the first to the third lenses E1 to E3 constitute the first group optical system G1, the fourth to the sixth lenses E4 to E6 constitute the second group optical system G2, and the seventh to the eleventh lenses E7 to E11 constitute the third group optical system G3.

The respective lenses are supported by an appropriate common support frame or the like for each lens group, and at the time of zooming, each group optical system integrally operates. The diaphragm FA is arranged on the object side of the third group optical system G3, and operates integrally with the third group optical system G3. Surface numbers of the respective optical surfaces are added for reference. The respective reference signs in FIG. 7 are used independently for each example, in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, and the optical filter OF are arranged in order from the object side of a subject or the like, and an image is formed at the back of the optical filter OF having various optical filtering functions.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative meniscus lens formed in a convex shape on the object side, the fifth lens E5 is a negative lens including a double-concave lens, and the sixth lens E6 is a positive meniscus lens formed in a convex shape on the object side. The fifth lens E5 and the sixth lens E6 is a positive lens including double-convex lens, and the second group optical system G2 formed of the fourth to the sixth lenses E4 to E6 exhibits a negative focal length as a whole.

The seventh lens E7 is a positive lens including a double-convex lens, the eighth lens E8 is a negative meniscus lens formed in a convex shape on the object side, the ninth lens E9 is a positive lens including a double-convex lens, the tenth lens E10 is a negative lens including a double-concave lens, and the eleventh lens E11 is a positive lens including a double-convex lens.

The eighth lens E8 to the tenth lens E10 form a densely cemented triplet, and the third group optical system G3 formed of the seventh to the eleventh lenses E7 to E11 exhibits a positive focal length as a whole. The diaphragm FA arranged between the second group optical system G2 and the third group optical system G3 operates integrally with the third group optical system G3, and the distance from the third group optical system G3 is constant.

The optical filter OF arranged on the image surface side of the eleventh lens E11 in the third group optical system G3 may include a cover glass of a solid image capturing device 53 such as a CCD image capturing device, and has various optical filtering functions. In this example 1-7, the sixth surface, being a surface on the object side of the fourth lens E4 located closest to the object side in the second group optical system G2, the twelfth surface, being a surface on the object side of the seventh lens E7 located closest to the object side in the third group optical system G3, and the eighteenth surface, being a surface of the object side of the eleventh lens E11 located closest to the object side of the third group optical system G3, are respectively aspheric surfaces.

The shift of the respective group optical systems G1 to G3 accompanying zooming between the wide-angle end, that is, the short focal-length side, and the telephoto end, that is, the long focal-length side is, as illustrated in FIG. 7, such that the first group optical system G1 shifts from the image surface side toward the object side with a shift from the short focal-length side to the long focal-length side, and the second group optical system G2 shifts from the object side toward the image surface side, and the third group optical system G3 shifts from the image surface side toward the object side.

In example 1-7, the focal length f of the whole system, the F number F, and the half angle of view, ω, respectively change in the range of f=5.898 to 23.605, F=2.79 to 3.45, and ω=38.3 to 11.1 The optical characteristics relating to the respective optical surfaces and the optical elements are as shown in the following table. The lens surface added with * are aspheric surfaces.

TABLE 25

Optical characteristics

| Surface | R | D | Nd | νd | Note |
|---|---|---|---|---|---|
| 1 | 43.992 | 1.000 | 1.84666 | 23.8 | First lens |
| 2 | 24.879 | 3.499 | 1.56384 | 60.8 | Second lens |
| 3 | 125.477 | 0.100 | | | |
| 4 | 22.003 | 2.758 | 1.78800 | 47.5 | Third lens |
| 5 | 49.308 | d1 | | | |
| 6* | 52.156 | 0.800 | 1.78472 | 25.7 | Fourth lens |
| 7 | 5.356 | 4.310 | | | |
| 8 | −9.221 | 0.800 | 1.49700 | 81.6 | Fifth lens |
| 9 | 11.763 | 1.532 | 1.84666 | 23.8 | Sixth lens |
| 10 | −44.183 | d2 | | | |
| 11 | 0.000 | 0.245 | | | |
| 12* | 8.247 | 2.509 | 1.60342 | 38.0 | Seventh lens |
| 13 | −25.143 | 2.064 | | | |
| 14 | 15.998 | 0.800 | 1.83400 | 37.3 | Eighth lens |
| 15 | 4.105 | 2.812 | 1.72000 | 50.3 | Ninth lens |
| 16 | −5.274 | 0.816 | 1.80518 | 25.5 | Tenth lens |
| 17 | 7.832 | 1.209 | | | |
| 18* | 9.914 | 3.565 | 1.59551 | 39.2 | Eleventh lens |
| 19 | −15.402 | d3 | | | |
| 20 | 0.000 | 1.980 | 1.51680 | 64.2 | Filter, cover glass |
| 21 | 0.000 | | | | |

The optical surfaces on the sixth, the twelfth, and the eighteenth surfaces in Table 25 are aspheric surfaces, and parameters relating to expression (25) on the respective aspheric surfaces are as shown in the following table.

TABLE 26

Coefficient of aspheric surface

| | K | $A_4$ | $A_6$ | $A_8$ | $A_{10}$ |
|---|---|---|---|---|---|
| 6 | 47.18823 | 1.66302E−04 | −4.75304E−06 | 9.68797E−08 | −1.16785E−09 |
| 12 | 0.40944 | −3.51364E−04 | −3.22505E−06 | 1.56822E−07 | −1.19092E−08 |
| 18 | −2.14701 | 4.57066E−05 | 8.65923E−06 | −6.34640E−07 | 2.42648E−08 |

The interval d1 between the first group optical system G1 and the second group optical system G2, the interval d2 between the second group optical system G2 and the diaphragm FA, and the interval d3 between the third group optical system G3 and the optical filter OF are variable, and these variable intervals d1, d2, and d3 are changed as shown in the following table, corresponding to the focal length f of the whole system, accompanying zooming.

TABLE 27

Variable intervals

| | f | d1 | d2 | d3 |
|---|---|---|---|---|
| Wide | 5.898 | 1.084 | 12.884 | 5.226 |
| Mean | 11.177 | 5.946 | 4.759 | 8.702 |
| Tele | 23.605 | 16.881 | 0.910 | 10.244 |

The parameter values according to the respective conditional expressions (1) to (3) of the present invention in example 1-7 are as shown in the following table, and within the range of the respective conditional expressions.

TABLE 28

Parameter values in conditional expressions

| Np − Nn | −0.100 |
|---|---|
| νp − νn | 18.94 |
| K12/(fw + ft) | 0.925 |

Figure 14:
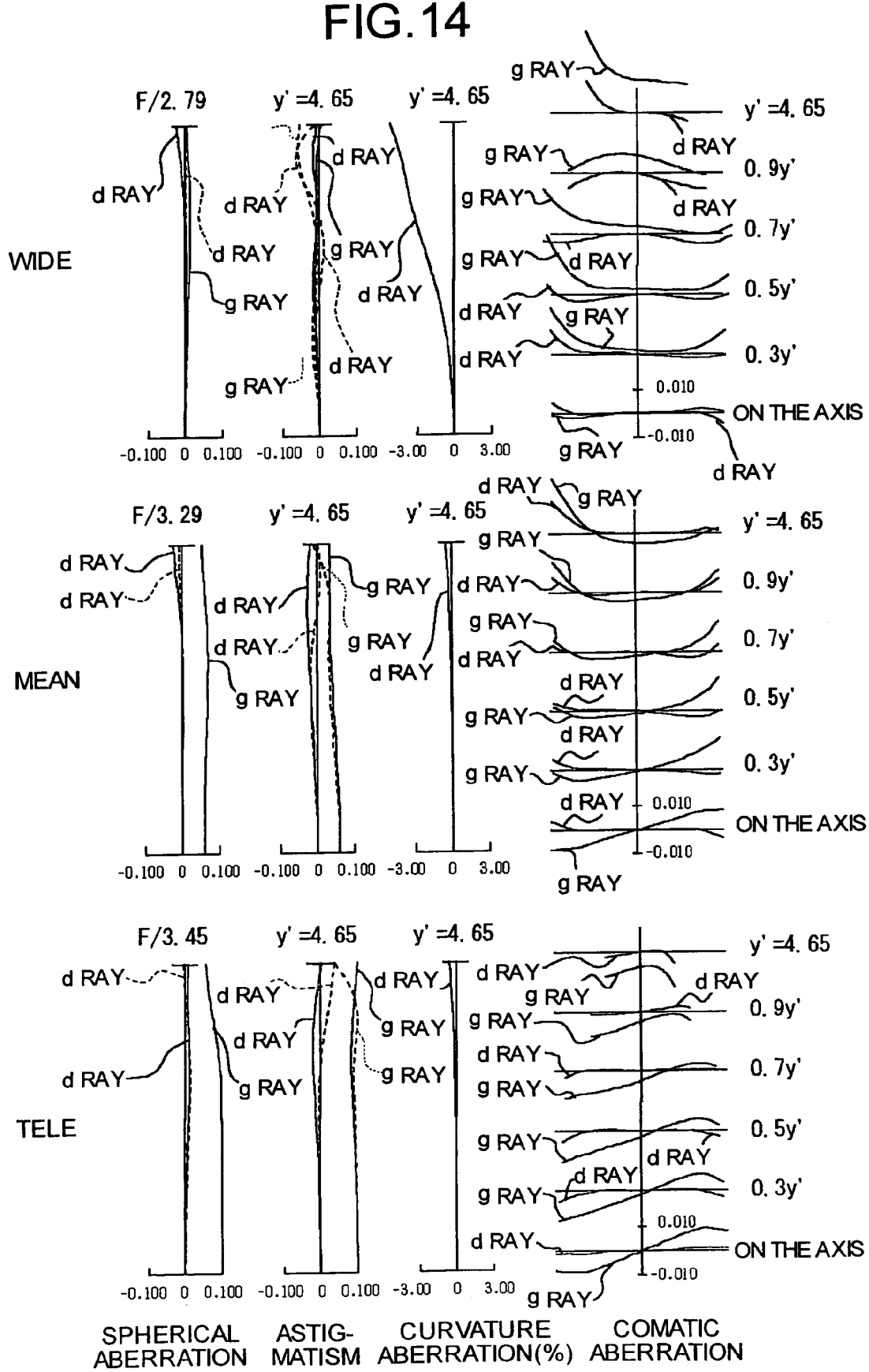
FIG. 14 is a set of graphs for illustrating aberration characteristics of the zoom lens shown in FIG. 7.

The aberration diagram in example 1-7 is illustrated in FIG. 14.

Example 1-6 covers a case when the aperture diaphragm at the long focal-length side is made large with respect to that at the short focal-length side, to decrease the F number at the long focal-length side.

Figure 15:
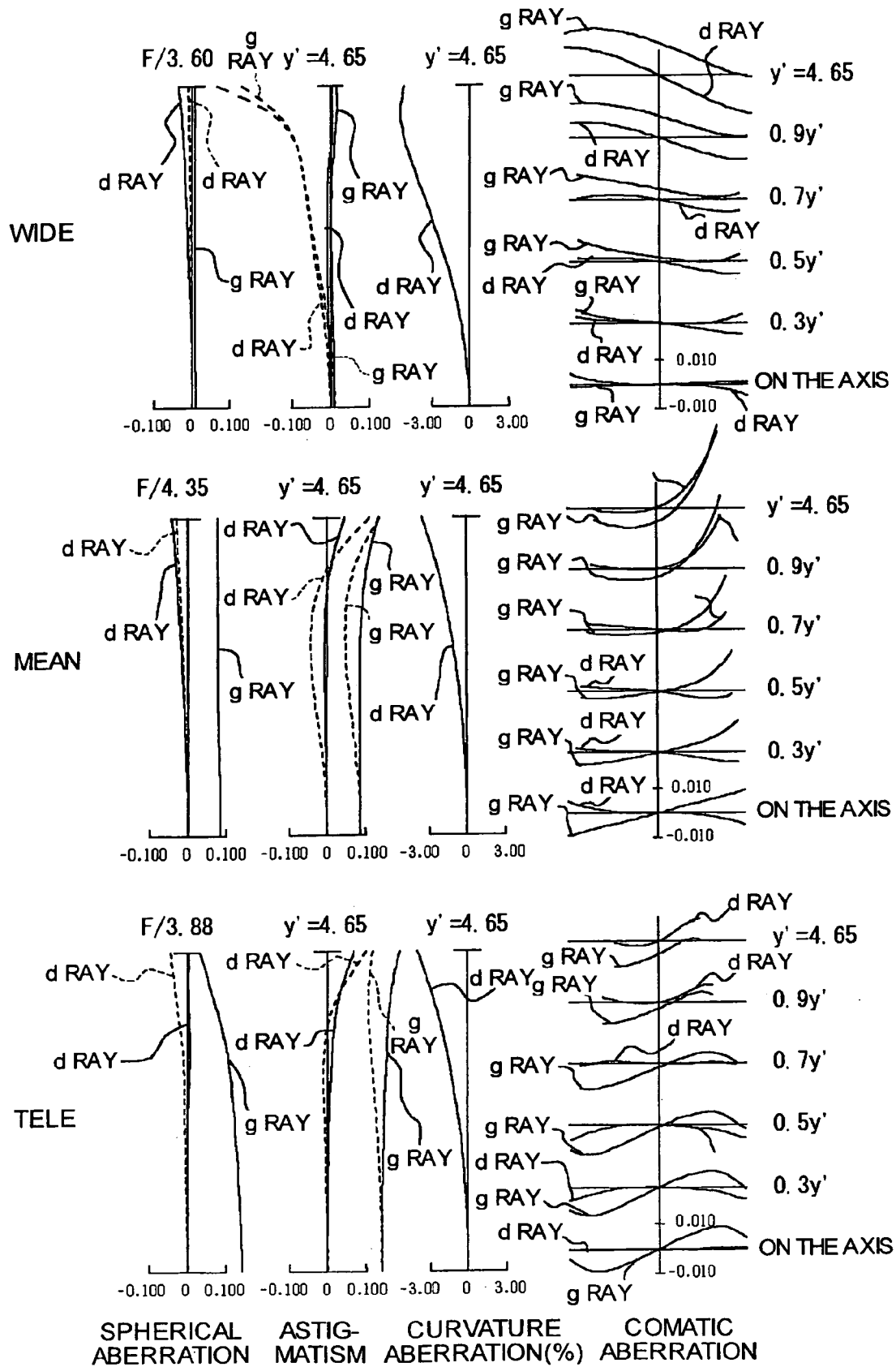
FIG. 15 is a set of graphs for illustrating aberration characteristics of the zoom lens shown in FIG. 6 when a beam flux of a mean image height at the short focal-length side and a mean focal length is shielded by a diaphragm.

In the respective lenses, a diaphragm for shading a part of beams of a mean angle of view can be arranged between the second group optical system G2 and the third group optical system G3, in the zooming range other than the long focal-length side. Therefore, an example of the aberration diagram when the diaphragm for shading is provided in the seventh embodiment is illustrated in FIG. 15. The position of the diaphragm for shading in this case is as follows. Short focal-length side: At a position of 10 millimeters from the second group optical system G2 toward the image surface side. Mean focal-length: At a position of 1 millimeter from the second group optical system G2 toward the image surface side.

In this example, an example, in which the position of the diaphragm for shading and the diameter of the diaphragm are changed in order to shade a part of the beams of the mean image height from the short focal-length side to the mean focal length, is shown, but the position and the diameter may be fixed corresponding to the aberration situation, and for example, the zooming range to be shaded may be only at the short focal-length side.

As is obvious from example 1-1 to example 1-7, since the zoom lens according to the first embodiment has the number of lenses as small as 10 to 11, and is very compact, it can correspond to resources saving. Further, various aberrations from the chromatic aberration down can be favorably corrected over the whole zoom range, so as to be able to correspond to image capturing devices of 3,000,000 pixels or more, while the half angle of view on the short focal length side is as wide as equal to or more than 38 degrees, and the magnification is as high as 3× to 6×. Further, since an optical glass that is chemically stable and does not contain any toxic substance such as lead or arsenic is used, the materials can be recycled, and hence conservation of global environment is possible, without having water pollution due to waste fluid at the time of machining. Further, by using the zoom lens according to the respective examples as a shooting lens in a camera, considerable miniaturization, light weight, and low cost can be realized, and electric power saving can be achieved, while maintaining high performance as a camera. By constituting a mobile information terminal by adding a communication function to such a camera function, considerable miniaturization, light weight, and low cost of the mobile information terminal can be realized, and electric power saving can be achieved.

Specific configuration and numerical examples are shown in example 2, as an example of the zoom lens according to the fourth embodiment of the present invention. In each example, the aberrations of the zoom lens are sufficiently corrected, and correspondence to the photodetector with 3,000,000 to 5,000,000 pixels becomes possible. It will be obvious from the examples below, that excellent imaging performance can be ensured, while achieving sufficient miniaturization and wide angle of view, by forming the zoom lens as shown in the fourth embodiment.

In example 2, various signs as described below are used.
f: Focal length of the whole system
F: F number
ω: Half angle of view
R: Radius of curvature
D: Spacing
$N_d$: Refractive index
$v_d$: Abbe constant
K: Conical constant of the aspheric surface
$A_4$: Fourth coefficient of the aspheric surface
$A_6$: Sixth coefficient of the aspheric surface
$A_8$: Eighth coefficient of the aspheric surface
$A_{10}$: Tenth coefficient of the aspheric surface However, the aspheric surface used herein is defined by the following expression, when it is assumed that a reciprocal of a paraxial radius of curvature (paraxial curvature) is C, and the height from the optical axis is H.

$$X = \frac{CH^2}{1 + \sqrt{(1-(1+K)C^2H^2)}} + A_4 \cdot Y^4 + A_6 \cdot Y^6 + A_8 \cdot Y^8 + A_{10} \cdot Y^{10} \quad (26)$$

Figure 19:
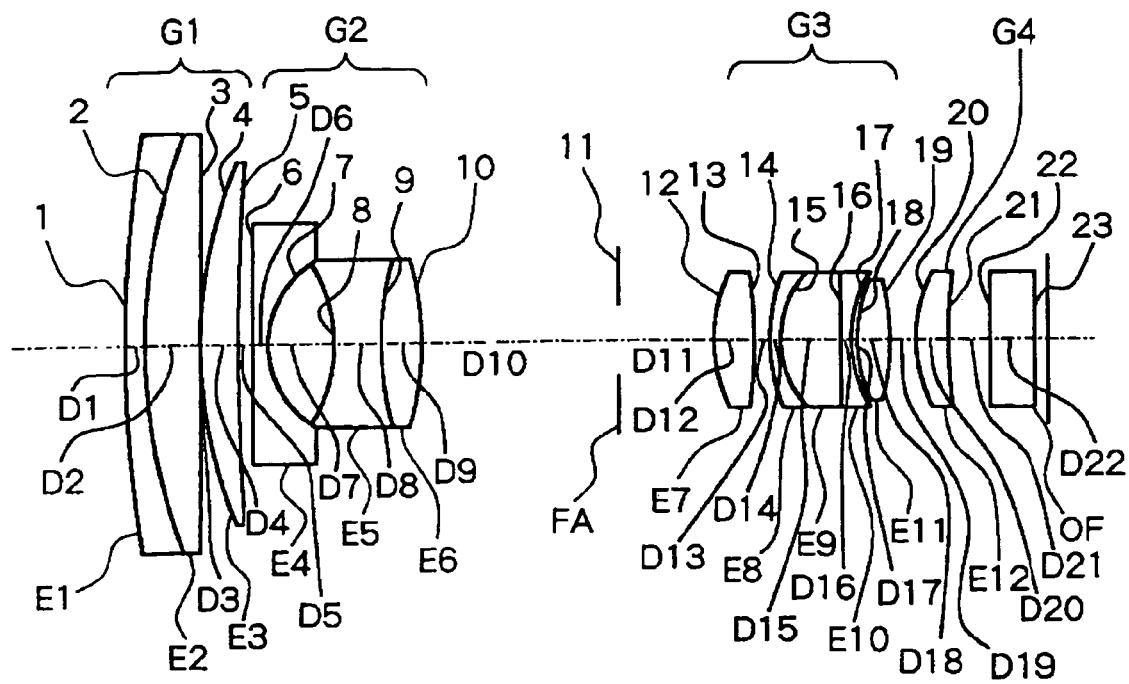
FIG. 19 is a schematic diagram of an optical system of example 2-1 of a zoom lens according to a fourth embodiment of the present invention.

FIG. 19 is a schematic diagram of an optical system of example 2-1 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12 a diaphragm FA, and an optical filter (including a cover glass) OF. In this case, the first to the third lenses E1 to E3 constitute the first group optical system G1, the fourth to the sixth lenses E4 to E6 constitute the second group optical system G2, the seventh to the eleventh lenses E7 to E11 constitute the third group optical system G3, and the twelfth lens E12 constitutes the fourth group optical system G4.

The respective lenses are supported by an appropriate common support frame or the like for each lens group, and at the time of zooming, each group optical system integrally operates. Surface numbers of the respective optical surfaces are added for reference. The respective reference signs in FIG. 19 are used independently for each example, in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, the twelfth lens E12, and the optical filter OF are arranged in order from the object side of a subject or the like, and an image is formed at the back of the optical filter OF having various optical filtering functions.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative lens including double-convex lens, the fifth lens E5 is also a negative lens including a double-concave lens, and the sixth lens E6 is a positive lens including a double-convex lens. The fifth lens E5 and the sixth lens E6 are densely cemented doublet, and the second group optical system formed of the fourth to the sixth lenses E4 to E6 exhibits a negative focal length as a whole.

The seventh lens E7 is a positive lens including a double-convex lens, the eighth lens E8 is a negative meniscus lens formed in a convex shape on the object side, the ninth lens E9 is a positive lens including a double-convex lens, the tenth lens E10 is a negative lens including a double-concave lens, and the eleventh lens E11 is a positive lens including a double-convex lens.

The eighth lens E8 to the tenth lens E10 form a densely cemented triplet, and the third group optical system G3 formed of the seventh to the eleventh lenses E7 to E11 exhibits a positive focal length as a whole. The twelfth lens E12 is a positive meniscus lens formed in a convex shape on the object side. The twelfth lens E12 alone constitutes the fourth group optical system G4 that has a positive focal length.

The diaphragm FA is arranged between the second group optical system G2 and the third group optical system G3, and the distance from the diaphragm FA to the second group optical system G2 and to the third group optical system G3 are respectively variable.

The optical filter OF arranged on the image surface side of the twelfth lens E12 in the fourth group optical system G4 is integrally supported with the fourth group optical system G4, and has various optical filtering functions.

In this example 2-1, the sixth surface, being a surface on the object side of the fourth lens E4 located closest to the object side in the second group optical system G2, the twelfth surface, being a surface on the object side of the seventh lens E7 located closest to the object side in the third group optical system G3, and the twentieth surface, being a surface of the object side of the twelfth lens E12 located closest to the object side of the fourth group optical system G4, are respectively aspheric surfaces.

Accompanying zooming between the wide-angle end, that is, the short focal-length side, and the telephoto end, that is, the long focal-length side, the second group optical system G2 shifts from the image surface side toward the object side, the third group optical system G3 that mainly takes on a zooming function and an image-surface compensating function shifts from the image surface side toward the object side.

In example 2-1, the focal length f of the whole system, the F number F, and the half angle of view, ω, respectively change in the range of f=5.8 to 17.3, F=2.71 to 3.88, and ω=40.98 to 14.65. The optical characteristics relating to the respective optical surfaces and the optical elements are as shown in the following table.

TABLE 29

Optical characteristics

| Surface number | R | D | Nd | vd |
|---|---|---|---|---|
| 1 | 120.000 | 1.40 | 1.84666 | 23.78 |
| 2 | 47.947 | 4.00 | 1.77250 | 49.62 |
| 3 | 777.800 | 0.10 | | |
| 4 | 34.000 | 3.13 | 1.62299 | 58.12 |
| 5 | 174.440 | (Variable) | | |
| 6 (Aspheric surface) | −86.538 | 1.00 | 1.69700 | 48.51 |
| 7 | 7.654 | 5.00 | | |
| 8 | −12.100 | 3.50 | 1.51742 | 52.15 |
| 9 | 19.645 | 3.22 | 1.74950 | 35.04 |
| 10 | −23.799 | (Variable) | | |
| 11 (Diaphragm) | ∞ | (Variable) | | |
| 12 (Aspheric surface) | 11.864 | 3.10 | 1.74400 | 44.72 |
| 13 | −214.330 | 1.25 | | |
| 14 | 16.470 | 0.80 | 1.75520 | 27.53 |
| 15 | 7.800 | 4.50 | 1.51680 | 64.20 |
| 16 | −124.000 | 0.80 | 1.75520 | 27.53 |
| 17 | 8.710 | 0.61 | | |
| 18 | 17.585 | 2.25 | 1.62041 | 60.34 |
| 19 | −34.112 | (Variable) | | |
| 20 (Aspheric surface) | 10.920 | 2.53 | 1.48749 | 70.44 |
| 21 | 100.000 | 3.16 | | |
| 22 | ∞ | 3.26 | 1.51680 | 64.20 |
| 23 | ∞ | | | |

The respective optical surfaces on the sixth surface, the twelfth surface, and the twentieth surface, described as "aspheric surface" in Table 29, are respectively aspheric surfaces, and parameters relating to the expression (26) on each aspheric surface are as follows.

Aspheric Surface: The Sixth Surface $K = 0$ $A_4 = 1.12052 \times 10^{-4}$ $A_6 = -8.10477 \times 10^{-7}$ $A_8 = 4.62470 \times 10^{-5}$ $A_{10} = -1.54132 \times 10^{-11}$ Aspheric Surface: The Twelfth Surface $K = 0$ $A_4 = -7.35995 \times 10^{-5}$ $A_6 = 7.34774 \times 10^{-8}$ $A_8 = -6.373950 \times 10^{-9}$ $A_{10} = -1.28077 \times 10^{-12}$ Aspheric Surface: The Twentieth Surface $K = 0$ $A_4 = -6.86256 \times 10^{-5}$ $A_6 = 2.33037 \times 10^{-6}$ $A_8 = -9.02050 \times 10^{-8}$ $A_{10} = 1.62904 \times 10^{-9}$ The interval $D_5$ between the first group optical system G1 and the second group optical system G2, the interval $D_{10}$ between the second group optical system G2 and the diaphragm FA, the interval $D_{11}$ between the diaphragm FA and the third group optical system G3, and the interval $D_{19}$ between the third group optical system G3 and the fourth group optical system G4 are variable, and these variable intervals $D_5$, $D_{10}$, $D_{11}$, and $D_{19}$ are changed as shown in the following table, accompanying zooming.

TABLE 30

Variable interval

| | Wide-angle end | Mean focal length | Telephoto end |
|---|---|---|---|
| f | 5.80 | 11.60 | 17.30 |
| $D_5$ | 1.20 | 11.32 | 15.14 |
| $D_{10}$ | 14.95 | 4.83 | 1.01 |
| $D_{11}$ | 7.24 | 3.95 | 1.00 |
| $D_{19}$ | 2.00 | 5.30 | 8.25 |

The numerical values according to the respective conditional expressions of the present invention in example 2-1 are as shown in the following table, and within the range of the respective conditional expressions or values close to the range.

Figure 20:
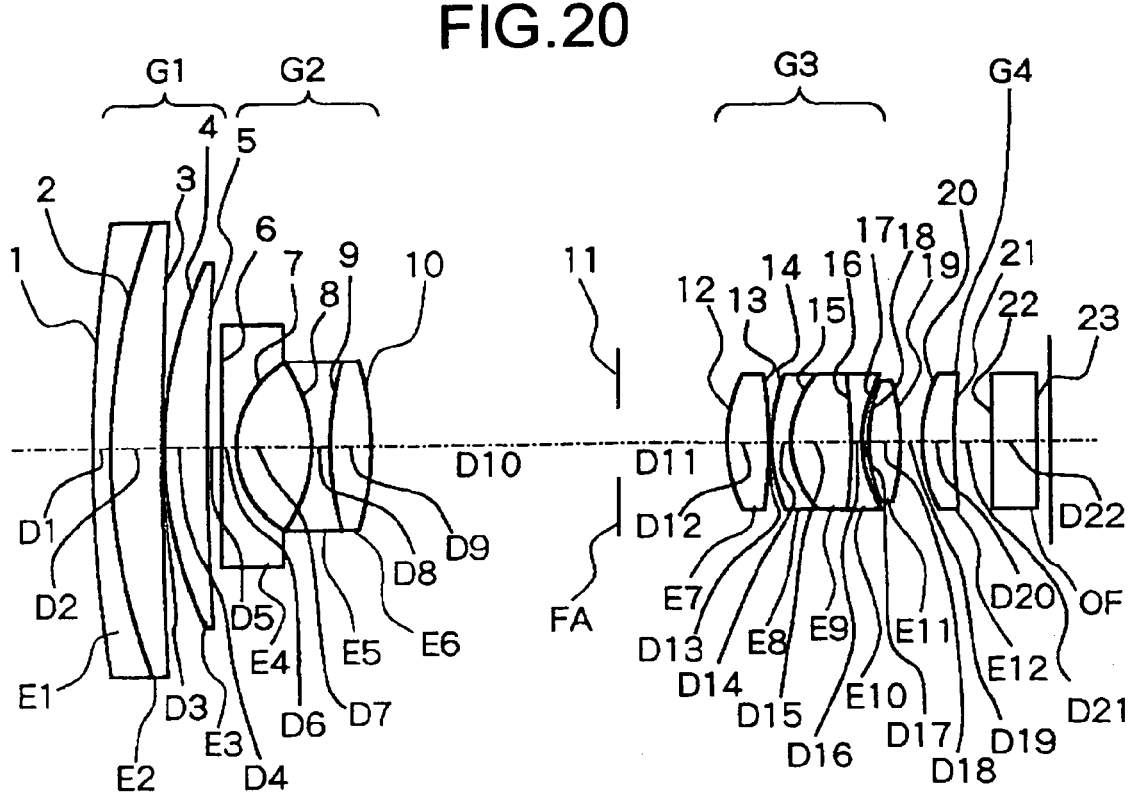
FIG. 20 is a schematic diagram of an optical system of example 2-2 of the zoom lens according to the fourth embodiment.

Numerical Values in the Conditional Expressions $N_{c2}(N_{15-16}) = 1.51680$ $v_{c2}(v_{15-16}) = 64.20$ $N_{c1}(N_{14-15}) = 1.75520$ $v_{c1}(v_{14-15}) = 27.53$ $N_{c3}(N_{16-17}) = 1.75520$ $v_{c3}(v_{16-17}) = 27.53$ $R_{c2}/R_{c4}(R_{15}/R_{17}) = 0.896 \ (= 7.800/8.710)$ FIG. 20 is a schematic diagram of an optical system of example 2-2 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, a diaphragm FA, and an optical filter (including a cover glass) OF. In this case, the first to the third lenses E1 to E3 constitute the first group optical system G1, the fourth to the sixth lenses E4 to E6 constitute the second group optical system G2, and the seventh to the eleventh lenses E7 to E11 constitute the third group optical system G3, and the twelfth lens E12 constitutes the fourth group optical system G4.

The respective lenses are supported by an appropriate common support frame or the like for each lens group, and at the time of zooming, each group optical system integrally operates. The respective reference signs in FIG. 20 are used independently for each example, in order to avoid complexity due to an increase in number of digits of the reference signs. Therefore, even when a common reference sign is given, it is not always a common configuration to other examples.

In FIG. 20, for example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, the twelfth lens E12, and the optical filter OF are arranged in order from the object side of a subject or the like, and an image is formed at the back of the optical filter OF having various optical filtering functions.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative lens including a double-concave lens, the fifth lens E5 is also a negative lens including a double-concave lens, and the sixth lens E6 is a positive lens including a double-convex lens. The fifth lens E5 and the sixth lens E6 form a densely cemented doublet, and the second group optical system G2 formed of the fourth to the sixth lenses E4 to E6 exhibits a negative focal length as a whole. The seventh lens E7 is a positive lens including a double-convex lens, the eighth lens E8 is a negative meniscus lens formed in a convex shape on the object side, the ninth lens E9 is a positive lens including a double-convex lens, the tenth lens E10 is a negative lens including a double-concave lens, and the eleventh lens E11 is a positive lens including a double-convex lens. The eighth to the tenth lenses E8 to E10 form a densely cemented triplet, and the third group optical system G3 formed of the seventh to the eleventh lenses E7 to E11 exhibits a positive focal length as a whole. The twelfth lens E12 is a positive meniscus lens formed in a convex shape on the object side, and the twelfth lens E12 alone constitutes the fourth group optical system G4 and the third group optical system G3. The diaphragm FA is arranged between the second group optical system G2 and the third group optical system G3, and the distances from the diaphragm FA to the optical system G2 and the optical system G3 are respectively variable.

The optical filter OF arranged on the image surface side of the twelfth lens E12 in the fourth group optical system G4 is integrally supported with the fourth group optical system G4 and has various optical filtering functions.

In this example 2-2, the sixth surface, being a surface on the object side of the fourth lens E4 located closest to the object side in the second group optical system G2, the twelfth surface, being a surface on the object side of the seventh lens E7 located closest to the object side in the third group optical system G3, and the twentieth surface, being a surface on the object side of the twelfth lens E12 that constitutes the fourth group optical system G4 are respectively aspheric surfaces.

Accompanying zooming between the wide-angle end, that is, the short focal-length side, and the telephoto end, that is, the long focal-length side, the second group optical system G2 shifts from the object side toward the image surface side, and the third group optical system G3 that mainly takes on a zooming function and an image-surface compensating function shifts from the image surface side toward the object side.

In example 2-2, the focal length f of the whole system, the F number F, and the half angle of view, ω, respectively change in the range of f=5.8 to 23.2, F=2.77 to 4.17, and ω=40.08 to 11.02. The optical characteristics relating to the respective optical surfaces and the optical elements are as shown in the following table.

TABLE 31

Optical characteristics

| Surface number | R | D | Nd | vd |
|---|---|---|---|---|
| 1 | 120.000 | 1.40 | 1.84666 | 23.78 |
| 2 | 47.947 | 4.00 | 1.77250 | 49.62 |

TABLE 31-continued

Optical characteristics

| Surface number | R | D | Nd | vd |
|---|---|---|---|---|
| 3 | 777.812 | 0.10 | | |
| 4 | 34.000 | 3.26 | 1.62041 | 60.34 |
| 5 | 174.440 | (Variable) | 1.00000 | |
| 6 (Aspheric surface) | −189.660 | 1.00 | 1.80610 | 40.73 |
| 7 | 8.326 | 5.48 | | |
| 8 | −12.745 | 1.00 | 1.48749 | 70.44 |
| 9 | 16.747 | 3.56 | 1.74950 | 35.04 |
| 10 | −25.024 | (Variable) | | |
| 11 (Diaphragm) | ∞ | (Variable) | | |
| 12 (Aspheric surface) | 10.726 | 3.43 | 1.74400 | 44.90 |
| 13 | −64.740 | 0.46 | | |
| 14 | 22.316 | 0.80 | 1.69895 | 30.05 |
| 15 | 7.800 | 4.50 | 1.48749 | 70.44 |
| 16 | −99.262 | 0.80 | 1.75520 | 27.53 |
| 17 | 8.337 | 0.68 | | |
| 18 | 18.012 | 2.30 | 1.62041 | 60.34 |
| 19 | −28.240 | (Variable) | | |
| 20 (Aspheric surface) | 10.975 | 2.20 | 1.48749 | 70.44 |
| 21 | 30.000 | 3.16 | | |
| 22 | ∞ | 3.26 | 1.51680 | 64.20 |
| 23 | ∞ | | | |

The respective optical surfaces on the sixth surface, the twelfth surface, and the twentieth surface, described as "aspheric surface" in Table 31, are respectively aspheric surfaces, and parameters relating to the expression (26) on each aspheric surface are as follows.

Aspheric Surface: The Sixth Surface $K=0$ $A_4=7.57026 \times 10^{-5}$ $A_6=-5.91870 \times 10^{-7}$ $A_8=4.32704 \times 10^{-9}$ $A_{10}=-1.78040 \times 10^{-11}$ Aspheric Surface: The Twelfth Surface $K=0$ $A_4=-1.14646 \times 10^{-4}$ $A_6=-1.28319 \times 10^{-7}$ $A_8=-9.13454 \times 10^{-9}$ $A_{10}=5.08427 \times 10^{-11}$ Aspheric Surface: The Twentieth Surface $K=0$ $A_4=-6.38620 \times 10^{-5}$ $A_6=3.96426 \times 10^{-6}$ $A_8=-1.65462 \times 10^{-7}$ $A_{10}=3.08386 \times 10^{-9}$ The interval $D_5$ between the first group optical system G1 and the second group optical system G2, the interval $D_{10}$ between the second group optical system G2 and the diaphragm FA, the interval $D_{11}$ between the diaphragm FA and the third group optical system G3, and the interval $D_{19}$ between the third group optical system G3 and the fourth group optical system G4 are variable, and these variable intervals $D_5$, $D_{10}$, $D_{11}$, and $D_{19}$ are changed as shown in the following table, accompanying zooming.

TABLE 32

| | Variable interval | | |
|---|---|---|---|
| | Wide-angle end | Mean focal length | Telephoto end |
| f | 5.80 | 14.50 | 23.20 |
| $D_5$ | 1.20 | 14.43 | 18.70 |
| $D_{10}$ | 18.50 | 5.27 | 1.00 |
| $D_{11}$ | 7.91 | 4.12 | 1.00 |
| $D_{19}$ | 2.00 | 5.80 | 8.92 |

The numerical values according to the respective conditional expressions of the present invention in example 2-2 are as shown in the following table, and within the range of the respective conditional expressions or values close to the range.

Figure 21:
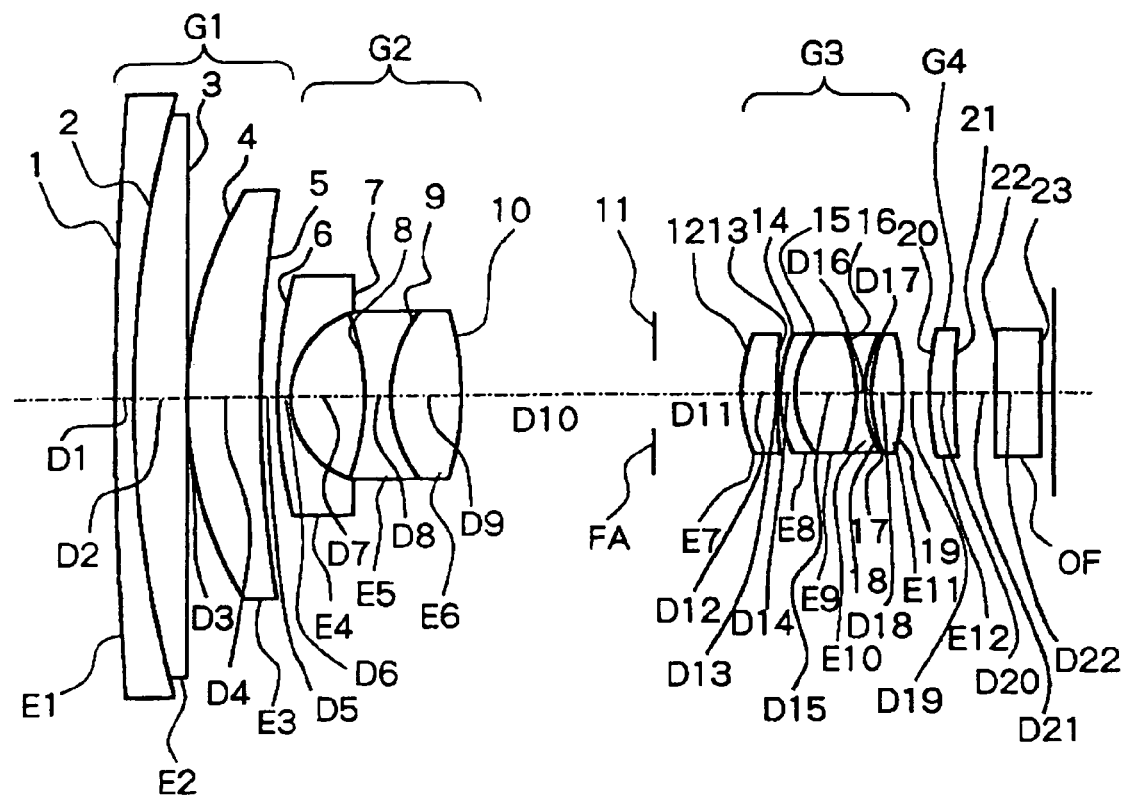
FIG. 21 is a schematic diagram of an optical system of example 2-3 of the zoom lens according to the fourth embodiment.

$N_{c2}(N_{15\text{-}16})=1.48749$ $v_{c2}(v_{15\text{-}16})=70.44$ $N_{c1}(N_{14\text{-}15})=1.69895$ $v_{c1}(v_{14\text{-}15})=30.05$ $N_{c3}(N_{16\text{-}17})=1.75520$ $v_{c3}(v_{16\text{-}17})=27.53$ $R_{c2}/R_{c4}(R_{15}/R_{17})=0.936\ (=7.800/8.337)$ FIG. 21 is a schematic diagram of an optical system of example 2-3 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, a diaphragm FA, and an optical filter (including a cover glass) OF. In this case, the first to the third lenses E1 to E3 constitute the first group optical system G1, the fourth to the sixth lenses E4 to E6 constitute the second group optical system G2, and the seventh to the eleventh lenses E7 to E11 constitute the third group optical system G3, and the twelfth lens E12 constitutes the fourth group optical system G4.

The respective lenses are supported by an appropriate common support frame or the like for each lens group, and at the time of zooming, each group optical system integrally operates. The respective reference signs in FIG. 20 are used independently for each example, in order to avoid complexity due to an increase in number of digits of the reference signs. Therefore, even when a common reference sign is given, it is not always a common configuration to other examples.

In FIG. 21, for example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, the twelfth lens E12, and the optical filter OF are arranged in order from the object side of a subject or the like, and an image is formed at the back of the optical filter OF having various optical filtering functions.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative meniscus lens formed in a convex shape on the object side, the fifth lens E5 is a negative lens including a double-concave lens, and the sixth lens E6 is a positive lens including a double-convex lens. The fifth lens E5 and the sixth lens E6 form a densely cemented doublet, and the second group optical system G2 formed of the fourth to the sixth lenses E4 to E6 exhibits a negative focal length as a whole. The seventh lens E7 is a positive meniscus lens formed in a convex shape on the object side, the eighth lens E8 is a negative meniscus lens formed in a convex shape on the object side, the ninth lens E9 is a positive lens including a double-convex lens, the tenth lens E10 is a negative lens including a double-concave lens, and the eleventh lens E11 is a positive lens including a double-convex lens. The eighth to the tenth lenses E8 to E10 form a densely cemented triplet, and the third group optical system G3 formed of the seventh to the eleventh lenses E7 to E11 exhibits a positive focal length as a whole. The twelfth lens E12 is a positive meniscus lens formed in a convex shape on the object side, and the twelfth lens E12 alone constitutes the fourth group optical system G4 and the third group optical system G3. The diaphragm FA is arranged between the second group optical system G2 and the third group optical system G3, and the distances from the diaphragm FA to the optical system G2 and the optical system G3 are respectively variable.

The optical filter OF arranged on the image surface side of the twelfth lens E12 in the fourth group optical system G4 is integrally supported with the fourth group optical system G4 and has various optical filtering functions.

In this example 2-2, the sixth surface, being a surface on the object side of the fourth lens E4 located closest to the object side in the second group optical system G2, the twelfth surface, being a surface on the object side of the seventh lens E7 located closest to the object side in the third group optical system G3, and the twentieth surface, being a surface on the object side of the twelfth lens E12 that constitutes the fourth group optical system G4 are respectively aspheric surfaces.

Accompanying zooming between the wide-angle end, that is, the short focal-length side, and the telephoto end, that is, the long focal-length side, the second group optical system G2 shifts from the object side toward the image surface side, and the third group optical system G3 that mainly takes on a zooming function and an image-surface compensating function shifts from the image surface side toward the object side.

In example 2-3, the focal length f of the whole system, the F number F, and the half angle of view, ω, respectively change in the range of f=4.95 to 14.85, F=2.97 to 4.13, and ω=44.45 to 17.07. The optical characteristics relating to the respective optical surfaces and the optical elements are as shown in the following table.

TABLE 33

| | Optical characteristics | | | |
|---|---|---|---|---|
| Surface number | R | D | Nd | vd |
| 1 | 340.249 | 1.40 | 1.84666 | 23.78 |
| 2 | 84.506 | 4.00 | 1.77250 | 49.62 |
| 3 | −2061.000 | 0.10 | | |

TABLE 33-continued

Optical characteristics

| Surface number | R | D | Nd | vd |
|---|---|---|---|---|
| 4 | 32.281 | 5.67 | 1.60311 | 60.69 |
| 5 | 103.000 | (Variable) | | |
| 6 (Aspheric surface) | 62.385 | 1.00 | 1.74400 | 44.90 |
| 7 | 6.720 | 5.73 | | |
| 8 | −14.335 | 2.00 | 1.60311 | 60.69 |
| 9 | 10.105 | 5.07 | 1.74950 | 35.04 |
| 10 | −39.048 | (Variable) | | |
| 11 (Diaphragm) | ∞ | (Variable) | | |
| 12 (Aspheric surface) | 9.406 | 2.68 | 1.74400 | 44.90 |
| 13 | 34.332 | 0.36 | | |
| 14 | 13.923 | 0.80 | 1.75520 | 27.53 |
| 15 | 7.230 | 5.00 | 1.48749 | 70.44 |
| 16 | −9.214 | 0.80 | 1.67270 | 32.17 |
| 17 | 28.990 | 0.25 | | |
| 18 | 20.970 | 2.20 | 1.60311 | 60.69 |
| 19 (Aspheric surface) | −25.000 | (Variable) | | |
| 20 (Aspheric surface) | 34.300 | 2.00 | 1.48749 | 70.44 |
| 21 | 44.910 | 3.16 | | |
| 22 | ∞ | 3.26 | 1.51680 | 64.20 |
| 23 | ∞ | | | |

The respective optical surfaces on the sixth surface, the twelfth surface, the nineteenth surface, and the twentieth surface, described as "aspheric surface" in Table 33, are respectively aspheric surfaces, and parameters relating to the expression (26) on each aspheric surface are as follows.

Aspheric Surface: The Sixth Surface
$K=0$
$A_4=7.68143\times10^{-5}$
$A_6=-5.7879\times10^{-7}$
$A_8=3.43461\times10^{-9}$
$A_{10}=-1.26775\times10^{-11}$ Aspheric Surface: The Twelfth Surface
$K=0$
$A_4=-5.90244\times10^{-5}$
$A_6=-2.26307\times10^{-8}$
$A_8A_8=3.99618\times10^{-8}$
$A_{10}=-1.41064\times10^{-9}$ Aspheric Surface: The Nineteenth Surface
$K=0$
$A_4=4.15890\times10^{-4}$
$A_6=6.31024\times10^{-6}$
$A_8=-1.6099\times10^{-7}$
$A_{10}=9.6189\times10^{-9}$ Aspheric Surface: The Twentieth Surface
$K=0$
$A_4=-4.83239\times10^{-5}$
$A_6=4.240811\times10^{-6}$
$A_8=-3.49807\times10^{-7}$
$A_{10}=8.93436\times10^{-9}$ The interval $D_5$ between the first group optical system G1 and the second group optical system G2, the interval $D_{10}$ between the second group optical system G2 and the diaphragm FA, the interval $D_{11}$ between the diaphragm FA and the third group optical system G3, and the interval $D_{19}$ between the third group optical system G3 and the fourth group optical system G4 are variable, and these variable intervals $D_5$, $D_{10}$, $D_{11}$, and $D_{19}$ are changed as shown in the following table, accompanying zooming.

TABLE 34

Variable interval

| | Wide-angle end | Mean focal length | Telephoto end |
|---|---|---|---|
| f | 4.95 | 9.90 | 14.85 |
| $D_5$ | 1.20 | 11.64 | 15.03 |
| $D_{10}$ | 14.83 | 4.39 | 1.00 |
| $D_{11}$ | 6.50 | 3.76 | 1.00 |
| $D_{19}$ | 2.00 | 4.74 | 7.49 |

The numerical values according to the respective conditional expressions of the present invention in example 2-3 are as shown in the following table, and within the range of the respective conditional expressions or values close to the range.

Numerical Values in the Conditional Expressions $N_{c2}(N_{15-16})=1.48749$ $v_{c2}(v_{15-16})=70.44$ $N_{c1}(N_{14-15})=1.75520$ $v_{c1}(v_{14-15})=27.53$ $N_{c3}(N_{16-17})=1.67270$ $v_{c3}(v_{16-17})=32.17$ $R_{c2}/R_{c4}(R_{15}/R_{17})=0.249$ (=7.230/28.990)

Figure 22:
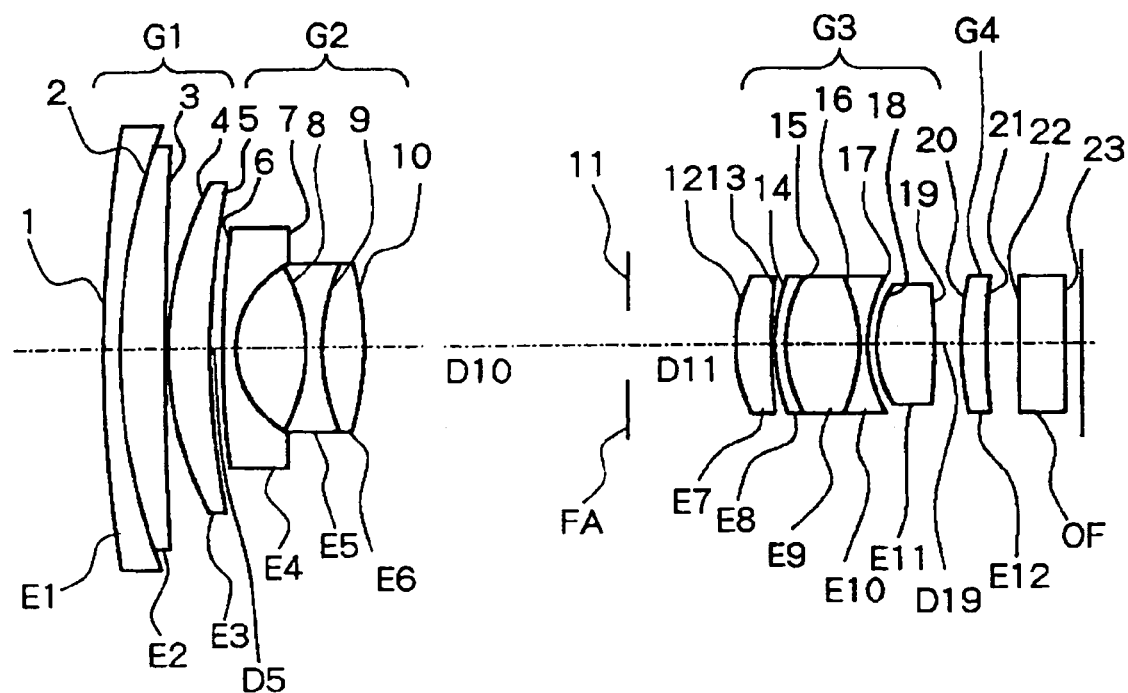
FIG. 22 is a schematic diagram of an optical system of example 2-4 of the zoom lens according to the fourth embodiment.

FIG. 22 is a schematic diagram of an optical system of example 2-4 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12 a diaphragm FA, and an optical filter (including a cover glass) OF. In this case, the first to the third lenses E1 to E3 constitute the first group optical system G1, the fourth to the sixth lenses E4 to E6 constitute the second group optical system G2, the seventh to the eleventh lenses E7 to E11 constitute the third group optical system G3, and the twelfth lens E12 constitutes the fourth group optical system G4.

The respective lenses are supported by an appropriate common support frame or the like for each lens group, and at the time of zooming, each group optical system integrally operates. Surface numbers of the respective optical surfaces are added for reference. The respective reference signs in FIG. 22 are used independently for each example, in order to avoid complexity due to an increase in number of digits of the reference signs. Therefore, even when a common reference sign is given, it is not always a common configuration to other examples.

In FIG. 22, for example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, the twelfth lens E12, and the optical filter OF are arranged in order from the object side of a subject or the like, and an image is formed at the back of the optical filter OF having various optical filtering functions.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative lens including double-concave lens, the fifth lens E5 is also a negative lens including a double-concave lens, and the sixth lens E6 is a positive lens including a double-convex lens. The fifth lens E5 and the sixth lens E6 are densely cemented doublet, and the second group optical system formed of the fourth to the sixth lenses E4 to E6 exhibits a negative focal length as a whole.

The seventh lens E7 is a positive meniscus lens formed in a convex shape on the object side, the eighth lens E8 is a negative meniscus lens formed in a convex shape on the object side, the ninth lens E9 is a positive lens including a double-convex lens, the tenth lens E10 is a negative lens including a double-concave lens, and the eleventh lens E11 is a positive lens including a double-convex lens.

The eighth lens E8 to the tenth lens E10 form a densely cemented triplet, and the third group optical system G3 formed of the seventh to the eleventh lenses E7 to E11 exhibits a positive focal length as a whole. The twelfth lens E12 is a positive meniscus lens formed in a convex shape on the object side. The twelfth lens E12 alone constitutes the fourth group optical system G4 that has a positive focal length.

The diaphragm FA is arranged between the second group optical system G2 and the third group optical system G3, and the distance from the diaphragm FA to the second group optical system G2 and to the third group optical system G3 are respectively variable.

The optical filter OF arranged on the image surface side of the twelfth lens E12 in the fourth group optical system G4 is integrally supported with the fourth group optical system G4, and has various optical filtering functions.

In this example 2-4, the sixth surface, being a surface on the object side of the fourth lens E4 located closest to the object side in the second group optical system G2, the twelfth surface, being a surface on the object side of the seventh lens E7 located closest to the object side in the third group optical system G3, and the twentieth surface, being a surface of the object side of the twelfth lens E12 located closest to the object side of the fourth group optical system G4, are respectively aspheric surfaces.

Accompanying zooming between the wide-angle end, that is, the short focal-length side, and the telephoto end, that is, the long focal-length side, the second group optical system G2 shifts from the image surface side toward the object side, the third group optical system G3 that mainly takes on a zooming function and an image-surface compensating function shifts from the image surface side toward the object side.

In example 2-4, the focal length f of the whole system, the F number F, and the half angle of view, ω, respectively change in the range of f=5.80 to 29.00, F=3.01 to 4.58, and ω=40.16 to 8.91 The optical characteristics relating to the respective optical surfaces and the optical elements are as shown in the following table.

TABLE 35

Optical characteristics

| Surface number | R | D | Nd | νd |
|---|---|---|---|---|
| 1 | 120.000 | 1.40 | 1.84666 | 23.78 |
| 2 | 47.947 | 4.00 | 1.77250 | 49.62 |
| 3 | 777.812 | 0.10 | | |
| 4 | 28.848 | 3.43 | 1.62041 | 60.34 |
| 5 | 76.889 | (Variable) | | |
| 6 (Aspheric surface) | −482.650 | 1.00 | 1.72342 | 37.99 |
| 7 | 8.112 | 5.70 | | |
| 8 | −14.212 | 1.32 | 1.51680 | 64.20 |
| 9 | 17.367 | 3.37 | 1.75520 | 27.53 |
| 10 | −37.226 | (Variable) | | |
| 11 (Diaphragm) | ∞ | (Variable) | | |
| 12 (Aspheric surface) | 11.729 | 3.15 | 1.74400 | 44.90 |
| 13 | 1830.000 | 0.15 | | |
| 14 | 23.741 | 0.80 | 1.74950 | 35.04 |
| 15 | 10.996 | 6.00 | 1.48749 | 70.44 |
| 16 | −11.275 | 0.80 | 1.69895 | 30.05 |
| 17 | 11.275 | 0.78 | | |
| 18 | 9.792 | 4.50 | 1.60311 | 60.69 |
| 19 (Aspheric surface) | −41.240 | (Variable) | | |
| 20 (Aspheric surface) | 24.847 | 2.00 | 1.75520 | 27.53 |
| 21 | 30.000 | 3.16 | | |
| 22 | ∞ | 3.26 | 1.51680 | 64.20 |
| 23 | ∞ | | | |

The respective optical surfaces on the sixth surface, the twelfth surface, the nineteenth surface, and the twentieth surface, described as "aspheric surface" in Table 35, are respectively aspheric surfaces, and parameters relating to the expression (26) on each aspheric surface are as follows.

Aspheric Surface: The Sixth Surface
$K=0$
$A_4=8.12716\times10^{-5}$
$A_6=-4.73737\times10^{-7}$
$A_8=2.32995\times10^{-9}$
$A_{10}=-6.6229\times10^{-12}$ Aspheric Surface: The Twelfth Surface
$K=0$
$A_4=-4.04940\times10^{-5}$
$A_6=1.08387\times10^{-7}$
$A_8=2.10711\times10^{-9}$
$A_{10}=-9.71445\times10^{-11}$ Aspheric Surface: The Nineteenth Surface
$K=0$
$A_4=2.66425\times10^{-4}$
$A_6=2.83525\times10^{-6}$
$A_8=6.42161\times10^{-9}$
$A_{10}=1.40725\times10^{-10}$ Aspheric Surface: The Twentieth Surface
$K=0$
$A_4=-5.64236\times10^{-5}$
$A_6=-2.46282\times10^{-7}$
$A_8=-1.02479\times10^{-8}$
$A_{10}=-1.58903\times10^{-10}$ The interval $D_5$ between the first group optical system G1 and the second group optical system G2, the interval $D_{10}$ between the second group optical system G2 and the diaphragm FA, the interval $D_{11}$ between the diaphragm FA and the third group optical system G3, and the interval $D_{19}$ between the third group optical system G3 and the fourth group optical system G4 are variable, and these variable intervals $D_5$, $D_{10}$, $D_{11}$, and $D_{19}$ are changed as shown in the following table, accompanying zooming.

TABLE 36

| | Variable interval | | |
|---|---|---|---|
| | Wide-angle end | Mean focal length | Telephoto end |
| f | 5.80 | 17.40 | 29.00 |
| $D_5$ | 1.20 | 17.54 | 21.68 |
| $D_{10}$ | 21.48 | 5.14 | 1.00 |
| $D_{11}$ | 8.69 | 4.60 | 1.00 |
| $D_{19}$ | 2.07 | 5.23 | 9.18 |

The numerical values according to the respective conditional expressions of the present invention in example 2-1 are as shown in the following table, and within the range of the respective conditional expressions or values close to the range.

Figure 23:
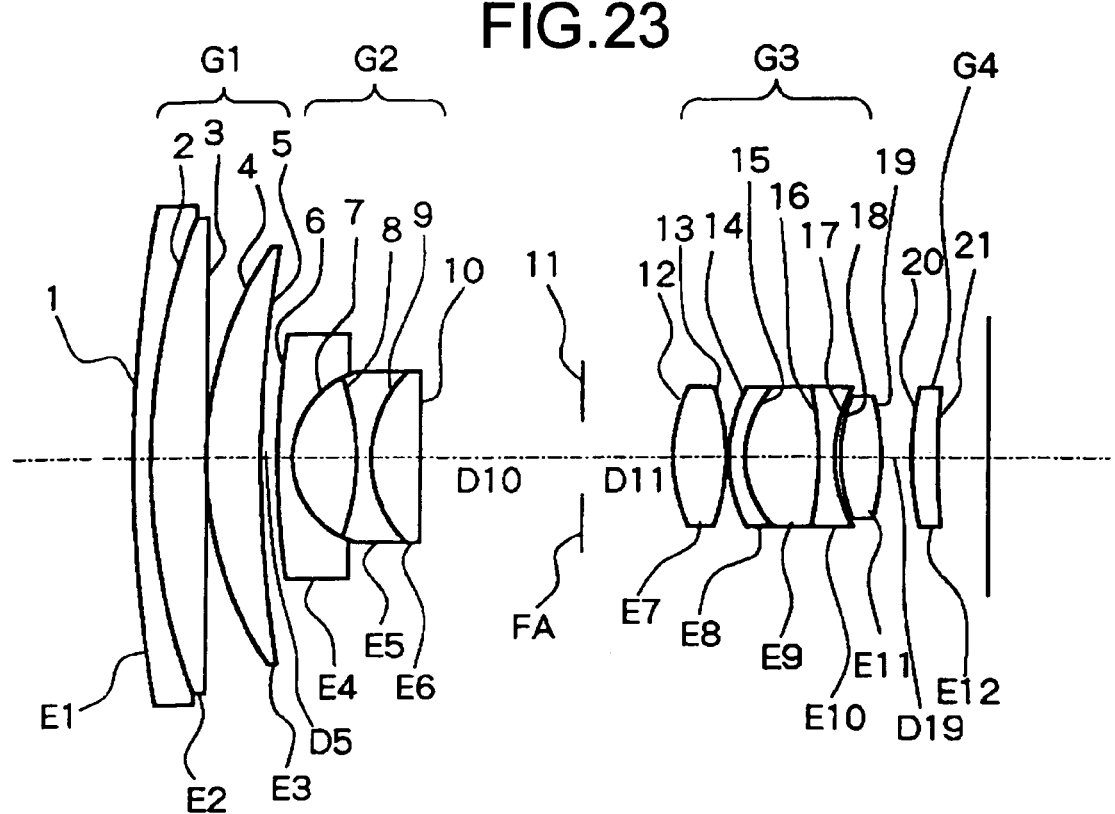
FIG. 23 is a schematic diagram of an optical system of example 2-5 of the zoom lens according to the fourth embodiment.

Numerical Values in the Conditional Expressions $N_{c2}(N_{15-16}) = 1.48749$ $v_{c2}(v_{15-16}) = 70.44$ $N_{c1}(N_{14-15}) = 1.74950$ $v_{c1}(v_{14-15}) = 35.04$ $N_{c3}(N_{16-17}) = 1.69895$ $v_{c3}(v_{16-17}) = 30.05$ $R_{c2}/R_{c4}(R_{15}/R_{17}) = 0.975 \ (= 10.996/11.275)$ FIG. 23 is a schematic diagram of an optical system of example 2-5 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, and a diaphragm FA. In this case, the first to the third lenses E1 to E3 constitute the first group optical system G1, the fourth to the sixth lenses E4 to E6 constitute the second group optical system G2, the seventh to the eleventh lenses E7 to E11 constitute the third group optical system G3, and the twelfth lens E12 constitutes the fourth group optical system G4.

The respective lenses are supported by an appropriate common support frame or the like for each lens group, and at the time of zooming, each group optical system integrally operates. The respective reference signs in FIG. 23 are used independently for each example as described previously. Therefore, even when a common reference sign is given, it is not always a common configuration to other examples.

For example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, and the twelfth lens E12 are arranged in order from the object side of a subject or the like, and an image is formed at the back of the twelfth lens E12.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative meniscus lens formed in a convex shape on the object side, the fifth lens E5 is a negative lens including a double-concave lens, and the sixth lens E6 is a positive lens including a double-convex lens. The fifth lens E5 and the sixth lens E6 form a densely cemented doublet, and the second group optical system G2 formed of the fourth to the sixth lenses E4 to E6 exhibits a negative focal length as a whole.

The seventh lens E7 is a positive lens including a double-convex lens, the eighth lens E8 is a negative meniscus lens formed in a convex shape on the object side, the ninth lens E9 is a positive lens including a double-convex lens, the tenth lens E10 is a negative lens including a double-concave lens, and the eleventh lens E11 is a positive lens including a double-convex lens. The eighth to the tenth lenses E8 to E10 form a densely cemented triplet, and the third group optical system G3 formed of the seventh to the eleventh lenses E7 to E11 exhibits a positive focal length as a whole.

The twelfth lens E12 is a positive meniscus lens formed in a convex shape on the object side and only the twelfth lens E12 forms the fourth group optical system G4. The diaphragm FA arranged between the second group optical system G2 and the third group optical system G3 makes a distance from the second group optical system G2 and a distance from the third group optical system G3 variable.

The sixth surface, being a surface on the object side of the fourth lens E4 located closest to the object side in the second group optical system G2, and the twelfth surface, being a surface on the object side of the seventh lens E7 located closest to the object side in the third group optical system G3, the twentieth surface, being a surface on the object side of the twelfth lens E12 that forms the fourth group optical system G4 are respectively aspheric surfaces.

Accompanying zooming between the wide-angle end, that is, the short focal end, and the telephoto end, that is, the long focal end, the second group optical system G2 shifts from the image surface side toward the object side, the third group optical system G3 that mainly takes on a zooming function and an image-surface compensating function shifts from the image surface side toward the object side, and the fourth group optical system G4 is fixed in this case, but may shift to mainly compensate the shift of the image surface accompanying to the shifts of the second group optical system G2 and the third group optical system G3.

In example 2-5, the focal length f of the whole system, the F number F, and the half angle of view, ω, respectively change in the range of f=5.80 to 17.30, F=2.81 to 4.20, and ω=40.90 to 14.70. The optical characteristics relating to the respective optical surfaces and the optical elements are as shown in the following table.

TABLE 37

| | Optical characteristics | | | |
|---|---|---|---|---|
| Surface number | R | D | Nd | vd |
| 1 | 120.000 | 1.00 | 1.84666 | 23.78 |
| 2 | 47.947 | 3.47 | 1.77250 | 49.62 |
| 3 | 777.800 | 0.10 | | |

TABLE 37-continued

Optical characteristics

| Surface number | R | D | Nd | vd |
|---|---|---|---|---|
| 4 | 25.000 | 3.40 | 1.62041 | 60.34 |
| 5 | 80.692 | (Variable) | | |
| 6 (Aspheric surface) | 47.194 | 1.00 | 1.71736 | 29.50 |
| 7 | 5.735 | 3.80 | | |
| 8 | −15.615 | 1.00 | 1.51680 | 64.20 |
| 9 | 7.676 | 3.03 | 1.75520 | 27.53 |
| 10 | −591.000 | (Variable) | | |
| 11 (Diaphragm) | 0.000 | (Variable) | | |
| 12 (Aspheric surface) | 10.480 | 3.64 | 1.62041 | 60.34 |
| 13 | −19.154 | 0.10 | | |
| 14 | 11.513 | 0.80 | 1.71736 | 29.50 |
| 15 | 7.087 | 4.89 | 1.51680 | 64.20 |
| 16 | −27.000 | 0.80 | 1.75520 | 27.53 |
| 17 | 6.348 | 0.50 | | |
| 18 | 9.108 | 2.40 | 1.48749 | 70.44 |
| 19 | −130.567 | (Variable) | | |
| 20 (Aspheric surface) | 11.607 | 2.04 | 1.60342 | 38.01 |
| 21 | 30.000 | | | |

The respective optical surfaces on the sixth surface, the twelfth surface, and the twentieth surface, described as "aspheric surface" in Table 37, are respectively aspheric surfaces, and parameters relating to the expression (26) on each aspheric surface are as follows.

Aspheric Surface: The Sixth Surface $K=0$ $A_4=5.23322 \times 10^{-5}$ $A_6=-1.06487 \times 10^{-6}$ $A_8=1.53041 \times 10^{-8}$ $A_{10}=-1.05107 \times 10^{-10}$ Aspheric Surface: The Twelfth Surface $K=0$ $A_4=-2.36271 \times 10^{-4}$ $A_6=8.22279 \times 10^{-7}$ $A_8=-2.66532 \times 10^{-8}$ $A_{10}=1.51637 \times 10^{-10}$ Aspheric Surface: The Twentieth Surface $K=0$ $A_4=-2.13837 \times 10^{-4}$ $A_6=1.02617 \times 10^{-5}$ $A_8=-4.96891 \times 10^{-7}$ $A_{10}=1.33335 \times 10^{-8}$ The interval $D_5$ between the first group optical system G1 and the second group optical system G2, the interval $D_{10}$ between the second group optical system G2 and the diaphragm FA, the interval $D_{11}$ between the diaphragm FA and the third group optical system G3, and the interval $D_{19}$ between the third group optical system G3 and the fourth group optical system G4 are variable, and these variable intervals $D_5$, $D_{10}$, $D_{11}$, and $D_{19}$ are changed as shown in the following table, accompanying zooming.

TABLE 38

Variable interval

| | Wide-angle end | Mean focal length | Telephoto end |
|---|---|---|---|
| f | 5.80 | 11.60 | 17.30 |
| $D_5$ | 1.20 | 8.30 | 10.70 |
| $D_{10}$ | 10.50 | 3.40 | 1.00 |
| $D_{11}$ | 6.02 | 3.39 | 1.00 |
| $D_{19}$ | 2.00 | 2.49 | 2.27 |

The numerical values according to the respective conditional expressions of the present invention in example 2-5 are as shown in the following table, and within the range of the respective conditional expressions.

Figure 24:
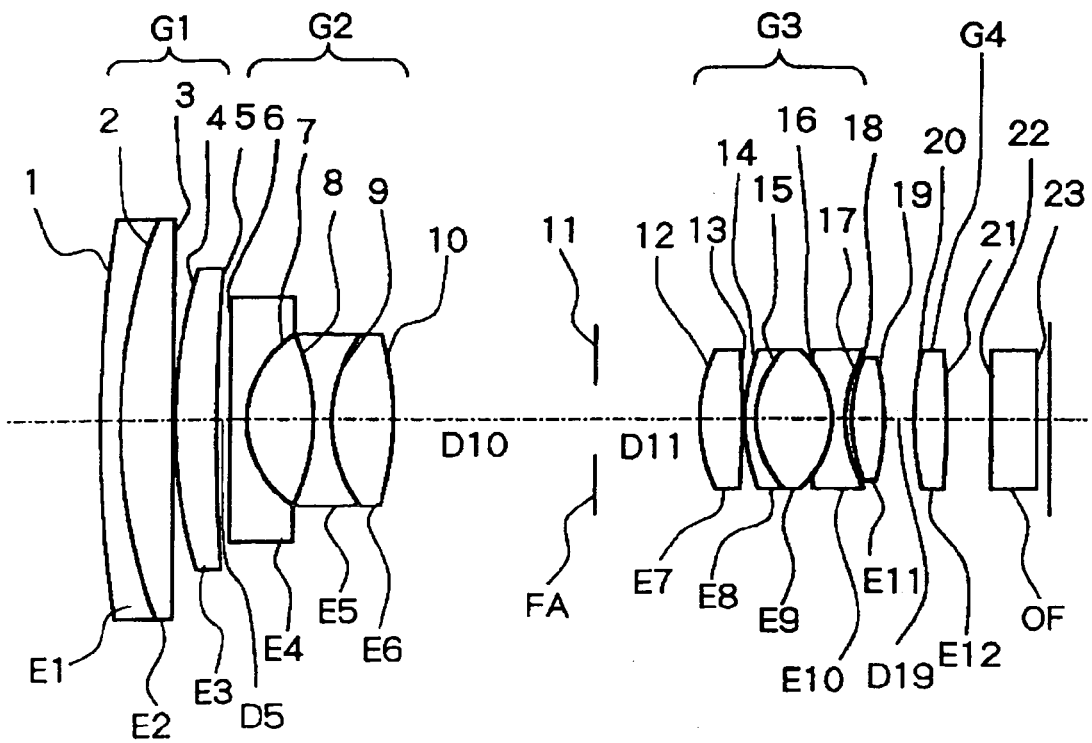
FIG. 24 is a schematic diagram of an optical system of example 2-6 of the zoom lens according to the fourth embodiment.

Numerical Values in the Conditional Expressions $N_{c2}(N_{15-16})=1.51680$ $v_{c2}(v_{15-16})=64.20$ $N_{c1}(N_{14-15})=1.71736$ $v_{c1}(v_{14-15})=29.50$ $N_{c3}(N_{16-17})=1.75520$ $v_{c3}(v_{16-17})=27.53$ $R_{c2}/R_{c4}(R_{15}/R_{17})=1.116 \ (=7.087/6.348)$ FIG. 24 is a schematic diagram of an optical system of example 2-6 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, a diaphragm FA, and an optical filter OF. In this case, the first to the third lenses E1 to E3 constitute the first group optical system G1, the fourth to the sixth lenses E4 to E6 constitute the second group optical system G2, the seventh to the eleventh lenses E7 to E11 constitute the third group optical system G3, and the twelfth lens E12 constitutes the fourth group optical system G4.

The respective lenses are supported by an appropriate common support frame or the like for each lens group, and at the time of zooming, each group optical system integrally operates. The respective reference signs in FIG. 24 are used independently for each example as described previously. Therefore, even when a common reference sign is given, it is not always a common configuration to other examples.

For example, the first lens E1, the second lens E2, the third lens E3, the fourth lens E4, the fifth lens E5, the sixth lens E6, the diaphragm FA, the seventh lens E7, the eighth lens E8, the ninth lens E9, the tenth lens E10, the eleventh lens E11, the twelfth lens E12, and the optical filter OF are arranged in order from the object side of a subject or the like, and an image is formed at the back of the optical filter OF.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative lens including a double-concave lens, the fifth lens E5 is also a negative lens including a double-concave lens, and the sixth lens E6 is a positive lens including a double-convex lens. The fifth lens E5 and the sixth lens E6 form a densely cemented doublet, and the second group optical system G2 formed of the fourth to the sixth lenses E4 to E6 exhibits a negative focal length as a whole.

The seventh lens E7 is a positive lens including a double-convex lens, the eighth lens E8 is a negative meniscus lens formed in a convex shape on the object side, the ninth lens E9 is a positive lens including a double-convex lens, the tenth lens E10 is a negative lens including a double-concave lens, and the eleventh lens E11 is a positive lens including a double-convex lens. The eighth to the tenth lenses E8 to E10 form a densely cemented triplet, and the third group optical system G3 formed of the seventh to the eleventh lenses E7 to E11 exhibits a positive focal length as a whole. The twelfth lens E12 is a positive lens including a double-convex lens and only the twelfth lens E12 that forms the fourth group optical system G4.

The diaphragm FA arranged between the second group optical system G2 and the third group optical system G3 makes a distance from the second group optical system G2 and a distance from the third group optical system G3 variable. The optical filter OF arranged on a side of image surface of the twelfth lens E12 of the fourth group optical system G4 is integrally retained with the fourth group optical system G4 and includes various optical filtering functions.

The sixth surface, being a surface on the object side of the fourth lens E4 located closest to the object side in the second group optical system G2, and the twelfth surface, being a surface on the object side of the seventh lens E7 located closest to the object side in the third group optical system G3, the twentieth surface, being a surface on the object side of the twelfth lens E12 that forms the fourth group optical system G4 are respectively aspheric surfaces.

Accompanying zooming between the wide-angle end, that is, the short focal end, and the telephoto end, that is, the long focal end, the second group optical system G2 shifts from the image surface side toward the object side, the third group optical system G3 that mainly takes on a zooming function and an image-surface compensating function shifts from the image surface side toward the object side, and the fourth group optical system G4 is fixed in this case, but may shift to mainly compensate the shift of the image surface accompanying to the shifts of the second group optical system G2 and the third group optical system G3.

In example 2-6, the focal length f of the whole system, the F number F, and the half angle of view, ω, respectively change in the range of f=5.80 to 17.30, F=2.89 to 4.02, and ω=39.93 to 14.65. The optical characteristics relating to the respective optical surfaces and the optical elements are as shown in the following table.

TABLE 39

Optical characteristics

| Surface number | R | D | Nd | vd |
|---|---|---|---|---|
| 1 | 120.000 | 1.40 | 1.84666 | 23.78 |
| 2 | 47.947 | 4.00 | 1.77250 | 49.62 |
| 3 | 777.800 | 0.10 | | |
| 4 | 38.000 | 3.13 | 1.74400 | 44.90 |
| 5 | 157.162 | (Variable) | | |
| 6 | −107.942 | 1.00 | 1.74950 | 35.04 |

TABLE 39-continued

Optical characteristics

| Surface number | R | D | Nd | vd |
|---|---|---|---|---|
| (Aspheric surface) | | | | |
| 7 | 7.565 | 4.95 | | |
| 8 | −11.990 | 1.40 | 1.48749 | 70.44 |
| 9 | 13.998 | 4.38 | 1.74950 | 35.04 |
| 10 | −25.914 | (Variable) | | |
| 11 | ∞ | (Variable) | | |
| (Diaphragm) | | | | |
| 12 | 10.269 | 3.34 | 1.74950 | 35.04 |
| (Aspheric surface) | | | | |
| 13 | −85.882 | 0.10 | | |
| 14 | 22.337 | 0.80 | 1.69895 | 30.05 |
| 15 | 8.100 | 5.64 | 1.51680 | 64.20 |
| 16 | −7.056 | 0.80 | 1.75520 | 27.53 |
| 17 | 9.105 | 0.71 | | |
| 18 | 22.991 | 2.35 | 1.62041 | 60.34 |
| 19 | −22.340 | (Variable) | | |
| 20 | 17.024 | 2.53 | 1.74400 | 44.90 |
| (Aspheric surface) | | | | |
| 21 | −58.471 | 3.16 | | |
| 22 | ∞ | 3.26 | 1.51680 | 64.20 |
| 23 | ∞ | | | |

The respective optical surfaces on the sixth surface, the twelfth surface, and the twentieth surface, described as "aspheric surface" in Table 39, are respectively aspheric surfaces, and parameters relating to the expression (26) on each aspheric surface are as follows.

Aspheric Surface: The Sixth Surface $K=0$ $A_4=1.10558\times10^{-4}$ $A_6=-1.01970\times10^{-6}$ $A_8=7.93490\times10^{-9}$ $A_{10}=-3.49749\times10^{-11}$ Aspheric Surface: The Twelfth Surface $K=0$ $A_4=-7.70888\times10^{-5}$ $A_6=2.55732\times10^{-7}$ $A_8=-7.94450\times10^{-10}$ $A_{10}=-6.13339\times10^{-11}$ Aspheric Surface: The Twentieth Surface $K=0$ $A_4=-1.76923\times10^{-5}$ $A_6=3.83822\times10^{-7}$ $A_8=-8.16788\times10^{-9}$ $A_{10}=1.40087\times10^{-8}$ The interval $D_5$ between the first group optical system G1 and the second group optical system G2, the interval $D_{10}$ between the second group optical system G2 and the diaphragm FA, the interval $D_{11}$ between the diaphragm FA and the third group optical system G3, and the interval $D_{19}$ between the third group optical system G3 and the fourth group optical system G4 are variable, and these variable intervals $D_5$, $D_{10}$, $D_{11}$, and $D_{19}$ are changed as shown in the following table, accompanying zooming.

TABLE 40

| | Variable interval | | |
|---|---|---|---|
| | Wide-angle end | Mean focal length | Telephoto end |
| f | 5.80 | 11.60 | 17.30 |
| $D_5$ | 1.20 | 8.17 | 15.14 |
| $D_{10}$ | 14.94 | 7.97 | 1.00 |
| $D_{11}$ | 7.68 | 1.71 | 1.00 |
| $D_{19}$ | 2.00 | 8.01 | 6.61 |

The numerical values according to the respective conditional expressions of the present invention in example 2-6 are as shown in the following table, and within the range of the respective conditional expressions.

Figure 25:
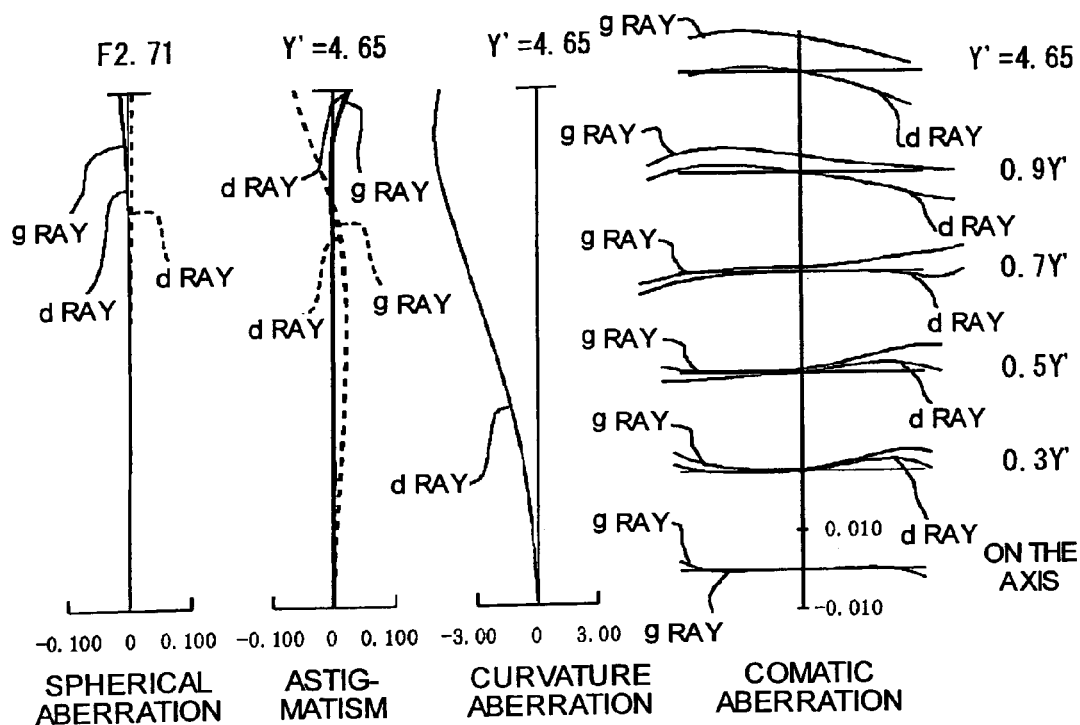
FIG. 25 is a set of graphs for illustrating aberration characteristics of the zoom lens shown in FIG. 37 at the short focal-length side.
Figure 26:
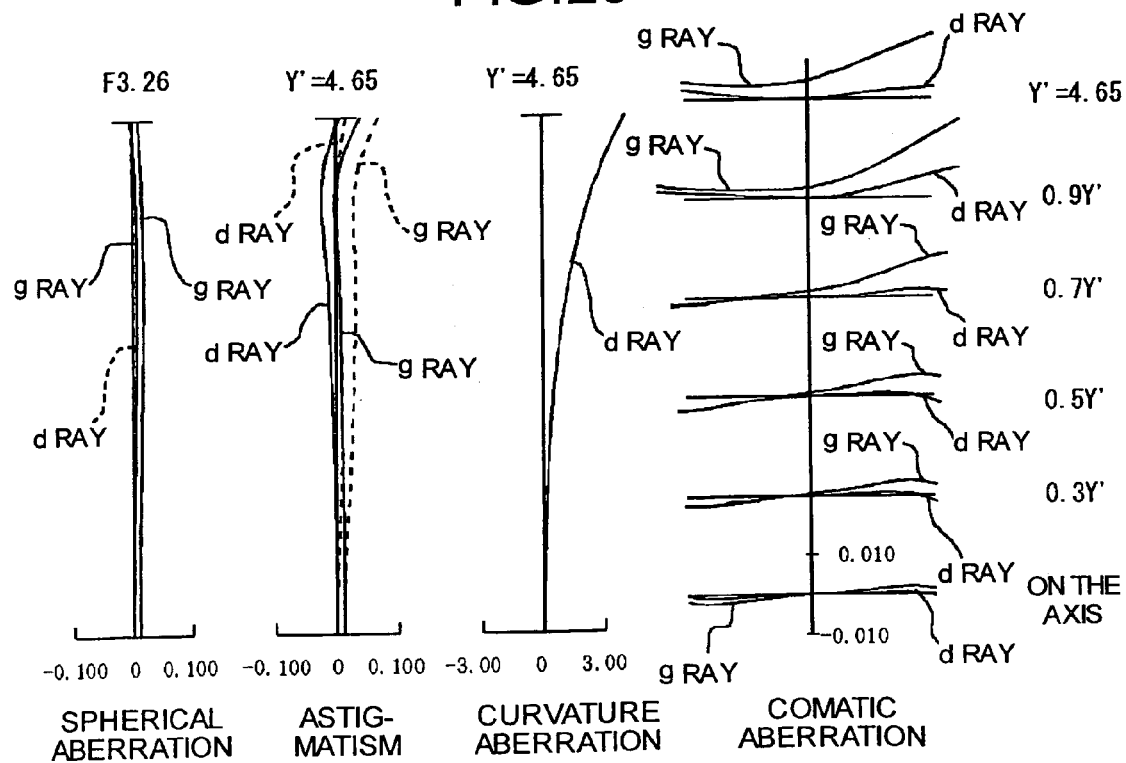
FIG. 26 is a set of graphs for illustrating aberration characteristics of the zoom lens shown in FIG. 19 at the mean focal length.
Figure 27:
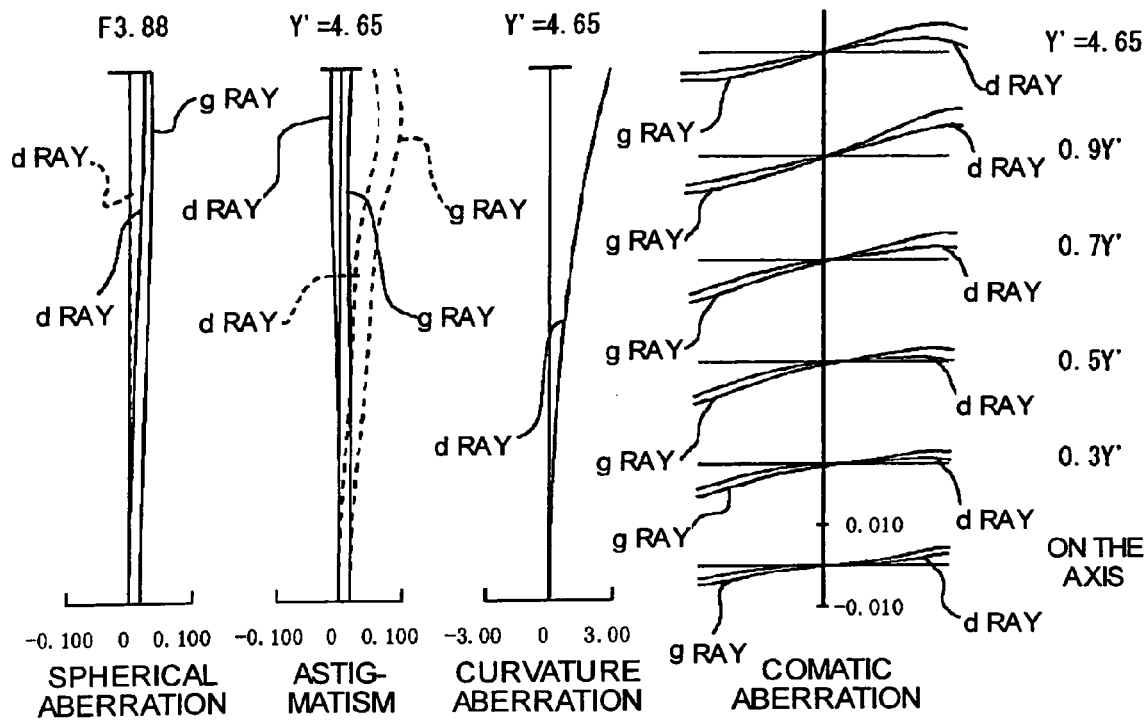
FIG. 27 is a set of graphs for illustrating aberration characteristics of the zoom lens shown in FIG. 19 at the long focal length.

Numerical Values in the Conditional Expressions $N_{c2}(N_{15-16})=1.51680$ $v_{c2}(v_{15-16})=64.20$ $N_{c1}(N_{14-15})=1.69895$ $v_{c1}(v_{14-15})=30.05$ $N_{c3}(N_{16-17})=1.75520$ $v_{c3}(v_{16-17})=27.53$ $R_{c2}/R_{c4}(R_{15}/R_{17})=0.890\ (=8.100/9.105)$ FIG. 25 is an aberration curve at the short focal end of the zoom lens in example 2-1, FIG. 26 is an aberration curve at the mean focal length of the zoom lens in example 2-1, and FIG. 27 is an aberration curve at the long focal end of the zoom lens in example 2-1.

Figure 28:
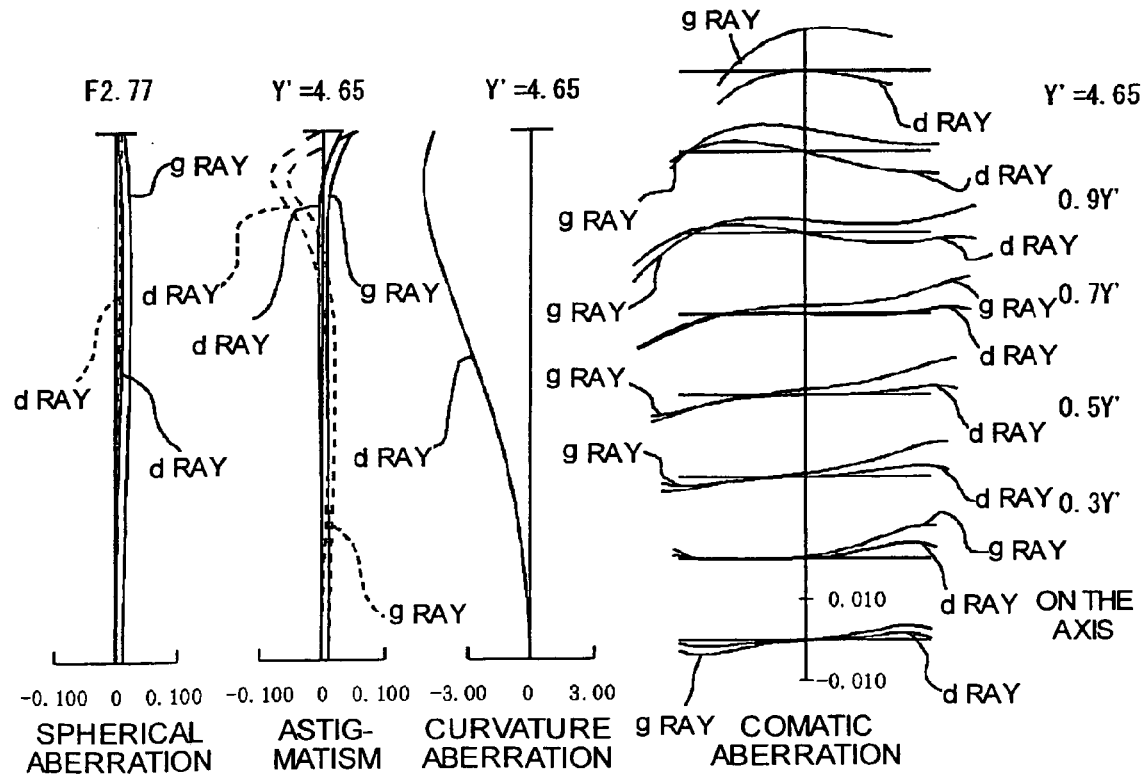
FIG. 28 is a set of graphs for illustrating aberration characteristics of the zoom lens shown in FIG. 20 at the short focal length.
Figure 31:
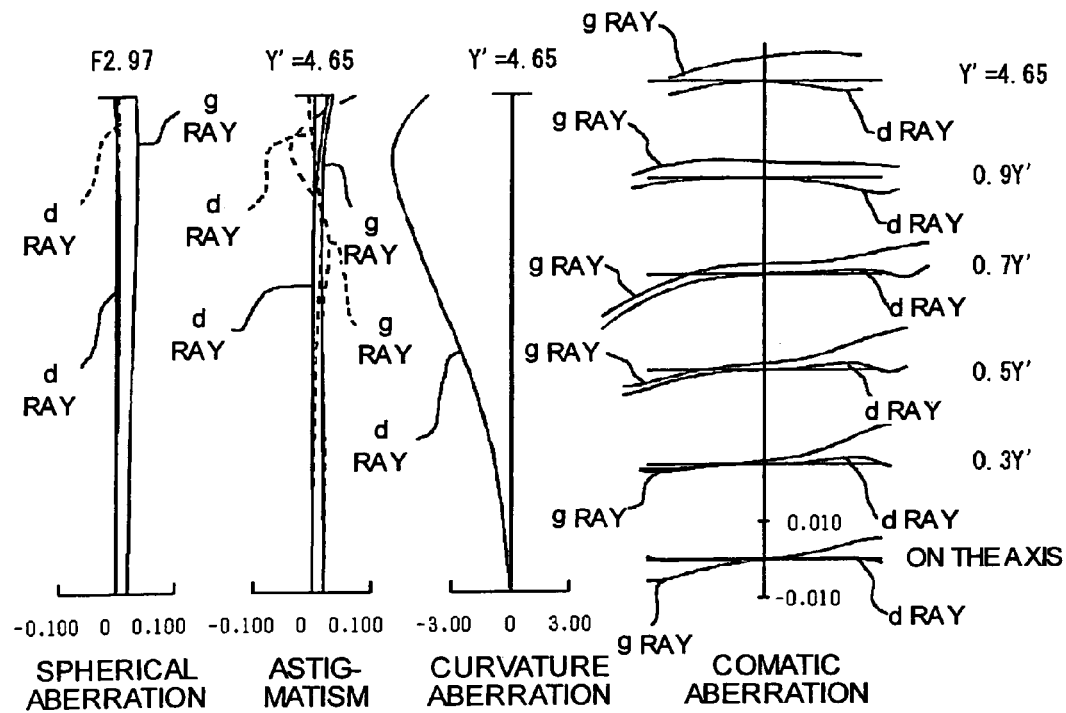
FIG. 31 is a set of graphs for illustrating aberration characteristics of the zoom lens shown in FIG. 21 at the short focal length.
Figure 32:
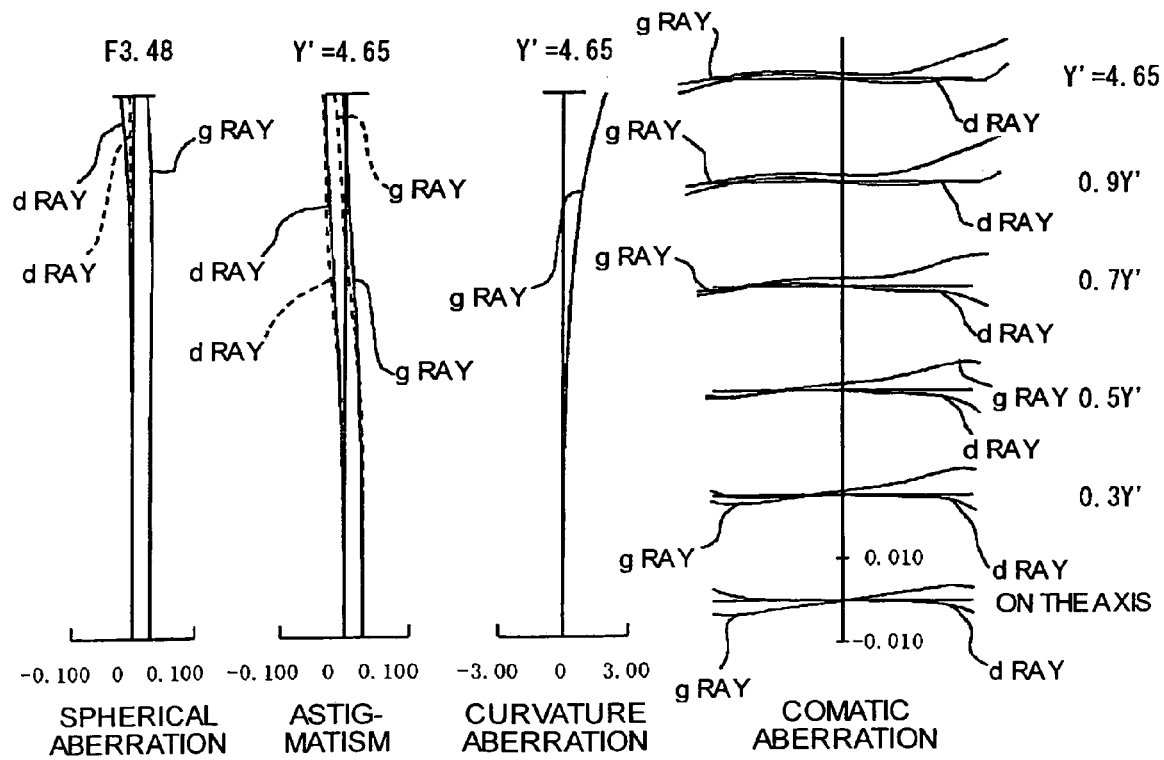
FIG. 32 is a set of graphs for illustrating aberration characteristics of the zoom lens shown in FIG. 21 at the mean focal length.
Figure 33:
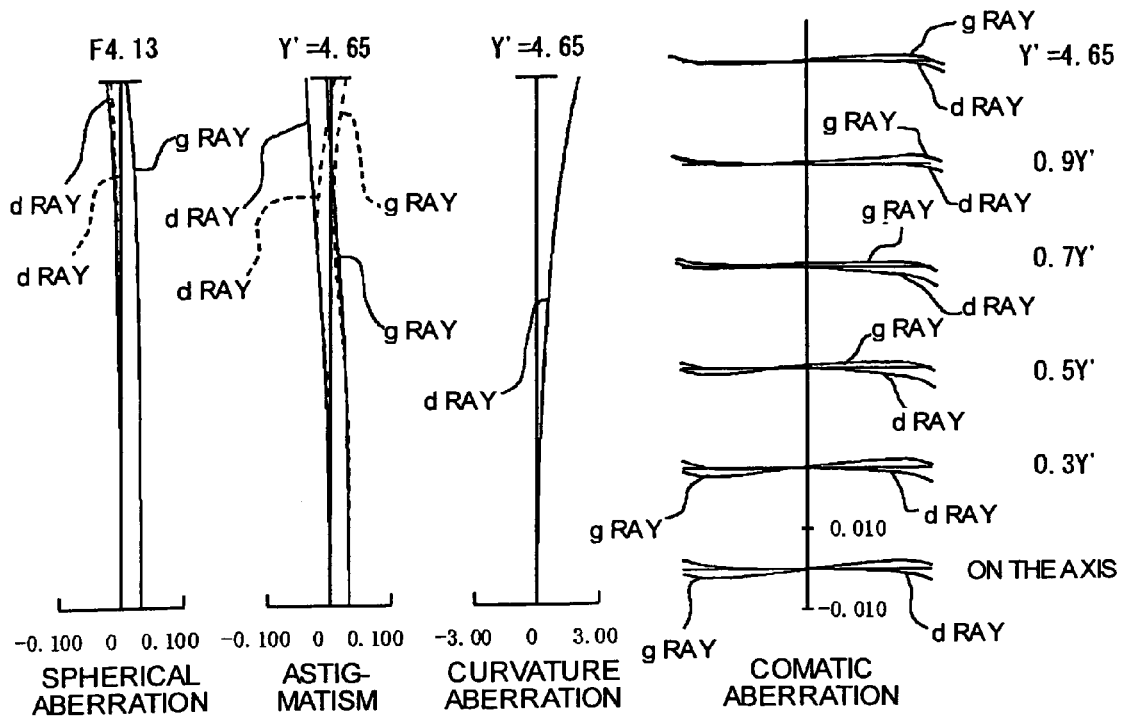
FIG. 33 is a set of graphs for illustrating aberration characteristics of the zoom lens shown in FIG. 21 at the long focal length.
Figure 34:
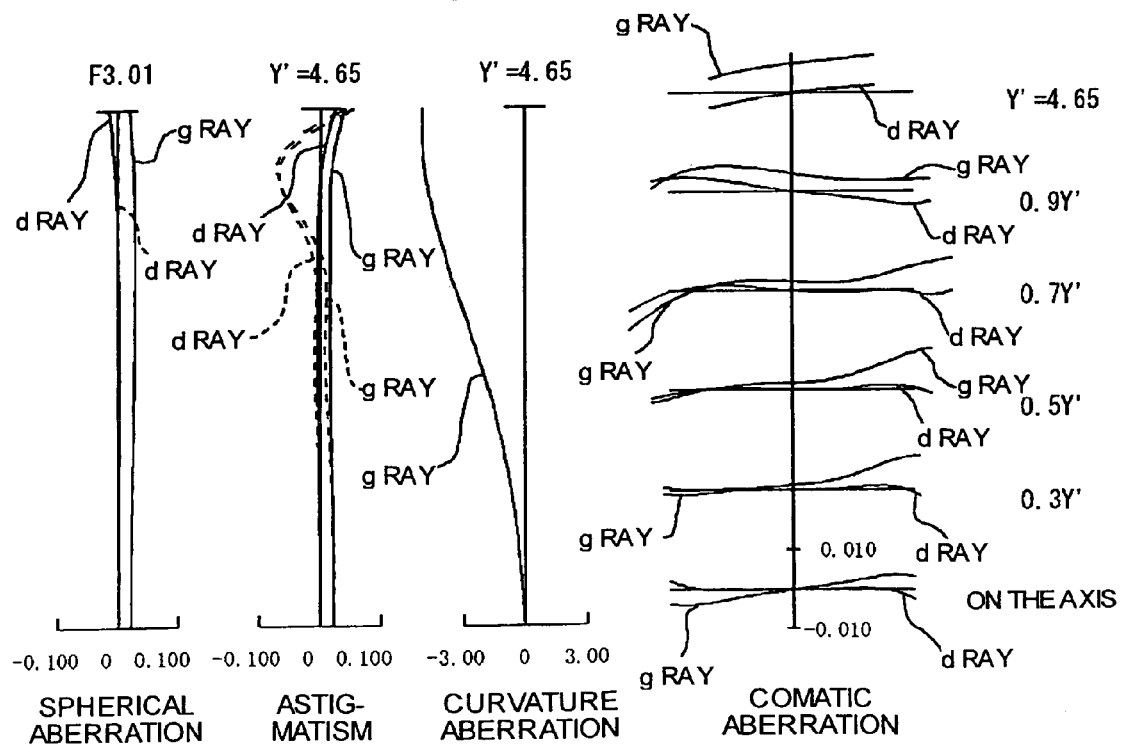
FIG. 34 is a set of graphs for illustrating aberration characteristics of the zoom lens shown in FIG. 22 at the short focal length.
Figure 35:
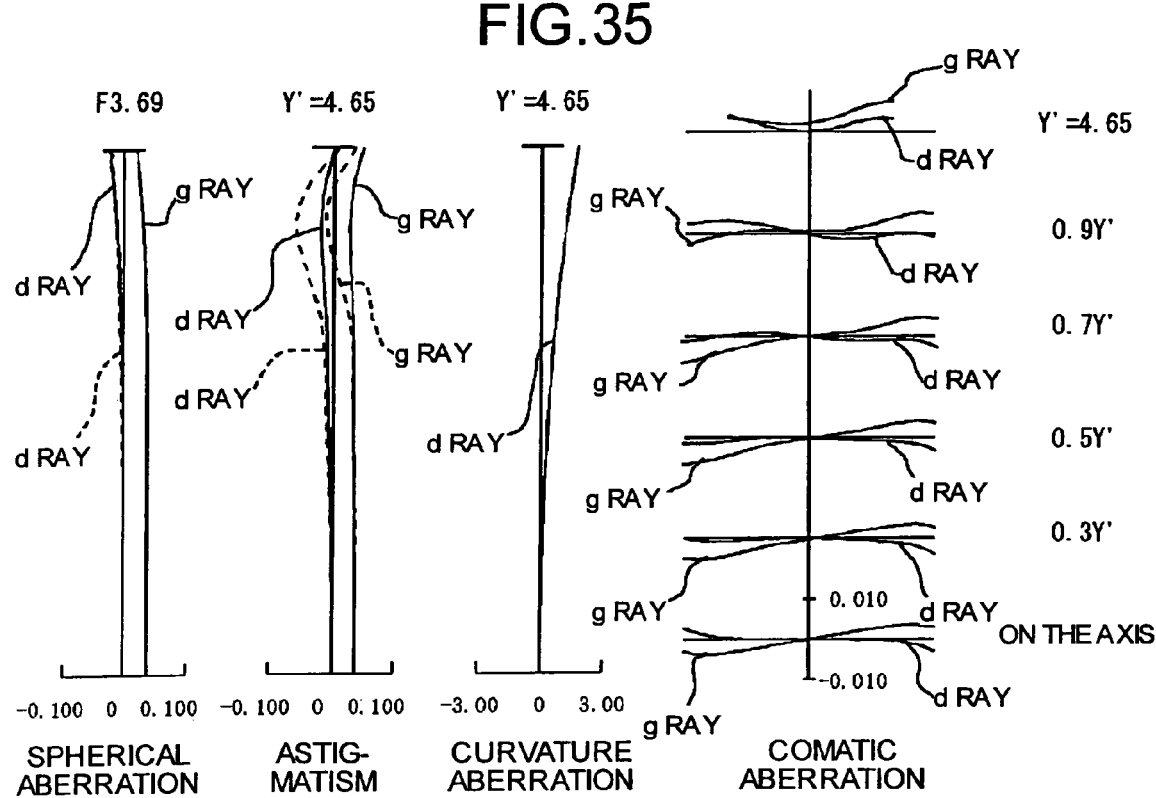
FIG. 35 is a set of graphs for illustrating aberration characteristics of the zoom lens shown in FIG. 22 at the mean focal length.
Figure 36:
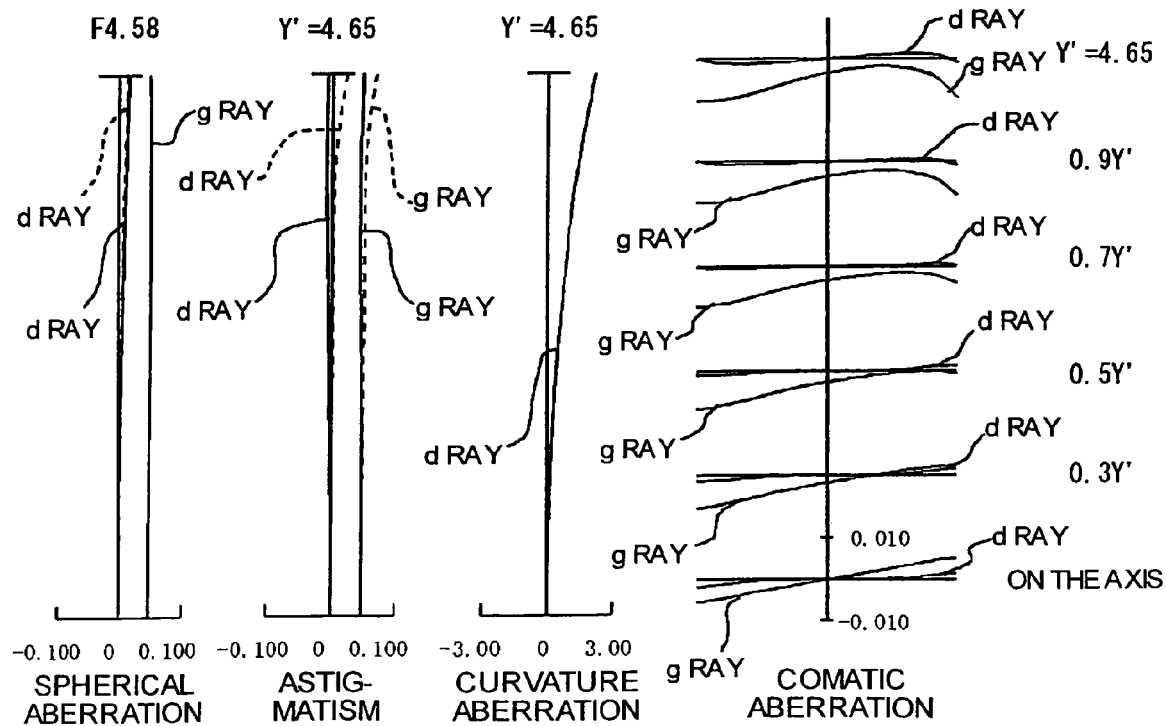
FIG. 36 is a set of graphs for illustrating aberration characteristics of the zoom lens shown in FIG. 22 at the long focal length.
Figure 37:
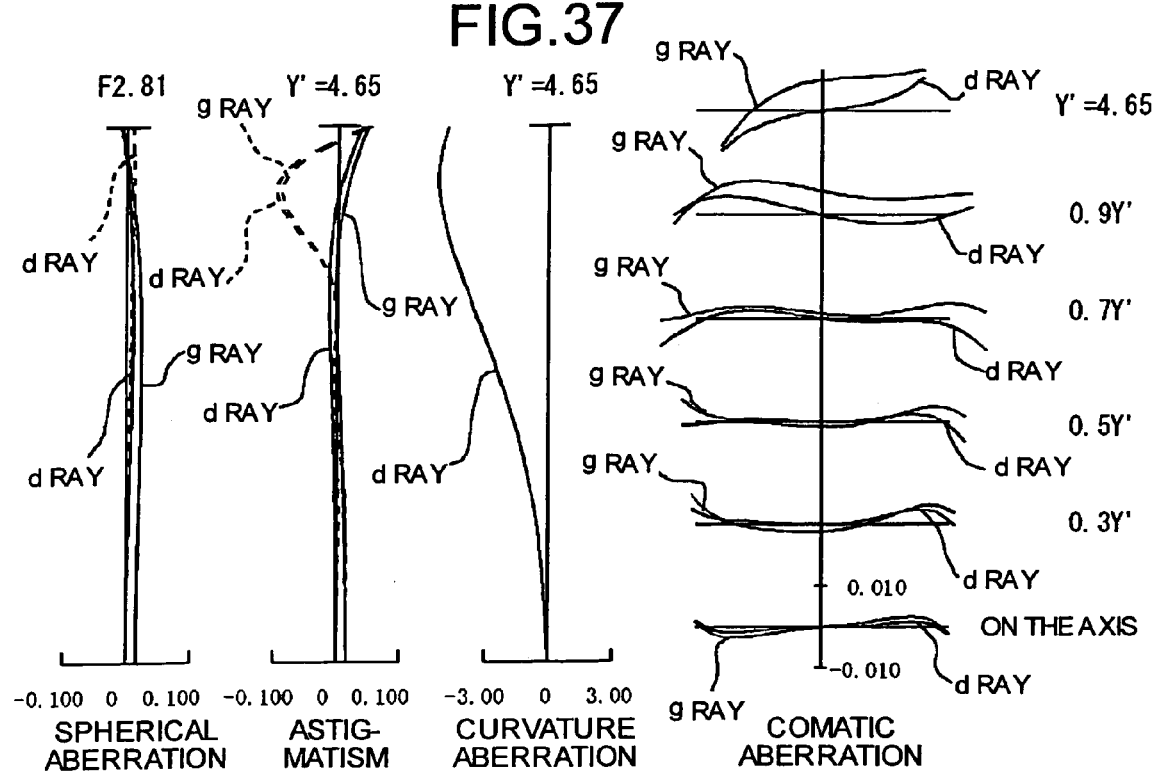
FIG. 37 is a set of graphs for illustrating aberration characteristics of the zoom lens shown in FIG. 23 at the short focal length.
Figure 38:
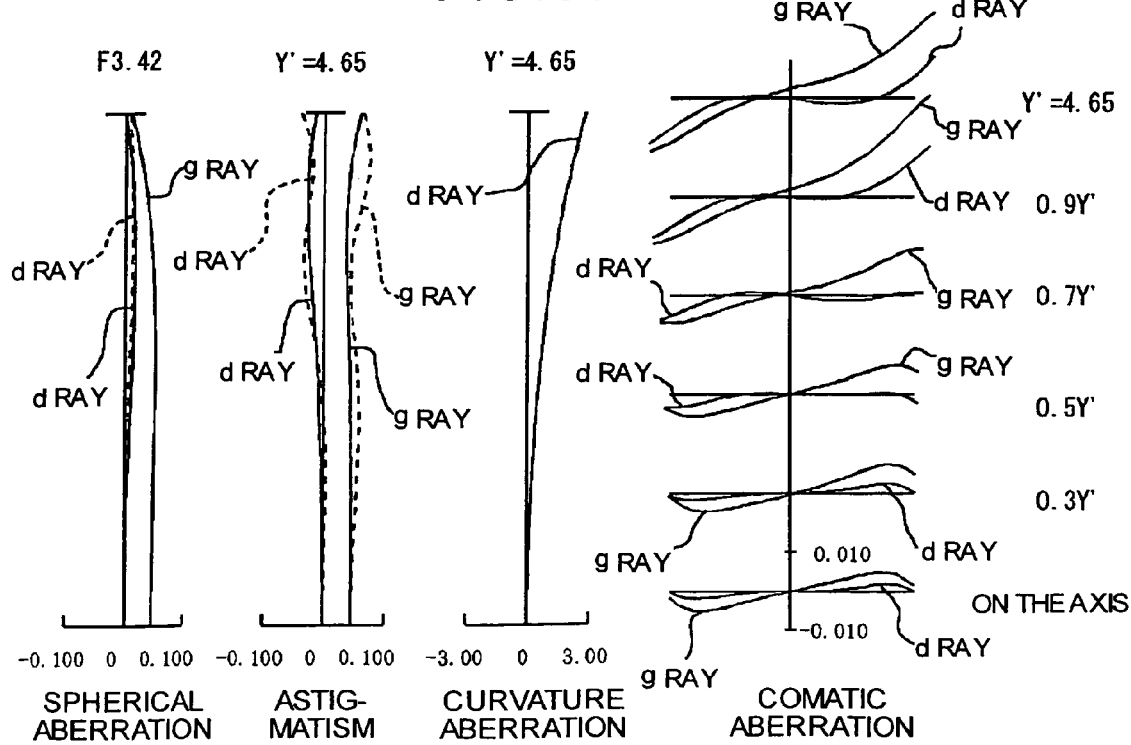
FIG. 38 is a set of graphs for illustrating aberration characteristics of the zoom lens shown in FIG. 23 at the mean focal length.

FIG. 28 is an aberration curve at the short focal end of the zoom lens in example 2-2, FIG. 29 is an aberration curve at the mean focal length of the zoom lens in example 2-2, and FIG. 30 is an aberration curve at the long focal end of the zoom lens in example 2-2. Likewise, FIG. 31 is an aberration curve at the short focal end of the zoom lens in example 2-3, FIG. 32 is an aberration curve at the mean focal length of the zoom lens in example 2-3, and FIG. 33 is an aberration curve at the long focal end of the zoom lens in example 2-3. FIG. 34 is an aberration curve at the short focal end of the zoom lens in example 2-4, FIG. 35 is an aberration curve at the mean focal length of the zoom lens in example 2-4, and FIG. 36 is an aberration curve at the long focal end of the zoom lens in example 2-4. FIG. 37 is an aberration curve at the short focal end of the zoom lens in example 2-5, FIG. 38 is an aberration curve at the mean focal length of the zoom lens in example 2-5, and FIG. 39 is an aberration curve at the long focal end of the zoom lens in example 2-5.

Figure 41:
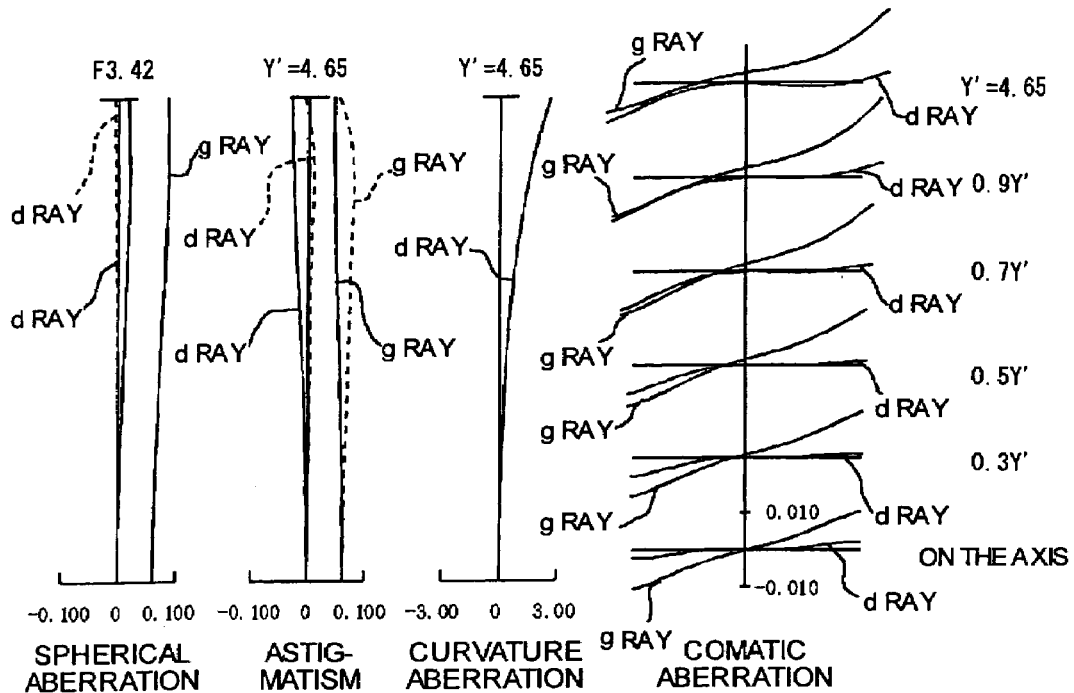
FIG. 41 is a set of graphs for illustrating aberration characteristics of the zoom lens shown in FIG. 24 at the mean focal length.
Figure 42:
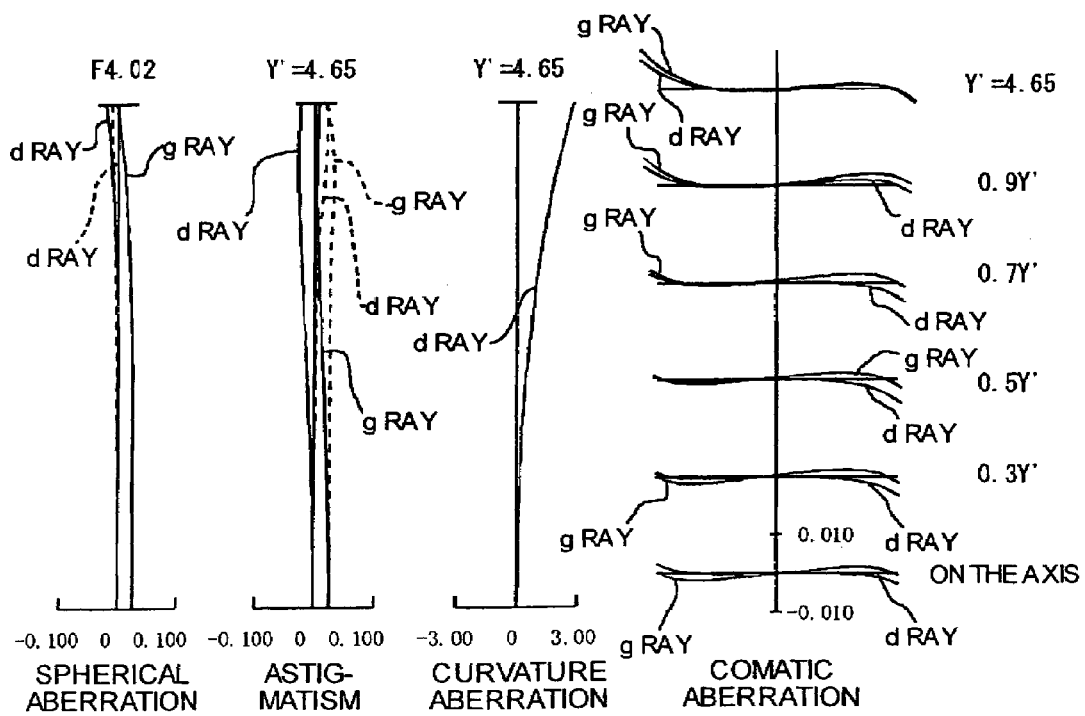
FIG. 42 is a set of graphs for illustrating aberration characteristics of the zoom lens shown in FIG. 24 at the long focal length.

FIG. 40 is an aberration curve at the short focal end of the zoom lens in example 2-6, FIG. 41 is an aberration curve at the mean focal length of the zoom lens in example 2-6, and FIG. 42 is an aberration curve at the long focal end of the zoom lens in example 2-6. In the aberration curves from FIG. 25 to FIG. 42, a solid line in the diagram illustrating spherical aberration expresses spherical aberration, and a broken line expresses sine condition, and a solid line in the diagram illustrating astigmatism expresses a sagittal image surface and a broken line expresses a meridional image surface. From these aberration curves, it is seen that excellent characteristics can be obtained from the respective examples. If a camera is constructed by using the zoom lens shown in these examples as the shooting lens, a small and high quality camera with a wide angle of view can be realized. If a mobile information terminal is constructed by using the zoom lens shown in these examples as the shooting lens in the camera unit, a mobile information terminal having a small and high quality camera with a wide angle of view can be realized.

Next, several examples that shows specific configuration and numerical examples of a zoom lens according to a fifth embodiment of the present invention will be explained in detail. Specific configuration and numerical examples are shown in example 3, as an example of the zoom lens according to the fifth embodiment of the present invention. In example 3, the aberrations of the zoom lens are sufficiently corrected, and correspondence to the photodetector with 3,000,000 to 5,000,000 pixels becomes possible. It will be obvious from the examples below, that excellent imaging performance can be ensured, while achieving sufficient miniaturization, by forming the zoom lens as shown in the fifth embodiment.

In example 3, various signs as described below are used.
f: Focal length of the whole system
F: F number
ω: Half angle of view
R: Radius of curvature of each surface
D: Spacing
$N_d$: Refractive index with respect to d ray
$v_d$: Abbe constant with respect to d ray
K: Conical constant of the aspheric surface
$A_4$: Fourth coefficient of the aspheric surface
$A_6$: Sixth coefficient of the aspheric surface
$A_8$: Eighth coefficient of the aspheric surface
$A_{10}$: Tenth coefficient of the aspheric surface
Wide: Short focal length
Mean: Medium focal length
Tele: Long focal length However, the aspheric surface used herein is defined by the following expression, when it is assumed that a reciprocal of a paraxial radius of curvature (paraxial curvature) is C, and the height from the optical axis is H.

$$X = \frac{CH^2}{1+\sqrt{(1-(1+K)C^2H^2}} + A_4 \cdot Y^4 + A_6 \cdot Y^6 + A_8 \cdot Y^8 + A_{10} \cdot Y^{10} \quad (26)$$

In the numerical examples below, E-XY stands for $10^{-XY}$. In the aberration diagram explained below, a solid line in the diagram illustrating spherical aberration expresses spherical aberration, and a broken line expresses sine condition, and a solid line in the diagram illustrating astigmatism expresses a sagittal image surface and a broken line expresses a meridional image surface. Further, in the respective aberration diagrams, d ray (587.56 nanometers) and g ray (435.83 nanometers) are illustrated.

Figure 43:
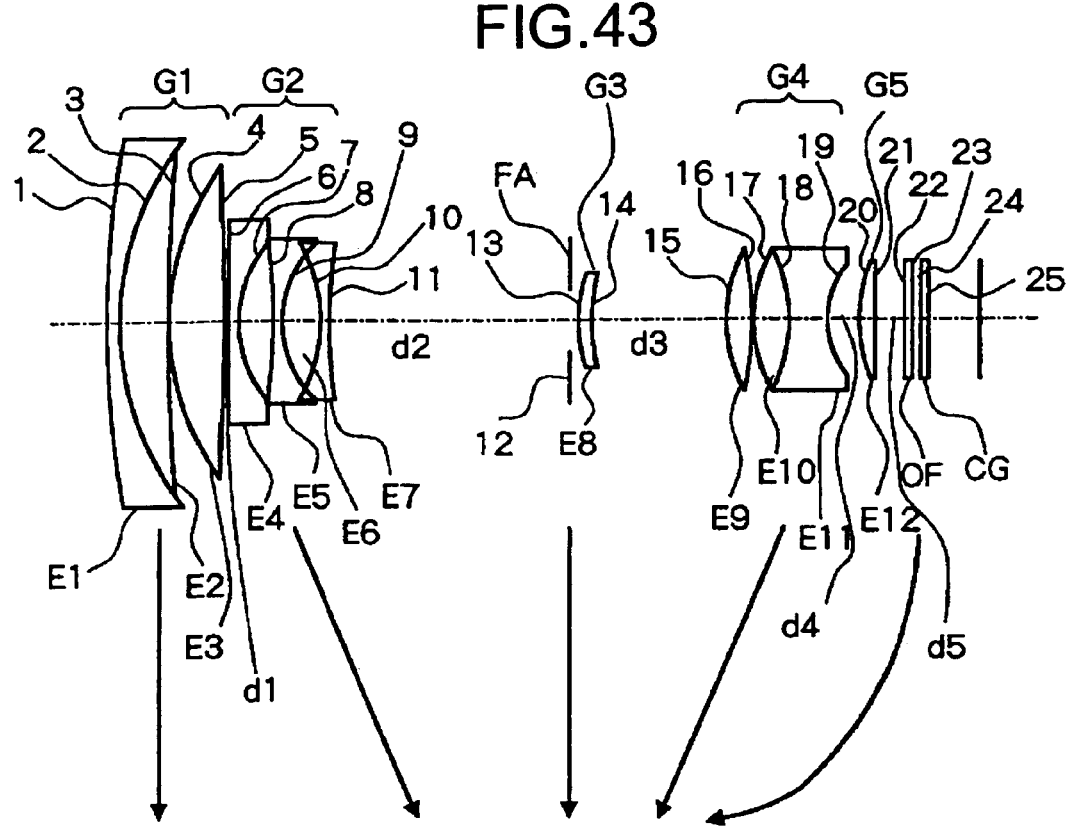
FIG. 43 is a schematic diagram of an optical system of example 3-1 of a zoom lens according to a fifth embodiment of the present invention.

FIG. 43 is a schematic diagram of an optical system of example 3-1 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, a diaphragm FA, an optical filter OF, and a cover glass CG. In this case, the first to the third lenses E1 to E3 constitute the first group optical system G1, the fourth to the seventh lenses E4 to E7 constitute the second group optical system G2, the eighth lens E8 constitutes the third group optical system G3, the ninth to the eleventh lenses E9 to E11 constitute the fourth group optical system G4, and the twelfth lens E12 constitutes the fifth group optical system G5.

The respective lenses are supported by an appropriate common support frame or the like for each lens group, and at the time of zooming, each group optical system integrally operates. In FIG. 43, surface numbers that are assigned to each optical surface are shown for reference. The respective reference signs in FIG. 43 are used independently for each example in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the seventh lens E7, the diaphragm FA, the eighth lens E8, the ninth lens E9, the tenth lens E10, the eleventh lens E11, the twelfth lens E12, an thirteenth E13, the optical filter OF, and the cover glass CG are arranged in order from the object side of a subject or the like to the image-surface side, and an image is formed at the back of the cover glass CG.

The first lens E1 is a negative meniscus lens formed in a convex shape on the object side, the second lens E2 is a positive meniscus lens formed in a convex shape on the object side, and the third lens E3 is a positive lens including a double-convex lens. The first lens E1 and the second lens E2 form a densely cemented doublet, and the first group optical system G1 formed of the first to the third lenses E1 to E3 exhibits a positive focal length as a whole.

The fourth lens E4 is a negative lens including a double-concave lens, the fifth lens E5 is a negative lens including a double-concave lens, the sixth lens E6 is a positive lens including a double-convex lens, and the seventh lens E7 is a negative lens including a double-concave lens. The second group optical system G2 formed of the fourth to the seventh lenses E4 to E7 exhibits a negative focal length as a whole.

The eighth lens E8 is a positive meniscus lens formed in a convex shape on the object side and only the eighth lens E8 forms the third group optical system G3 that exhibits a positive focal length. The ninth lens E9 is a positive lens including a double-convex lens, the tenth lens E10 is a positive lens including a double-convex lens, and the eleventh lens E11 is a negative lens including a double-concave lens. The tenth to the eleventh lenses E10 to E11 form a densely cemented doublet, and the fourth group optical system G4 formed of the ninth to the eleventh lenses E9 to E11 exhibits a positive focal length as a whole. The twelfth lens E12 is a positive lens including a double-convex lens and only the twelfth lens E12 forms the fifth group optical system G5 that exhibits a positive focal length.

The diaphragm FA arranged between the second group optical system G2 and the third group optical system G3 is integrally retained with the third group optical system G3 while keeping the distance from the third group optical system G3 constant.

On a side of the image surface of the twelfth lens E12 of the fifth group optical system G5, the optical filter OF that includes various optical filtering functions and the cover glass CG that protects an input surface of a solid image element are arranged in order toward the image-surface side and integrally retained with the solid image element.

The fourth surface, being a surface on the object side of the third lens E3 located closest to the image-surface side in the first group optical system G1, the sixth surface, being a surface on the object side of the fourth lens E4 located closest to the object side in the second group optical system G2, the thirteenth surface, being a surface on the object side of the eighth lens E8 that forms the third group optical system G3, the fifteenth surface, being a surface on the object side of the ninth lens E9 located closest to the object side in the fourth group optical system G4, and the twentieth surface, being a surface on the object side of the twelfth lens E12 that forms the fifth group optical system G5 are respectively aspheric surfaces.

In example 3-1, the focal length f of the whole system, the F number F, and the half angle of view, ω, respectively change in the range of f=7.404 to 71.820, F=3.2 to 4.40, and ω=33.497 to 3.705. The optical characteristics relating to the respective optical surfaces and the optical elements are as shown in the following table.

TABLE 41

Optical characteristics

| Surface | R | D | $N_d$ | $V_d$ | Note |
|---|---|---|---|---|---|
| 1 | 89.755 | 1.200 | 1.78300 | 30.7 | First lens |
| 2 | 27.999 | 4.458 | 1.61900 | 60.3 | Second lens |
| 3 | 227.885 | 0.100 | | | |
| 4 | 26.060 | 4.801 | 1.61700 | 60.4 | Third lens |
| 5 | −11645.225 | d1 | | | |
| 6 | −279.679 | 1.000 | 1.83200 | 37.3 | Fourth lens |
| 7 | 10.975 | 3.231 | | | |
| 8 | −61.442 | 0.800 | 1.54100 | 65.3 | Fifth lens |
| 9 | 10.925 | 3.597 | 1.71700 | 29.5 | Sixth lens |
| 10 | −15.956 | 0.800 | 1.77300 | 49.6 | Seventh lens |
| 11 | 42.210 | d2 | | | |
| 12 | Diaphragm | 1.000 | | | |
| 13 | 11.846 | 1.284 | 1.48700 | 70.4 | Eighth lens |
| 14 | 20.211 | d3 | | | |
| 15 | 13.910 | 2.410 | 1.50000 | 68.9 | Ninth lens |
| 16 | −25.091 | 0.100 | | | |
| 17 | 13.689 | 3.374 | 1.69100 | 54.2 | Tenth lens |
| 18 | −18.625 | 3.500 | 1.78700 | 33.0 | Eleventh lens |
| 19 | 7.393 | d4 | | | |
| 20 | 15.210 | 1.622 | 1.48700 | 70.4 | Twelfth lens |
| 21 | −281.555 | d5 | | | |
| 22 | Plane | 0.927 | 1.54900 | 69.3 | Filter |
| 23 | Plane | 0.800 | | | |
| 24 | Plane | 0.500 | 1.50000 | 64.0 | cover glass |
| 25 | Plane | | | | |

The respective optical surfaces on the fourth surface, the sixth surface, the thirteenth surface, the fifteenth surface, and the twentieth surface in Table 41 are respectively aspheric surfaces, and parameters relating to the expression (26) on each aspheric surface are as follows.

TABLE 42

Coefficient of aspheric surface

| | K | $A_4$ | $A_6$ | $A_8$ | $A_{10}$ |
|---|---|---|---|---|---|
| 4 | −0.149 | −0.120E−05 | −0.192E−08 | −0.176E−11 | −0.448E−14 |
| 6 | 326.153 | 0.264E−04 | −0.159E−06 | 0.140E−08 | −0.568E−11 |
| 13 | −2.285 | 0.104E−03 | −0.457E−06 | −0.170E−07 | 0.151E−11 |
| 15 | −0.902 | −0.424E−04 | 0.835E−07 | 0.356E−08 | −0.575E−10 |
| 20 | −0.226 | −0.612E−06 | −0.277E−06 | 0.593E−07 | −0.125E−08 |

The interval d1 between the first group optical system G1 and the second group optical system G2, the interval d2 between the second group optical system G2 and the diaphragm FA, the interval d3 between the third group optical system G3 and the fourth group optical system G4, the interval d4 between the fourth group optical system G4 and the fifth group optical system G5, and the interval d5 between the fifth group optical system G5 and the optical filter OF are variable, and these variable intervals d1, d2, d3, d4, and d5 are changed as shown in the following table, corresponding to the focal length f of the whole system, accompanying zooming.

TABLE 43

Variable intervals

| | f | d1 | d2 | d3 | d4 | d5 |
|---|---|---|---|---|---|---|
| Wide | 7.404 | 0.532 | 22.110 | 12.600 | 3.020 | 2.407 |
| Mean | 23.917 | 14.053 | 8.569 | 7.257 | 5.514 | 2.998 |
| Tele | 71.820 | 21.478 | 1.164 | 1.000 | 17.500 | 1.700 |

The parameter values according to the conditional expression (17) of the present invention in example 3-1 are as shown in the following table, and within the range of the conditional expression.

TABLE 44

Parameter values in the conditional expression

| $R_{C2}/R_{C4}$ | 0.259 |
|---|---|

Figure 47:
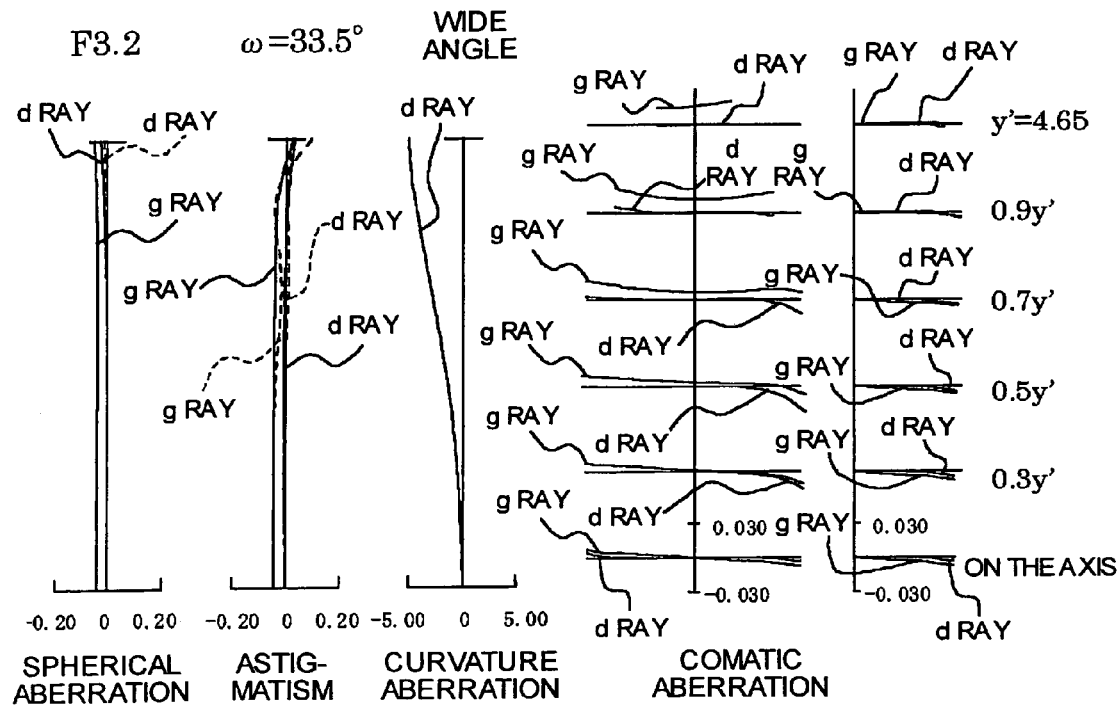
FIG. 47 is a set of graphs for illustrating aberration characteristics of the zoom lens shown in FIG. 43 at the short focal-length side.
Figure 48:
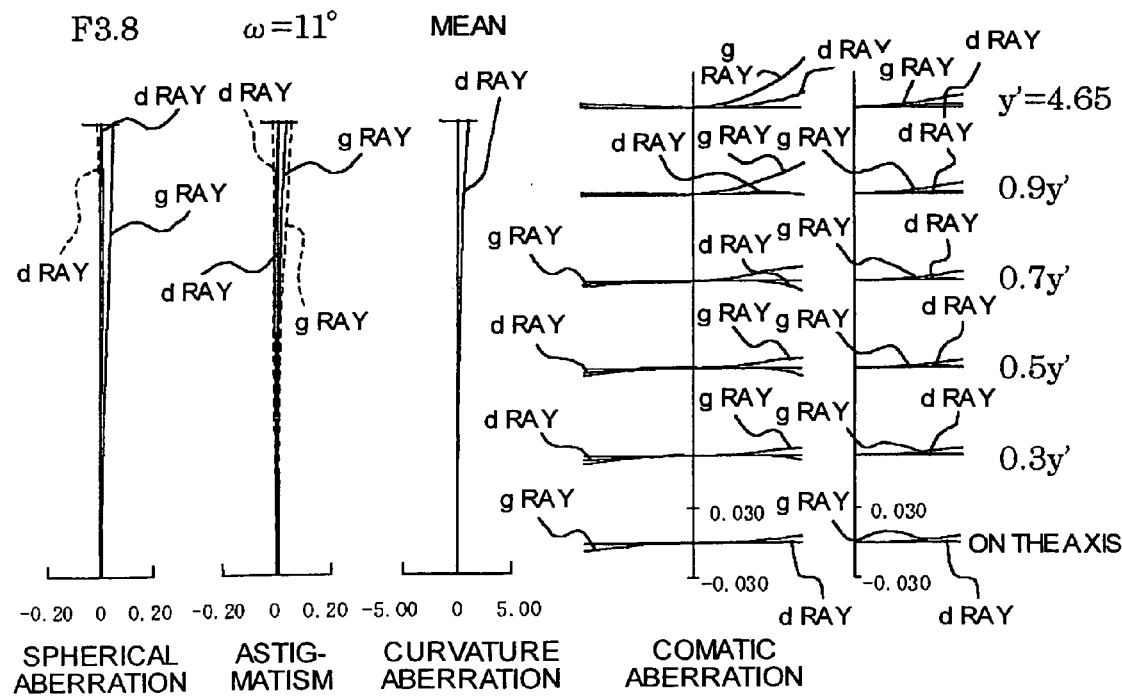
FIG. 48 is a set of graphs for illustrating aberration characteristics of the zoom lens shown in FIG. 43 at the mean focal-length side.
Figure 49:
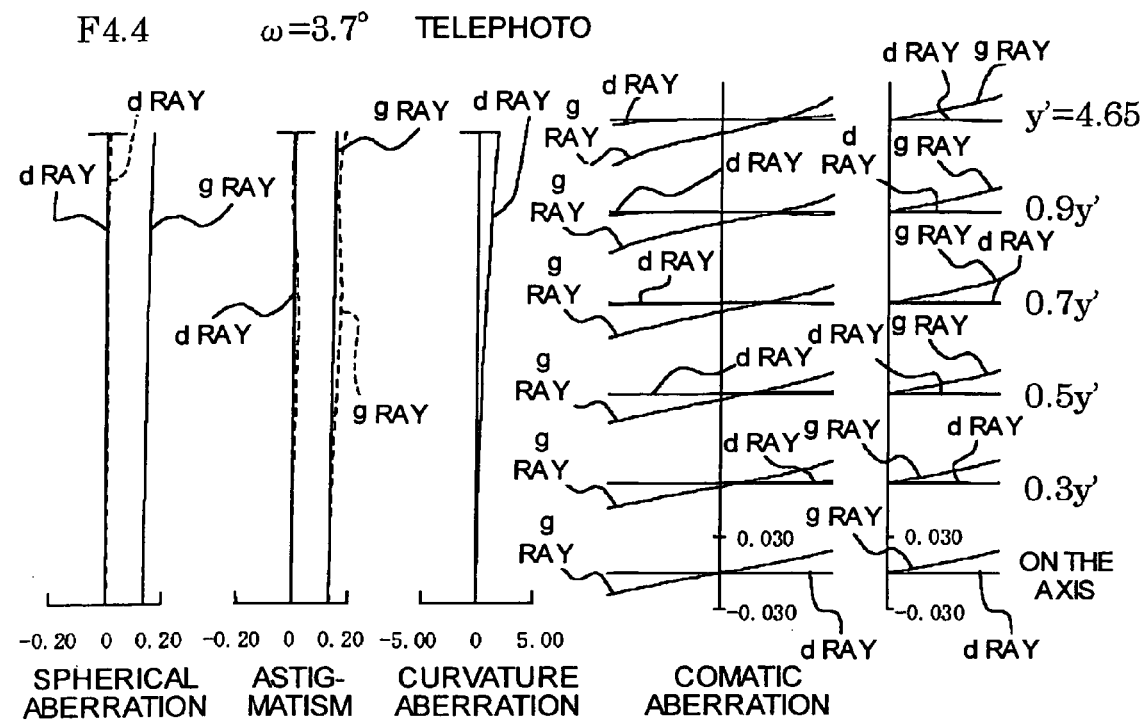
FIG. 49 is a set of graphs for illustrating aberration characteristics of the zoom lens shown in FIG. 43 at the long focal-length side.

The aberration diagrams at the wide-angle end (short focal end), the mean focal length, and the telephoto end (long focal end) according to example 3-1 are respectively illustrated in FIG. 47 to FIG. 49.

Figure 44:
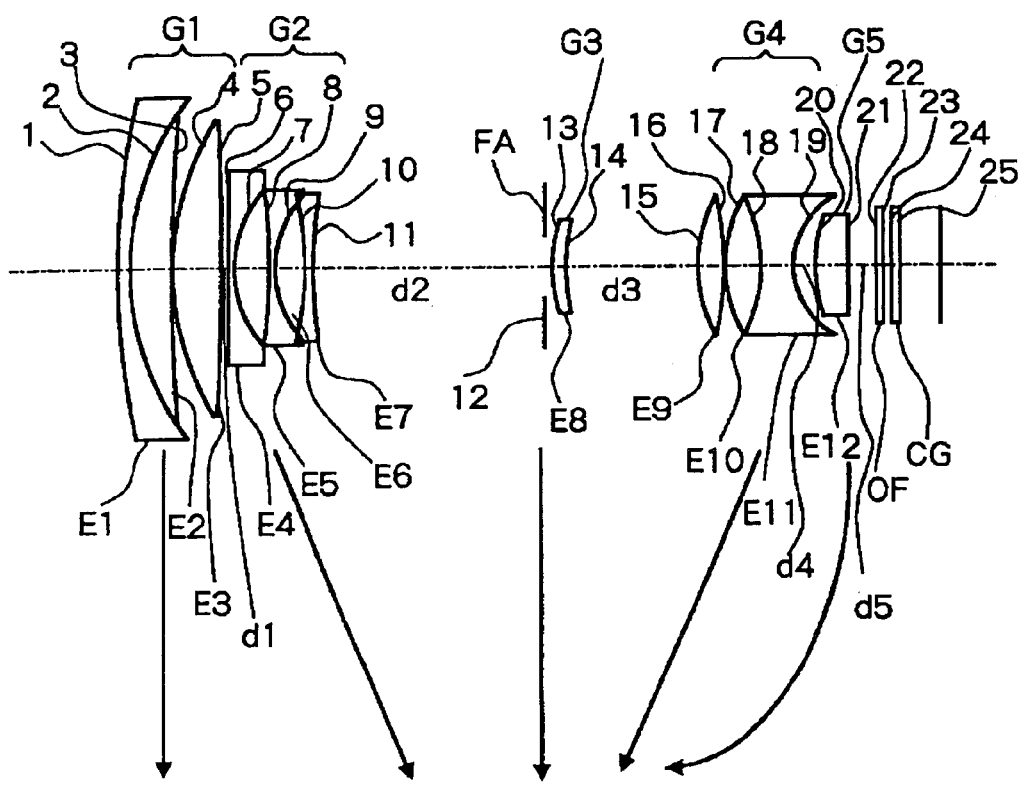
FIG. 44 is a schematic diagram of an optical system of example 3-2 of the zoom lens according to the fifth embodiment.

FIG. 44 is a schematic diagram of an optical system of example 3-2 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, a diaphragm FA, an optical filter OF, and a cover glass CG. In this case, the first to the third lenses E1 to E3 constitute the first group optical system G1, the fourth to the seventh lenses E4 to E7 constitute the second group optical system G2, the eighth lens E8 constitutes the third group optical system G3, the ninth to the eleventh lenses E9 to E11 constitute the fourth group optical system G4, and the twelfth lens E12 constitutes the fifth group optical system G5.

The respective lenses are supported by an appropriate common support frame or the like for each lens group, and at the time of zooming, each group optical system integrally operates. In FIG. 44, parts of surface numbers that are assigned to each optical surface are shown for reference. The respective reference signs in FIG. 44 are used independently for each example as described previously. Therefore, even when a common reference sign is given, it is not always a common configuration to other examples.

For example, the first lens E1, the second lens E2, the third lens E3, the fourth lens E4, the fifth lens E5, the sixth lens E6, the seventh lens E7, the diaphragm FA, the eighth lens E8, the ninth lens E9, the tenth lens E10, the eleventh lens E11, the twelfth lens E12, an thirteenth E13, the optical filter OF, and the cover glass CG are arranged in order from the object side of a subject or the like to the image-surface side, and an image is formed at the back of the cover glass CG.

The first lens E1 is a negative meniscus lens formed in a convex shape on the object side, the second lens E2 is a positive meniscus lens formed in a convex shape on the object side, and the third lens E3 is a positive lens including a double-convex lens. The first lens E1 and the second lens E2 form a densely cemented doublet, and the first group optical system G1 formed of the first to the third lenses E1 to E3 exhibits a positive focal length as a whole.

The fourth lens E4 is a negative lens including a double-concave lens, the fifth lens E5 is a negative lens including a double-concave lens, the sixth lens E6 is a positive lens including a double-convex lens, and the seventh lens E7 is a negative lens including a double-concave lens. The second group optical system G2 formed of the fourth to the seventh lenses E4 to E7 exhibits a negative focal length as a whole.

The eighth lens E8 is a positive meniscus lens formed in a convex shape on the object side and only the eighth lens E8 forms the third group optical system G3 that exhibits a positive focal length.

The ninth lens E9 is a positive lens including a double-convex lens, the tenth lens E10 is a positive lens including a double-convex lens, and the eleventh lens E11 is a negative lens including a double-concave lens. The tenth to the eleventh lenses E10 to E11 form a densely cemented doublet, and the fourth group optical system G4 formed of the ninth to the eleventh lenses E9 to E11 exhibits a positive focal length as a whole. The twelfth lens E12 is a positive lens including a double-convex lens and only the twelfth lens E12 forms the fifth group optical system G5 that exhibits a positive focal length.

The diaphragm FA arranged between the second group optical system G2 and the third group optical system G3 is integrally retained with the third group optical system G3 while keeping the distance from the third group optical system G3 constant.

On a side of the image surface of the twelfth lens E12 of the fifth group optical system G5, the optical filter OF that includes various optical filtering functions and the cover glass CG that protects an input surface of a solid image element are arranged in order toward the image-surface side and retained integrally with the solid image element.

The fourth surface, being a surface on the object side of the third lens E3 located closest to the image-surface side in the first group optical system G1, the sixth surface, being a surface on the object side of the fourth lens E4 located closest to the object side in the second group optical system G2, the thirteenth surface, being a surface on the object side of the eighth lens E8 that forms the third group optical system G3, the fifteenth surface, being a surface on the object side of the ninth lens E9 located closest to the object side in the fourth group optical system G4, and the twentieth surface, being a surface on the object side of the twelfth lens E12 that forms the fifth group optical system G5 are respectively aspheric surfaces.

In example 3-2, the focal length f of the whole system, the F number F, and the half angle of view, ω, respectively change in the range of f=7.400 to 71.776, F=3.200 to 4.400, and ω=33.512 to 3.707. The optical characteristics relating to the respective optical surfaces and the optical elements are as shown in the following table.

TABLE 45

Optical characteristics

| Surface | R | D | $N_d$ | $V_d$ | Note |
|---|---|---|---|---|---|
| 1 | 91.074 | 1.200 | 1.78700 | 31.0 | First lens |
| 2 | 28.167 | 4.266 | 1.61400 | 60.6 | Second lens |
| 3 | 235.621 | 0.100 | | | |
| 4 | 26.060 | 4.801 | 1.61500 | 60.6 | Third lens |
| 5 | −916.538 | d1 | | | |
| 6 | −209.116 | 1.000 | 1.81900 | 32.8 | Fourth lens |
| 7 | 11.17657 | 3.202 | | | |

TABLE 45-continued

Optical characteristics

| Surface | R | D | $N_d$ | $V_d$ | Note |
|---|---|---|---|---|---|
| 8 | −51.636 | 0.800 | 1.57900 | 62.7 | Fifth lens |
| 9 | 11.809 | 2.899 | 1.80100 | 25.1 | Sixth lens |
| 10 | −29.084 | 0.800 | 1.83500 | 43.0 | Seventh lens |
| 11 | 40.965 | d2 | | | |
| 12 | Diaphragm | 1.000 | | | |
| 13 | 11.822 | 1.291 | 1.48800 | 70.3 | Eighth lens |
| 14 | 20.211 | d3 | | | |
| 15 | 14.054 | 2.520 | 1.50100 | 68.9 | Ninth lens |
| 16 | −24.574 | 0.100 | | | |
| 17 | 14.024 | 3.451 | 1.69000 | 54.3 | Tenth lens |
| 18 | −18.0889 | 3.500 | 1.78700 | 33.0 | Eleventh lens |
| 19 | 7.486 | d4 | | | |
| 20 | 15.258 | 3.555 | 1.48700 | 70.4 | Twelfth lens |
| 21 | −367.955 | d5 | | | |
| 22 | Plane | 0.927 | 1.54900 | 69.3 | Filter |
| 23 | Plane | 0.800 | | | |
| 24 | Plane | 0.500 | 1.50000 | 64.0 | cover glass |
| 25 | Plane | | | | |

The respective optical surfaces on the fourth surface, the sixth surface, the thirteenth surface, the fifteenth surface, and the twentieth surface in Table 45 are respectively aspheric surfaces, and parameters relating to the expression (26) on each aspheric surface are as follows.

TABLE 46

Coefficient of aspheric surface

| | K | $A_4$ | $A_6$ | $A_8$ | $A_{10}$ |
|---|---|---|---|---|---|
| 4 | −0.152 | −0.123E−05 | −0.190E−08 | −0.138E−11 | −0.478E−14 |
| 6 | 316.273 | 0.266E−04 | −0.157E−06 | 0.184E−08 | −0.722E−11 |
| 13 | −2.305 | 0.103E−03 | −0.450E−06 | −0.942E−09 | 0.593E−11 |
| 15 | −0.892 | −0.419E−04 | 0.760E−07 | 0.271E−08 | −0.480E−10 |
| 20 | −0.298 | −0.335E−05 | −0.376E−06 | 0.655E−07 | −0.140E−08 |

The interval d1 between the first group optical system G1 and the second group optical system G2, the interval d2 between the second group optical system G2 and the diaphragm FA, the interval d3 between the third group optical system G3 and the fourth group optical system G4, the interval d4 between the fourth group optical system G4 and the fifth group optical system G5, and the interval d5 between the fifth group optical system G5 and the optical filter OF are variable, and these variable intervals d1, d2, d3, d4, and d5 are changed as shown in the following table, corresponding to the focal length f of the whole system, accompanying zooming.

TABLE 47

Variable intervals

| | f | d1 | d2 | d3 | d4 | d5 |
|---|---|---|---|---|---|---|
| Wide | 7.399 | 0.543 | 22.429 | 13.115 | 1.992 | 2.407 |
| Mean | 23.898 | 14.135 | 8.818 | 7.332 | 5.373 | 2.998 |
| Tele | 71.776 | 21.801 | 1.171 | 1.000 | 17.607 | 1.700 |

The parameter values according to the conditional expression (17) of the present invention in example 3-2 are as shown in the following table, and within the range of the conditional expression.

TABLE 48

Parameter values in the conditional expression

| $R_{C2}/R_{C4}$ | 0.288 |
|---|---|

Figure 50:
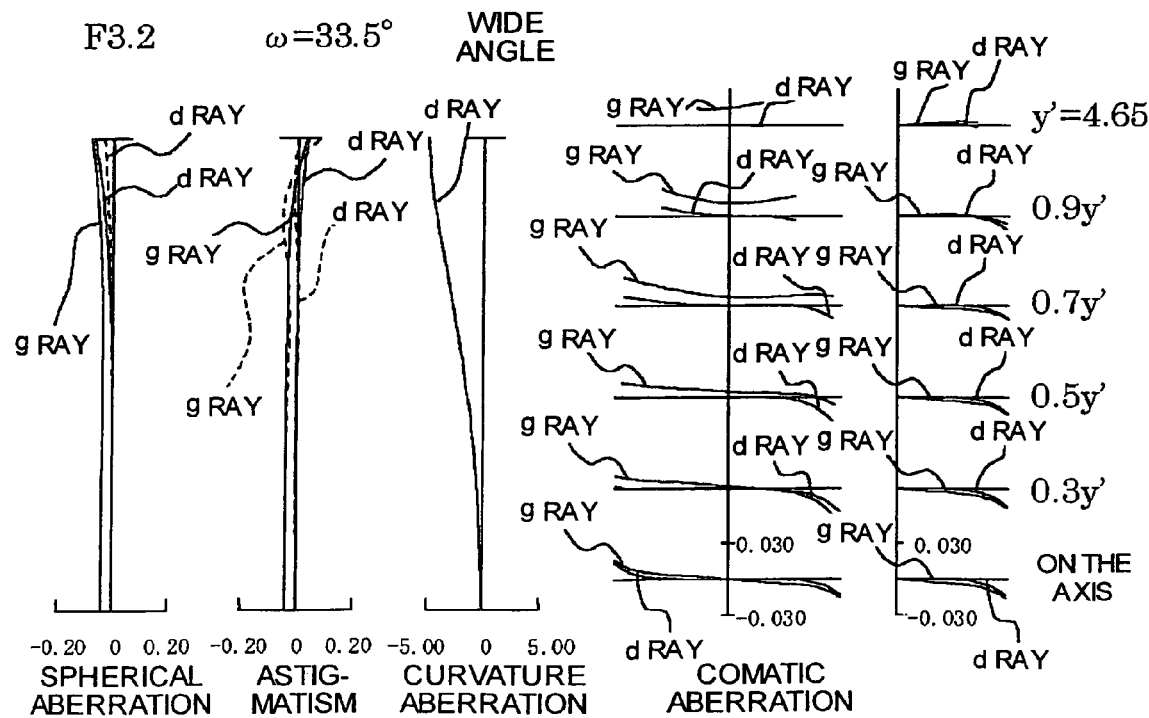
FIG. 50 is a set of graphs for illustrating aberration characteristics of the zoom lens shown in FIG. 44 at the short focal-length side.
Figure 51:
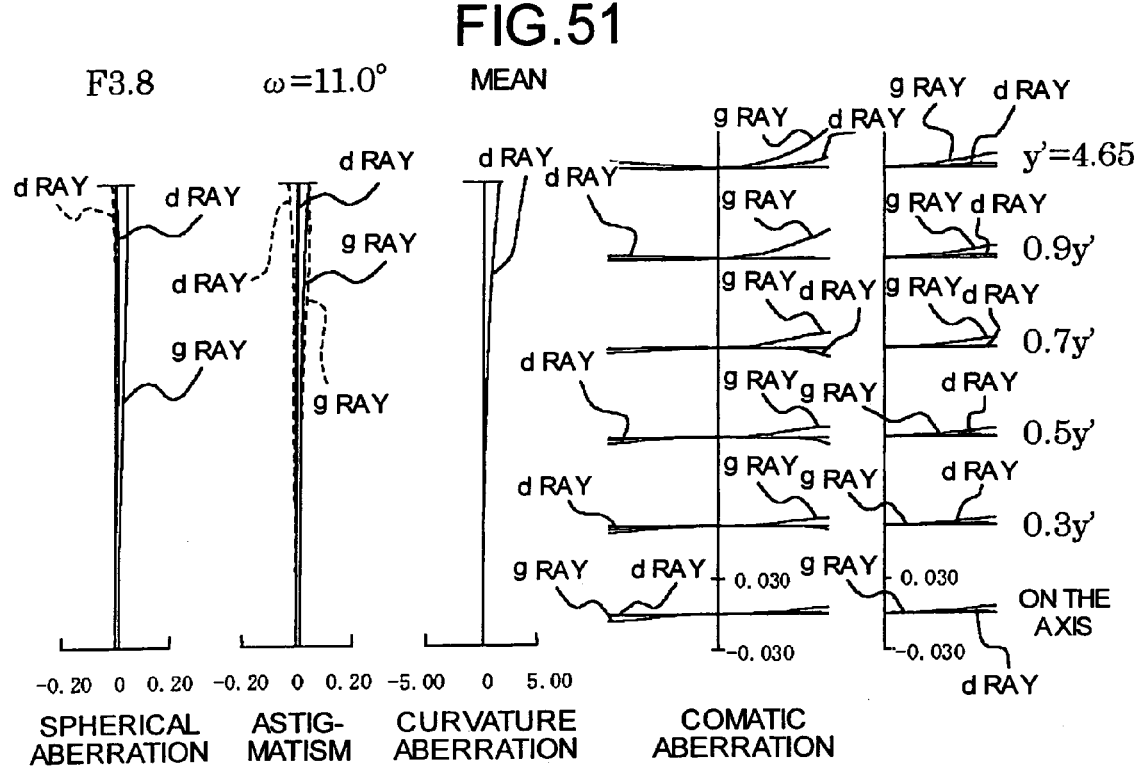
FIG. 51 is a set of graphs for illustrating aberration characteristics of the zoom lens shown in FIG. 44 at the mean focal-length side.
Figure 52:
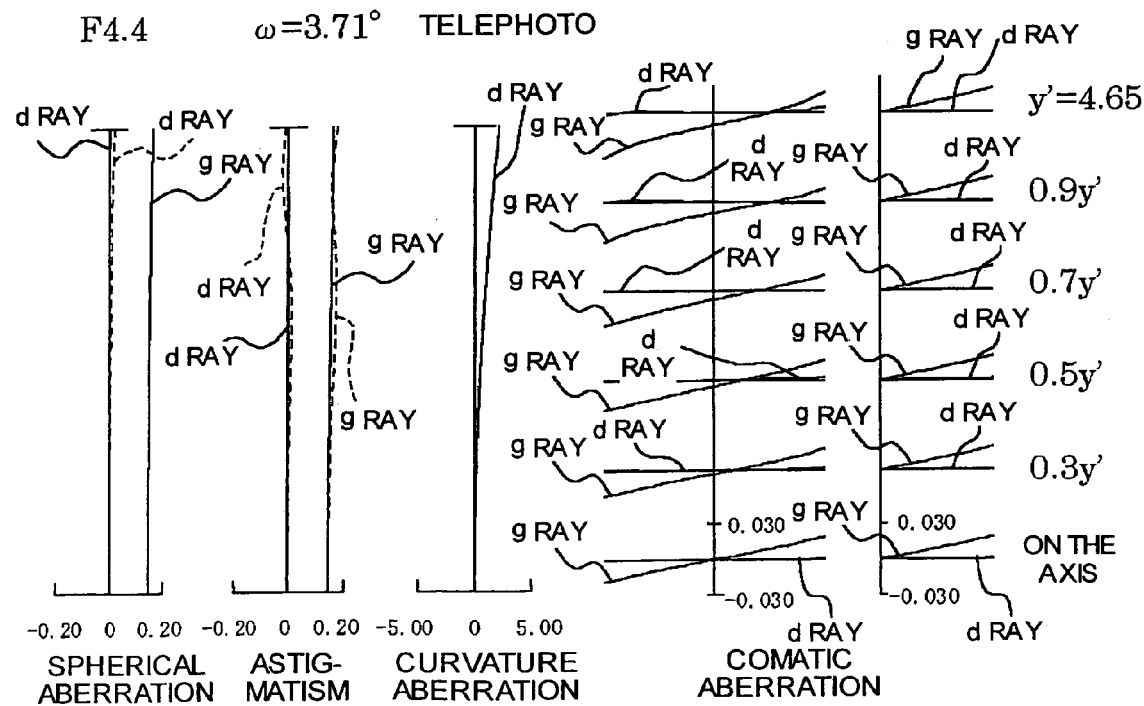
FIG. 52 is a set of graphs for illustrating aberration characteristics of the zoom lens shown in FIG. 44 at the long focal-length side.

The aberration diagrams at the wide-angle end (short focal end), the mean focal length, and the telephoto end (long focal end) according to example 3-2 are respectively illustrated in FIG. 50 to FIG. 52.

Figure 45:
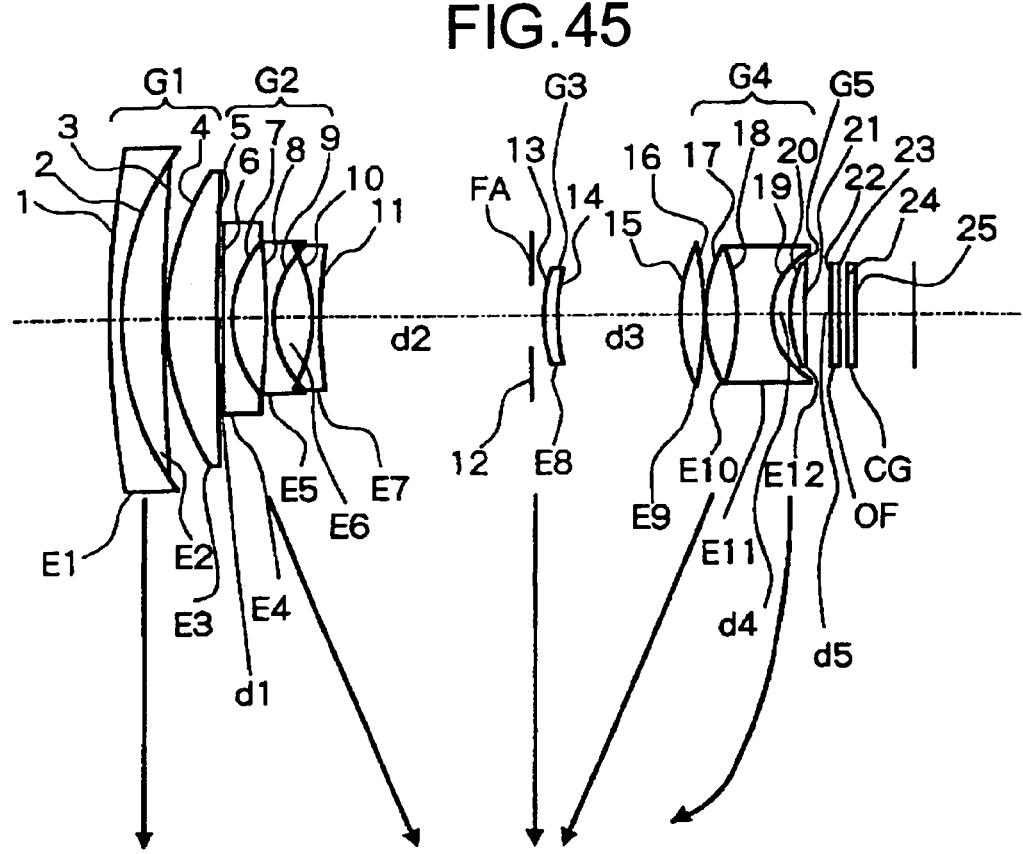
FIG. 45 is a schematic diagram of an optical system of example 3-3 of the zoom lens according to the fifth embodiment.

FIG. 45 is a schematic diagram of an optical system of example 3-3 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, a diaphragm FA, an optical filter OF, and a cover glass CG. In this case, the first to the third lenses E1 to E3 constitute the first group optical system G1, the fourth to the seventh lenses E4 to E7 constitute the second group optical system G2, the eighth lens E8 constitutes the third group optical system G3, the ninth to the eleventh lenses E9 to E11 constitute the fourth group optical system G4, and the twelfth lens E12 constitutes the fifth group optical system G5.

The respective lenses are supported by an appropriate common support frame or the like for each lens group, and at the time of zooming, each group optical system integrally operates. In FIG. 45, parts of surface numbers that are assigned to each optical surface are shown for reference. The respective reference signs in FIG. 45 are used independently for each example, as described previously. Therefore, even when a common reference sign is given, it is not always a common configuration to other examples.

For example, the first lens E1, the second lens E2, the third lens E3, the fourth lens E4, the fifth lens E5, the sixth lens E6, the seventh lens E7, the diaphragm FA, the eighth lens E8, the ninth lens E9, the tenth lens E10, the eleventh lens E11, the twelfth lens E12, an thirteenth lens E13, the optical filter OF, and the cover glass CG are arranged in order from the object side of a subject or the like to the image-surface side, and an image is formed at the back of the cover glass CG.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative lens including a double-concave lens, the fifth lens E5 is a negative lens including a double-concave lens, the sixth lens E6 is a positive lens including a double-convex lens, and the seventh lens E7 is a negative lens including a double-concave lens. The second group optical system G2 formed of the fourth to the seventh lenses E4 to E7 exhibits a negative focal length as a whole.

The eighth lens E8 is a positive meniscus lens formed in a convex shape on the object side and only the eighth lens E8 forms the third group optical system G3 that exhibits a positive focal length. The ninth lens E9 is a positive lens including a double-convex lens, the tenth lens E10 is a positive lens including a double-convex lens, and the eleventh lens E11 is a negative lens including a double-concave lens. The tenth to the eleventh lenses E10 to E11 form a densely cemented doublet, and the fourth group optical system G4 formed of the ninth to the eleventh lenses E9 to E11 exhibits a positive focal length as a whole. The twelfth lens E12 is a positive meniscus lens formed in a convex shape on the object side and only the twelfth lens E12 forms the fifth group optical system G5 that exhibits a positive focal length.

The diaphragm FA arranged between the second group optical system G2 and the third group optical system G3 is integrally retained with the third group optical system G3 while keeping the distance from the third group optical system G3 constant.

On a side of the image surface of the twelfth lens E12 of the fifth group optical system G5, the optical filter OF that includes various optical filtering functions and the cover glass CG that protects an input surface of a solid image element are arranged in order toward the image-surface side and retained integrally with the solid image element.

The fourth surface, being a surface on the object side of the third lens E3 located closest to the image-surface side in the first group optical system G1, the sixth surface, being a surface on the object side of the fourth lens E4 located closest to the object side in the second group optical system G2, the thirteenth surface, being a surface on the object side of the eighth lens E8 that forms the third group optical system G3, the fifteenth surface, being a surface on the object side of the ninth lens E9 located closest to the object side in the fourth group optical system G4, and the twentieth surface, being a surface on the object side of the twelfth lens E12 that forms the fifth group optical system G5 are respectively aspheric surfaces.

In example 3-3, the focal length f of the whole system, the F number F, and the half angle of view, ω, respectively change in the range of f=7.4 to 71.78, F=3.1 to 4.3, and ω=33.511 to 3.707. The optical characteristics relating to the respective optical surfaces and the optical elements are as shown in the following table.

TABLE 49

Optical characteristics

| Surface | R | D | $N_d$ | $V_d$ | Note |
|---|---|---|---|---|---|
| 1 | 104.665 | 1.200 | 1.78400 | 29.5 | First lens |
| 2 | 29.362 | 4.450 | 1.62000 | 60.3 | Second lens |
| 3 | 360.264 | 0.100 | | | |
| 4 | 25.711 | 4.956 | 1.62000 | 60.2 | Third lens |
| 5 | 6466.354 | d1 | | | |
| 6 | −319.910 | 1.000 | 1.77700 | 49.0 | Fourth lens |
| 7 | 10.529 | 3.482 | | | |
| 8 | −44.997 | 0.800 | 1.58300 | 62.4 | Fifth lens |
| 9 | 10.693 | 3.955 | 1.75000 | 35.0 | Sixth lens |
| 10 | −13.121 | 0.800 | 1.77300 | 49.6 | Seventh lens |
| 11 | 44.864 | d2 | | | |
| 12 | Diaphragm | 1.000 | | | |
| 13 | 11.641 | 1.300 | 1.48700 | 70.4 | Eighth lens |
| 14 | 19.475 | d3 | | | |
| 15 | 13.988 | 2.548 | 1.50200 | 68.8 | Ninth lens |
| 16 | −24.250 | 0.100 | | | |
| 17 | 13.903 | 3.198 | 1.69300 | 54.1 | Tenth lens |
| 18 | −18.843 | 3.500 | 1.78800 | 33.8 | Eleventh lens |
| 19 | 7.494 | d4 | | | |
| 20 | 14.815 | 1.587 | 1.48700 | 70.4 | Twelfth lens |
| 21 | 967.954 | d5 | | | |
| 22 | Plane | 0.927 | 1.54900 | 69.3 | Filter |
| 23 | Plane | 0.800 | | | |
| 24 | Plane | 0.500 | 1.50000 | 64.0 | cover glass |
| 25 | Plane | | | | |

The respective optical surfaces on the fourth surface, the sixth surface, the thirteenth surface, the fifteenth surface, and the twentieth surface in Table 49 are respectively aspheric surfaces, and parameters relating to the expression (26) on each aspheric surface are as follows.

TABLE 50

Coefficient of aspheric surface

| | K | $A_4$ | $A_6$ | $A_8$ | $A_{10}$ |
|---|---|---|---|---|---|
| 4 | −0.156 | −0.126E−05 | −0.207E−08 | −0.169E−11 | −0.584E−14 |
| 6 | 419.293 | 0.265E−04 | −0.217E−06 | 0.209E−08 | −0.852E−11 |
| 13 | −2.278 | 0.105E−03 | −0.457E−06 | −0.249E−08 | 0.678E−10 |
| 15 | −0.898 | −0.422E−04 | 0.783E−07 | 0.203E−08 | −0.348E−10 |
| 20 | −0.281 | −0.295E−05 | 0.303E−07 | 0.563E−07 | −0.131E−08 |

The interval d1 between the first group optical system G1 and the second group optical system G2, the interval d2 between the second group optical system G2 and the diaphragm FA, the interval d3 between the third group optical system G3 and the fourth group optical system G4, the interval d4 between the fourth group optical system G4 and the fifth group optical system G5, and the interval d5 between the fifth group optical system G5 and the optical filter OF are variable, and these variable intervals d1, d2, d3, d4, and d5 are changed as shown in the following table, corresponding to the focal length f of the whole system, accompanying zooming.

TABLE 51

Variable intervals

| | f | d1 | d2 | d3 | d4 | d5 |
|---|---|---|---|---|---|---|
| Wide | 7.4 | 0.531 | 21.530 | 12.868 | 1.705 | 2.407 |
| Mean | 23.9 | 13.684 | 8.357 | 7.309 | 4.922 | 2.998 |
| Tele | 71.780 | 20.916 | 1.166 | 1.000 | 18.194 | 1.7 |

The parameter values according to the conditional expression (17) of the present invention in example 3-3 are as shown in the following table, and within the range of the conditional expression.

TABLE 52

Parameter values in the conditional expression

| $R_{C2}/R_{C4}$ | 0.238 |
|---|---|

Figure 53:
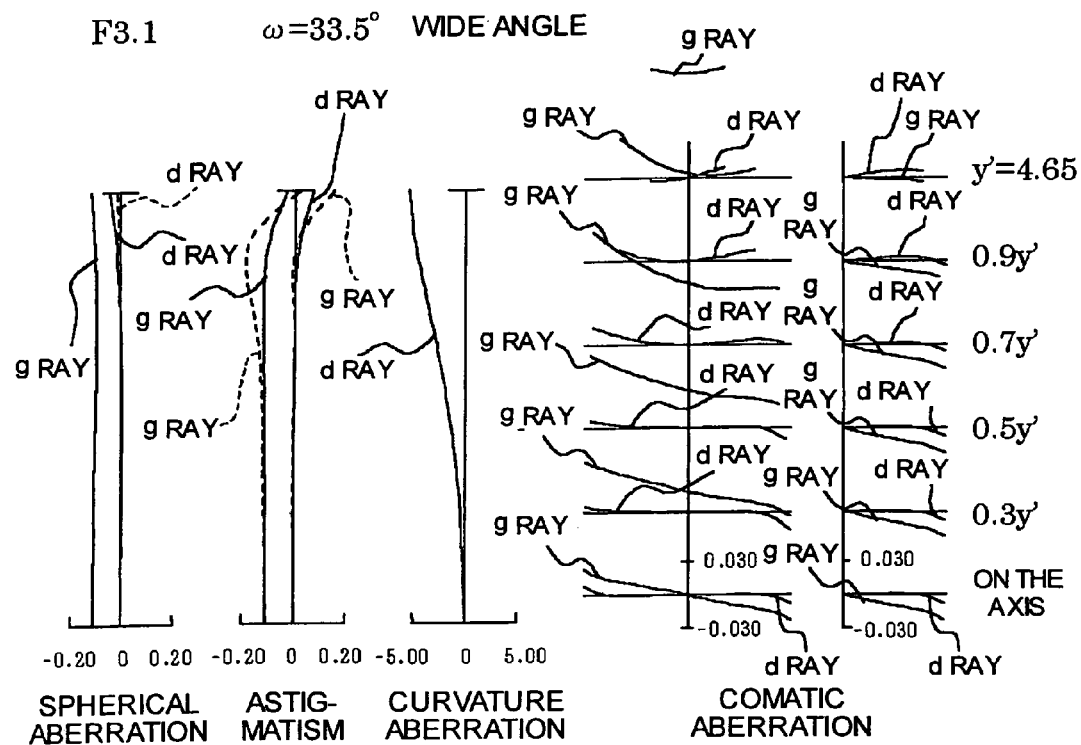
FIG. 53 is a set of graphs for illustrating aberration characteristics of the zoom lens shown in FIG. 45 at the short focal-length side.
Figure 54:
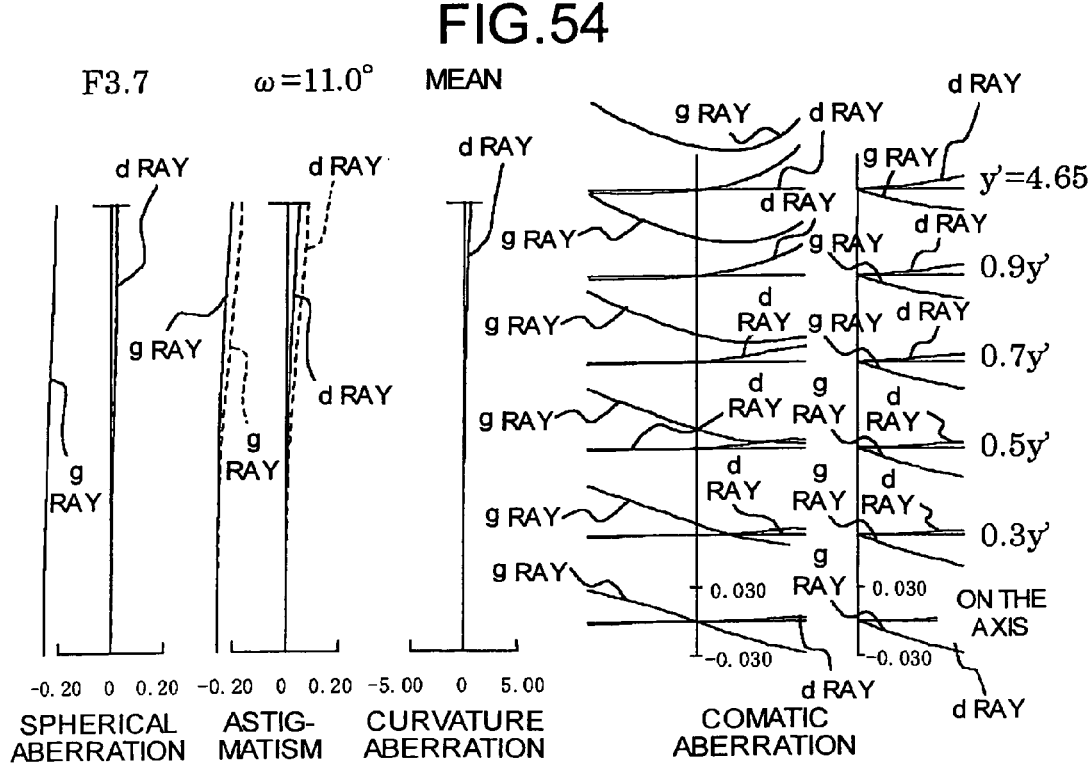
FIG. 54 is a set of graphs for illustrating aberration characteristics of the zoom lens shown in FIG. 45 at the mean focal-length side.
Figure 55:
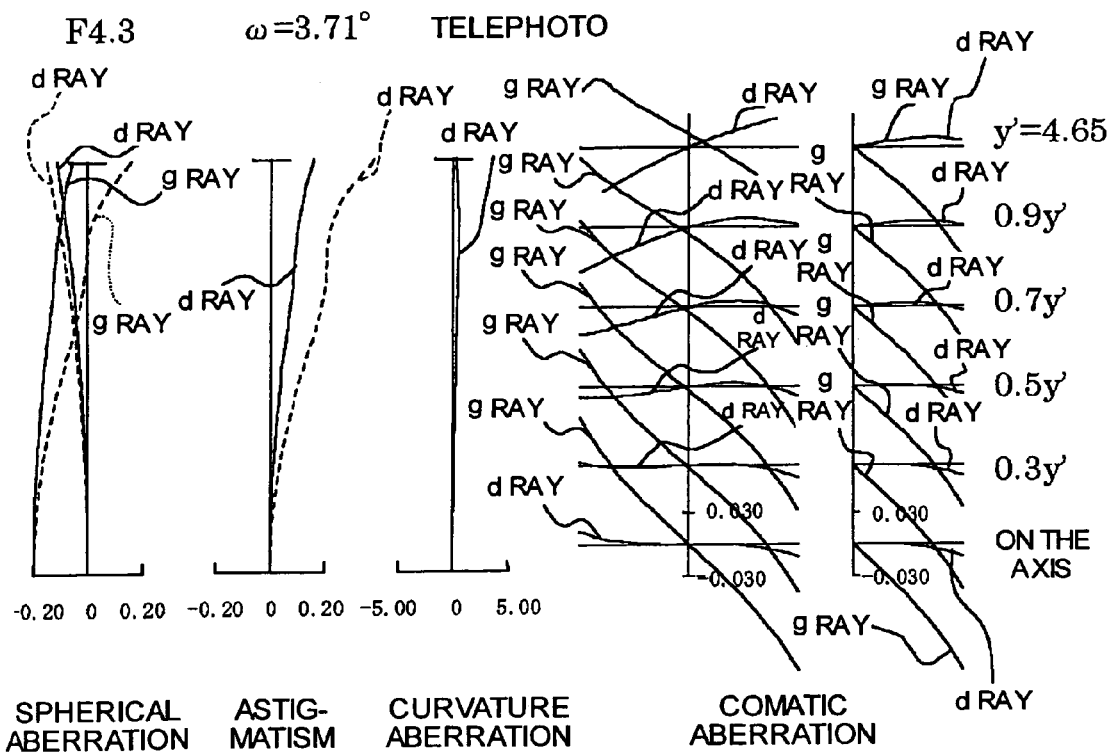
FIG. 55 is a set of graphs for illustrating aberration characteristics of the zoom lens shown in FIG. 45 at the long focal-length side.

The aberration diagrams at the wide-angle end (short focal end), the mean focal length, and the telephoto end (long focal end) according to example 3-3 are respectively illustrated in FIG. 53 to FIG. 55.

Figure 46:
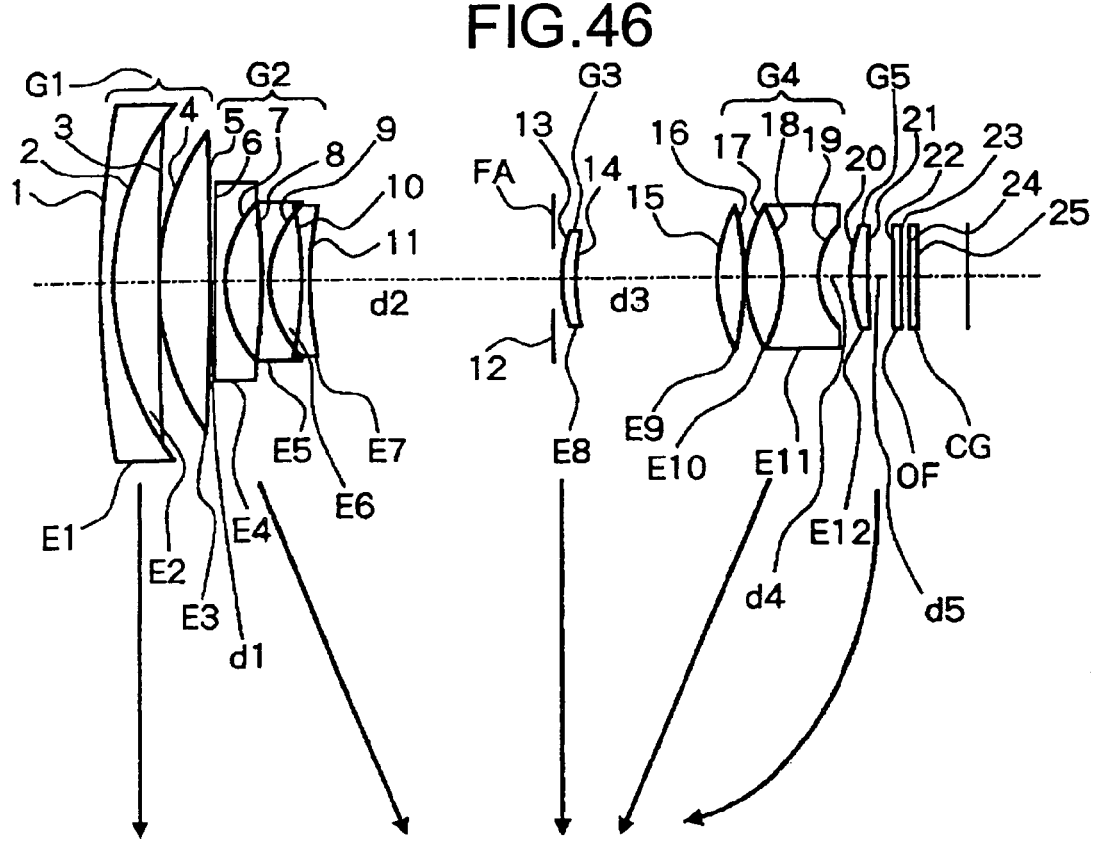
FIG. 46 is a schematic diagram of an optical system of example 3-4 of the zoom lens according to the fifth embodiment.

FIG. 46 is a schematic diagram of an optical system of example 3-4 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, a diaphragm FA, an optical filter OF, and a cover glass CG. In this case, the first to the third lenses E1 to E3 constitute the first group optical system G1, the fourth to the seventh lenses E4 to E7 constitute the second group optical system G2, the eighth lens E8 constitutes the third group optical system G3, the ninth to the eleventh lenses E9 to E11 constitute the fourth group optical system G4, and the twelfth lens E12 constitutes the fifth group optical system G5.

The respective lenses are supported by an appropriate common support frame or the like for each lens group, and at the time of zooming, each group optical system integrally operates. In FIG. 46, parts of surface numbers that are assigned to each optical surface are shown for reference. The respective reference signs in FIG. 46 are used independently for each example, in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the seventh lens E7, the diaphragm FA, the eighth lens E8, the ninth lens E9, the tenth lens E10, the eleventh lens E11, the twelfth lens E12, an thirteenth E13, the optical filter OF, and the cover glass CG are arranged in order from the object side of a subject or the like to the image-surface side, and an image is formed at the back of the cover glass CG.

The first lens E1 is a negative meniscus lens formed in a convex shape on the object side, the second lens E2 is a positive meniscus lens formed in a convex shape on the object side, and the third lens E3 is a positive lens including a double-convex lens. The first lens E1 and the second lens E2 form a densely cemented doublet, and the first group optical system G1 formed of the first to the third lenses E1 to E3 exhibits a positive focal length as a whole.

The fourth lens E4 is a negative lens including a double-concave lens, the fifth lens E5 is a negative lens including a double-concave lens, the sixth lens E6 is a positive lens including a double-convex lens, and the seventh lens E7 is a negative lens including a double-concave lens. The second group optical system G2 formed of the fourth to the seventh lenses E4 to E7 exhibits a negative focal length as a whole.

The eighth lens E8 is a positive meniscus lens formed in a convex shape on the object side and only the eighth lens E8 forms the third group optical system G3 that exhibits a positive focal length. The ninth lens E9 is a positive lens including a double-convex lens, the tenth lens E10 is a positive lens including a double-convex lens, and the eleventh lens E11 is a negative lens including a double-concave lens. The tenth to the eleventh lenses E10 to E11 form a densely cemented doublet, and the fourth group optical system G4 formed of the ninth to the eleventh lenses E9 to E11 exhibits a positive focal length as a whole. The twelfth lens E12 is a positive meniscus lens formed in a convex shape on the object side and only the twelfth lens E12 forms the fifth group optical system G5 that exhibits a positive focal length.

The diaphragm FA arranged between the second group optical system G2 and the third group optical system G3 is integrally retained with the third group optical system G3 while keeping the distance from the third group optical system G3 constant.

On a side of the image surface of the twelfth lens E12 of the fifth group optical system G5, the optical filter OF that includes various optical filtering functions and the cover glass CG that protects an input surface of a solid image element are arranged in order toward the image-surface side and retained integrally with the solid image element.

The fourth surface, being a surface on the object side of the third lens E3 located closest to the image-surface side in the first group optical system G1, the sixth surface, being a surface on the object side of the fourth lens E4 located closest to the object side in the second group optical system G2, the thirteenth surface, being a surface on the object side of the eighth lens E8 that forms the third group optical system G3, the fifteenth surface, being a surface on the object side of the ninth lens E9 located closest to the object side in the fourth group optical system G4, and the twentieth surface, being a surface on the object side of the twelfth lens E12 that forms the fifth group optical system G5 are respectively aspheric surfaces.

In example 3-4, the focal length f of the whole system, the F number F, and the half angle of view, ω, respectively change in the range of f=7.4 to 71.774, F=3.2 to 4.4, and ω=33.511 to 3.707. The optical characteristics relating to the respective optical surfaces and the optical elements are as shown in the following table.

TABLE 53

Optical characteristics

| Surface | R | D | $N_d$ | $V_d$ | Note |
|---|---|---|---|---|---|
| 1 | 102.324 | 1.200 | 1.81000 | 32.4 | First lens |
| 2 | 28.720 | 4.340 | 1.62000 | 60.3 | Second lens |
| 3 | 316.900 | 0.100 | | | |
| 4 | 26.521 | 4.556 | 1.61600 | 60.5 | Third lens |
| 5 | −1623.049 | d1 | | | |
| 6 | −233.391 | 1.000 | 1.84300 | 28.4 | Fourth lens |
| 7 | 11.103 | 3.185 | | | |
| 8 | −64.989 | 0.800 | 1.58700 | 62.1 | Fifth lens |
| 9 | 11.604 | 2.933 | 1.84700 | 23.8 | Sixth lens |
| 10 | −33.164 | 0.800 | 1.83500 | 43.0 | Seventh lens |
| 11 | 34.007 | d2 | | | |
| 12 | Diaphragm | 1.000 | | | |
| 13 | 11.848 | 1.313 | 1.48700 | 70.4 | Eighth lens |
| 14 | 20.383 | d3 | | | |
| 15 | 14.12268 | 2.488 | 1.50600 | 68.4 | Ninth lens |
| 16 | −24.665 | 0.100 | | | |
| 17 | 13.579 | 3.222 | 1.69300 | 54.1 | Tenth lens |
| 18 | −18.727 | 3.500 | 1.78700 | 32.3 | Eleventh lens |
| 19 | 7.417 | d4 | | | |
| 20 | 13.963 | 1.565 | 1.48700 | 70.4 | Twelfth lens |
| 21 | 110.201 | d5 | | | |
| 22 | Plane | 0.927 | 1.54900 | 69.3 | Filter |
| 23 | Plane | 0.800 | | | |
| 24 | Plane | 0.500 | 1.50000 | 64.0 | cover glass |
| 25 | Plane | | | | |

The respective optical surfaces on the fourth surface, the sixth surface, the thirteenth surface, the fifteenth surface, and the twentieth surface in Table 53 are respectively aspheric surfaces, and parameters relating to the expression (26) on each aspheric surface are as follows.

TABLE 54

Coefficient of aspheric surface

| | K | $A_4$ | $A_6$ | $A_8$ | $A_{10}$ |
|---|---|---|---|---|---|
| 4 | −0.147 | −0.117E−05 | −0.181E−08 | −0.163E−11 | −0.400E−14 |
| 6 | 329.270 | 0.254E−04 | −0.179E−06 | 0.211E−08 | −0.967E−11 |
| 13 | −2.312 | 0.103E−03 | −0.438E−06 | −0.849E−09 | −0.616E−13 |
| 15 | −0.886 | −0.416E−04 | 0.505E−07 | 0.228E−08 | −0.370E−10 |
| 20 | −0.370 | −0.244E−05 | −0.388E−06 | 0.745E−07 | −0.157E−08 |

The interval d1 between the first group optical system G1 and the second group optical system G2, the interval d2 between the second group optical system G2 and the diaphragm FA, the interval d3 between the third group optical system G3 and the fourth group optical system G4, the interval d4 between the fourth group optical system G4 and the fifth group optical system G5, and the interval d5 between the fifth group optical system G5 and the optical filter OF are variable, and these variable intervals d1, d2, d3, d4, and d5 are changed as shown in the following table, corresponding to the focal length f of the whole system, accompanying zooming.

TABLE 55

| | | | Variable intervals | | | |
|---|---|---|---|---|---|---|
| | f | d1 | d2 | d3 | d4 | d5 |
| Wide | 7.4 | 0.804 | 22.644 | 13.349 | 2.851 | 2.407 |
| Mean | 23.9 | 14.741 | 8.687 | 7.688 | 6.276 | 2.998 |
| Tele | 71.774 | 22.227 | 1.221 | 1.000 | 19.327 | 1.7 |

The parameter values according to the conditional expression (17) of the present invention in example 3-4 are as shown in the following table, and within the range of the conditional expression.

TABLE 56

| Parameter values in the conditional expression | |
|---|---|
| $R_{C2}/R_{C4}$ | 0.341 |

Figure 56:
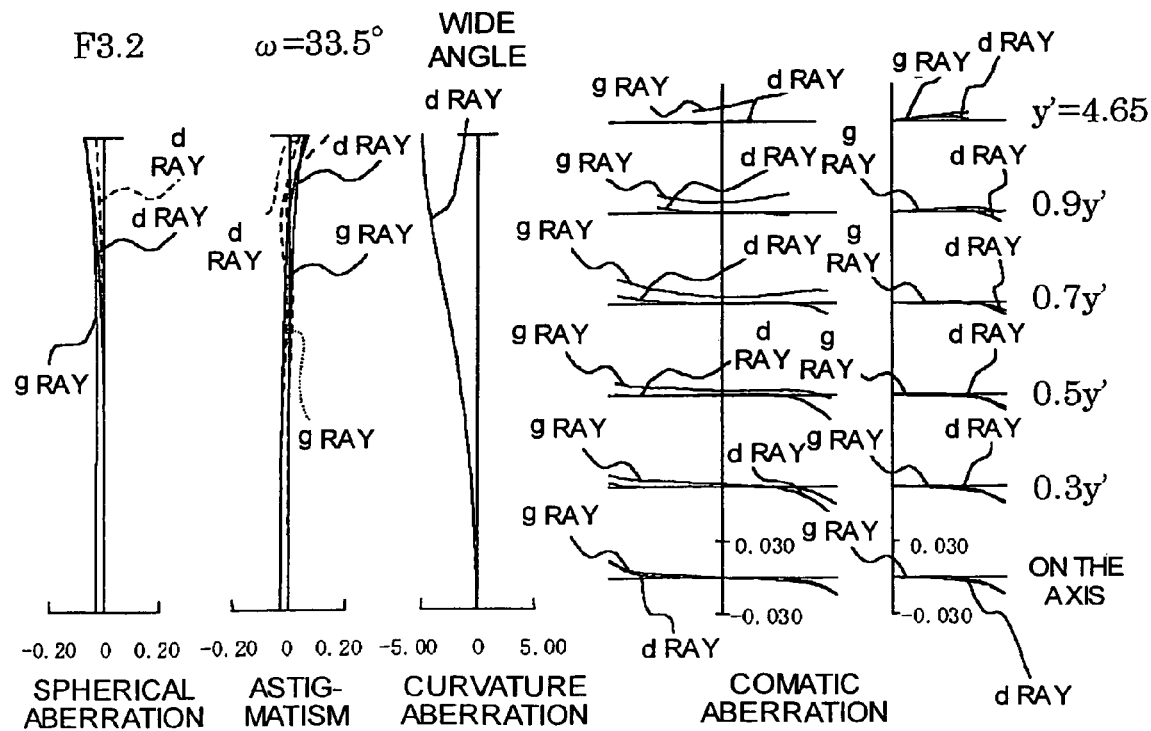
FIG. 56 is a set of graphs for illustrating aberration characteristics of the zoom lens shown in FIG. 46 at the short focal-length side.
Figure 57:
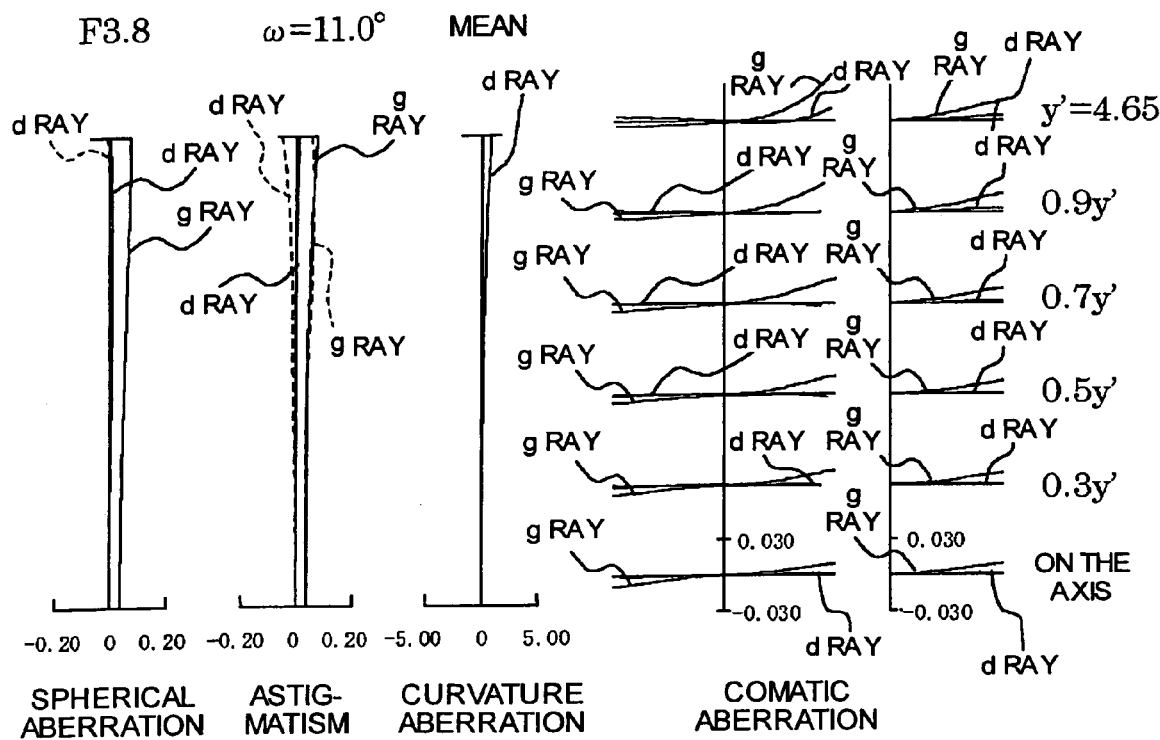
FIG. 57 is a set of graphs for illustrating aberration characteristics of the zoom lens shown in FIG. 46 at the mean focal-length side.
Figure 58:
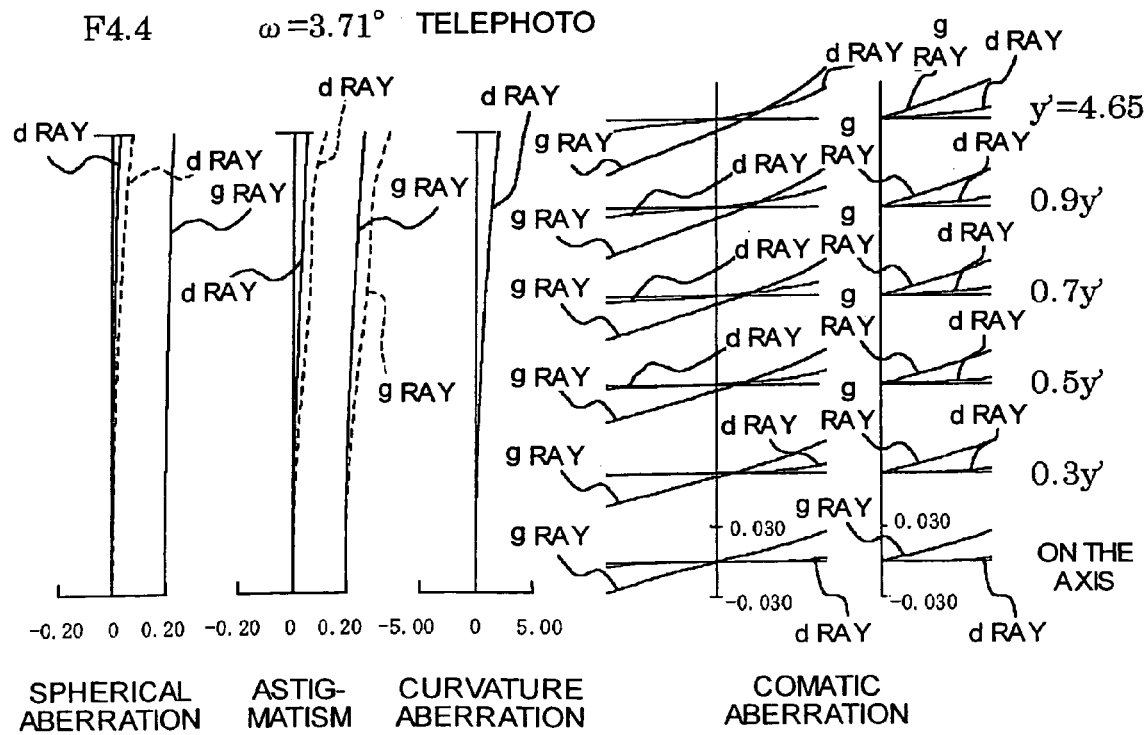
FIG. 58 is a set of graphs for illustrating aberration characteristics of the zoom lens shown in FIG. 46 at the long focal-length side.

The aberration diagrams at the wide-angle end (short focal end), the mean focal length, and the telephoto end (long focal end) according to example 3-4 are respectively illustrated in FIG. 56 to FIG. 58. In example 1 to example 3-4, as the lens material for all lenses, an optical glass that is chemically stable and does not contain any toxic substance such as lead or arsenic can be used, the materials can be recycled, without having water pollution due to waste fluid at the time of machining.

According to the fifth embodiment, a zoom lens, which is sufficiently small, can achieve a high magnification, and can obtain a high resolving power corresponding to the image capturing device with 3,000,000 to 5,000,000 pixels, a camera using the zoom lens as the shooting optical system, and a mobile information terminal using the zoom lens as the shooting optical system in the camera unit can be provided.

Specific configuration and numerical examples are shown in example 3, as an example of the zoom lens according to the sixth embodiment of the present invention. In each example, the aberrations of the zoom lens are sufficiently corrected, and correspondence to the photodetector with 3,000,000 to 5,000,000 pixels becomes possible. It will be obvious from the examples below, that excellent imaging performance can be ensured, while achieving sufficient miniaturization, by forming the zoom lens as shown in the sixth embodiment.

In each example, various signs as described below are used.

f: Focal length of the whole system
F: F number
ω: Half angle of view
R: Radius of curvature of each surface
D: Spacing
$N_d$: Refractive index with respect to d ray
$v_d$: Abbe constant with respect to d ray
K: Conical constant of the aspheric surface
$A_4$: Fourth coefficient of the aspheric surface
$A_6$: Sixth coefficient of the aspheric surface
$A_8$: Eighth coefficient of the aspheric surface
$A_{10}$: Tenth coefficient of the aspheric surface
Wide: Short focal length
Mean: Medium focal length
Tele: Long focal length However, the aspheric surface used herein is defined by the following expression, when it is assumed that a reciprocal of a paraxial radius of curvature (paraxial curvature) is C, and the height from the optical axis is H.

$$X = \frac{CH^2}{1+\sqrt{(1-(1+K)C^2H^2)}} + A_4 \cdot Y^4 + A_6 \cdot Y^6 + A_8 \cdot Y^8 + A_{10} \cdot Y^{10} \quad (26)$$

In the numerical examples below, E-XY stands for $10^{-XY}$. In the aberration diagram explained below, a solid line in the diagram illustrating spherical aberration expresses spherical aberration, and a broken line expresses sine condition, and a solid line in the diagram illustrating astigmatism expresses a sagittal image surface and a broken line expresses a meridional image surface. Further, in the respective aberration diagrams, d ray (587.56 nanometers) and g ray (435.83 nanometers) are illustrated.

Figure 59:
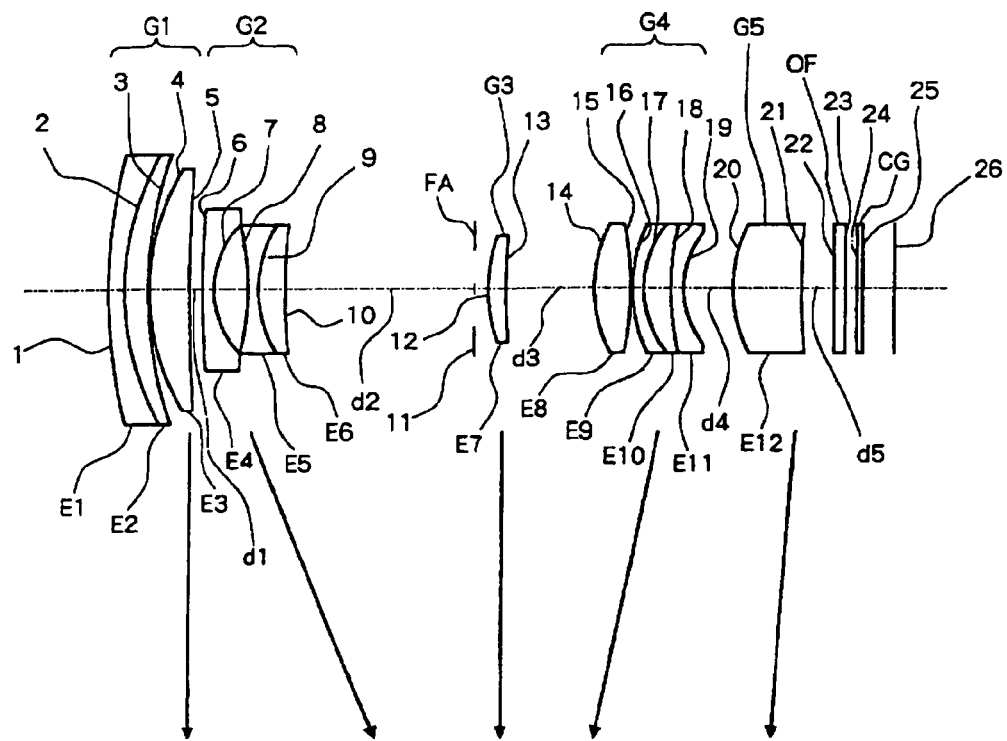
FIG. 59 is a schematic diagram of an optical system of example 4-1 of a zoom lens according to a sixth embodiment of the present invention.

FIG. 59 is a schematic diagram of an optical system of example 4-1 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, a diaphragm FA, an optical filter OF, and a cover glass CG. In this case, the first to the third lenses E1 to E3 constitute the first group optical system G1, the fourth to the seventh lenses E4 to E7 constitute the second group optical system G2, the eighth lens E8 constitutes the third group optical system G3, the ninth to the eleventh lenses E9 to E11 constitute the fourth group optical system G4, and the twelfth lens E12 constitutes the fifth group optical system G5.

The respective lenses are supported by an appropriate common support frame or the like for each lens group, and at the time of zooming, each group optical system integrally operates. In FIG. 59, parts of surface numbers that are assigned to each optical surface are shown for reference. The respective reference signs in FIG. 59 are used independently for each example, in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the seventh lens E7, the diaphragm FA, the eighth lens E8, the ninth lens E9, the tenth lens E10, the eleventh lens E11, the twelfth lens E12, an thirteenth E13, the optical filter OF, and the cover glass CG are arranged in order from the object side of a subject or the like to the image-surface side, and an image is formed at the back of the cover glass CG.

The first lens E1 is a negative meniscus lens formed in a convex shape on the object side, the second lens E2 is a positive meniscus lens formed in a convex shape on the object side, and the third lens E3 is a positive lens including a double-convex lens. The first lens E1 and the second lens E2 form a densely cemented doublet, and the first group optical system G1 formed of the first to the third lenses E1 to E3 exhibits a positive focal length as a whole.

The fourth lens E4 is a negative lens including a double-concave lens, the fifth lens E5 is a negative lens including a double-concave lens, the sixth lens E6 is a positive lens including a double-convex lens, and the seventh lens E7 is a negative lens including a double-concave lens. The second group optical system G2 formed of the fourth to the seventh lenses E4 to E7 exhibits a negative focal length as a whole.

The eighth lens E8 is a positive meniscus lens formed in a convex shape on the object side and only the eighth lens E8 forms the third group optical system G3 that exhibits a positive focal length. The ninth lens E9 is a positive lens including a double-convex lens, the tenth lens E10 is a positive lens including a double-convex lens, and the eleventh lens E11 is a negative lens including a double-concave lens. The tenth to the eleventh lenses E10 to E11 form a densely cemented doublet, and the fourth group optical system G4 formed of the ninth to the eleventh lenses E9 to E11 exhibits a positive focal length as a whole. The twelfth lens E12 is a positive lens including a double-convex lens and only the twelfth lens E12 forms the fifth group optical system G5 that exhibits a positive focal length. The diaphragm FA arranged between the second group optical system G2 and the third group optical system G3 is integrally retained with the third group optical system G3 while keeping the distance from the third group optical system G3 constant.

On a side of the image surface of the twelfth lens E12 of the fifth group optical system G5, the optical filter OF that includes various optical filtering functions and the cover glass CG that protects an input surface of a solid image element are arranged in order toward the image-surface side and retained integrally with the solid image element.

The fourth surface, being a surface on the object side of the third lens E3 located closest to the image-surface side in the first group optical system G1, the sixth surface, being a surface on the object side of the fourth lens E4 located closest to the object side in the second group optical system G2, the thirteenth surface, being a surface on the object side of the eighth lens E8 that forms the third group optical system G3, the fifteenth surface, being a surface on the object side of the ninth lens E9 located closest to the object side in the fourth group optical system G4, and the twentieth surface, being a surface on the object side of the twelfth lens E12 that forms the fifth group optical system G5 are respectively aspheric surfaces.

In example 4-1, the focal length f of the whole system, the F number F, and the half angle of view, ω, respectively change in the range of f=7.404 to 71.820, F=3.2 to 4.40, and ω=33.497 to 3.705. The optical characteristics relating to the respective optical surfaces and the optical elements are as shown in the following table.

TABLE 57

Optical characteristics

| | R | D | $N_d$ | $v_d$ | Note |
|---|---|---|---|---|---|
| 1 | 39.503 | 1.200 | 1.84666 | 23.78 | First lens |
| 2 | 21.996 | 1.698 | 1.62041 | 60.34 | Second lens |
| 3 | 30.197 | 0.100 | | | |
| 4 | 17.527 | 3.047 | 1.72916 | 54.67 | Third lens |
| 5 | 200.671 | d1 | | | |
| 6 | 155.019 | 0.800 | 1.83400 | 37.34 | Fourth lens |
| 7 | 6.861 | 2.456 | | | |
| 8 | −16.851 | 0.800 | 1.48749 | 70.44 | Fifth lens |
| 9 | 9.243 | 2.000 | 1.80518 | 25.46 | Sixth lens |
| 10 | 83.105 | d2 | | | |
| 11 | Diaphragm | 1.000 | | | |
| 12 | 11.210 | 1.377 | 1.48749 | 70.44 | Seventh lens |
| 13 | 37.911 | d3 | | | |
| 14 | 9.969 | 2.748 | 1.48749 | 70.44 | Eighth lens |
| 15 | −19.173 | 0.100 | | | |
| 16 | 13.122 | 0.809 | 1.84666 | 23.78 | Ninth lens |

TABLE 57-continued

Optical characteristics

| | R | D | $N_d$ | $v_d$ | Note |
|---|---|---|---|---|---|
| 17 | 8.048 | 1.989 | 1.51680 | 64.20 | Tenth lens |
| 18 | 17.504 | 1.001 | 1.80610 | 33.27 | Eleventh lens |
| 19 | 7.528 | d4 | | | |
| 20 | 10.939 | 5.033 | 1.48749 | 70.44 | Twelfth lens |
| 21 | 59.964 | d5 | | | |
| 22 | Plane | 0.927 | 1.54892 | 69.31 | Filter |
| 23 | Plane | 0.800 | | | |
| 24 | Plane | 0.500 | 1.50000 | 64.00 | cover glass |
| 25 | Plane | | | | |

The respective optical surfaces on the fourth surface, the sixth surface, the thirteenth surface, the fifteenth surface, and the twentieth surface in Table 57 are respectively aspheric surfaces, and parameters relating to the expression (26) on each aspheric surface are as follows.

TABLE 58

Coefficient of aspheric surface

| | K | $A_4$ | $A_6$ | $A_8$ | $A_{10}$ |
|---|---|---|---|---|---|
| 4 | −0.269 | −3.464E−06 | −2.330E−09 | −1.572E−10 | 5.415E−13 |
| 6 | 342.566 | 6.456E−05 | −6.388E−07 | 3.854E−09 | −8.387E−11 |
| 12 | −2.213 | 1.125E−04 | −2.702E−06 | 1.473E−07 | −5.625E−09 |
| 14 | −1.535 | −7.893E−05 | 7.904E−07 | −5.165E−08 | 8.763E−10 |
| 20 | −0.886 | −1.084E−05 | −2.426E−06 | 1.491E−07 | −1.923E−09 |

The interval d1 between the first group optical system G1 and the second group optical system G2, the interval d2 between the second group optical system G2 and the diaphragm FA, the interval d3 between the third group optical system G3 and the fourth group optical system G4, the interval d4 between the fourth group optical system G4 and the fifth group optical system G5, and the interval d5 between the fifth group optical system G5 and the optical filter OF are variable, and these variable intervals d1, d2, d3, d4, and d5 are changed as shown in the following table, corresponding to the focal length f of the whole system, accompanying zooming.

TABLE 59

Variable intervals

| | f | d1 | d2 | d3 | d4 | d5 |
|---|---|---|---|---|---|---|
| Wide | 7.689 | 1.000 | 13.998 | 6.670 | 3.688 | 2.209 |
| Mean | 15.250 | 7.772 | 7.205 | 3.453 | 4.501 | 5.959 |
| Tele | 33.064 | 13.945 | 1.053 | 1.000 | 3.66859 | 9.20647 |

The parameter values according to the conditional expression (24) of the present invention in example 4-1 are as shown in the following table, and within the range of the conditional expression.

TABLE 60

Parameter values in the conditional expression

| $R_{c2}/R_{c4}$ | 0.460 |
|---|---|

Figure 63:
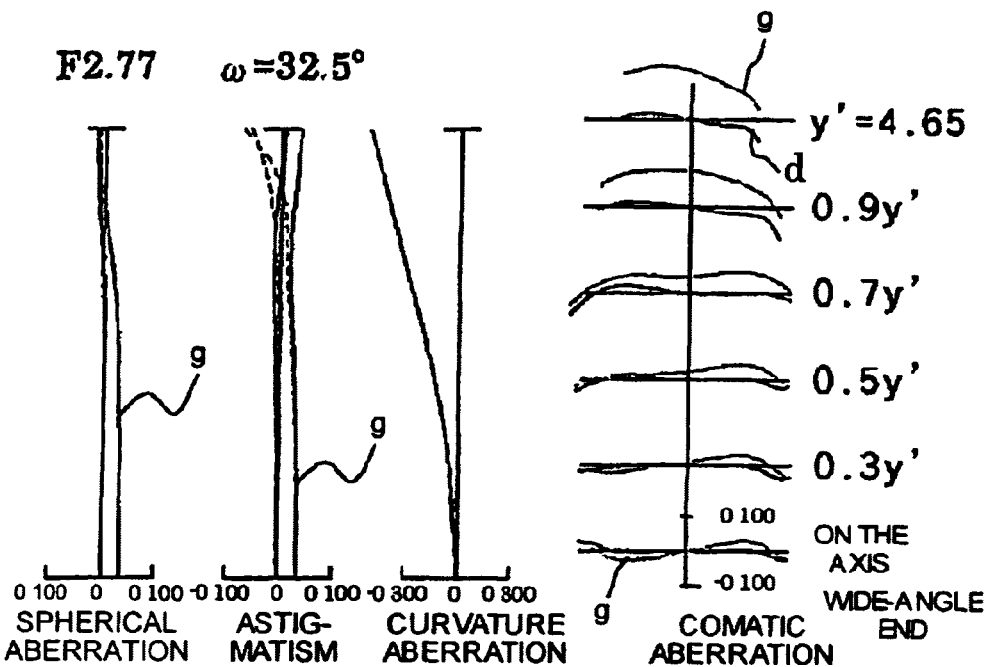
FIG. 63 is a set of graphs for illustrating aberration characteristics of the zoom lens shown in FIG. 59 at the short focal-length side.
Figure 64:
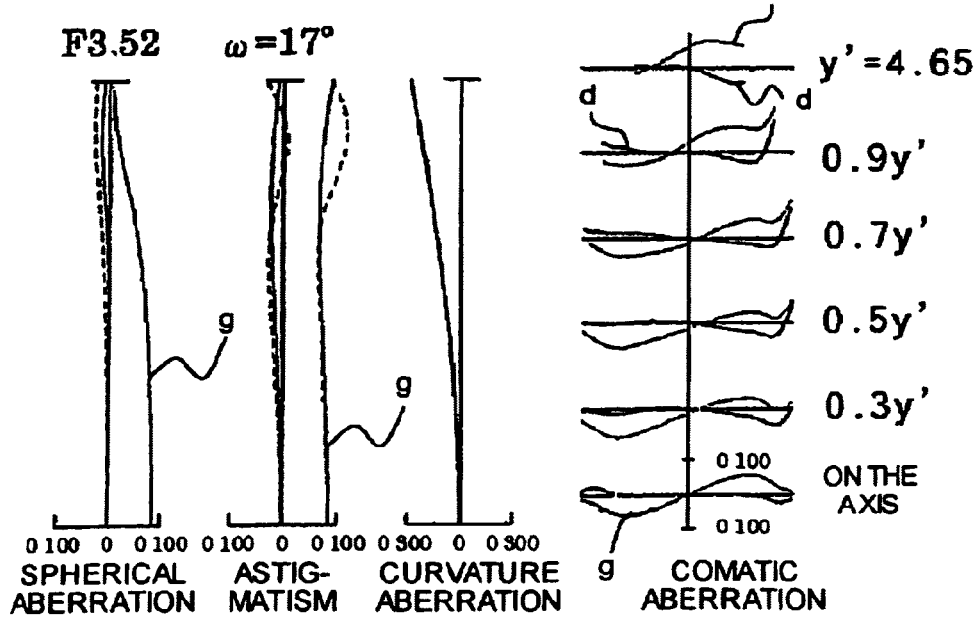
FIG. 64 is a set of graphs for illustrating aberration characteristics of the zoom lens shown in FIG. 59 at the mean focal-length side.
Figure 65:
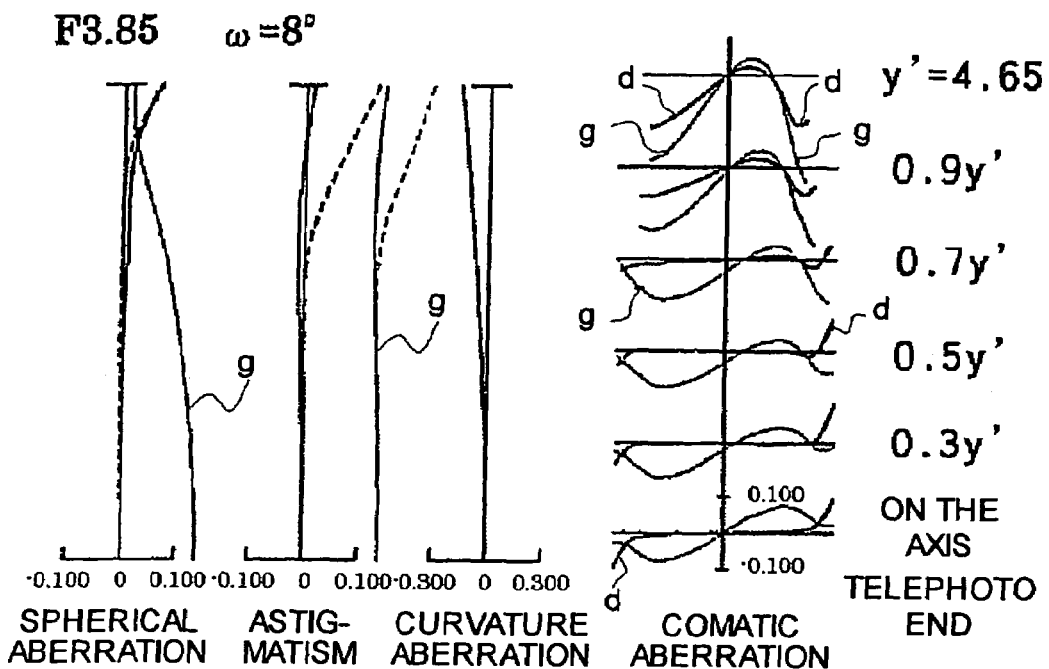
FIG. 65 is a set of graphs for illustrating aberration characteristics of the zoom lens shown in FIG. 59 at the long focal-length side.

The aberration diagrams at the wide-angle end (short focal end), the mean focal length, and the telephoto end (long focal end) according to example 4-1 are respectively illustrated in FIG. 63 to FIG. 65.

Figure 60:
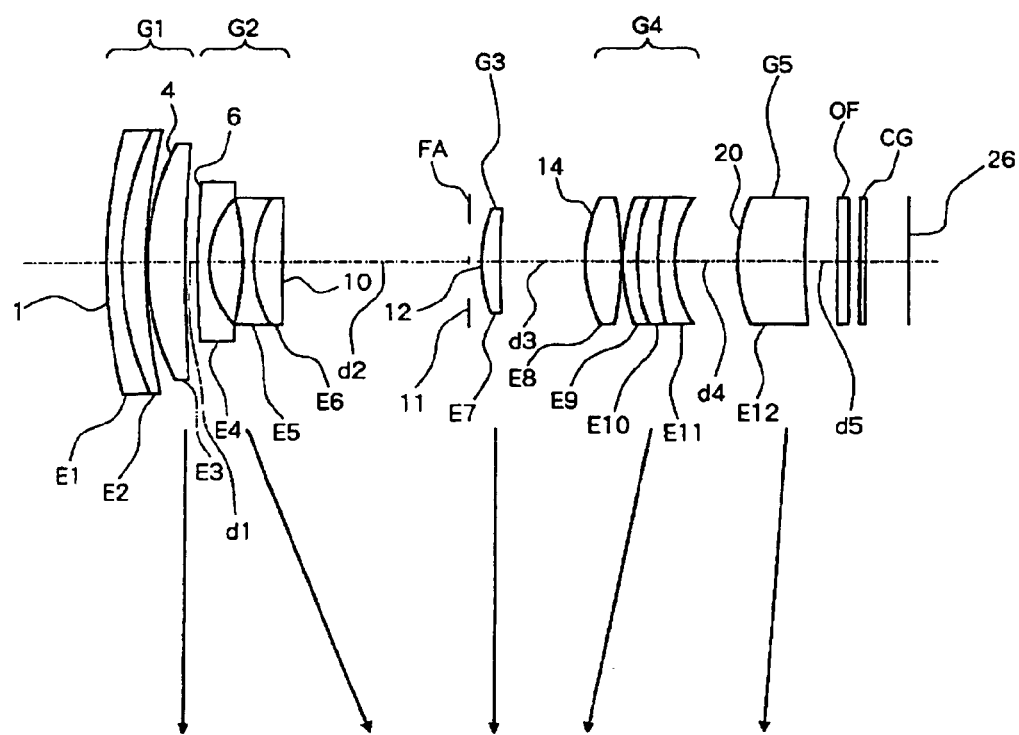
FIG. 60 is a schematic diagram of an optical system of example 4-2 of the zoom lens according to the sixth embodiment.

FIG. 60 is a schematic diagram of an optical system of example 4-2 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, a diaphragm FA, an optical filter OF, and a cover glass CG. In this case, the first to the third lenses E1 to E3 constitute the first group optical system G1, the fourth to the seventh lenses E4 to E7 constitute the second group optical system G2, the eighth lens E8 constitutes the third group optical system G3, the ninth to the eleventh lenses E9 to E11 constitute the fourth group optical system G4, and the twelfth lens E12 constitutes the fifth group optical system G5.

The respective lenses are supported by an appropriate common support frame or the like for each lens group, and at the time of zooming, each group optical system integrally operates. In FIG. 60, parts of surface numbers that are assigned to each optical surface are shown for reference. The respective reference signs in FIG. 60 are used independently for each example, in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the seventh lens E7, the diaphragm FA, the eighth lens E8, the ninth lens E9, the tenth lens E10, the eleventh lens E11, the twelfth lens E12, an thirteenth E13, the optical filter OF, and the cover glass CG are arranged in order from the object side of a subject or the like to the image-surface side, and an image is formed at the back of the cover glass CG.

The first lens E1 is a negative meniscus lens formed in a convex shape on the object side, the second lens E2 is a positive meniscus lens formed in a convex shape on the object side, and the third lens E3 is a positive lens including a double-convex lens. The first lens E1 and the second lens E2 form a densely cemented doublet, and the first group optical system G1 formed of the first to the third lenses E1 to E3 exhibits a positive focal length as a whole.

The fourth lens E4 is a negative lens including a double-concave lens, the fifth lens E5 is a negative lens including a double-concave lens, the sixth lens E6 is a positive lens including a double-convex lens, and the seventh lens E7 is a negative lens including a double-concave lens. The second group optical system G2 formed of the fourth to the seventh lenses E4 to E7 exhibits a negative focal length as a whole.

The eighth lens E8 is a positive meniscus lens formed in a convex shape on the object side and only the eighth lens E8 forms the third group optical system G3 that exhibits a positive focal length. The ninth lens E9 is a positive lens including a double-convex lens, the tenth lens E10 is a positive lens including a double-convex lens, and the eleventh lens E11 is a negative lens including a double-concave lens. The tenth to the eleventh lenses E10 to E11 form a densely cemented doublet, and the fourth group optical system G4 formed of the ninth to the eleventh lenses E9 to E11 exhibits a positive focal length as a whole. The twelfth lens E12 is a positive lens including a double-convex lens and only the twelfth lens E12 forms the fifth group optical system G5 that exhibits a positive focal length. The diaphragm FA arranged between the second group optical system G2 and the third group optical system G3 is integrally retained with the third group optical system G3 while keeping the distance from the third group optical system G3 constant.

On a side of the image surface of the twelfth lens E12 of the fifth group optical system G5, the optical filter OF that includes various optical filtering functions and the cover glass CG that protects an input surface of a solid image element are arranged in order toward the image-surface side and retained integrally with the solid image element.

The fourth surface, being a surface on the object side of the third lens E3 located closest to the image-surface side in the first group optical system G1, the sixth surface, being a surface on the object side of the fourth lens E4 located closest to the object side in the second group optical system G2, the thirteenth surface, being a surface on the object side of the eighth lens E8 that forms the third group optical system G3, the fifteenth surface, being a surface on the object side of the ninth lens E9 located closest to the object side in the fourth group optical system G4, and the twentieth surface, being a surface on the object side of the twelfth lens E12 that forms the fifth group optical system G5 are respectively aspheric surfaces.

In example 4-2, the focal length f of the whole system, the F number F, and the half angle of view, ω, respectively change in the range of f=7.400 to 71.776, F=3.200 to 4.400, and ω=33.512 to 3.707. The optical characteristics relating to the respective optical surfaces and the optical elements are as shown in the following table.

TABLE 61

Optical characteristics

| | R | D | $N_d$ | $v_d$ | Note |
|---|---|---|---|---|---|
| 1 | 47.161 | 1.200 | 1.84666 | 23.78 | First lens |
| 2 | 23.691 | 1.839 | 1.62041 | 60.34 | Second lens |
| 3 | 38.330 | 0.100 | | | |
| 4 | 18.603 | 2.988 | 1.72916 | 54.67 | Third lens |
| 5 | 524.119 | d1 | | | |
| 6 | 184.692 | 0.800 | 1.834 | 37.34 | Fourth lens |
| 7 | 6.747 | 2.418 | | | |
| 8 | −14.187 | 0.804 | 1.48749 | 70.44 | Fifth lens |
| 9 | 9.514 | 2.187 | 1.80518 | 25.46 | Sixth lens |
| 10 | 216.270 | 13.637 | d2 | | |
| 11 | Diaphragm | 1.033 | | | |
| 12 | 11.374 | 1.293 | 1.48749 | 70.44 | Seventh lens |
| 13 | 27.483 | d3 | | | |
| 14 | 10.783 | 2.744 | 1.48749 | 70.44 | Eighth lens |
| 15 | −17.861 | 0.108 | | | |
| 16 | 16.243 | 1.095 | 1.92300 | 20.90 | Ninth lens |
| 17 | 13.963 | 1.483 | 1.48700 | 70.40 | Tenth lens |
| 18 | 20.000 | 1.318 | 1.92300 | 20.90 | Eleventh lens |
| 19 | 8.652 | d4 | | | |
| 20 | 12.261 | 5.116 | 1.48749 | 70.44 | Twelfth lens |
| 21 | 442.676 | d5 | | | |
| 22 | Plane | 0.927 | 1.54892 | 69.31 | Filter |
| 23 | Plane | 0.800 | | | |
| 24 | Plane | 0.500 | 1.50000 | 64.00 | cover glass |
| 25 | Plane | | | | |

The respective optical surfaces on the fourth surface, the sixth surface, the thirteenth surface, the fifteenth surface, and the twentieth surface in Table 61 are respectively aspheric surfaces, and parameters relating to the expression (26) on each aspheric surface are as follows.

TABLE 62

Coefficient of aspheric surface

| | K | $A_4$ | $A_6$ | $A_8$ | $A_{10}$ |
|---|---|---|---|---|---|
| 4 | −0.282 | −3.799E−06 | −2.563E−09 | −1.714E−10 | 7.389E−13 |
| 6 | 541.182 | 6.866E−05 | −7.206E−07 | 2.180E−10 | −2.017E−11 |
| 12 | −2.300 | 1.074E−04 | −2.446E−06 | 1.228E−07 | −4.807E−09 |
| 14 | −1.588 | −8.454E−05 | 8.975E−07 | −4.394E−08 | 6.855E−10 |
| 20 | −1.184 | −3.805E−05 | −2.098E−06 | 8.476E−08 | −1.030E−09 |

The interval d1 between the first group optical system G1 and the second group optical system G2, the interval d2 between the second group optical system G2 and the diaphragm FA, the interval d3 between the third group optical system G3 and the fourth group optical system G4, the interval d4 between the fourth group optical system G4 and the fifth group optical system G5, and the interval d5 between the fifth group optical system G5 and the optical filter OF are variable, and these variable intervals d1, d2, d3, d4, and d5 are changed as shown in the following table, corresponding to the focal length f of the whole system, accompanying zooming.

TABLE 63

Variable intervals

| | f | d1 | d2 | d3 | d4 | d5 |
|---|---|---|---|---|---|---|
| Wide | 7.697 | 1.000 | 13.637 | 6.606 | 4.661 | 2.208 |
| Mean | 15.250 | 7.575 | 7.067 | 3.358 | 5.325 | 5.862 |
| Tele | 33.102 | 13.616 | 1.020 | 1.000 | 4.438 | 9.135 |

The parameter values according to the conditional expression (24) of the present invention in example 4-2 are as shown in the following table, and within the range of the conditional expression.

TABLE 64

Parameter values in the conditional expression

| $R_{c2}/R_{c4}$ | 0.698 |
|---|---|

Figure 66:
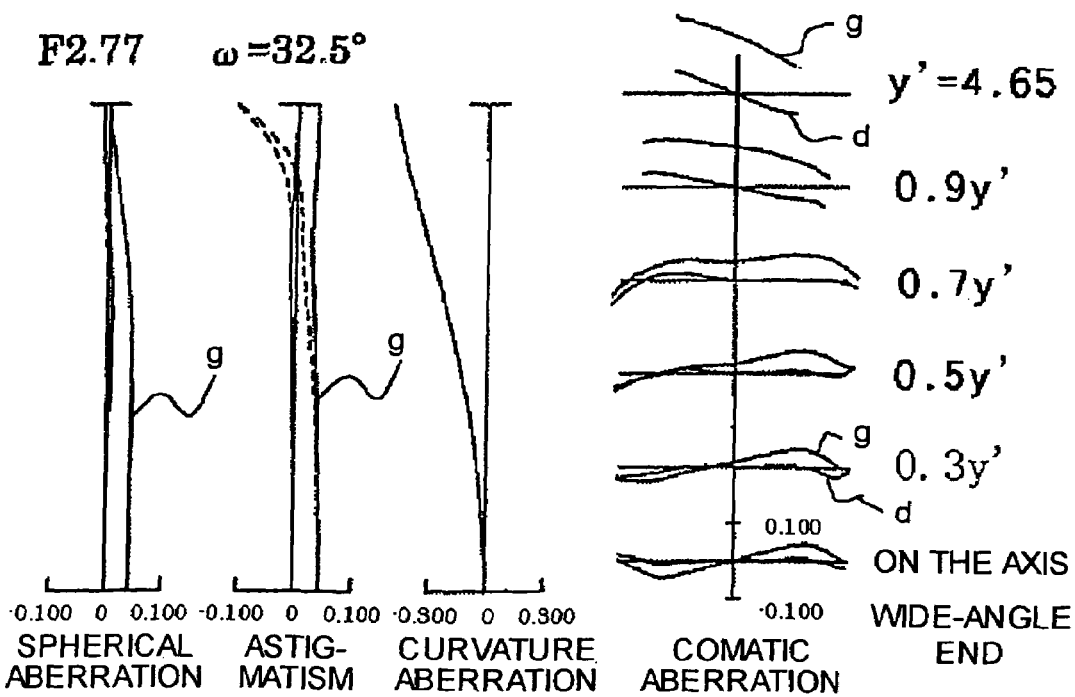
FIG. 66 is a set of graphs for illustrating aberration characteristics of the zoom lens shown in FIG. 60 at the short focal-length side.
Figure 67:
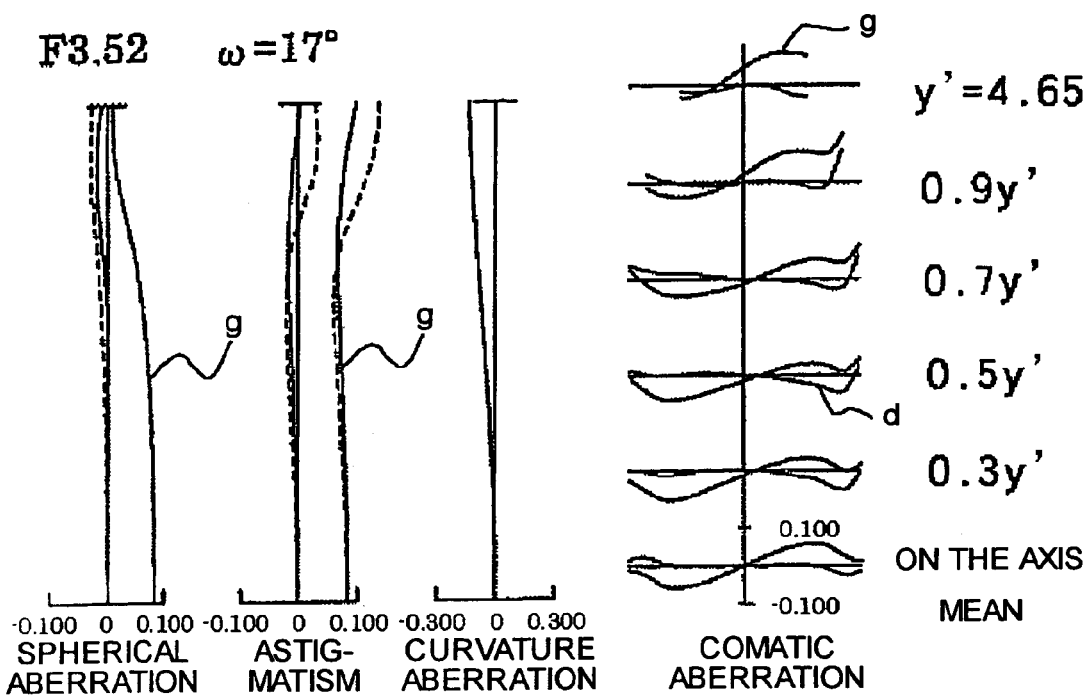
FIG. 67 is a set of graphs for illustrating aberration characteristics of the zoom lens shown in FIG. 60 at the mean focal-length side.
Figure 68:
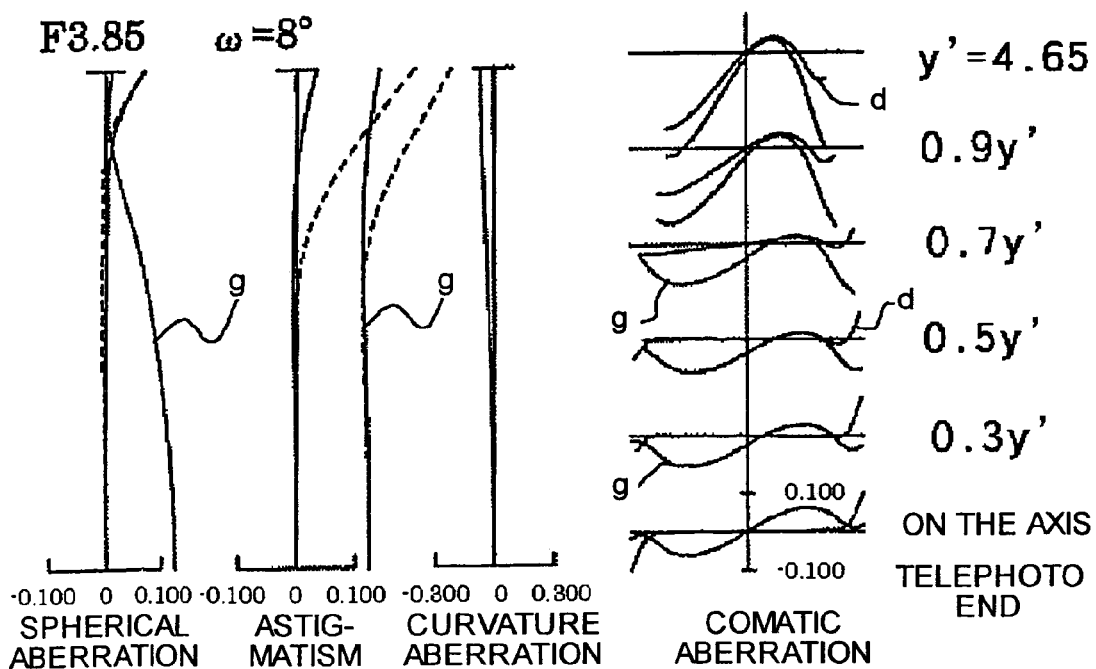
FIG. 68 is a set of graphs for illustrating aberration characteristics of the zoom lens shown in FIG. 60 at the long focal-length side.

The aberration diagrams at the wide-angle end (short focal end), the mean focal length, and the telephoto end (long focal end) according to example 4-2 are respectively illustrated in FIG. 66 to FIG. 68.

Figure 61:
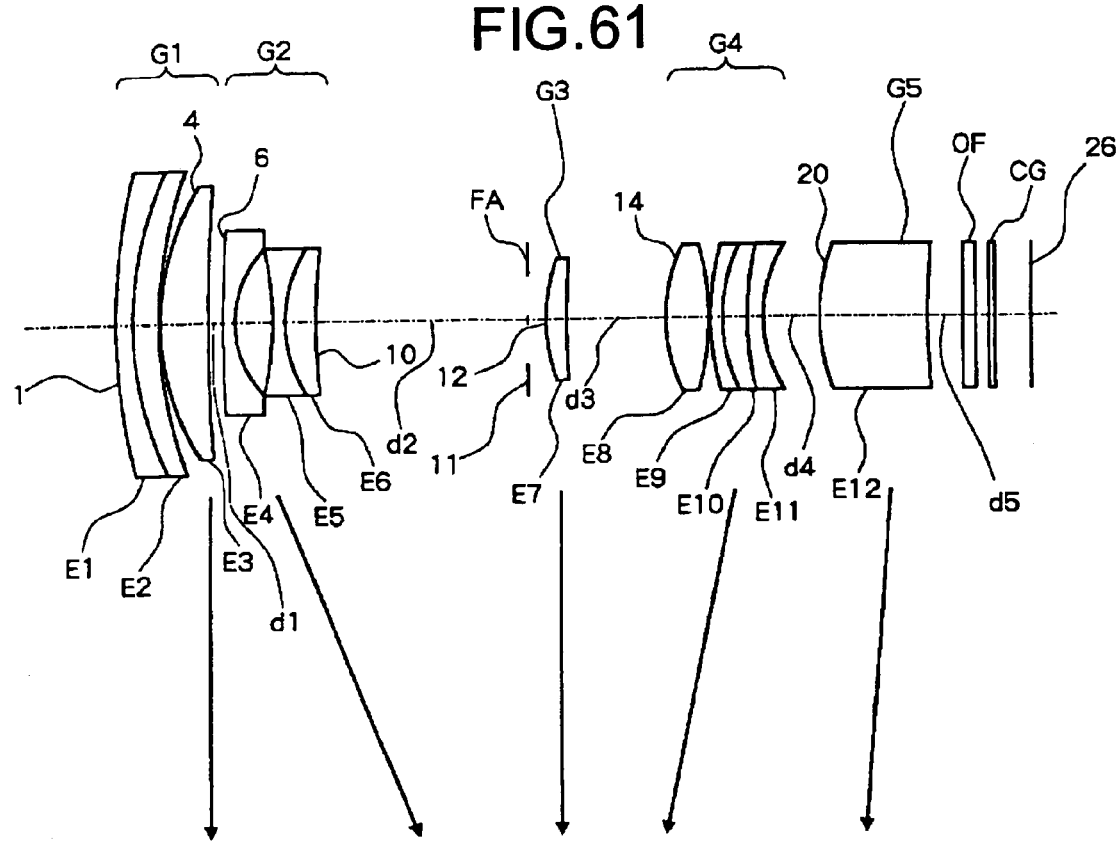
FIG. 61 is a schematic diagram of an optical system of example 4-3 of the zoom lens according to the sixth embodiment.

FIG. 61 is a schematic diagram of an optical system of example 4-3 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, a diaphragm FA, an optical filter OF, and a cover glass CG. In this case, the first to the third lenses E1 to E3 constitute the first group optical system G1, the fourth to the seventh lenses E4 to E7 constitute the second group optical system G2, the eighth lens E8 constitutes the third group optical system G3, the ninth to the eleventh lenses E9 to E11 constitute the fourth group optical system G4, and the twelfth lens E12 constitutes the fifth group optical system G5.

The respective lenses are supported by an appropriate common support frame or the like for each lens group, and at the time of zooming, each group optical system integrally operates. In FIG. 61, parts of surface numbers that are assigned to each optical surface are shown for reference. The respective reference signs in FIG. 61 are used independently for each example, in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the seventh lens E7, the diaphragm FA, the eighth lens E8, the ninth lens E9, the tenth lens E10, the eleventh lens E11, the twelfth lens E12, an thirteenth E13, the optical filter OF, and the cover glass CG are arranged in order from the object side of a subject or the like to the image-surface side, and an image is formed at the back of the cover glass CG.

The first lens E1 is a negative meniscus lens formed in a convex shape on the object side, the second lens E2 is a positive meniscus lens formed in a convex shape on the object side, and the third lens E3 is a positive meniscus lens formed in a convex shape on the object side. The first lens E1 and the second lens E2 form a densely cemented doublet, and the first group optical system G1 formed of the first to the third lenses E1 to E3 exhibits a positive focal length as a whole.

The fourth lens E4 is a negative lens including a double-concave lens, the fifth lens E5 is a negative lens including a double-concave lens, the sixth lens E6 is a positive lens including a double-convex lens, and the seventh lens E7 is a negative lens including a double-concave lens. The second group optical system G2 formed of the fourth to the seventh lenses E4 to E7 exhibits a negative focal length as a whole.

The eighth lens E8 is a positive meniscus lens formed in a convex shape on the object side and only the eighth lens E8 forms the third group optical system G3 that exhibits a positive focal length. The ninth lens E9 is a positive lens including a double-convex lens, the tenth lens E10 is a positive lens including a double-convex lens, and the eleventh lens E11 is a negative lens including a double-concave lens. The tenth to the eleventh lenses E10 to E11 form a densely cemented doublet, and the fourth group optical system G4 formed of the ninth to the eleventh lenses E9 to E11 exhibits a positive focal length as a whole. The twelfth lens E12 is a positive meniscus lens formed in a convex shape on the object side and only the twelfth lens E12 forms the fifth group optical system G5 that exhibits a positive focal length. The diaphragm FA arranged between the second group optical system G2 and the third group optical system G3 is integrally retained with the third group optical system G3 while keeping the distance from the third group optical system G3 constant.

On a side of the image surface of the twelfth lens E12 of the fifth group optical system G5, the optical filter OF that includes various optical filtering functions and the cover glass CG that protects an input surface of a solid image element are arranged in order toward the image-surface side and retained integrally with the solid image element.

The fourth surface, being a surface on the object side of the third lens E3 located closest to the image-surface side in the first group optical system G1, the sixth surface, being a surface on the object side of the fourth lens E4 located closest to the object side in the second group optical system G2, the thirteenth surface, being a surface on the object side of the eighth lens E8 that forms the third group optical system G3, the fifteenth surface, being a surface on the object side of the ninth lens E9 located closest to the object side in the fourth group optical system G4, and the twentieth surface, being a surface on the object side of the twelfth lens E12 that forms the fifth group optical system G5 are respectively aspheric surfaces.

In example 4-3, the focal length f of the whole system, the F number F, and the half angle of view, ω, respectively change in the range of f=7.4 to 71.78, F=3.1 to 4.3, and ω=33.511 to 3.707. The optical characteristics relating to the respective optical surfaces and the optical elements are as shown in the following table.

TABLE 65

Optical characteristics

|   | R | D | $N_d$ | $v_d$ | Note |
|---|---|---|---|---|---|
| 1 | 43.559 | 1.200 | 1.84666 | 23.78 | First lens |
| 2 | 23.072 | 1.758 | 1.62041 | 60.34 | Second lens |
| 3 | 34.177 | 0.100 | | | |
| 4 | 17.934 | 2.983 | 1.72916 | 54.67 | Third lens |
| 5 | 197.504 | d1 | | | |
| 6 | 144.256 | 0.800 | 1.834 | 37.34 | Fourth lens |
| 7 | 6.811 | 2.436 | | | |
| 8 | −16.739 | 0.800 | 1.48749 | 70.44 | Fifth lens |
| 9 | 9.138 | 2.027 | 1.80518 | 25.46 | Sixth lens |
| 10 | 89.180 | d2 | | | |
| 11 | Diaphragm | 1.223 | | | |
| 12 | 11.254 | 1.368 | 1.48749 | 70.44 | Seventh lens |
| 13 | 32.211 | d3 | | | |
| 14 | 10.567 | 2.831 | 1.48749 | 70.44 | Eighth lens |
| 15 | −17.288 | 0.100 | | | |
| 16 | 21.737 | 0.800 | 1.60300 | 38.00 | Ninth lens |
| 17 | 11.694 | 1.652 | 1.48700 | 70.40 | Tenth lens |
| 18 | 20.000 | 0.978 | 1.92300 | 20.90 | Eleventh lens |
| 19 | 9.504 | d4 | | | |
| 20 | 11.960 | 7.034 | 1.48749 | 70.44 | Twelfth lens |
| 21 | 72.212 | d5 | | | |
| 22 | Plane | 0.927 | 1.54892 | 69.31 | Filter |
| 23 | Plane | 0.800 | | | |
| 24 | Plane | 0.500 | 1.50000 | 64.00 | cover glass |
| 25 | Plane | | | | |

The respective optical surfaces on the fourth surface, the sixth surface, the thirteenth surface, the fifteenth surface, and the twentieth surface in Table 65 are respectively aspheric surfaces, and parameters relating to the expression (26) on each aspheric surface are as follows.

TABLE 66

Coefficient of aspheric surface

|   | K | $A_4$ | $A_6$ | $A_8$ | $A_{10}$ |
|---|---|---|---|---|---|
| 4 | −0.273 | −3.577E−06 | 1.296E−09 | −2.017E−10 | 8.571E−13 |
| 6 | 378.650 | 6.767E−05 | −9.957E−07 | 1.095E−08 | −2.145E−10 |
| 12 | −2.230 | 1.111E−04 | −3.230E−06 | 1.823E−07 | −6.120E−09 |
| 14 | −1.590 | −8.528E−05 | 6.634E−07 | −4.513E−08 | 7.328E−10 |
| 20 | −1.305 | −4.698E−05 | −2.384E−06 | 9.838E−08 | −1.359E−09 |

The interval d1 between the first group optical system G1 and the second group optical system G2, the interval d2 between the second group optical system G2 and the diaphragm FA, the interval d3 between the third group optical system G3 and the fourth group optical system G4, the interval d4 between the fourth group optical system G4 and the fifth group optical system G5, and the interval d5 between the fifth group optical system G5 and the optical filter OF are variable, and these variable intervals d1, d2, d3, d4, and d5 are changed as shown in the following table, corresponding to the focal length f of the whole system, accompanying zooming.

TABLE 67

Variable intervals

|   | f | d1 | d2 | d3 | d4 | d5 |
|---|---|---|---|---|---|---|
| Wide | 7.699 | 1.000 | 14.123 | 6.740 | 3.783 | 2.220 |
| Mean | 15.247 | 7.828 | 7.295 | 3.383 | 4.658 | 5.874 |
| Tele | 33.105 | 14.072 | 1.050 | 1.000 | 3.582 | 9.089 |

The parameter values according to the conditional expression (24) of the present invention in example 4-3 are as shown in the following table, and within the range of the conditional expression.

TABLE 68

Parameter values in the conditional expression

| $R_{c2}/R_{c4}$ | 0.598 |
|---|---|

Figure 69:
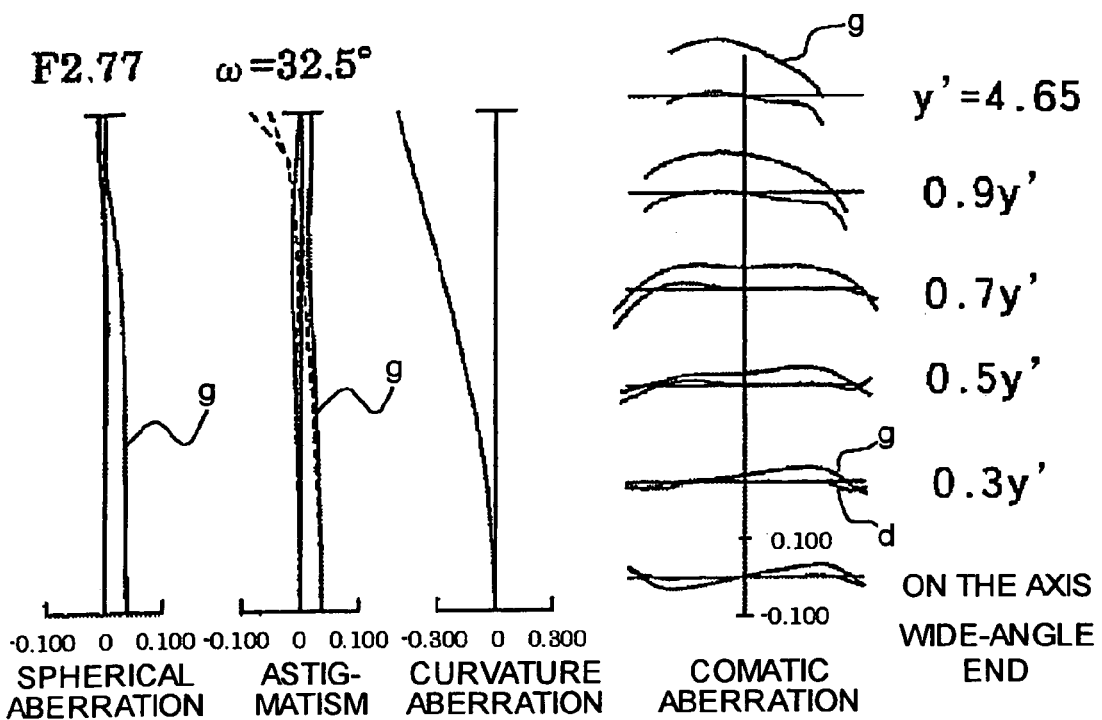
FIG. 69 is a set of graphs for illustrating aberration characteristics of the zoom lens shown in FIG. 61 at the short focal-length side.
Figure 70:
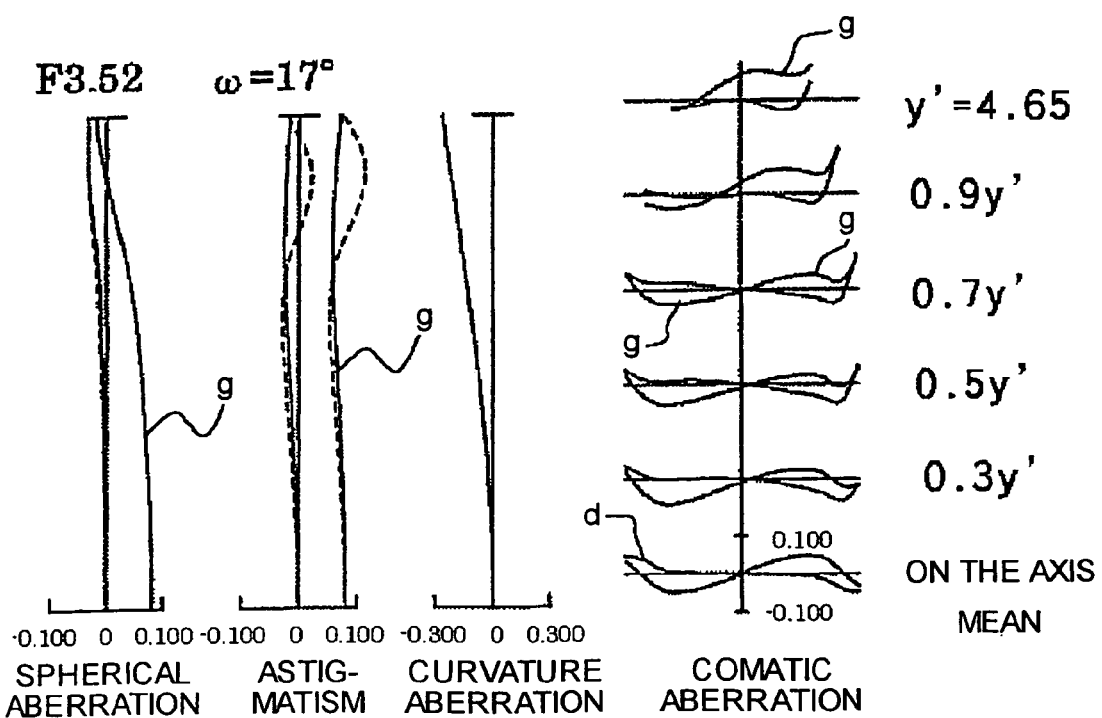
FIG. 70 is a set of graphs for illustrating aberration characteristics of the zoom lens shown in FIG. 61 at the mean focal-length side.
Figure 71:
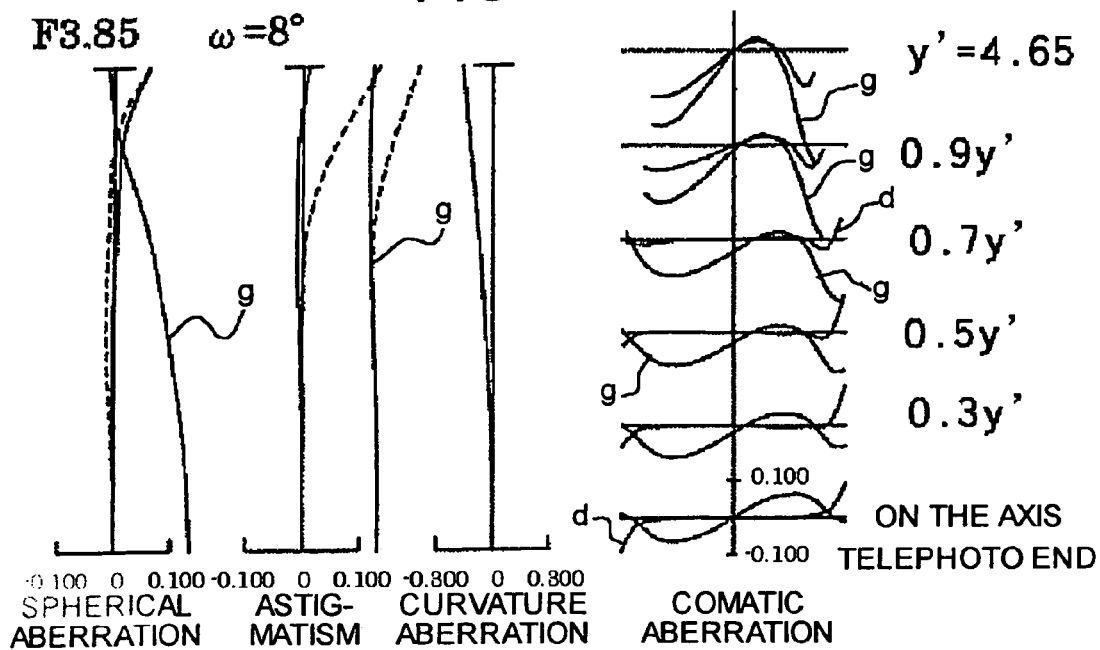
FIG. 71 is a set of graphs for illustrating aberration characteristics of the zoom lens shown in FIG. 61 at the long focal-length side.

The aberration diagrams at the wide-angle end (short focal end), the mean focal length, and the telephoto end (long focal end) according to example 4-3 are respectively illustrated in FIG. 69 to FIG. 71.

Figure 62:
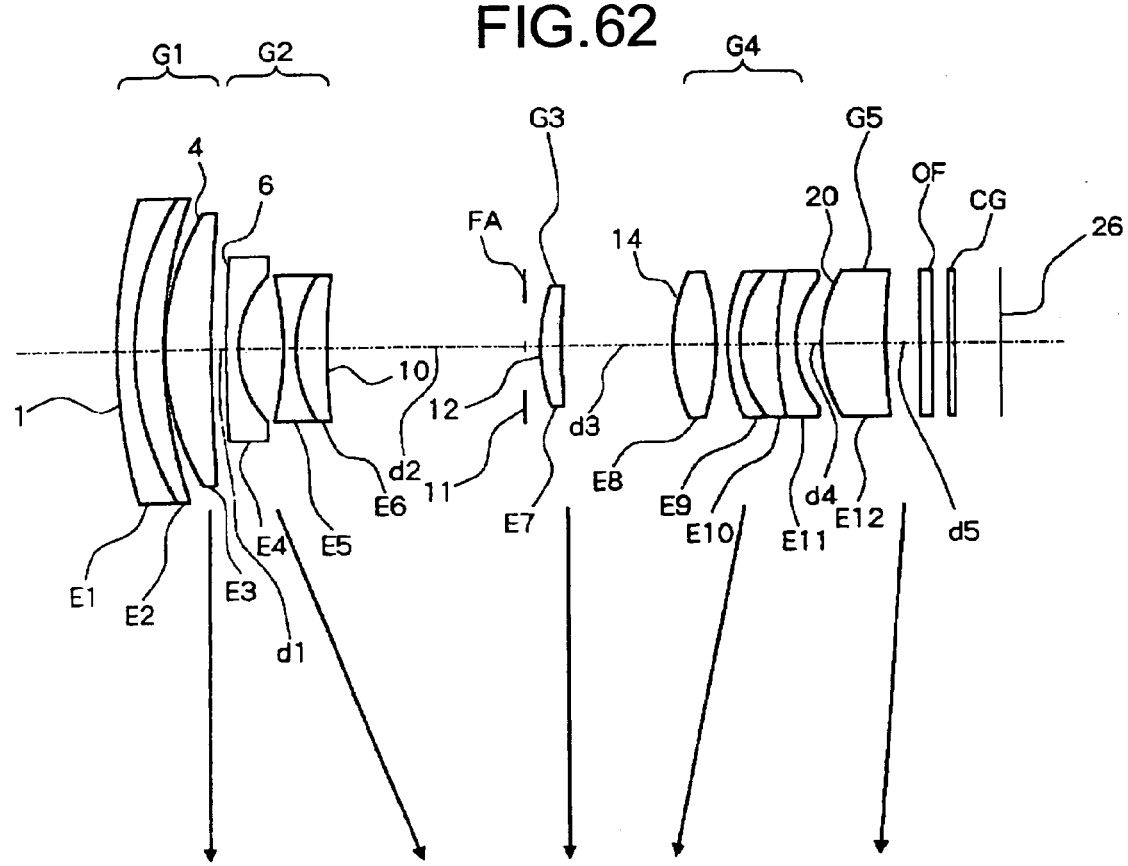
FIG. 62 is a schematic diagram of an optical system of example 4-4 of the zoom lens according to the sixth embodiment.

FIG. 62 is a schematic diagram of an optical system of example 4-4 of a zoom lens according to the present invention. The zoom lens includes a first lens E1, a second lens E2, a third lens E3, a fourth lens E4, a fifth lens E5, a sixth lens E6, a seventh lens E7, an eighth lens E8, a ninth lens E9, a tenth lens E10, an eleventh lens E11, a twelfth lens E12, a diaphragm FA, an optical filter OF, and a cover glass CG. In this case, the first to the third lenses E1 to E3 constitute the first group optical system G1, the fourth to the seventh lenses E4 to E7 constitute the second group optical system G2, the eighth lens E8 constitutes the third group optical system G3, the ninth to the eleventh lenses E9 to E11 constitute the fourth group optical system G4, and the twelfth lens E12 constitutes the fifth group optical system G5.

The respective lenses are supported by an appropriate common support frame or the like for each lens group, and at the time of zooming, each group optical system integrally operates. In FIG. 62, parts of surface numbers that are assigned to each optical surface are shown for reference. The respective reference signs in FIG. 62 are used independently for each example, in order to avoid complexity due to an increase in number of digits of the reference signs. Therefore, even when a common reference sign is given, it is not always a common configuration to other examples.

For example, the first lens E1, the second lens E2, the third lens E3, the fourth lens E4, the fifth lens E5, the sixth lens E6, the seventh lens E7, the diaphragm FA, the eighth lens E8, the ninth lens E9, the tenth lens E10, the eleventh lens E11, the twelfth lens E12, an thirteenth E13, the optical filter OF, and the cover glass CG are arranged in order from the object side of a subject or the like to the image-surface side, and an image is formed at the back of the cover glass CG.

The first lens E1 is a negative meniscus lens formed in a convex shape on the object side, the second lens E2 is a positive meniscus lens formed in a convex shape on the object side, and the third lens E3 is a positive lens including a double-convex lens. The first lens E1 and the second lens E2 form a densely cemented doublet, and the first group optical system G1 formed of the first to the third lenses E1 to E3 exhibits a positive focal length as a whole.

The fourth lens E4 is a negative lens including a double-concave lens, the fifth lens E5 is a negative lens including a double-concave lens, the sixth lens E6 is a positive lens including a double-convex lens, and the seventh lens E7 is a negative lens including a double-concave lens. The second group optical system G2 formed of the fourth to the seventh lenses E4 to E7 exhibits a negative focal length as a whole.

The eighth lens E8 is a positive meniscus lens formed in a convex shape on the object side and only the eighth lens E8 forms the third group optical system G3 that exhibits a positive focal length. The ninth lens E9 is a positive lens including a double-convex lens, the tenth lens E10 is a positive lens including a double-convex lens, and the eleventh lens E11 is a negative lens including a double-concave lens. The tenth to the eleventh lenses E10 to E11 form a densely cemented doublet, and the fourth group optical system G4 formed of the ninth to the eleventh lenses E9 to E11 exhibits a positive focal length as a whole. The twelfth lens E12 is a positive meniscus lens formed in a convex shape on the object side and only the twelfth lens E12 forms the fifth group optical system G5 that exhibits a positive focal length. The diaphragm FA arranged between the second group optical system G2 and the third group optical system G3 is integrally retained with the third group optical system G3 while keeping the distance from the third group optical system G3 constant.

On a side of the image surface of the twelfth lens E12 of the fifth group optical system G5, the optical filter OF that includes various optical filtering functions and the cover glass CG that protects an input surface of a solid image element are arranged in order toward the image-surface side and retained integrally with the solid image element.

The fourth surface, being a surface on the object side of the third lens E3 located closest to the image-surface side in the first group optical system G1, the sixth surface, being a surface on the object side of the fourth lens E4 located closest to the object side in the second group optical system G2, the thirteenth surface, being a surface on the object side of the eighth lens E8 that forms the third group optical system G3, the fifteenth surface, being a surface on the object side of the ninth lens E9 located closest to the object side in the fourth group optical system G4, and the twentieth surface, being a surface on the object side of the twelfth lens E12 that forms the fifth group optical system G5 are respectively aspheric surfaces.

In example 4-4, the focal length f of the whole system, the F number F, and the half angle of view, ω, respectively change in the range of f=7.4 to 71.774, F=3.2 to 4.4, and ω=33.511 to 3.707. The optical characteristics relating to the respective optical surfaces and the optical elements are as shown in the following table.

TABLE 69

Optical characteristics

|    | R       | D     | $N_d$   | $\nu_d$ | Note        |
|----|---------|-------|---------|---------|-------------|
| 1  | 34.036  | 1.200 | 1.84666 | 23.78   | First lens  |
| 2  | 19.769  | 1.966 | 1.62041 | 60.34   | Second lens |
| 3  | 30.362  | 0.100 |         |         |             |
| 4  | 17.339  | 3.019 | 1.72916 | 54.67   | Third lens  |
| 5  | 195.185 | d1    |         |         |             |
| 6  | 230.407 | 0.800 | 1.83400 | 37.34   | Fourth lens |
| 7  | 6.777   | 2.937 |         |         |             |
| 8  | −19.058 | 0.800 | 1.48749 | 70.44   | Fifth lens  |
| 9  | 8.914   | 1.920 | 1.80518 | 25.46   | Sixth lens  |
| 10 | 54.357  | d2    |         |         |             |
| 11 | Diaphragm | 1.000 |       |         |             |

TABLE 69-continued

Optical characteristics

|    | R       | D     | $N_d$   | $\nu_d$ | Note          |
|----|---------|-------|---------|---------|---------------|
| 12 | 12.162  | 1.361 | 1.48749 | 70.44   | Seventh lens  |
| 13 | 58.506  | d3    |         |         |               |
| 14 | 11.347  | 2.840 | 1.48749 | 70.44   | Eighth lens   |
| 15 | −16.632 | 0.798 |         |         |               |
| 16 | 14.766  | 0.800 | 1.92300 | 20.90   | Ninth lens    |
| 17 | 8.792   | 2.289 | 1.48700 | 70.40   | Tenth lens    |
| 18 | 20.000  | 1.239 | 1.60300 | 38.00   | Eleventh lens |
| 19 | 7.317   | d4    |         |         |               |
| 20 | 9.728   | 3.929 | 1.48749 | 70.44   | Twelfth lens  |
| 21 | 36.166  | d5    |         |         |               |
| 22 | Plane   | 0.927 | 1.54892 | 69.31   | Filter        |
| 23 | Plane   | 0.800 |         |         |               |
| 24 | Plane   | 0.500 | 1.50000 | 64.00   | cover glass   |
| 25 | Plane   |       |         |         |               |

The respective optical surfaces on the fourth surface, the sixth surface, the thirteenth surface, the fifteenth surface, and the twentieth surface in Table 13 are respectively aspheric surfaces, and parameters relating to the expression (26) on each aspheric surface are as follows.

TABLE 70

Coefficient of aspheric surface

|    | K       | $A_4$       | $A_6$       | $A_8$       | $A_{10}$    |
|----|---------|-------------|-------------|-------------|-------------|
| 4  | −0.251  | −2.763E−06  | −6.163E−09  | −1.076E−10  | 3.020E−13   |
| 6  | 969.687 | 5.595E−05   | −3.115E−07  | −4.985E−09  | 1.574E−12   |
| 12 | −2.608  | 8.857E−05   | −2.893E−06  | 1.041E−07   | −2.967E−09  |
| 14 | −1.710  | −9.767E−05  | 8.163E−07   | −4.625E−08  | 7.683E−10   |
| 20 | −0.634  | 1.945E−05   | −1.746E−06  | 1.143E−07   | −9.014E−10  |

The interval d1 between the first group optical system G1 and the second group optical system G2, the interval d2 between the second group optical system G2 and the diaphragm FA, the interval d3 between the third group optical system G3 and the fourth group optical system G4, the interval d4 between the fourth group optical system G4 and the fifth group optical system G5, and the interval d5 between the fifth group optical system G5 and the optical filter OF are variable, and these variable intervals d1, d2, d3, d4, and d5 are changed as shown in the following table, corresponding to the focal length f of the whole system, accompanying zooming.

TABLE 71

Variable intervals

|      | f      | d1     | d2     | d3    | d4    | d5    |
|------|--------|--------|--------|-------|-------|-------|
| Wide | 7.700  | 1.000  | 12.913 | 7.359 | 1.656 | 2.268 |
| Mean | 15.251 | 6.989  | 6.905  | 3.623 | 3.915 | 3.363 |
| Tele | 33.113 | 12.816 | 1.077  | 1.000 | 4.680 | 4.721 |

The parameter values according to the conditional expression (24) of the present invention in example 4-4 are as shown in the following table, and within the range of the conditional expression.

TABLE 72

| Parameter values in the conditional expression | |
|---|---|
| $R_{c2}/R_{c4}$ | 0.44 |

Figure 72:
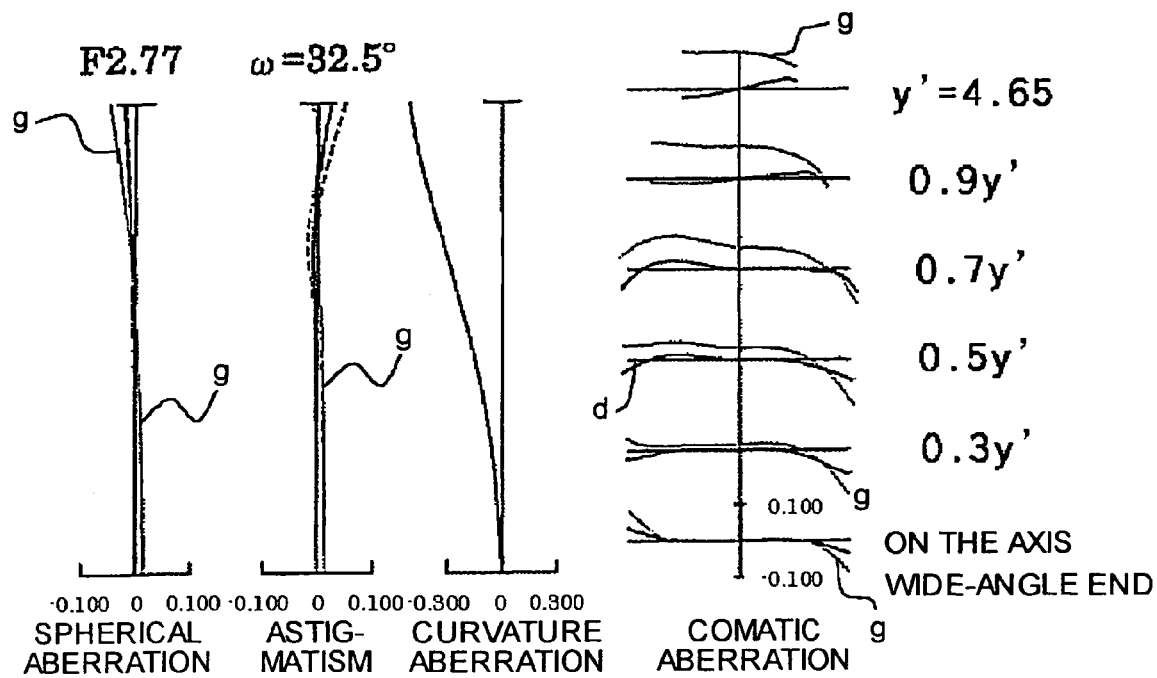
FIG. 72 is a set of graphs for illustrating aberration characteristics of the zoom lens shown in FIG. 62 at the short focal-length side.
Figure 73:
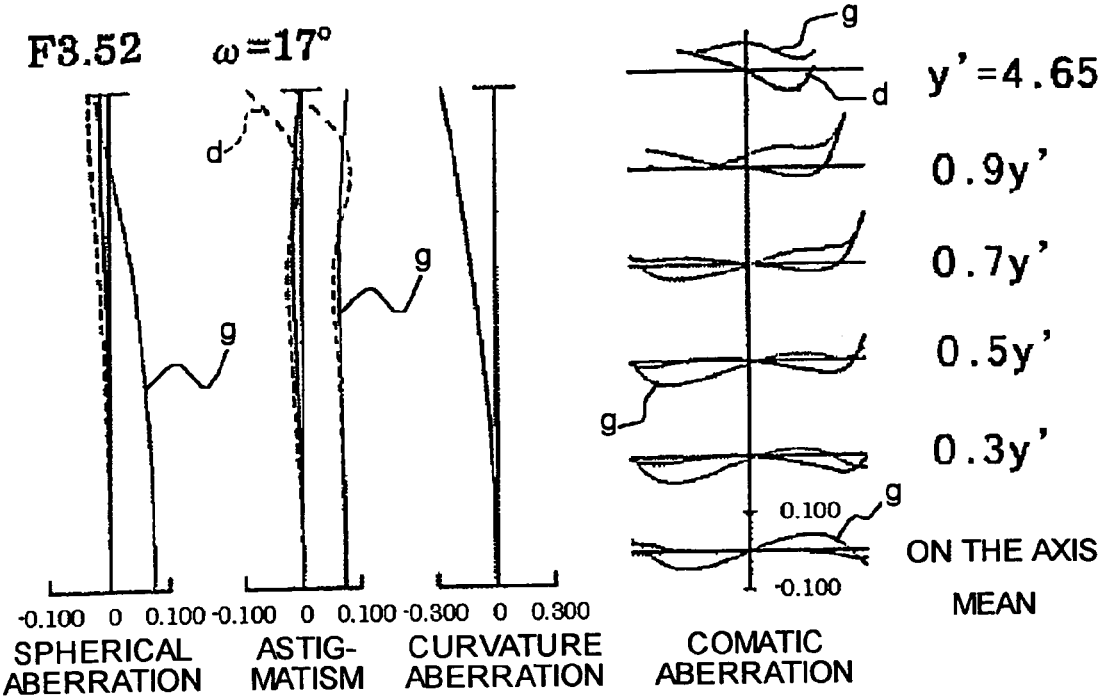
FIG. 73 is a set of graphs for illustrating aberration characteristics of the zoom lens shown in FIG. 62 at the mean focal-length side.
Figure 74:
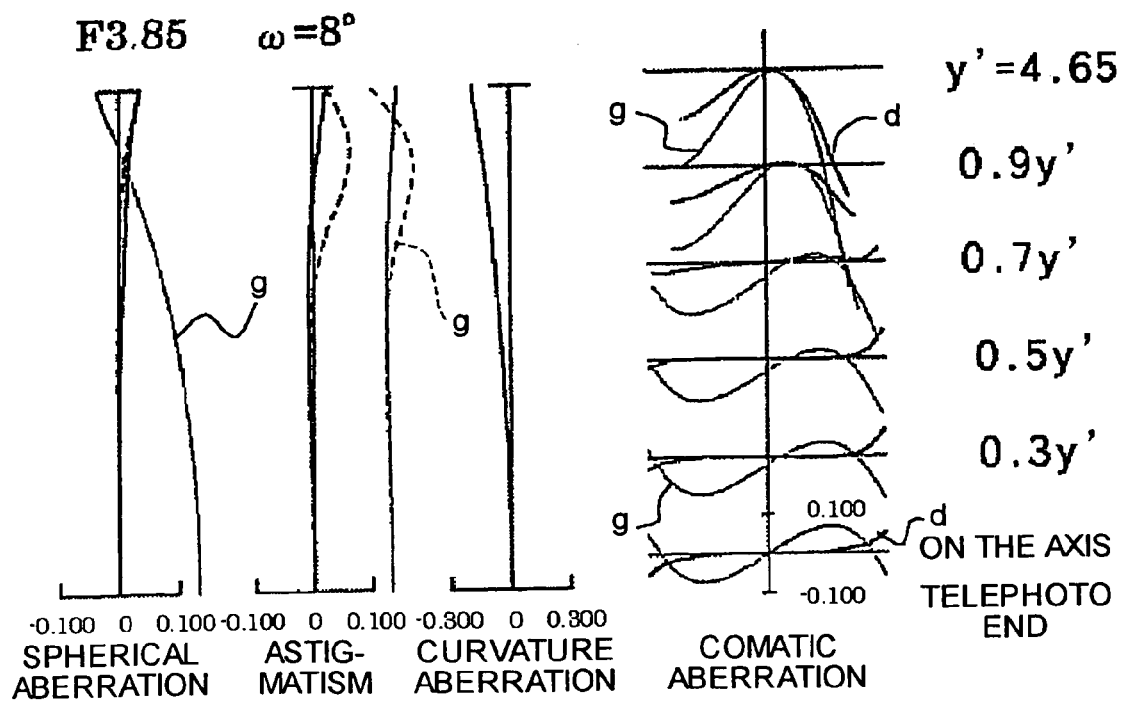
FIG. 74 is a set of graphs for illustrating aberration characteristics of the zoom lens shown in FIG. 62 at the long focal-length side.

The aberration diagrams at the wide-angle end (short focal end), the mean focal length, and the telephoto end (long focal end) according to example 4-4 are respectively illustrated in FIG. 72 to FIG. 74. In example 1 to example 4-4, as the lens material for all lenses, an optical glass that is chemically stable and does not contain any toxic substance such as lead or arsenic can be used, the materials can be recycled, without having water pollution due to waste fluid at the time of machining.

According to the sixth embodiment, a zoom lens, which is sufficiently small, can achieve a high magnification, and can obtain a high resolving power corresponding to the image capturing device with 3,000,000 to 5,000,000 pixels, a camera using the zoom lens as the shooting optical system, and a mobile information terminal using the zoom lens as the shooting optical system in the camera unit can be provided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A zoom lens comprising:
    a first group optical system having a positive refracting power;
    a second group optical system having a negative refracting power;
    a third group optical system having a positive refracting power; and
    a diaphragm that moves toward an object side integrally with the third group optical system, wherein
    the first group optical system, the second group optical system, and the third group optical system are sequentially arranged from the object side toward an image side,
    at least the first group optical system and the third group optical system moves in such a manner that a distance between the first group optical system and the second group optical system becomes minimum at a short focal-length side, and a distance between the second group optical system and the third group optical system becomes minimum at a long focal-length side, and
    the third group optical system includes a triplet lens formed by sequentially bonding a negative lens, a positive lens, and a negative lens.

2. The zoom lens according to claim 1, wherein a trace of a movement of the first group optical system between the short focal-length side and the long focal-length side makes a convex shape opening to the object side.

3. The zoom lens according to claim 2, wherein the first group optical system is closest to the image side at a mean focal-length side between the short focal-length side and the long focal-length side.

4. The zoom lens according to claim 1, wherein the negative lens, closest to the object side, of the triplet lens is formed with a strong concave opening to the image side.

5. The zoom lens according to claim 1, satisfying a relation $$0.6 < K12/(fw+ft) < 1.2$$

where K12 is changing amount of a distance between the first group optical system and the second group optical system, fw is a combined focal length of whole system at the short focal-length side, and ft is a combined focal length of the whole system at the long focal-length side.

6. The zoom lens according to claim 1, satisfying relations $$-0.22 < Np-Nn < 0 \text{ and } 3 < vp-vn < 36$$

where Np and vp are a refractive index and an Abbe constant of the positive lens of the triplet lens, respectively, and Nn and vn are an average of refractive indexes and an average of Abbe constants of the two negative lenses of the triplet lens.

7. The zoom lens according to claim 1, wherein the third group optical system further includes at least one positive lens at each of the object side and the image side of the triplet lens.

8. The zoom lens according to claim 7, wherein at least one positive lens from among the positive lenses arranged at the object side and the image side of the triplet lens is an aspheric lens.

9. The zoom lens according to claim 1, wherein each of the first group optical system and the second group optical system includes at least one positive lens and one negative lens.

10. A camera comprising a zoom lens as a shooting optical system, wherein the zoom lens includes
    a first group optical system having a positive refracting power;
    a second group optical system having a negative refracting power;
    a third group optical system having a positive refracting power; and
    a diaphragm that moves toward an object side integrally with the third group optical system, wherein
    the first group optical system, the second group optical system, and the third group optical system are sequentially arranged from the object side toward an image side,
    at least the first group optical system and the third group optical system moves in such a manner that a distance between the first group optical system and the second group optical system becomes minimum at a short focal-length side, and a distance between the second group optical system and the third group optical system becomes minimum at a long focal-length side, and
    the third group optical system includes a triplet lens formed by sequentially bonding a negative lens, a positive lens, and a negative lens.

11. The camera according to claim 10, wherein the camera is a digital camera.

12. A mobile information terminal comprising a zoom lens as a shooting optical system for a camera unit, wherein the zoom lens includes
    a first group optical system having a positive refracting power;
    a second group optical system having a negative refracting power;
    a third group optical system having a positive refracting power; and
    a diaphragm that moves toward an object side integrally with the third group optical system, wherein the first group optical system, the second group optical system, and the third group optical system are sequentially arranged from the object side toward an image side, at least the first group optical system and the third group optical system moves in such a manner that a distance between the first group optical system and the second group optical system becomes minimum at a short focal-length side, and a distance between the second group optical system and the third group optical system becomes minimum at a long focal-length side, and the third group optical system includes a triplet lens formed by sequentially bonding a negative lens, a positive lens, and a negative lens.

* * * * *